(12) United States Patent
Cirik et al.

(10) Patent No.: US 11,659,596 B2
(45) Date of Patent: *May 23, 2023

(54) RANDOM ACCESS PROCEDURES USING MULTIPLE ACTIVE BANDWIDTH PARTS

(71) Applicant: Comcast Cable Communications, LLC, Philadelphia, PA (US)

(72) Inventors: Ali Cirik, Herndon, VA (US); Esmael Hejazi Dinan, McLean, VA (US); Hua Zhou, Herndon, VA (US); Hyoungsuk Jeon, Centreville, VA (US); Alireza Babaei, Fairfax, VA (US); Kyungmin Park, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 326 days.

This patent is subject to a terminal disclaimer.

(21) Appl. No.: 16/950,631

(22) Filed: Nov. 17, 2020

(65) Prior Publication Data
US 2021/0176791 A1    Jun. 10, 2021

Related U.S. Application Data

(63) Continuation of application No. 16/418,078, filed on May 21, 2019, now Pat. No. 11,246,163, and a
(Continued)

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0098* (2013.01); *H04W 24/08* (2013.01);
(Continued)

(58) Field of Classification Search
CPC .... H04L 5/001; H04W 72/04; H04W 72/042; H04W 72/0453; H04W 72/14
See application file for complete search history.

(56) References Cited

U.S. PATENT DOCUMENTS 8,976,698 B2    3/2015    Chen et al.
10,750,534 B2   8/2020    Son
(Continued)

FOREIGN PATENT DOCUMENTS

EP    2672649 A1    12/2013
EP    3282633 A1    2/2018
(Continued)

OTHER PUBLICATIONS

Jul. 12, 2021—European Search Report—EP 21171212.0.
(Continued)

*Primary Examiner* — Gary Mui
(74) *Attorney, Agent, or Firm* — Banner & Witcoff, Ltd.

(57) ABSTRACT

Wireless communications using multiple active resources (e.g., bandwidth parts (BWP)) are described. A predetermined rule may be used to determine on which downlink (DL) BWP of multiple active DL BWPs, and/or on which uplink (UL) BWP of multiple active UL BWPs, a message is to be sent. A wireless device and/or a base station may reduce the quantity of active DL BWPs and/or active UL BWPs to monitor for a response.

48 Claims, 41 Drawing Sheets

Related U.S. Application Data continuation of application No. 16/418,411, filed on May 21, 2019, now Pat. No. 10,873,976.

(60) Provisional application No. 62/688,421, filed on Jun. 22, 2018, provisional application No. 62/674,904, filed on May 22, 2018, provisional application No. 62/674,550, filed on May 21, 2018.

(51) Int. Cl.
| | | |
|---|---|---|
| *H04W 72/04* | (2023.01) | |
| *H04W 76/11* | (2018.01) | |
| *H04W 76/27* | (2018.01) | |
| *H04W 24/08* | (2009.01) | |
| *H04W 72/0453* | (2023.01) | |
| *H04W 74/02* | (2009.01) | |
| *H04W 80/02* | (2009.01) | |
| *H04W 72/23* | (2023.01) | |

(52) U.S. Cl.
CPC ........ *H04W 72/04* (2013.01); *H04W 72/0453* (2013.01); *H04W 72/23* (2023.01); *H04W 74/02* (2013.01); *H04W 76/11* (2018.02); *H04W 76/27* (2018.02); *H04W 80/02* (2013.01)

(56) References Cited

U.S. PATENT DOCUMENTS

| | | |
|---|---|---|
| 2015/0043505 A1 | 2/2015 | Kim et al. |
| 2017/0156152 A1 | 6/2017 | Nazar et al. |
| 2017/0238323 A1 | 8/2017 | Marinier et al. |
| 2017/0245165 A1 | 8/2017 | Onggosanusi et al. |
| 2017/0353223 A1 | 12/2017 | Kim et al. |
| 2018/0006701 A1 | 1/2018 | Ahn et al. |
| 2018/0049047 A1 | 2/2018 | Lin et al. |
| 2018/0049169 A1 | 2/2018 | Lin et al. |
| 2018/0124687 A1 | 5/2018 | Park et al. |
| 2018/0124815 A1 | 5/2018 | Papasakellariou |
| 2018/0131493 A1 | 5/2018 | Luo et al. |
| 2018/0183551 A1 | 6/2018 | Chou et al. |
| 2019/0132109 A1 | 5/2019 | Zhou et al. |
| 2019/0149308 A1 | 5/2019 | Son |
| 2019/0166529 A1 | 5/2019 | Chen et al. |
| 2019/0208548 A1 | 7/2019 | Shih et al. |
| 2019/0215130 A1 | 7/2019 | Aiba et al. |
| 2019/0215847 A1 | 7/2019 | Abdoli et al. |
| 2019/0215869 A1 | 7/2019 | Lin |
| 2019/0222290 A1 | 7/2019 | Ly et al. |
| 2019/0222404 A1 | 7/2019 | Ang et al. |
| 2019/0253531 A1 | 8/2019 | Basu Mallick et al. |
| 2019/0254110 A1 | 8/2019 | He et al. |
| 2019/0335508 A1 | 10/2019 | Agiwal et al. |
| 2019/0349060 A1 | 11/2019 | Liao et al. |
| 2019/0349983 A1 | 11/2019 | Loehr et al. |
| 2019/0357085 A1 | 11/2019 | Chervyakov et al. |
| 2019/0357092 A1 | 11/2019 | Jung et al. |
| 2020/0127799 A1 | 4/2020 | Orsino et al. |
| 2020/0136878 A1 | 4/2020 | Yi et al. |
| 2020/0221499 A1 | 7/2020 | Hofstrom et al. |
| 2020/0288413 A1 | 9/2020 | Ahn et al. |
| 2020/0389922 A1* | 12/2020 | Xu .......................... H04L 5/0055 |
| 2021/0058999 A1* | 2/2021 | Chen ...................... H04W 76/19 |
| 2022/0264475 A1* | 8/2022 | Yi ........................ H04W 72/042 |

FOREIGN PATENT DOCUMENTS

| | | |
|---|---|---|
| WO | 2011038243 A2 | 3/2011 |
| WO | 2011038243 A3 | 7/2011 |
| WO | 2011085230 A2 | 7/2011 |
| WO | 2017197155 A1 | 11/2017 |
| WO | 2018021834 A1 | 2/2018 |
| WO | 2018031638 A1 | 2/2018 |
| WO | 2018031924 A1 | 2/2018 |
| WO | 2018044116 A1 | 3/2018 |
| WO | 2018080260 A1 | 5/2018 |
| WO | 2018084544 A1 | 5/2018 |
| WO | 2018084571 A1 | 5/2018 |
| WO | 2018085145 A1 | 5/2018 |
| WO | 2018089117 A1 | 5/2018 |
| WO | 2018145019 A1 | 8/2018 |

OTHER PUBLICATIONS

MediaTek Inc. "Remaining details on RACH procedure", 3GPP TSP RAN WG1 Meeting #92, Athens, Greece, Feb. 26-Mar. 2, 2018.
R1-1715675 3GPP TSG RAN WG1 Meeting NR Ad Hoc, Nagoya, Japan, Sep. 18-21, 2017, Source: Guangdong OPPO Mobile Telecom, Title: Uplink power control mechanism for NR.
R1-1715838 3GPP TSG RAN WG1 Meeting NR Ad Hoc, Nagoya, Japan, Sep. 18-21, 2017, Source: CATT, Title: NR Power Control Framework.
R1-1715902 3GPP TSG RAN WG1 Meeting NR Ad Hoc, Nagoya, Japan, Sep. 18-21, 2017, Source: LG Electronics, Title: Discussion on UL power control for NR.
R1-1716040 3GPP TSG RAN WG1 Meeting NR Ad Hoc, Nagoya, Japan, Sep. 18-21, 2017, Source: Samsung, Title: On UL Power Control.
R1-1716061 3GPP TSG RAN WG1 Meeting NR Ad Hoc, Nagoya, Japan, Sep. 18-21, 2017, Source: CMCC, Title: Discussion on power control framework.
R1-1716114 3GPP TSG RAN WG1 Meeting NR Ad Hoc, Nagoya, Japan, Sep. 18-21, 2017, Source: NTT DOCOMO, Inc., Title: Power control framework for PUSCH.
R1-1716127 3GPP TSG RAN WG1 Meeting NR Ad Hoc, Nagoya, Japan, Sep. 18-21, 2017, Source: Nokia, Nokia Shanghai Bell, Title: Discussion on NR power control framework.
R1-1716451 3GPP TSG RAN WG1 Meeting NR Ad Hoc, Nagoya, Japan, Sep. 18-21, 2017, Source: Qualcomm Incorporated, Title: Power control and PHR for NR.
R1-1716515 3GPP TSG RAN WG1 Meeting NR Ad Hoc, Nagoya, Japan, Sep. 18-21, 2017, Source: InterDigital Inc., Title: Further Details on Uplink Power Control.
R1-1716535 3GPP TSG RAN WG1 Meeting NR Ad Hoc, Nagoya, Japan, Sep. 18-21, 2017, Source: Panasonic, Title: Discussion on NR power control framework.
R1-1716604 3GPP TSG RAN WG1 Meeting NR Ad Hoc, Nagoya, Japan, Sep. 18-21, 2017, Source: Ericsson, Title: NR UL power control framework.
R1-1716606 3GPP TSG RAN WG1 Meeting NR Ad Hoc, Nagoya, Japan, Sep. 18-21, 2017, Source: Ericsson, Title: Closed loop PC in NR.
R1-1717311 3GPP TSG RAN WG1 Meeting NR Ad Hoc, Nagoya, Japan, Sep. 18-21, 2017, Source: Huawei, HiSilicon, Title: General considerations on UL power control design.
R1-1717408 3GPP TSG RAN WG1 Meeting #90bis, Prague, Czech Republic, Oct. 9-13, 2017, Source: Intel Corporation, Title: Remaining Details on UL Power Control Framework.
R1-1717438 3GPP TSG RAN WG1 Meeting #90bis, Prague, Czech Republic, Oct. 9-13, 2017, Source: ZTE, Sanechips, Title: On NR Power Control.
R1-1717508 3GPP TSG RAN WG1 Meeting #90bis, Prague, Czech Republic, Oct. 9-13, 2017, Source: vivo, Title: Remaining issues on NR UL power control.
R1-1717692 3GPP TSG RAN WG1 Meeting #90bis, Prague, Czech Republic, Oct. 9-13, 2017, Source: Samsung, Title: On UL Power Control.
R1-1717846 3GPP TSG RAN WG1 Meeting NR Ad Hoc, Nagoya, Japan, Sep. 18-21, 2017, Source: CATT, Title: NR Power Control Aspects.
R1-1717892 3GPP TSG RAN WG1 Meeting #90bis, Prague, Czech Republic, Oct. 9-13, 2017, Source: CMCC, Title: Discussion on power control framework.

(56) References Cited

OTHER PUBLICATIONS

R1-1717919 3GPP TSG RAN WG1 Meeting #90bis, Prague, Czech Republic, Oct. 9-13, 2017, Source: Panasonic, Title: Discussion on NR power control framework.
R1-1717983 3GPP TSG RAN WG1 Meeting #90bis, Prague, Czech Republic, Oct. 9-13, 2017, Source: LG Electronics, Title: Discussion on UL power control for NR.
R1-1718031 3GPP TSG RAN WG1 Meeting #90bis, Prague, Czech Republic, Oct. 9-13, 2017, Source: OPPO, Title: On uplink power control for NR.
R1-1718228 3GPP TSG RAN WG1 Meeting #90bis, Prague, Czech Republic, Oct. 9-13, 2017, Source: NTT DOCOMO, Inc., Title: Power control framework for PUSCH.
R1-1718502 3GPP TSG RAN WG1 Meeting #90bis, Prague, Czech Republic, Oct. 9-13, 2017, Source: InterDigital, Inc., Title: On NR Power Control Framework.
R1-1718592 3GPP TSG RAN WG1 Meeting #90bis, Prague, Czech Republic, Oct. 9-13, 2017, Source: Qualcomm Incorporated, Title: Power control and PHR for NR.
R1-1718625 3GPP TSG RAN WG1 Meeting #90bis, Prague, Czech Republic, Oct. 9-13, 2017, Source: ITL, Title: UL power control and PHR.
R1-1718652 3GPP TSG RAN WG1 Meeting #90bis, Prague, Czech Republic, Oct. 9-13, 2017, Source: Ericsson, Title: NR power control framework.
R1-1718655 3GPP TSG RAN WG1 Meeting #90bis, Prague, Czech Republic, Oct. 9-13, 2017, Source: Ericsson, Title: Further details on closed loop power control.
R1-1718692 3GPP TSG RAN WG1 Meeting #90bis, Prague, Czech Republic, Oct. 9-13, 2017, Source: Nokia, Nokia Shanghai Bell, Title: Discussion on NR power control framework.
R1-1718704 3GPP TSG RAN WG1 Meeting #90bis, Prague, Czech Republic, Oct. 9-13, 2017, Source: Motorola Mobility, Lenovo, Title: On NR power control.
3GPP TS 36.413 V13.3.0 (Jun. 2016), Technical Specification, 3rd Generation Partnership Project; Technical Specification Group Radio Access Network; Evolved Universal Terrestrial Radio Access Network (E-UTRAN); S1 Application ;Protocol (S1AP) (Release 13).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V10.3.0 (Sep. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10).
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) Protocol Specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
3GPP TSG RAN WG1 Meeting #90bis, Prague, Czech Republic, Oct. 9-13, 2017, Title: RAN1 Chairman's Notes.
3GPP TSG RAN WG1 Meeting #93, Busan, Korea, May 21-25, 2018, Title: RAN1 Chairman's Notes.
3GPP TSG RAN WG2 NR Ad Hoc, Vancouver, Canada, Jan. 22-26, 2018, Source: Session Chair (InterDigital), Title: Report from LTE and NR User Plane Break-Out Session.
R2-1711835 3GPP TSG RAN WG2 Meeting #99bis, Prague, Czech Republic, Oct. 9-13, 2017, Source: Session Chair (InterDigital), Title: Report from LTE and NR User Plane Break-Out Session.
R1-1716353 3GPP TSG RAN WG1 Meeting NR Ad Hoc, Nagoya, Japan, Sep. 18-21, 2017, Source: Ericsson, Title: On dynamic triggering for CSI reports and CSI-RS.
R1-1716354 3GPP TSG RAN WG1 Meeting NR Ad Hoc, Nagoya, Japan, Sep. 18-21, 2017, Source: Ericsson, Title: A comparison of CSI-RS activation schemes based on MAC CE and DCI.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1717939 3GPP TSG RAN WG1 Meeting #90bis, Prague, Czech Republic, Oct. 9-13, 2017, Source: LG Electronics, Title: Discussion on CSI measurement.
R1-1801073 3GPP TSG RAN WG1 NR Ad Hoc, Vancouver, Canada, Jan. 22-26, 2018, Source: RAN2, Title: LS on PDCCH order for initiation of random access.
R1-1805701 3GPP TSG RAN WG1 Meeting #92bis, Sanya, China, Apr. 16-20, 2018, Source: Qualcomm Incorporated, Title: Summary of Remaining Details on RACH Procedure.
R1-1805876 3GPP TSG RAN WG1 Meeting #93, Busan, Korea, May 21-25, 2018, Source: Huawei, HiSilicon, Title: Remaining details of RACH Procedures.
R1-1807747 3GPP TSG RAN WG1 Meeting #93, Busan, Korea, May 21-25, 2018, Source: Qualcomm Incorporated, Title: Summary of Remaining Details on RACH Procedure.
R2-1800688 3GPP TSG RAN WG2 NR Ad Hoc, Vancouver, Canada, Jan. 22-26, 2018, Source: Ericsson, Title: Need for PDCCH order.
Sep. 9, 2019—European Extended Search Report—EP 19174705.4.
Sep. 16, 2019—European Extended Search Report—EP 19175772.3.
R2-1712212 3GPP TSG RAN WG2 Meeting #100, Reno, USA, Nov. 27-Dec. 1, 2017, Source: ASUSTeK, Title: Details of BWP inactivity timer.
Sep. 26, 2019—European Extended Search Report—EP 19175077.7.
R1-1718581 3GPP TSG RAN WG1 Meeting #90bis, Prague, Czech Republic, Oct. 9-13, 2017, Source: Qualcomm Incorporated, Title: Open Issues on CA.
Nov. 22, 2019—European Office Action—EP 18205418.9.
Jan. 3, 2020—European Extended Search Report—EP 19189782.6.
R2-1806991 3GPP TSG RAN WG2 Meeting #102, Busan, Korea, May 21-25, 2018, Source: CATT, Title: Further issues with switching of bandwidth part and random access.
R2-1809515 3GPP TSG RAN WG2 AH-1807, Montreal, Canada, Jul. 2-6, 2018, Source: CATT, Title: Further issues with DL BWP switching for CFRA.
R2-1810513 3GPP TSG RAN WG2 NR AH1807, Montreal, Canada, Jul. 2-6, 2018, Source: Huawei, HiSilicon, Title: Clarification on RA procedure for BFR on BWPs without CBRA occasions.
Jan. 16, 2019—European Search Report—EP 18202948.8.
OPPO "SPS operations for BWP switching" Oct. 8, 2017.
Ericsson "URLLC aspects for grant-free UL transmission in NR" Feb. 12, 2017.
Mar. 29, 2019—Extended European Search Report—EP 18205418.9.
Jun. 28, 2019—European Extended Search Report—19166254.3.
Huawei, HiSilicon: "Bandwidth part activation and adaptation", Sep. 18, 2017.
InterDigital, Inc.: "Remaining details of BWP", Sep. 18, 2017.

(56) References Cited

OTHER PUBLICATIONS

LG Electronics: "Discussion on carrier aggregation and bandwidth parts", Sep. 18, 2017.
R1-1718901 3GPP TSG RAN WG1 Meeting 90bis, Prague, Czech Republic, Oct. 9-13, 2017, Source: MediaTek Inc., Title: Summary of Bandwidth Part Operation.
Jul. 10, 2019—European Extended Search Report—EP 19175762.4.
3GPP TSG-RAN WG2 Meeting #102: "Email Discussion on SSB and Cell relationship", May 21, 2018.
3GPP TSG RAN WG1 Meeting #93: "Remaining Issues on Beam Management", May 21, 2018.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716109 3GPP TSG RAN WG1 Meeting NR Ad Hoc, Nagoya, Japan, Sep. 18-21, 2017, Source: NTT DOCOMO,Inc., Title: Remaing issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1715454 3GPP TSG RAN WG1 Meeting NR Ad Hoc, Nagoya, Japan, Sep. 18-21, 2017, Source: ZTE, Sanechips, Title: On NR Power Control.
R1-1715478 3GPP TSG RAN WG1 Meeting NR Ad Hoc, Nagoya, Japan, Sep. 18-21, 2017, Source: Huawei, HiSilicon, Title: General considerations on UL power control design.
R1-1715505 3GPP TSG RAN WG1 Meeting NR Ad Hoc, Nagoya, Japan, Sep. 18-21, 2017, Source: Mitsubishi Electric, Title: UL transmission power control.
R1-1715651 3GPP TSG RAN WG1 Meeting NR Ad Hoc, Nagoya, Japan, Sep. 18-21, 2017, Source: vivo, Title: NR UL power control framework.

\* cited by examiner

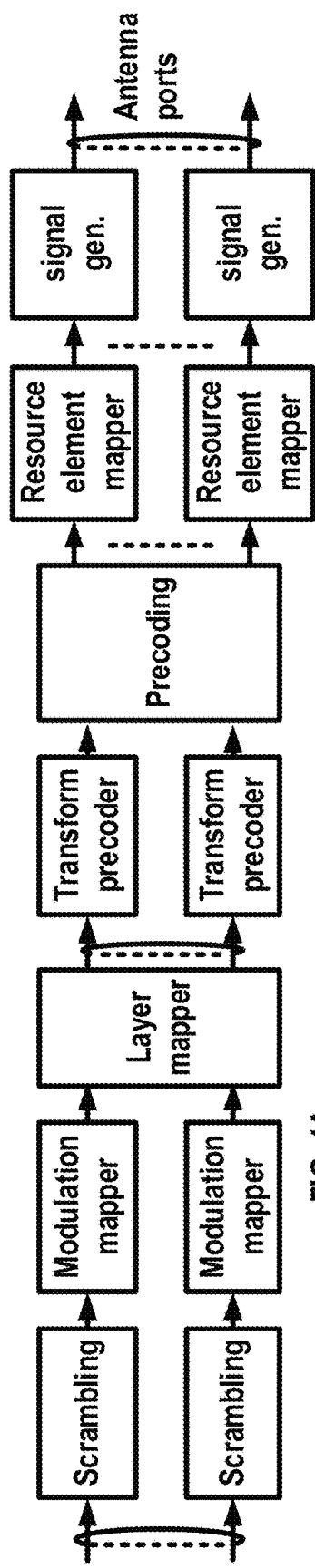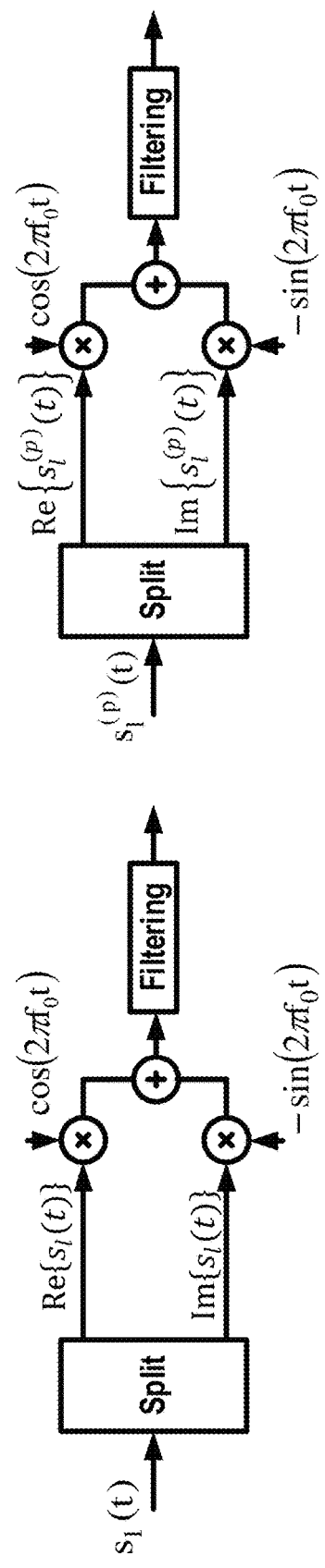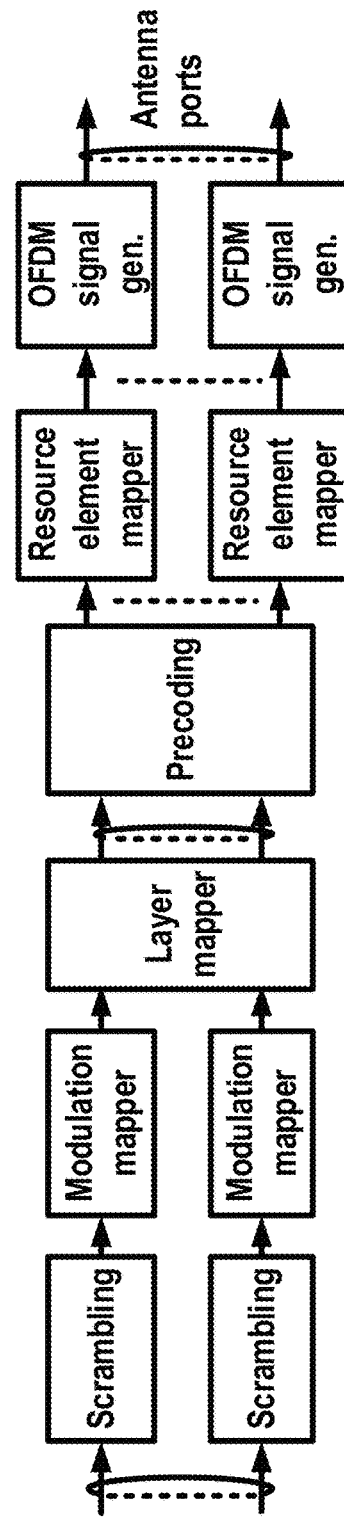
FIG. 4A
FIG. 4B
FIG. 4C
FIG. 4D

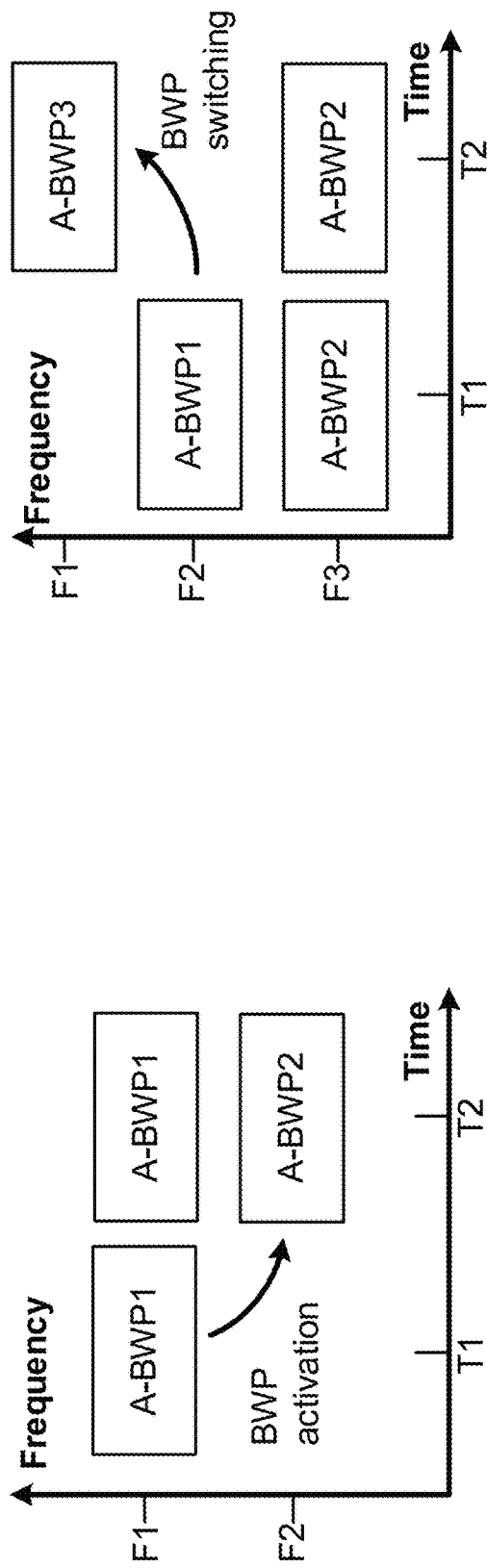
FIG. 18B
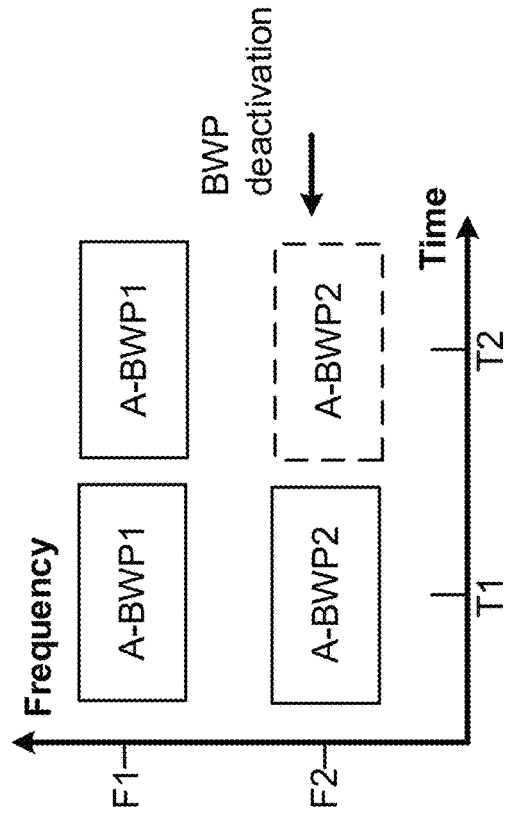
FIG. 18C
FIG. 18A

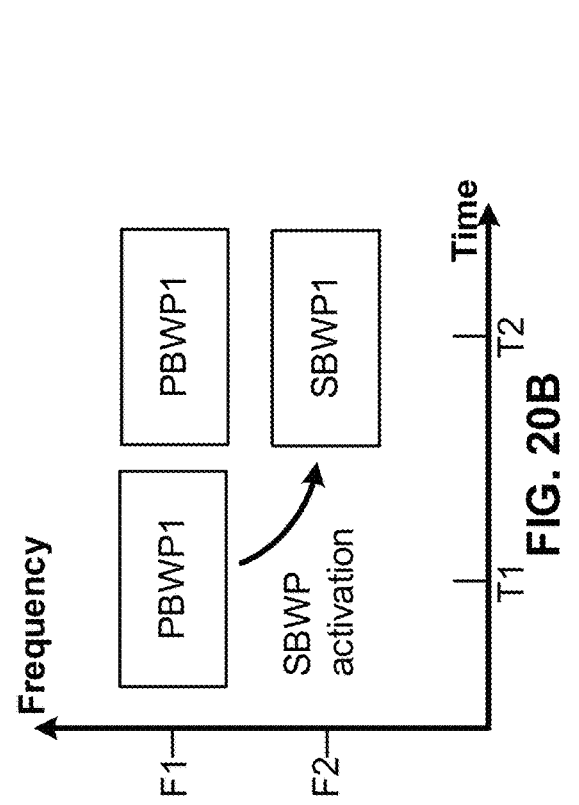
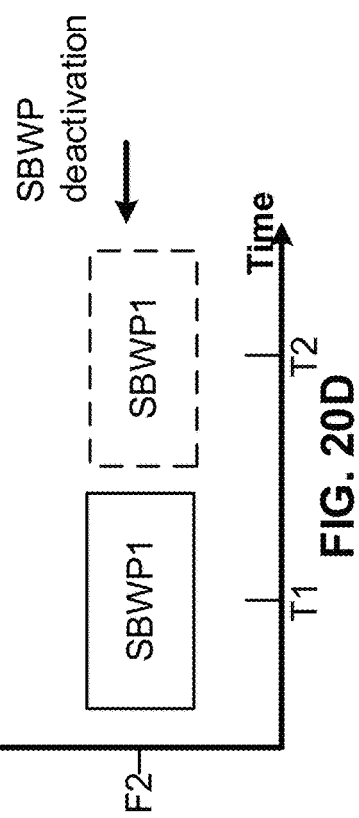
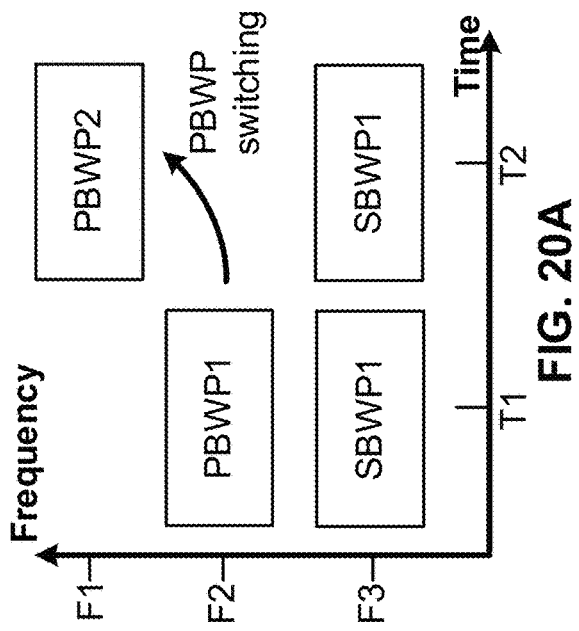
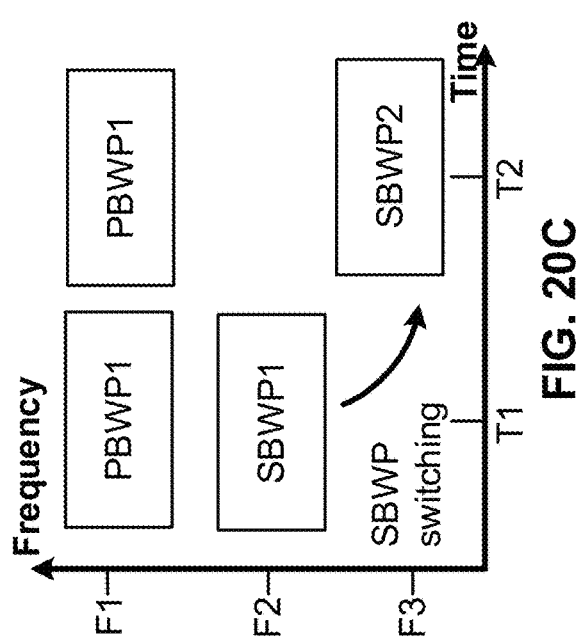

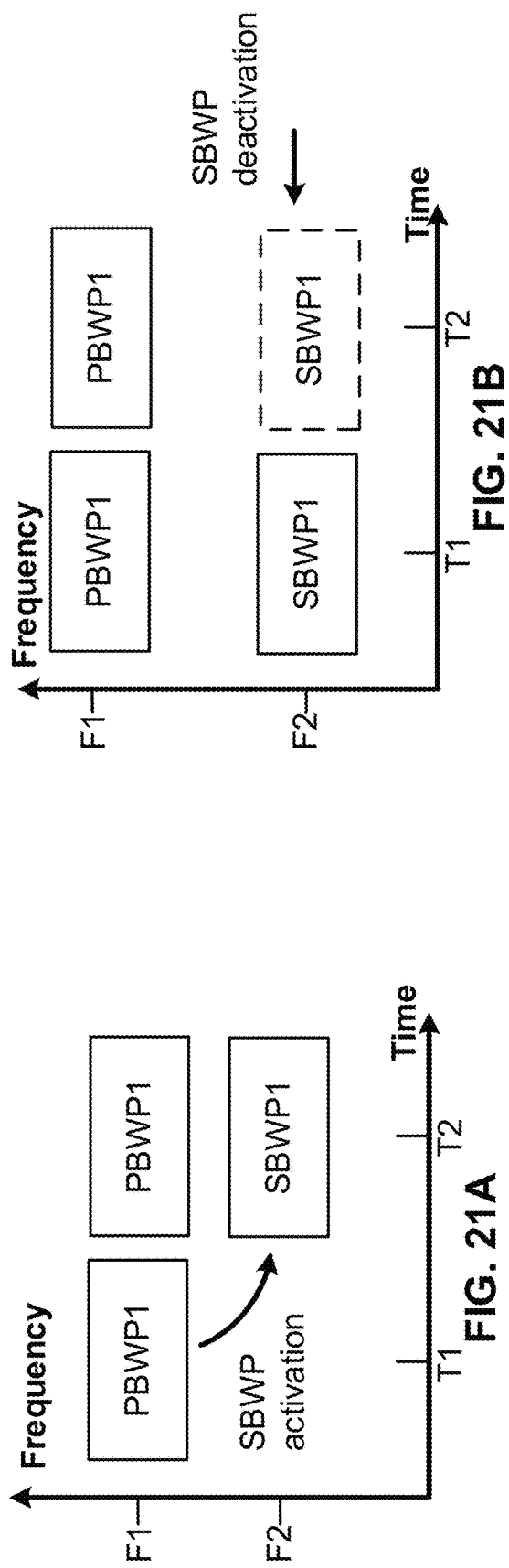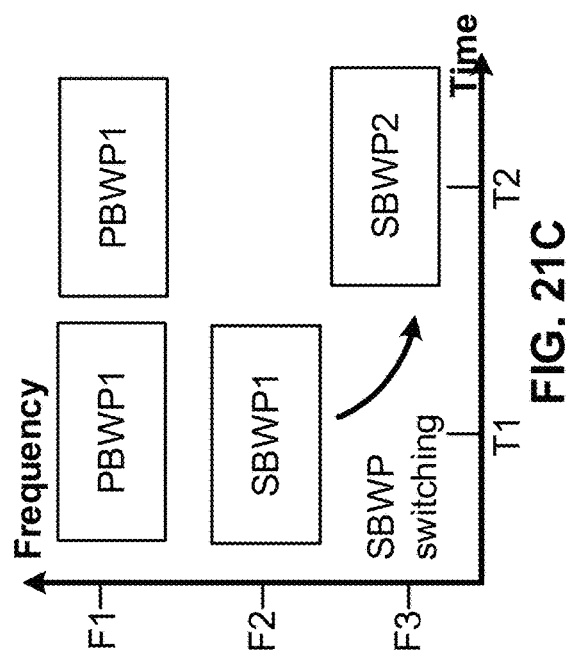
FIG. 21A
FIG. 21B
FIG. 21C

RANDOM ACCESS PROCEDURES USING MULTIPLE ACTIVE BANDWIDTH PARTS

CROSS-REFERENCE TO RELATED APPLICATIONS

This application is a continuation of U.S. application Ser. No. 16/418,411, filed on May 21, 2019, which is a continuation of U.S. application Ser. No. 16/418,078, filed on May 21, 2019, which claims the benefit of U.S. Provisional Application No. 62/674,550, titled "Random Access Procedure in Multiple Active Bandwidth Parts" and filed on May 21, 2018; U.S. Provisional Application No. 62/674,904, titled "Linkage in Multiple Active Bandwidth Parts" and filed on May 22, 2018; and U.S. Provisional Application No. 62/688,421, titled "Random Access Procedure in Multiple Active Bandwidth Parts" and filed on Jun. 22, 2018. Each of the above-referenced applications is hereby incorporated by reference in its entirety.

BACKGROUND

Wireless communications may use bandwidth parts (BWPs) and/or other wireless resources. Wireless communications may include random access procedures, for example, between a base station and a wireless device. A base station may send downlink control information (DCI) for scheduling BWPs and/or random access responses (RARs) for a random access procedure. A wireless device may monitor DCI for various BWP operations and/or a wireless device may monitor a BWP for RARs, which may lead to increased power consumption and/or reduced spectral efficiency.

SUMMARY

The following summary presents a simplified summary of certain features. The summary is not an extensive overview and is not intended to identify key or critical elements.

Wireless communications using multiple active resources (e.g., bandwidth parts) are described. A wireless device may support multiple active resources (e.g., BWPs) in a cell, for example, to improve uplink and/or downlink radio efficiency and/or reduce uplink signaling overhead. Sending messages (e.g., random access preambles) on more than one active uplink (UL) resource (e.g., UL BWP), monitoring for messages (e.g., random access responses) on more than one active downlink (DL) resource (e.g., DL BWP), and/or switching and/or activating/deactivating (e.g., activating or deactivating) more than one active resource (e.g., UL BWP, DL BWP, BWP, etc.), may cause, for example, excessive battery power consumption, increased interference, and/or misalignment between devices (e.g., between a base station and a wireless device). A base station and a wireless device may use a predetermined rule to determine which resource or resources (e.g., BWPs, UL BWPs, DL BWPs, etc.) to use for various messages. By using the predetermined rule, a wireless device and/or a base station may avoid or reduce the above issues and/or may facilitate reduced hardware complexity, reduced operational overhead, and greater efficiency for wireless communications using multiple active resources (e.g., BWPs).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 18A, FIG. 18B, and FIG. 18C show examples of multiple active BWPs operation.

FIG. 20A, FIG. 20B, FIG. 20C, and FIG. 20D show examples of multiple active BWPs operation.

FIG. 21A, FIG. 21B, and FIG. 21C show examples of multiple active BWPs operation.

DETAILED DESCRIPTION

Figure 1:
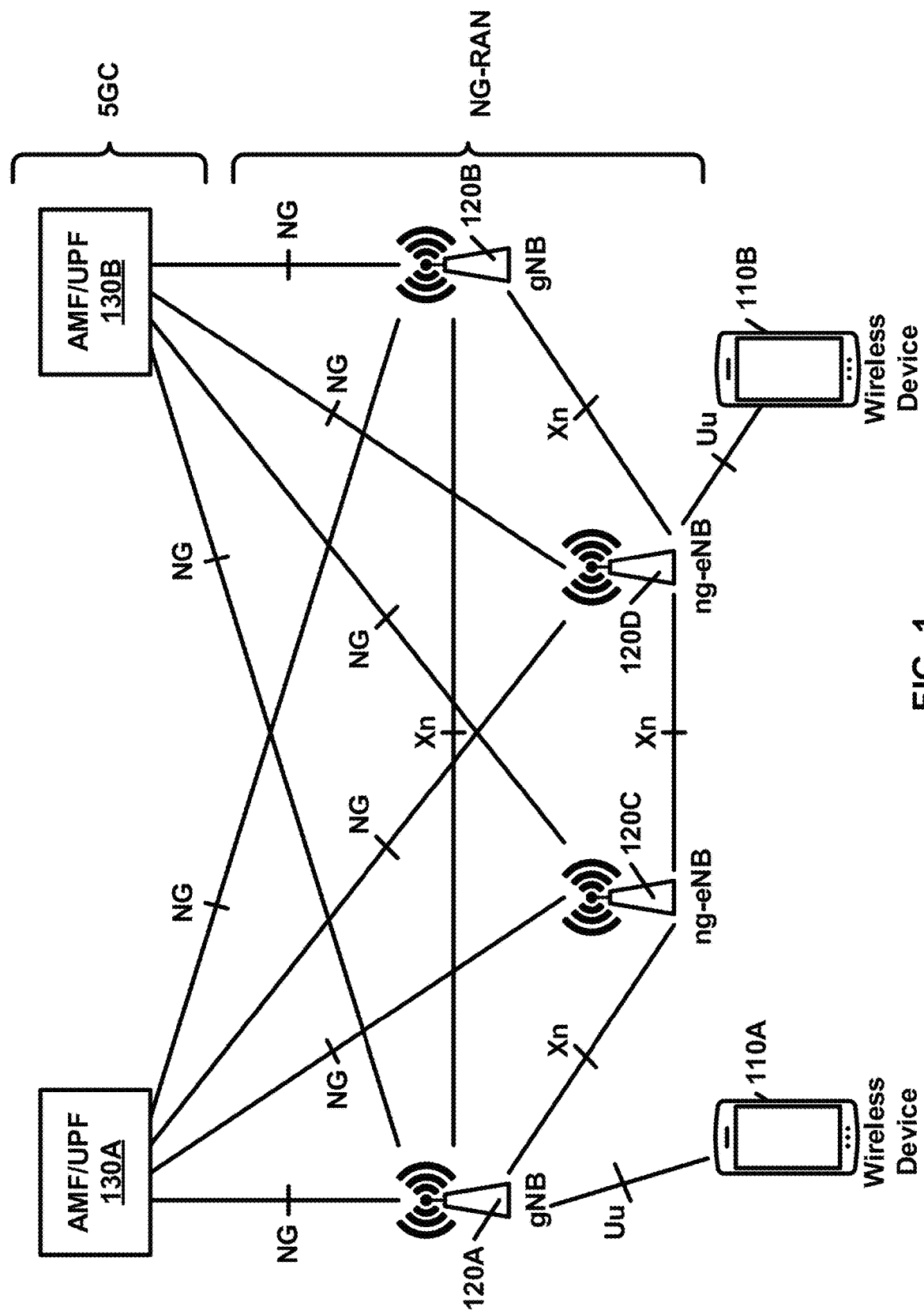
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to multiple active bandwidth parts in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
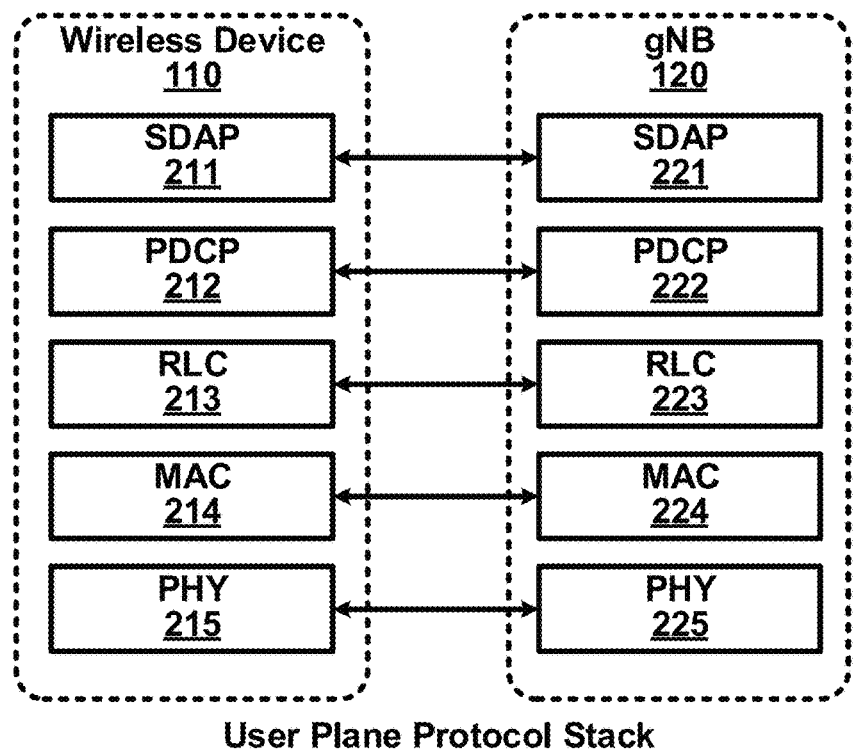
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
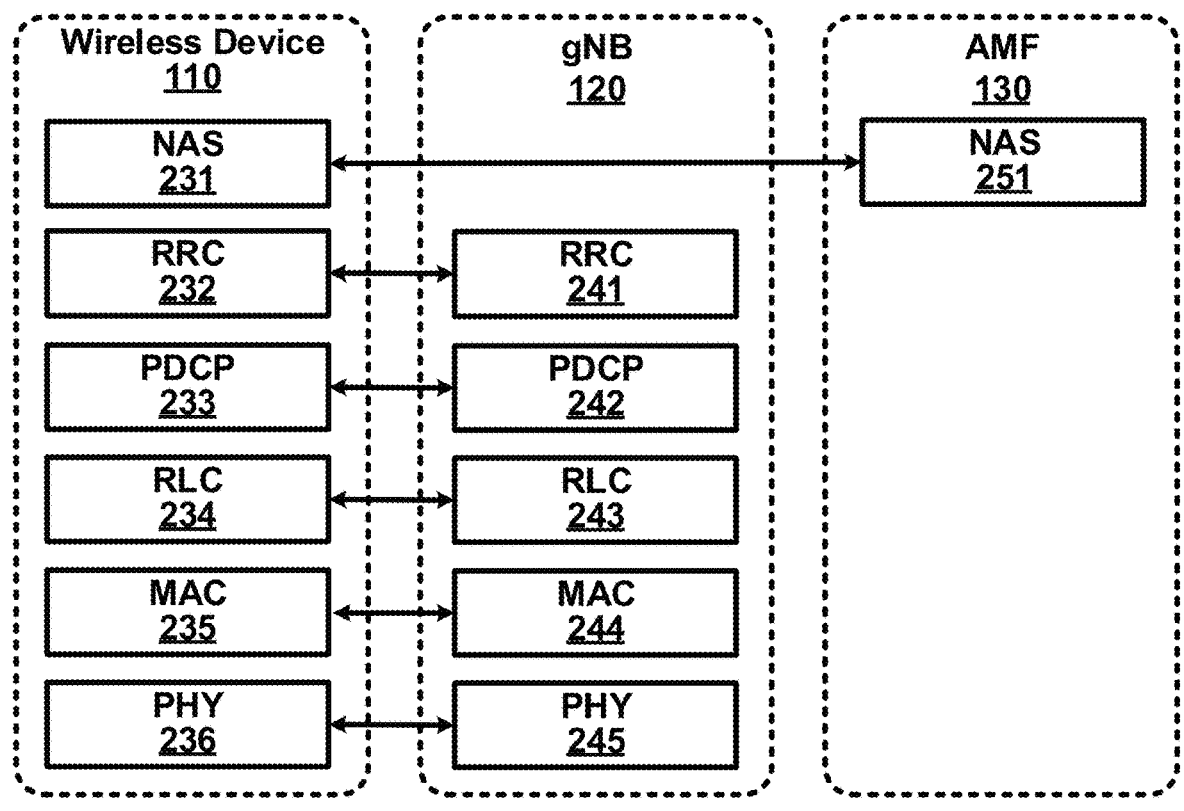
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
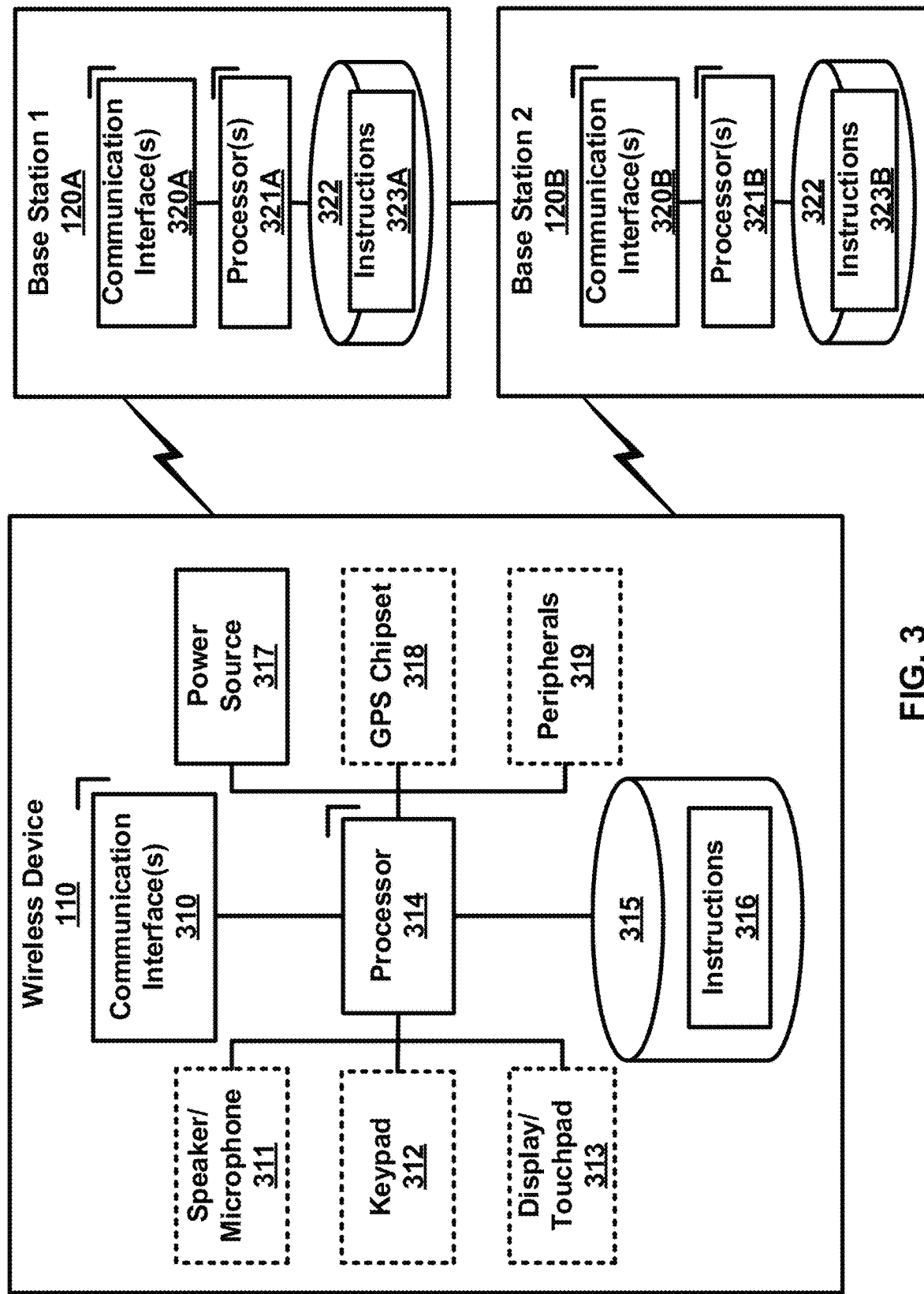
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG- RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
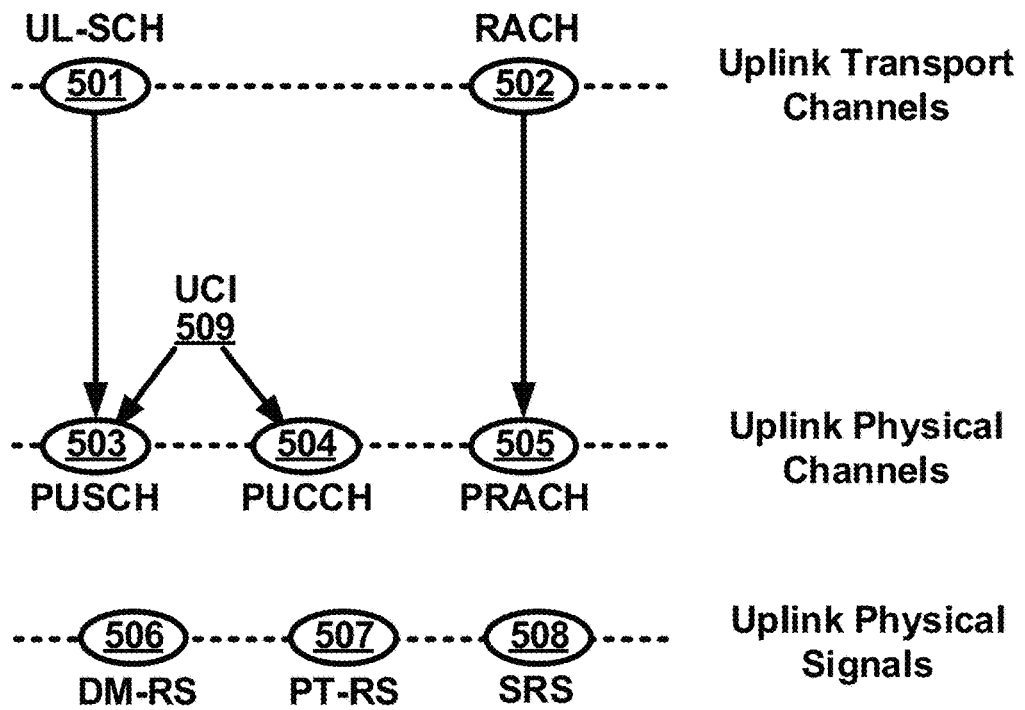
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
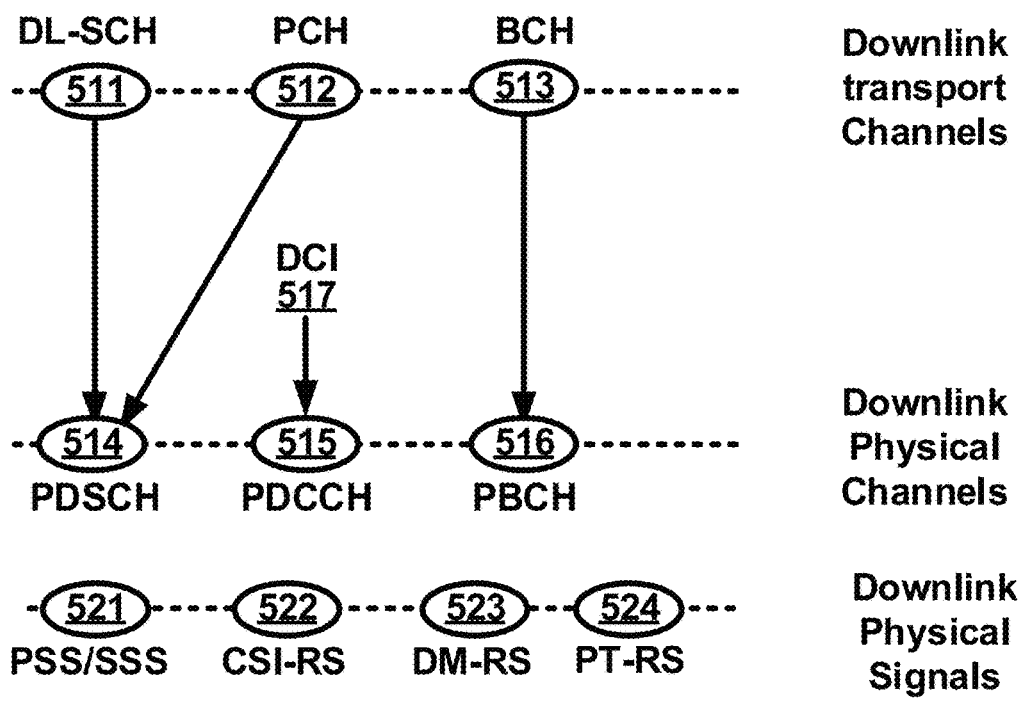
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. An UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block.

The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
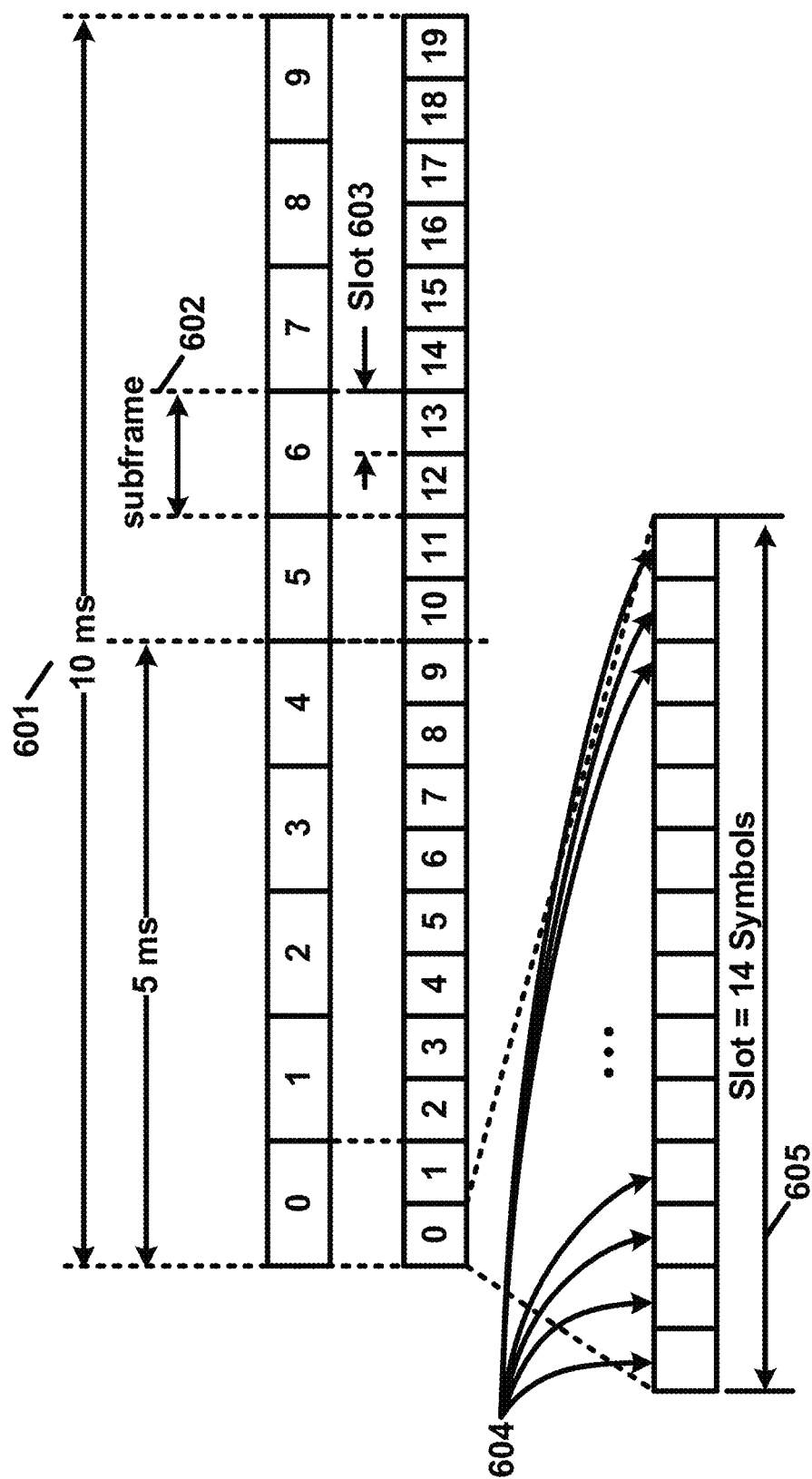
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
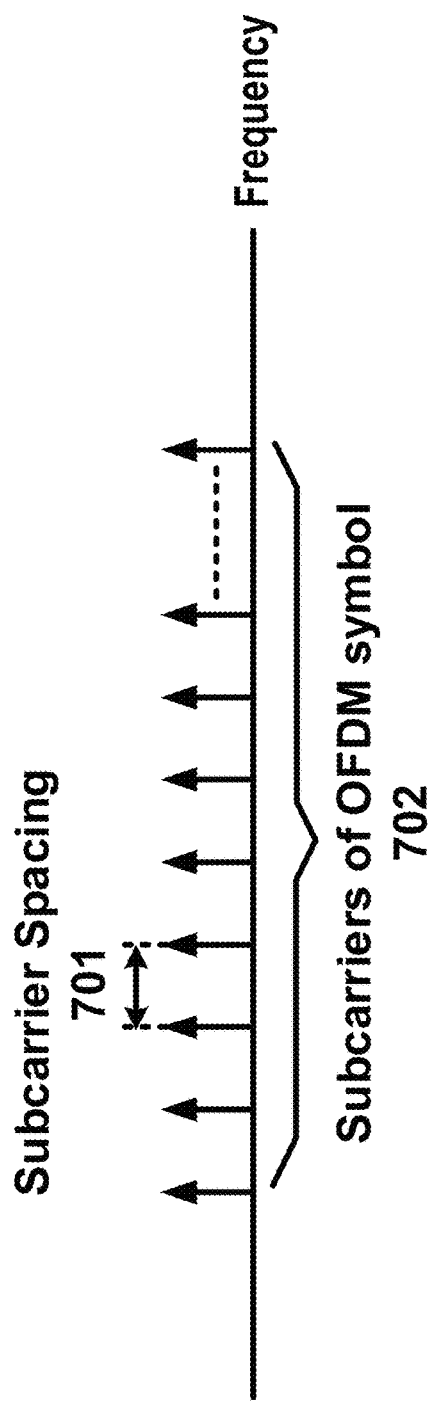
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
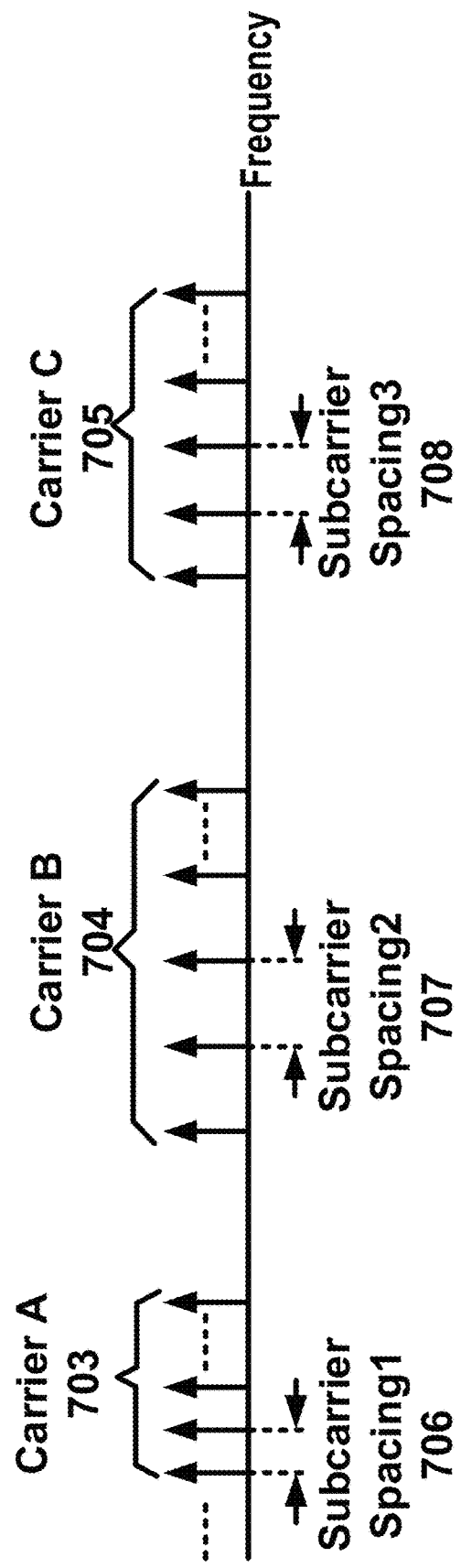

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
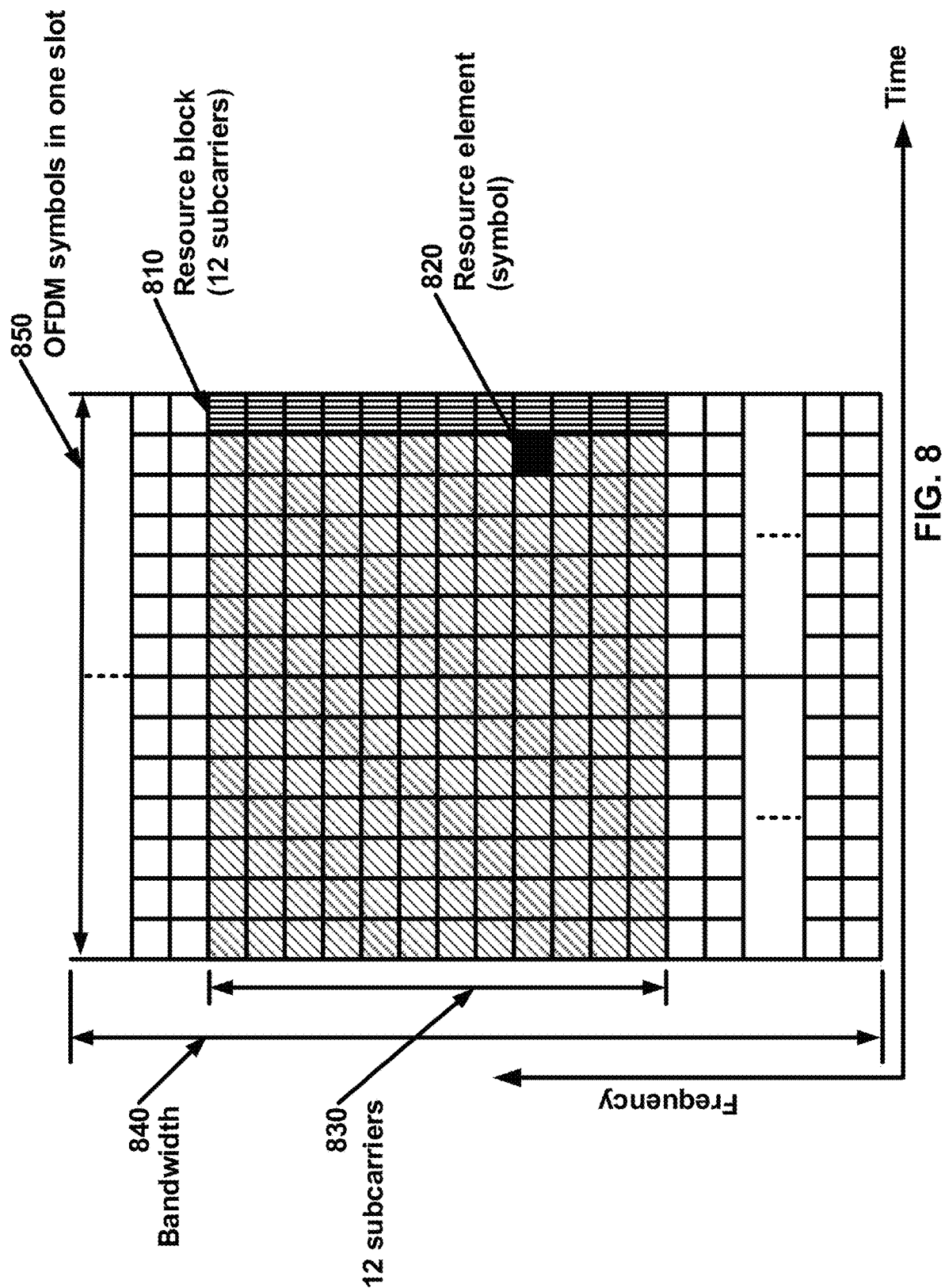
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message. The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
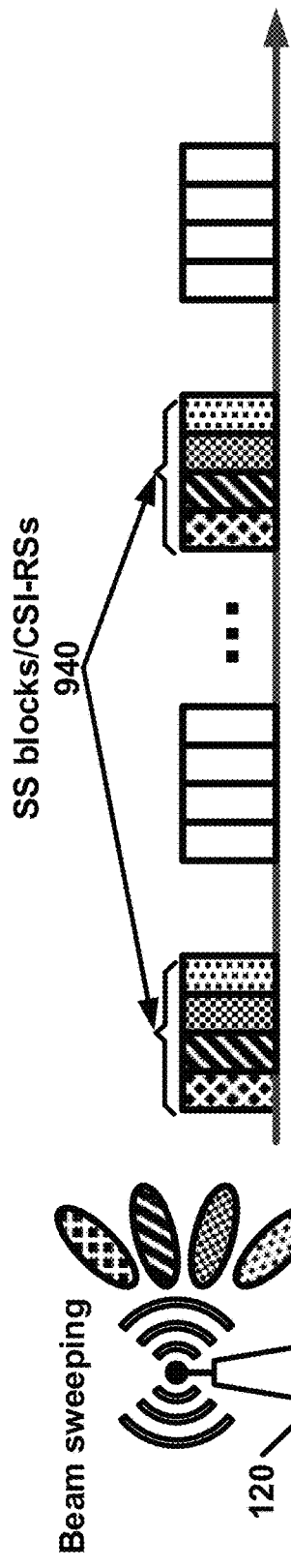
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
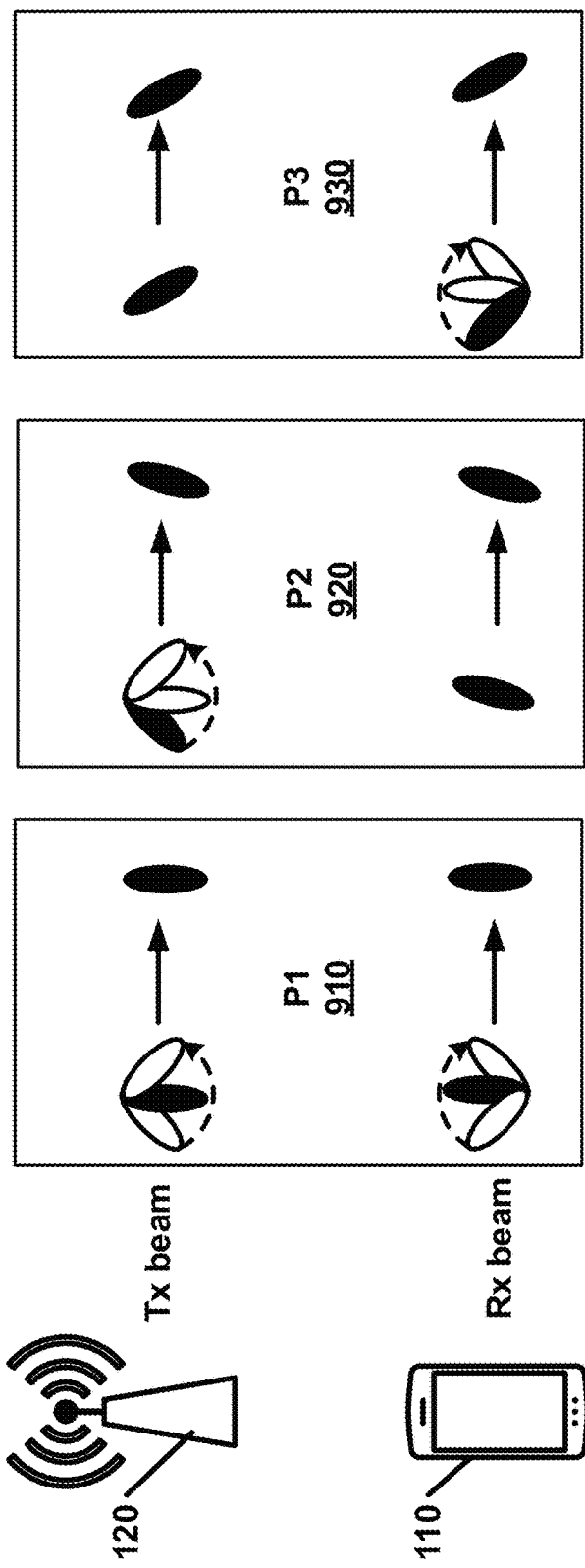
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
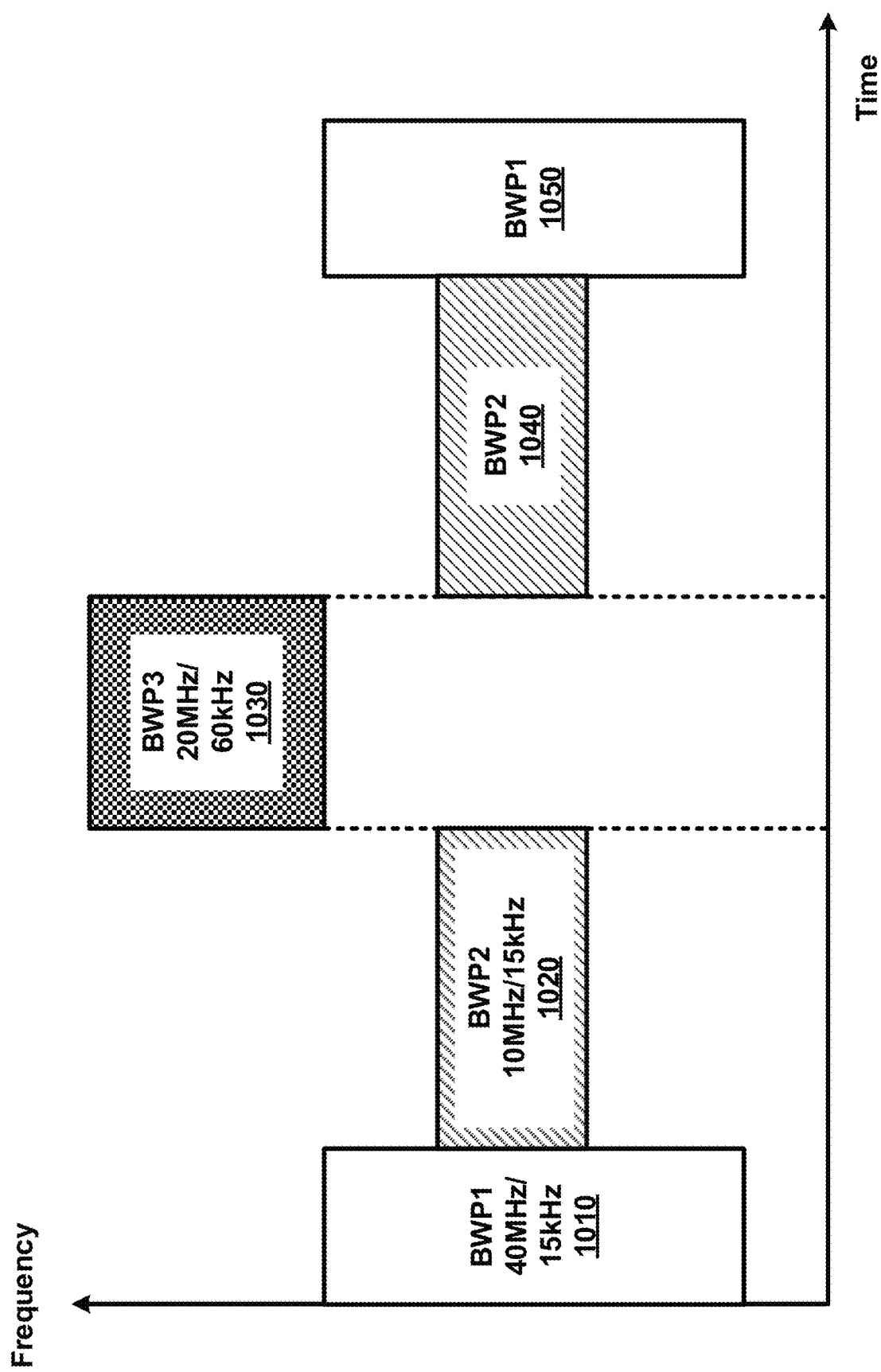
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for an UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
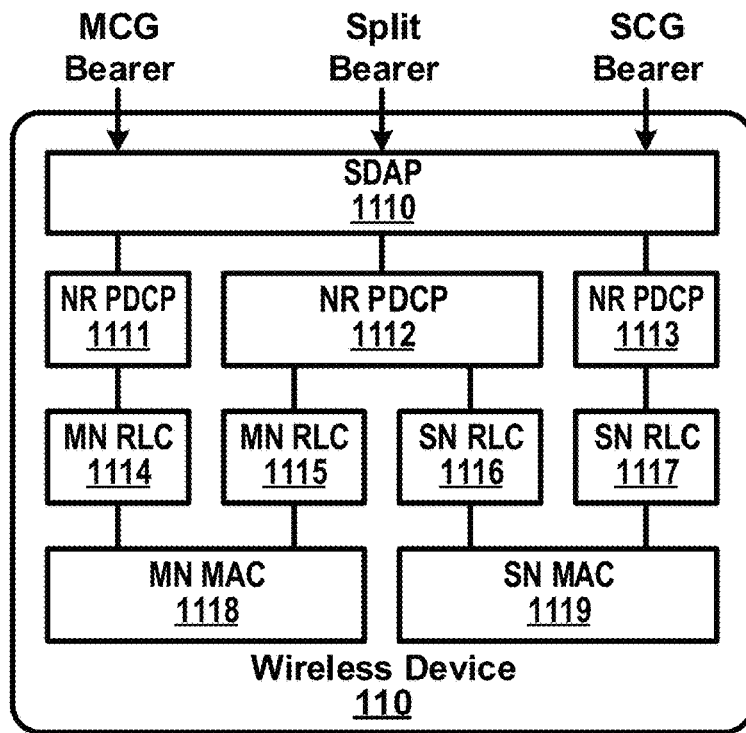
FIG. 11A and FIG. 11B show examples of multi connectivity.
Figure 11B:
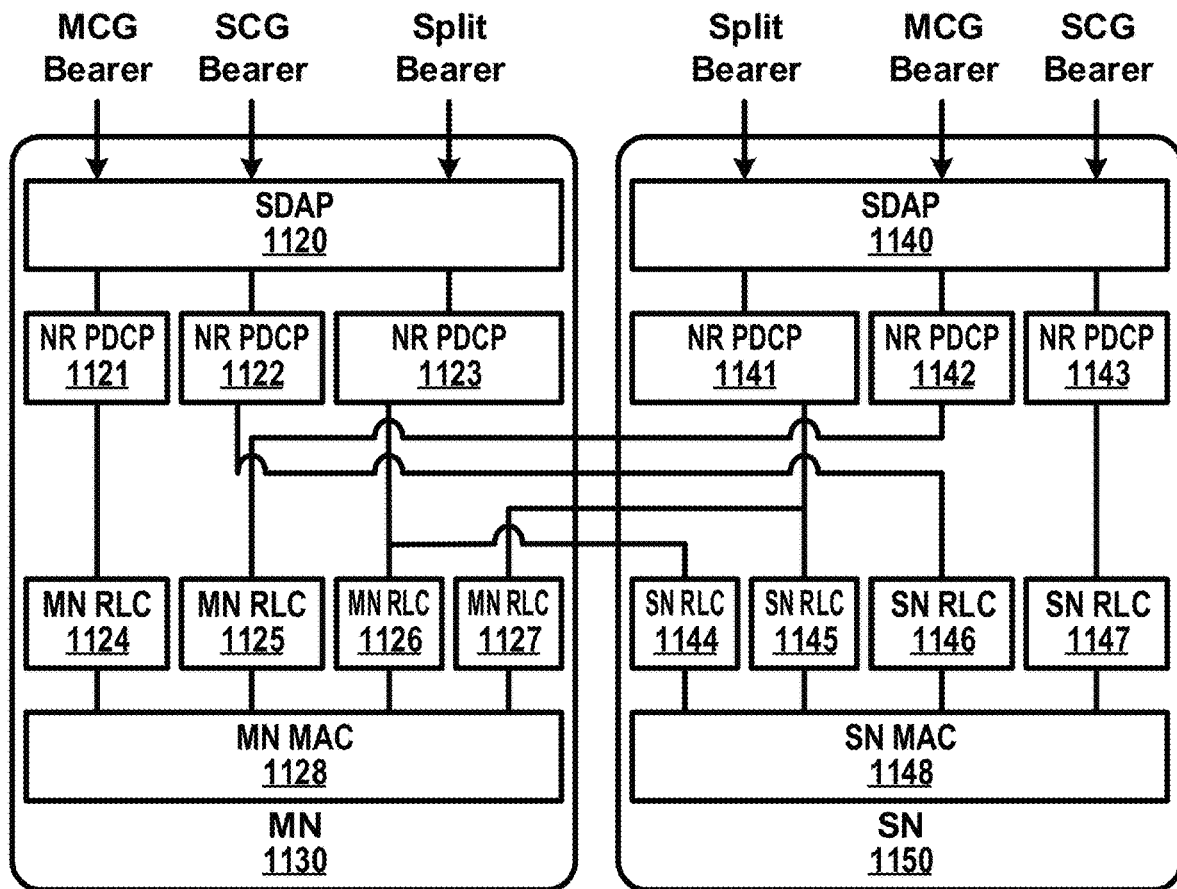

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
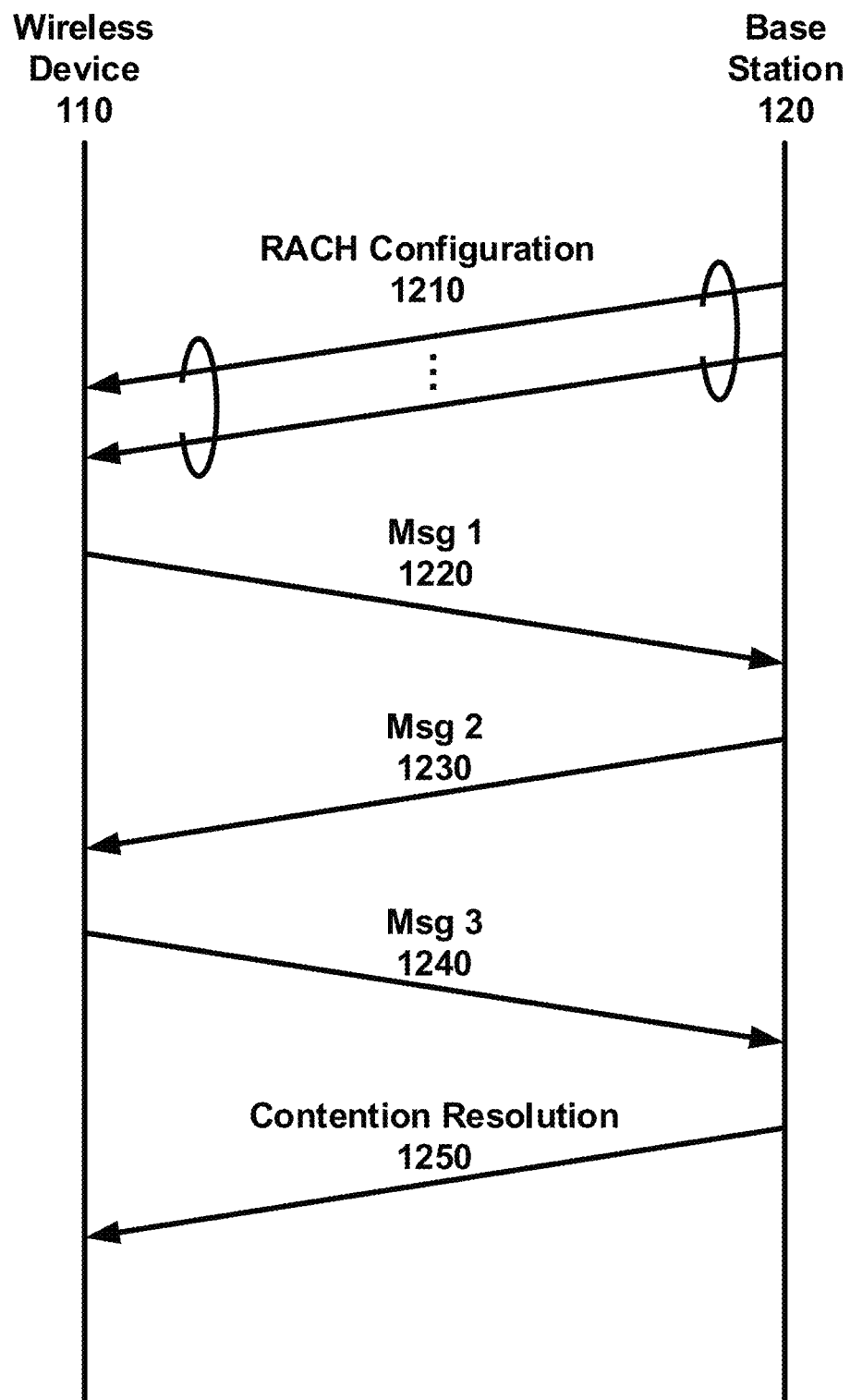
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
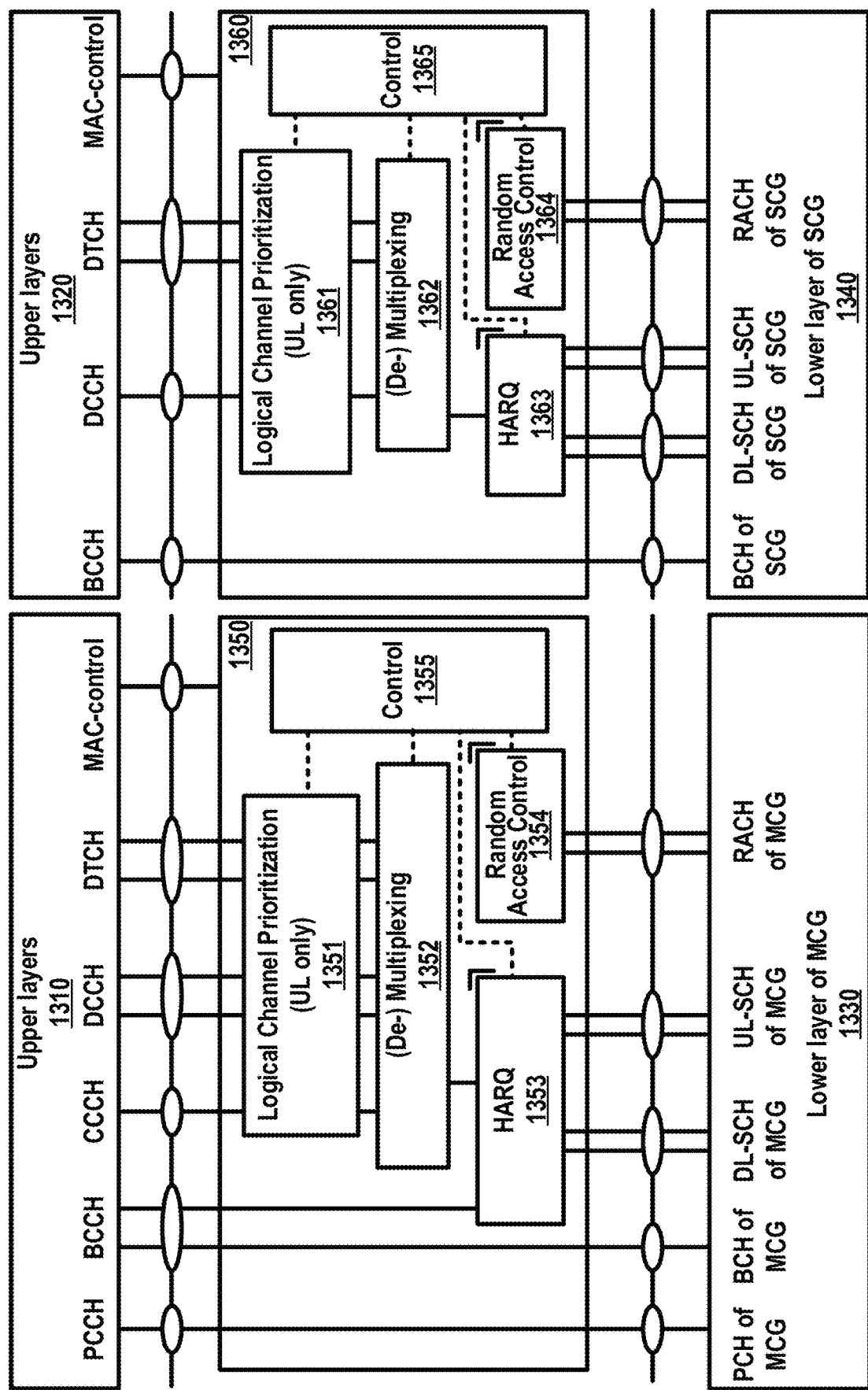
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. An UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
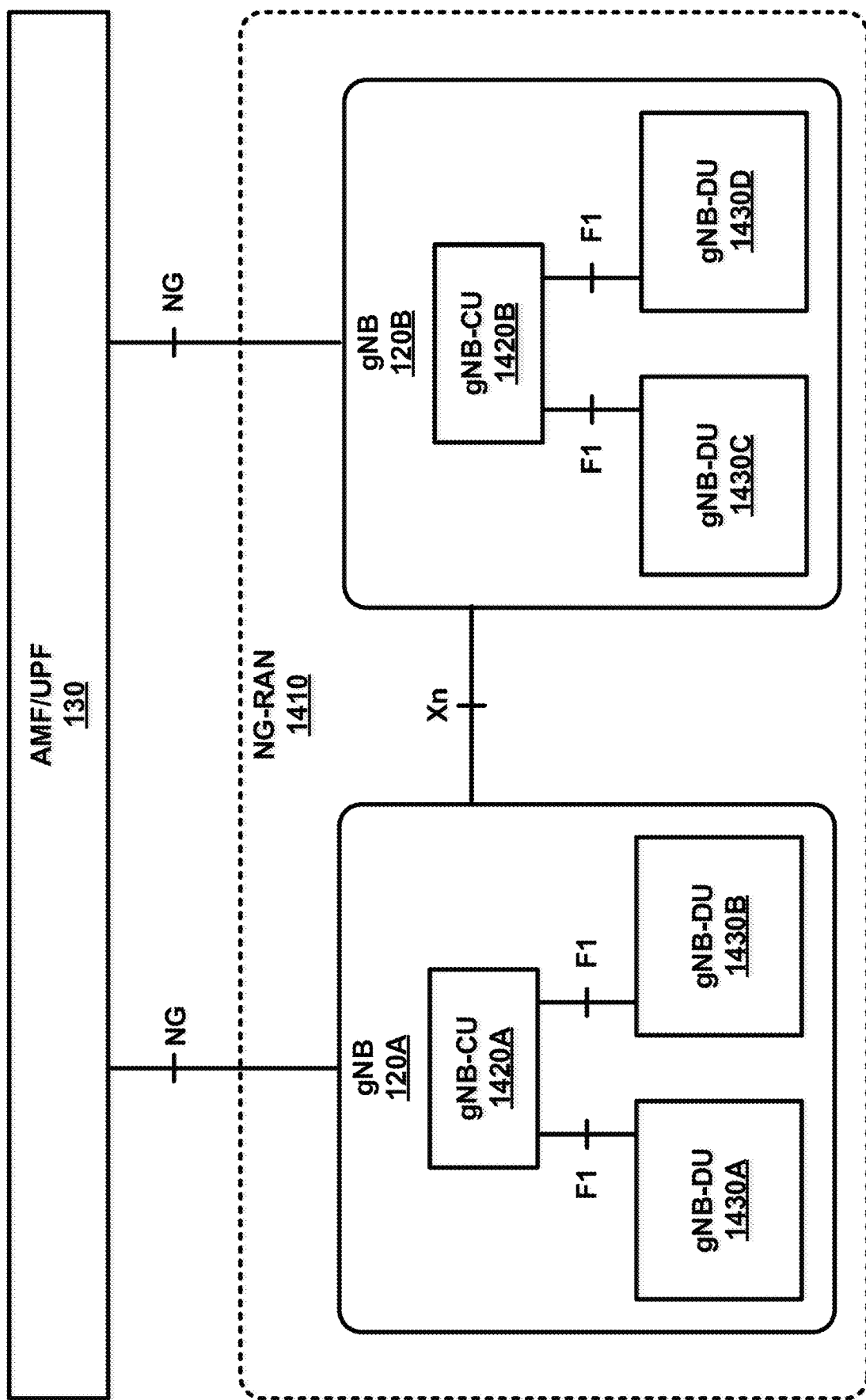
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
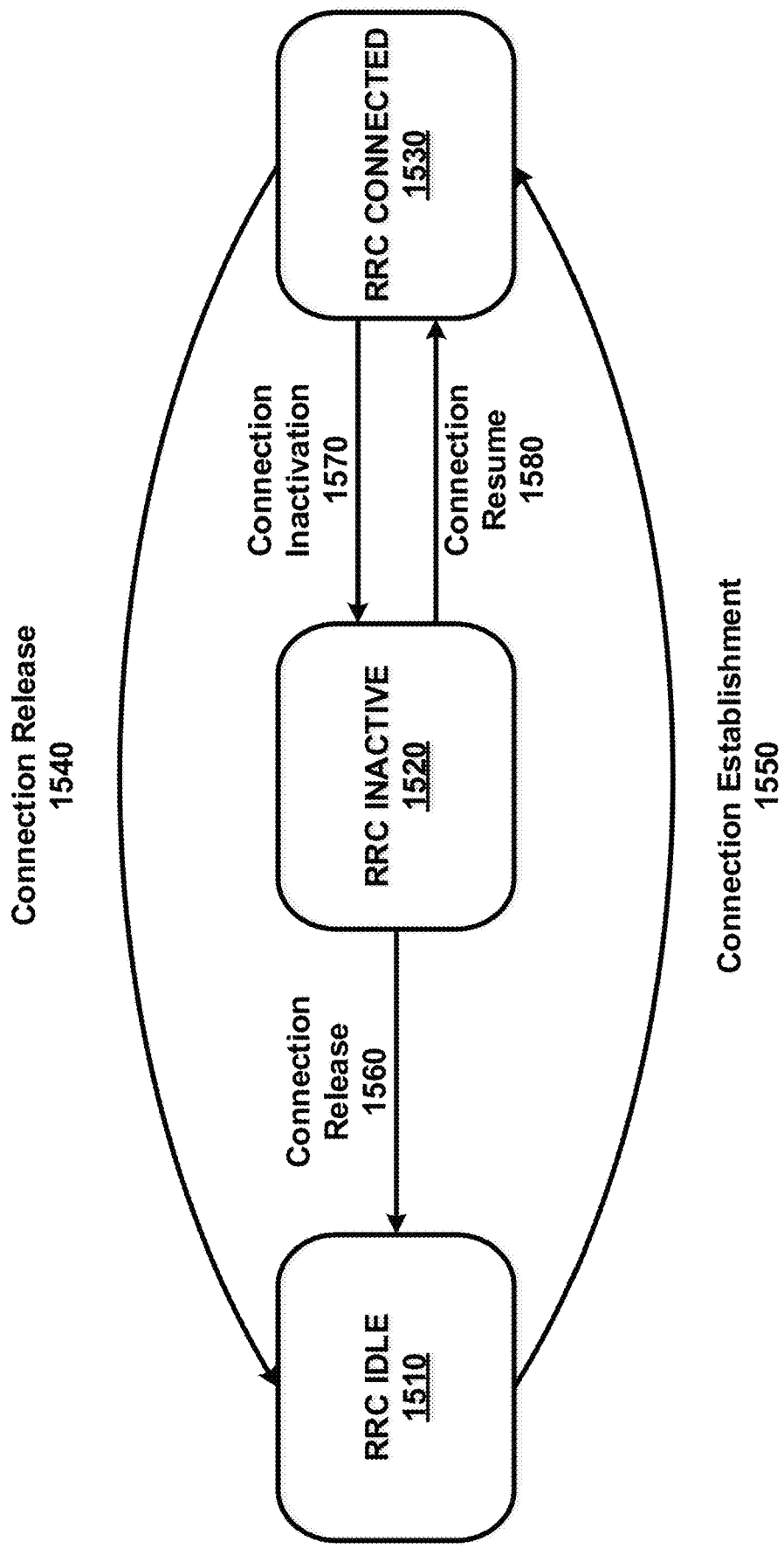
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may send (e.g., transmit) one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and/or with the last and least significant bit in the rightmost bit.

A MAC SDU may comprise a bit string that may be byte aligned (e.g., multiple of eight bits) in length. A MAC SDU may be included in a MAC PDU, for example, from the first bit onward. A MAC CE may be a bit string that may be byte aligned (e.g., multiple of eight bits) in length. A MAC subheader may be a bit string that may be byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

A MAC subheader may comprise, for example, an eight-bit L field. The LCID field may have six bits in length. The L field may have eight bits in length. A MAC subheader may comprise, for example, a sixteen-bit L field. The LCID field may have six bits in length. The L field may have sixteen bits in length. A MAC subheader may comprise: an R field comprising two bits in length; and an LCID field comprising multiple bits in length (e.g., if the MAC subheader corresponds to a fixed sized MAC CE), and/or padding. The LCID field may comprise six bits in length, and the R field may comprise two bits in length.

Multiple MAC CEs may be placed together, for example, in a DL MAC PDU. A MAC subPDU comprising a MAC CE may be, for example, prior to: a MAC subPDU comprising a MAC SDU, and/or a MAC subPDU comprising padding. Multiple MAC CEs may be included in an UL MAC PDU. A MAC subPDU comprising a MAC CE may be, for example, after some or all MAC subPDUs comprising a MAC SDU. The MAC subPDU may be, for example, before a MAC subPDU comprising padding.

A MAC entity of a base station may send (e.g., transmit), to a MAC entity of a wireless device, one or more MAC CEs. Multiple LCIDs may be associated with the one or more MAC CEs. The one or more MAC CEs may comprise at least one of: a SP ZP CSI-RS resource set activation/deactivation MAC CE; a PUCCH spatial relation activation/deactivation MAC CE; an SP SRS activation/deactivation MAC CE; an SP CSI reporting on PUCCH activation/deactivation MAC CE; a TCI state indication for wireless device-specific PDCCH MAC CE; a TCI state indication for wireless device-specific PDSCH MAC CE; an aperiodic CSI trigger state subselection MAC CE; a SP CSI-RS/CSI-IM resource set activation/deactivation MAC CE; a wireless device contention resolution identity MAC CE; a timing advance command MAC CE; a DRX command MAC CE; a long DRX command MAC CE; an SCell activation/deactivation MAC CE (e.g., 1 Octet); an SCell activation/deactivation MAC CE (e.g., 4 Octet); and/or a duplication activation/deactivation MAC CE. A MAC CE may comprise an LCID in the corresponding MAC subheader. Different MAC CEs may have different LCIDs in the corresponding MAC subheader. An LCID with 111011 in a MAC subheader may indicate a MAC CE associated with the MAC subheader is a long DRX command MAC CE.

The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. An LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have at least one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (e.g., PCell). A base station may send (e.g., transmit), to a wireless device, one or more messages comprising configuration parameters of a plurality of one or more secondary cells (e.g., SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

An SCell activation/deactivation MAC CE may comprise, for example, one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

An SCell Activation/Deactivation MAC CE may comprise, for example, four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example. In an example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, a first initial BWP may be a first BWP used for initial access. For the SCell, a second initial BWP may be a second BWP configured for the wireless device to first operate on the SCell if the SCell is activated.

A first DL and a first UL may switch BWP independently, for example, in paired spectrum (e.g., FDD). A second DL and a second UL may switch BWP simultaneously, for example, in unpaired spectrum (e.g., TDD). Switching between configured BWPs may be based on DCI and/or an inactivity timer. An expiry of the inactivity timer associated with a cell may switch an active BWP to a default BWP, for example, if the inactivity timer is configured for a serving cell. The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell. A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bandwidthpartInactivityTimer). The BWP switching may be controlled by a MAC entity, for example, based on initiating a random access procedure. A BWP may be initially active without receiving a PDCCH indicating a downlink assignment or an uplink grant, for example, based on an addition of an SpCell or an activation of an SCell. The active BWP for a serving cell may be indicated by an RRC message and/or a PDCCH message (e.g., PDCCH order). A DL BWP may be paired with an UL BWP, and/or BWP switching may be common for both UL and DL, for example, for unpaired spectrum.

A MAC entity may use operations on an active BWP for an activated serving cell configured with a BWP, such as one or more of: transmitting via an UL-SCH; transmitting via a RACH; monitoring a PDCCH; transmitting via a PUCCH; receiving via a DL-SCH; initializing and/or reinitializing suspended configured uplink grants of configured grant Type 1 according to a stored configuration, if any and/or to start in a symbol based on a procedure. On an inactive BWP for each activated serving cell configured with a BWP, a MAC entity: may refrain from transmitting via an UL-SCH, may refrain from transmitting via a RACH, may refrain from monitoring a PDCCH, may refrain from transmitting via a PUCCH, may refrain from transmitting an SRS, may refrain from receiving via a DL-SCH, may clear any configured downlink assignment and configured uplink grant of configured grant Type 2, and/or may suspend any configured uplink grant of configured Type 1.

A MAC entity may perform a random access procedure (e.g., based on an initiation of the random access procedure) on an active DL BWP and the active UL BWP, for example, if PRACH resources are configured for the active UL BWP. A MAC entity may switch to an initial DL BWP and an initial UL BWP, for example, if PRACH resources are not configured for an active UL BWP (e.g., based on initiation of a random access procedure). The MAC entity may perform the random access procedure on the initial DL BWP and the initial UL BWP, for example, based on the BWP switching.

A wireless device may perform BWP switching to a BWP indicated by a PDCCH, for example, if a MAC entity receives a PDCCH (e.g., a PDCCH order) for a BWP switching of a serving cell, for example, if a random access procedure associated with this serving cell is not ongoing. A wireless device may determine whether to switch a BWP or ignore the PDCCH for the BWP switching, for example, if a MAC entity received a PDCCH for a BWP switching while a random access procedure is ongoing in the MAC entity. The MAC entity may stop the ongoing Random Access procedure and initiate a second Random Access procedure on a new activated BWP, for example, if the MAC entity decides to perform the BWP switching. The MAC entity may continue with the ongoing Random Access procedure on the active BWP, for example if the MAC decides to ignore the PDCCH for the BWP switching. A wireless device may perform the BWP switching to a BWP indicated by the PDCCH, for example, if a MAC entity receives a PDCCH for a BWP switching addressed to a C-RNTI for a successful completion of a Random Access procedure.

The MAC entity may start or restart the BWP-InactivityTimer associated with the active DL BWP for a variety of reasons. The MAC entity may start or restart the BWP-InactivityTimer associated with the active DL BWP, for example, if one or more of the following occur: a BWP-InactivityTimer is configured for an activated serving sell, if a Default-DL-BWP is configured and an active DL BWP is not a BWP indicated by the Default-DL-BWP, if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a MAC-PDU is transmitted in a configured uplink grant or received in a configured downlink assignment, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, if a MAC-PDU is transmitted in a configured uplink grant or received in a configured downlink assignment, and/or if an ongoing random access procedure associated with the activated Serving Cell is successfully completed in response to receiving the PDCCH addressed to a C-RNTI.

The MAC entity may start or restart the BWP-InactivityTimer associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The MAC entity may stop the BWP-InactivityTimer associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated. The MAC entity may stop a second BWP-InactivityTimer associated with a second active DL BWP of an SpCell, for example, if the activated Serving Cell is an SCell (other than a PSCell).

The MAC entity may perform BWP switching to a BWP indicated by the Default-DL-BWP, for example, if one or more of the following occur: if a BWP-InactivityTimer is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP) for the serving cell. An initial active DL BWP may be determined, for example, by: a location and number of contiguous PRBs; a subcarrier spacing; and/or a cyclic prefix (e.g., for the control resource set for a Type0-PDCCH common search space). A wireless device may be provided (e.g., by a higher layer) a parameter (e.g., initial-UL-BWP) for an initial active UL BWP for a random access procedure, for example, for operation on a primary cell. The wireless device may be provided (e.g., by a higher layer) a parameter (e.g., Active-BWP-DL-Pcell) for first active DL BWP for receptions, for example, if a wireless device has a dedicated BWP configuration. The wireless device may be provided (e.g., by a higher layer) a parameter (e.g., Active-BWP-UL-Pcell) for a first active UL BWP for transmissions on a primary cell, for example, if a wireless device has a dedicated BWP configuration.

The wireless device may be configured with a variety of parameters for a DL BWP and/or for an UL BWP in a set of DL BWPs and/or UL BWPs, respectively, for a serving cell. The wireless device may be configured with one or more of: a subcarrier spacing (e.g., provided by higher layer parameter DL-BWP-mu or UL-BWP-mu), a cyclic prefix (e.g., provided by higher layer parameter DL-BWP-CP or UL-BWP-CP), a PRB offset with respect to the PRB (e.g., determined by higher layer parameters offset-pointA-low-scs and ref-scs) and a number of contiguous PRBs (e.g., provided by higher layer parameter DL-BWP-BW or UL-BWP-BW), an index in the set of DL BWPs or UL BWPs (e.g., by respective higher layer parameters DL-BWP-index or UL-BWP-index), a DCI format 1_0 or DCI format 1_1 detection to a PDSCH reception timing values (e.g., provided by higher layer parameter DL-data-time-domain), a PDSCH reception to a HARQ-ACK transmission timing values (e.g., provided by higher layer parameter DL-data-DL-acknowledgement), and/or a DCI 0_0 or DCI 0_1 detection to a PUSCH transmission timing values (e.g., provided by higher layer parameter UL-data-time-domain).

A DL BWP from a set of configured DL BWPs (e.g., with an index provided by higher layer parameter DL-BWP-index) may be paired with an UL BWP from a set of configured UL BWPs (e.g., with an index provided by higher layer parameter UL-BWP-index). A DL BWP from a set of configured DL BWPs may be paired with an UL BWP from a set of configured UL BWPs, for example, if the DL BWP index and the UL BWP index are equal (e.g., for unpaired spectrum operation). A wireless device may not be expected to receive a configuration where the center frequency for a DL BWP is different from the center frequency for an UL BWP, for example, if the DL-BWP-index of the DL BWP is equal to the UL-BWP-index of the UL BWP (e.g., for unpaired spectrum operation).

A wireless device may be configured with control resource sets (e.g., coresets) for every type of common search space and/or for wireless device-specific search space, for example, for a DL BWP in a set of DL BWPs on a primary cell. The wireless device may not be expected to be configured without a common search space on the PCell, or on the PSCell, in the active DL BWP. The wireless device may be configured with control resource sets for PUCCH transmissions, for example, for an UL BWP in a set of UL BWPs. A wireless device may receive a PDCCH message and/or a PDSCH message in a DL BWP, for example, according to a configured subcarrier spacing and/or a CP length for the DL BWP. A wireless device may transmit via a PUCCH and/or via a PUSCH in an UL BWP, for example, according to a configured subcarrier spacing and CP length for the UL BWP.

The BWP indicator field value may indicate an active DL BWP, from the configured DL BWP set, for DL receptions, for example, if a BWP indicator field is configured in DCI format 1_1. The BWP indicator field value may indicate the active UL BWP, from the configured UL BWP set, for UL transmissions. A wireless device may be provided (e.g., for the primary cell) with a higher layer parameter (e.g., Default-DL-BWP, or any other a default DL BWP among the configured DL BWPs), for example, if a BWP indicator field is configured in DCI format 0_1. The default BWP may be the initial active DL BWP, for example, if a wireless device is not provided a default DL BWP by higher layer parameter Default-DL-BWP. A wireless device may be expected to detect a DCI format 0_1 indicating active UL BWP change, or a DCI format 1_1 indicating active DL BWP change, for example, if a corresponding PDCCH is received within first 3 symbols of a slot.

A wireless device may be provided (e.g., for a primary cell) with a higher layer parameter (e.g., Default-DL-BWP, or any other a default DL BWP among the configured DL BWPs). The default DL BWP may be the initial active DL BWP, for example, if a wireless device is not provided a default DL BWP by the higher layer parameter Default-DL-BWP. A wireless device may be provided with a higher layer parameter (e.g., BWP-InactivityTimer) for a timer value for the primary cell. The wireless device may increment the timer, if running, every interval of 1 millisecond for frequency range 1, every 0.5 milliseconds for frequency range 2, or any other interval, for example, if the wireless device may not detect a DCI format 1_1 for paired spectrum operation or, for example, if the wireless device may not detect a DCI format 1_1 or DCI format 0_1 for unpaired spectrum operation during the interval.

Wireless device procedures on the secondary cell may be same as on the primary cell. Wireless device procedures may use the timer value for the secondary cell and the default DL BWP for the secondary cell, for example, if a wireless device is configured for a secondary cell with a higher layer parameter (e.g., Default-DL-BWP) indicating a default DL BWP among the configured DL BWPs and the wireless device is configured with a higher layer parameter (e.g., BWP-InactivityTimer) indicating a timer value. The wireless device may use the indicated DL BWP and the indicated UL BWP on the secondary cell as the respective first active DL BWP and first active UL BWP on the secondary cell or carrier, for example, if a wireless device is configured by a higher layer parameter (e.g., Active-BWP-DL-SCell) for a first active DL BWP and by a higher layer parameter (e.g., Active-BWP-UL-SCell) for a first active UL BWP on a secondary cell or carrier.

Figure 16:
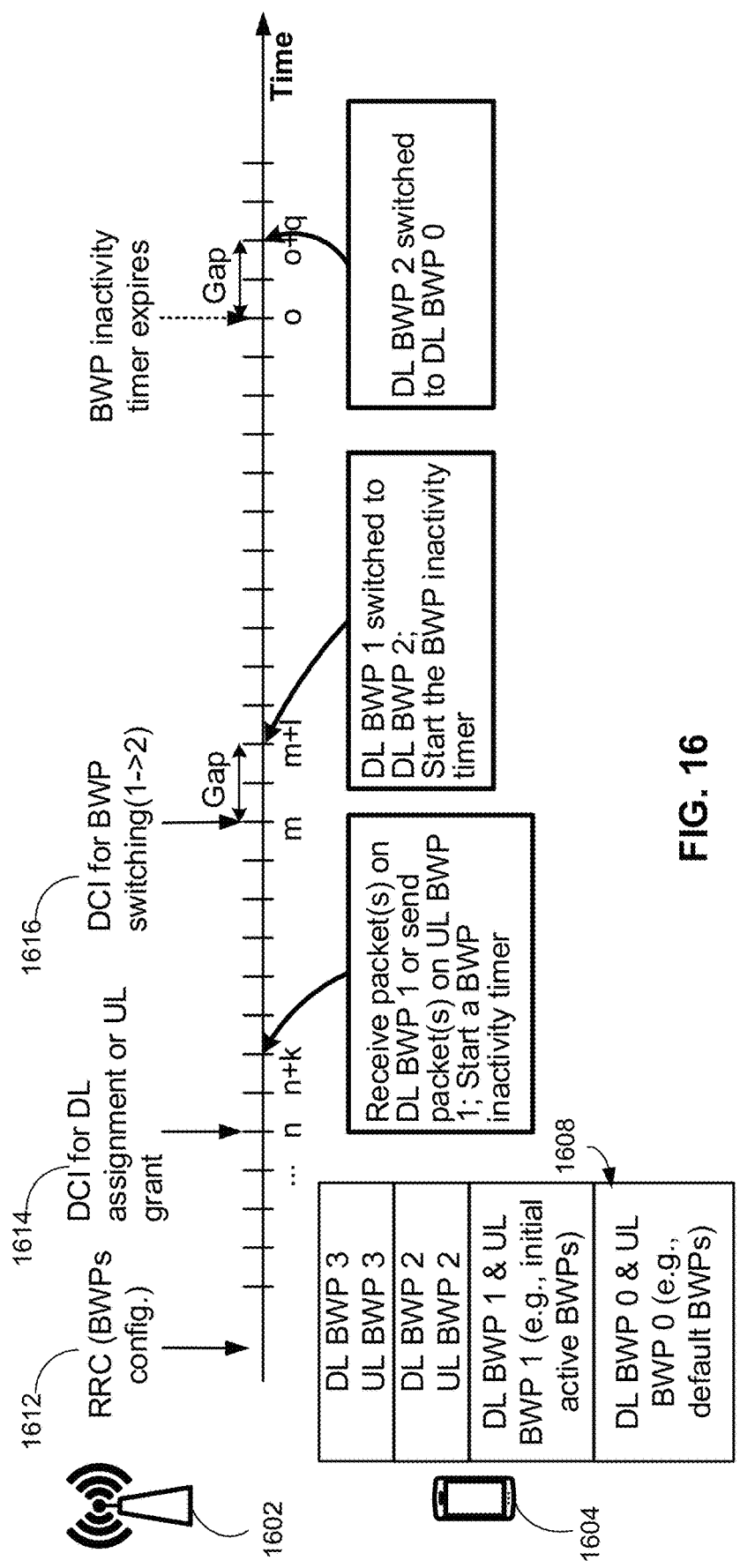
FIG. 16 shows an example of BWP operation.

FIG. 16 shows an example of BWP switching. The BWP switching may be on a PCell. A base station 1602 may send (e.g., transmit) one or more messages (e.g., one or more RRC messages) 1612 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in a table 1608). The DL (and/or UL) BWP 0 may be a default BWP. The DL (and/or UL) BWP 1 may be an initial active BWP (e.g., an initial DL BWP or an initial UL BWP). A wireless device 1604 may determine the multiple BWPs configured for the wireless device 1604, for example, based on the one or more messages 1612. The base station 1602 may send DCI 1614 for a DL assignment (e.g., at a time n). The DCI 1614 may be sent via the DL BWP 1 (e.g., an initial DL BWP). The wireless device 1604 may receive a packet via the DL BWP 1 or via another active DL BWP (e.g., at a time n+k), for example, based on the DL assignment. The wireless device 1604 may start a BWP inactivity timer (e.g., at the time n+k). The wireless device 1604 may start the BWP inactivity timer, for example, after receiving scheduled downlink packets. The base station 1602 may send DCI 1614 for an UL grant (e.g., at the time n). The DCI 1614 may be sent via the DL BWP 1 (e.g., a first DL BWP or an initial DL BWP). The wireless device 1604 may send a packet via an UL BWP 1 (e.g., via a first UL BWP or an initial UL BWP at a time n+k), for example, based on the UL grant. The wireless device 1604 may start a BWP inactivity timer (e.g., at the time n+k). The wireless device 1604 may start the BWP inactivity timer, for example, after sending scheduled uplink packets.

The base station 1602 may send DCI 1616 for BWP switching (e.g., a BWP switching from the DL BWP 1 to the DL BWP 2). The DCI 1616 may be sent via the active DL BWP 1 (e.g., at a time m). The wireless device 1604 may receive the DCI 1616, for example, by monitoring a PDCCH on the active DL BWP 1. The wireless device 1604 may switch the DL BWP 1 to the DL BWP 2 (e.g., at a time m+1), for example, based on the DCI 1616. There may be a delay (e.g., a gap) between the wireless device 1604 receiving the DCI 1616 and the wireless device 1604 switching to the DL BWP 2. The wireless device 1604 may start and/or re-start the BWP inactivity timer (e.g., at the time m+1), for example, after the BWP switching. The BWP inactivity timer may expire (e.g., at a time o), for example, if the wireless device 1604 does not perform reception or transmission for a period of time (e.g., a period from the time m+1 to the time o). The wireless device 1604 may switch the DL BWP 2 to the DL BWP 0 (e.g., a default BWP). The fallback to the DL BWP 0 may occur (e.g., at a time o+q), for example, after the BWP inactivity timer expires. There may be a delay (e.g., a gap) between the BWP inactivity timer expiration (e.g., at a time o) and the wireless device 1604 switching to the DL BWP 0 (e.g., at a time o+q). BWPs are described as example resources, and any wireless resource may be applicable to one or more procedures described herein.

Figure 17:
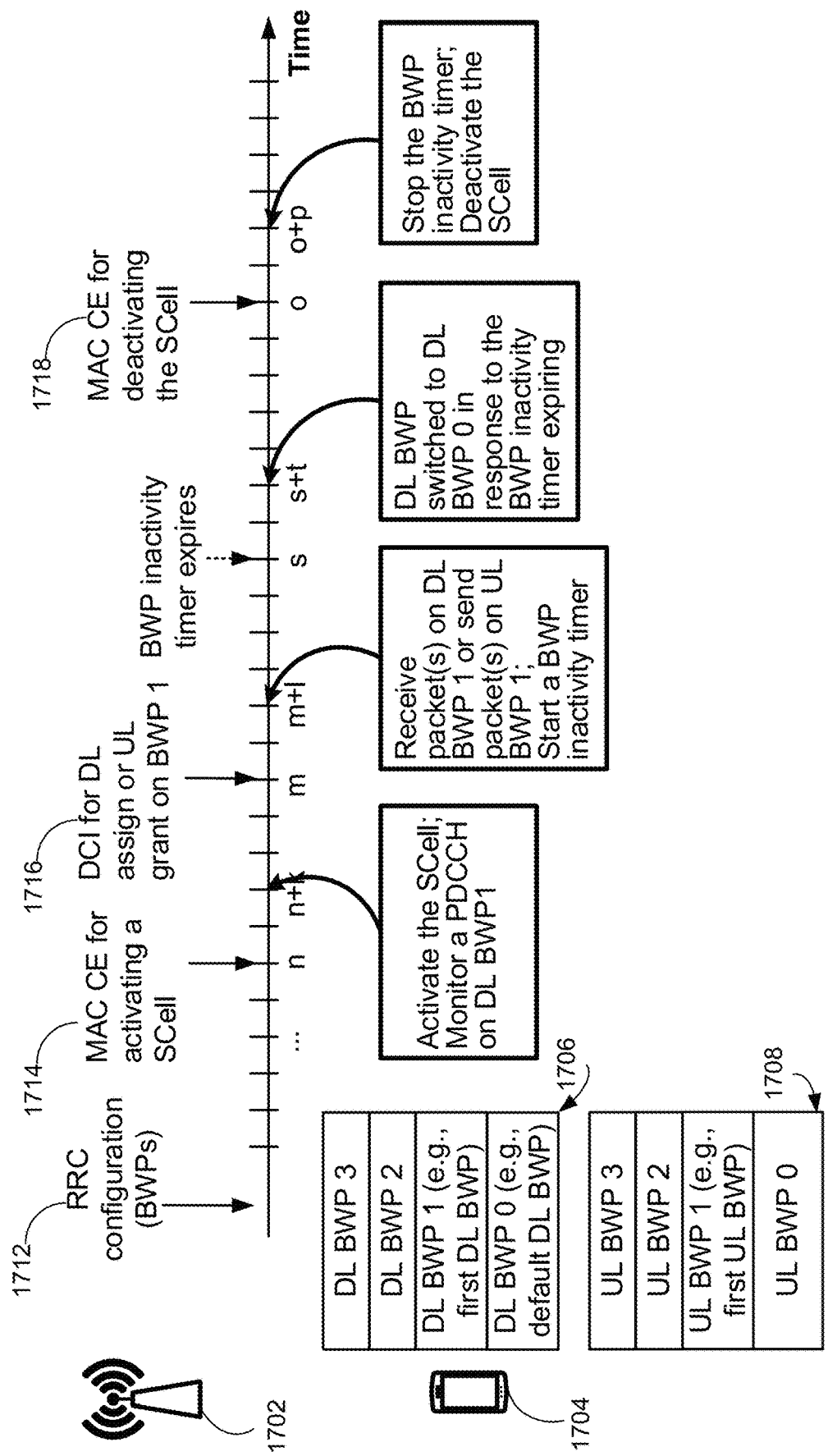
FIG. 17 shows an example of BWP operation in an SCell.

FIG. 17 shows an example of BWP switching. The BWP switching may be performed on an SCell. A base station 1702 may send (e.g., transmit) one or more messages (e.g., one or more RRC messages) 1712 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in tables 1706 and 1708, respectively). The multiple BWPs may be BWPs of an SCell. The DL (and/or UL) BWP 0 may be a default BWP. The DL (and/or UL) BWP 1 may be a first (or initial) active BWP (e.g., a first DL BWP or a first UL BWP). A wireless device 1704 may determine the multiple BWPs configured for the wireless device 1704, for example, based on the one or more messages 1712. The base station 1702 may send, to the wireless device 1704, a MAC CE 1714 for activating the SCell (e.g., at a time n). The wireless device 1704 may activate the SCell (e.g., at a time n+k). The wireless device 1704 may start to monitor a PDCCH on (e.g., sent via) the DL BWP 1. The base station 1702 may send DCI 1716 for a DL assignment (e.g., at a time m). The DCI 1716 may be sent via the DL BWP 1 (e.g., a first DL BWP). The wireless device 1704 may receive a packet via the DL BWP 1 or via another active DL BWP (e.g., at a time m+1), for example, based on the DL assignment. The wireless device 1704 may start a BWP inactivity timer (e.g., at the time m+1). The wireless device 1704 may start the BWP inactivity timer, for example, after receiving scheduled downlink packets. The base station 1702 may send DCI 1716 for an UL grant (e.g., at the time m). The DCI 1716 may be sent via the DL BWP 1 (e.g., a first DL BWP or an initial DL BWP). The wireless device 1704 may send a packet via an UL BWP 1 (e.g., via a first UL BWP or an initial UL BWP at a time m+1), for example, based on the UL grant. The wireless device 1704 may start a BWP inactivity timer (e.g., at the time m+1). The wireless device 1704 may start the BWP inactivity timer, for example, after sending scheduled uplink packets.

The BWP inactivity timer may expire (e.g., at a time s). The BWP inactivity may expire, for example, if the wireless device 1704 does not perform reception or transmission for a period of time (e.g., a period from the time m+1 to the time s). The wireless device 1704 may switch the DL BWP 1 to the DL BWP 0 (e.g., a default BWP). The fallback to the DL BWP 0 may occur (e.g., at a time s+t), for example, after the BWP inactivity timer expires. The base station 1702 may send, to the wireless device 1704, a MAC CE 1718 for deactivating the SCell (e.g., at a time o). The wireless device 1704 may deactivate the SCell and/or stop the BWP inactivity timer (e.g., at a time o+p). The wireless device 1704 may deactivate the SCell and/or stop the BWP inactivity timer, for example, after receiving and/or checking an indication of the MAC CE 1718.

A MAC entity may use operations on an active BWP for an activated serving cell configured with a BWP, such as one or more of: transmitting via an UL-SCH; transmitting via a RACH; monitoring a PDCCH; transmitting via a PUCCH; receiving via a DL-SCH; initializing and/or reinitializing suspended configured uplink grants of configured grant Type 1 according to a stored configuration, if any and/or to start in a symbol based on a procedure. On an inactive BWP for each activated serving cell configured with a BWP, a MAC entity: may refrain from transmitting via an UL-SCH, may refrain from transmitting via a RACH, may refrain from monitoring a PDCCH, may refrain from transmitting via a PUCCH, may refrain from transmitting an SRS, may refrain from receiving via a DL-SCH, may clear any configured downlink assignment and configured uplink grant of configured grant Type 2, and/or may suspend any configured uplink grant of configured Type 1.

A random access procedure (e.g., based on an initiation of the random access procedure) on an active DL BWP and the active UL BWP may be performed, for example, if PRACH resources are configured for the active UL BWP. The random access procedure may be performed, for example, by a MAC entity. A MAC entity may switch to an initial DL BWP and an initial UL BWP, for example, if PRACH resources are not configured for an active UL BWP (e.g., based on initiation of a random access procedure). The MAC entity may perform the random access procedure on the initial DL BWP and the initial UL BWP, for example, based on the BWP switching.

A wireless device may perform BWP switching to a BWP indicated by a PDCCH, for example, if a MAC entity receives a PDCCH (e.g., a PDCCH order) for a BWP switching of a serving cell, for example, if a random access procedure associated with this serving cell is not ongoing.

A wireless device may determine whether to switch a BWP or ignore the PDCCH for the BWP switching, for example, if a MAC entity received a PDCCH for a BWP switching while a random access procedure is ongoing in the MAC entity. The MAC entity may stop the ongoing Random Access procedure and initiate a second Random Access procedure on a new activated BWP, for example, if the MAC entity decides to perform the BWP switching. The MAC entity may continue with the ongoing Random Access procedure on the active BWP, for example if the MAC decides to ignore the PDCCH for the BWP switching. A wireless device may perform the BWP switching to a BWP indicated by the PDCCH, for example, if a MAC entity receives a PDCCH for a BWP switching addressed to a C-RNTI for a successful completion of a Random Access procedure.

The MAC entity may start or restart the BWP-InactivityTimer associated with the active DL BWP for a variety of reasons. The MAC entity may start or restart the BWP-InactivityTimer associated with the active DL BWP, for example, if one or more of the following occur: a BWP-InactivityTimer is configured for an activated serving sell, if a Default-DL-BWP is configured and an active DL BWP is not a BWP indicated by the Default-DL-BWP, if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a MAC-PDU is transmitted in a configured uplink grant or received in a configured downlink assignment, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, if a MAC-PDU is transmitted in a configured uplink grant or received in a configured downlink assignment, and/or if an ongoing random access procedure associated with the activated Serving Cell is successfully completed in response to receiving the PDCCH addressed to a C-RNTI.

The MAC entity may start or restart the BWP-InactivityTimer associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The MAC entity may stop the BWP-InactivityTimer associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated. The MAC entity may stop a second BWP-InactivityTimer associated with a second active DL BWP of an SpCell, for example, if the activated Serving Cell is an SCell (other than a PSCell).

The MAC entity may perform BWP switching to a BWP indicated by the Default-DL-BWP, for example, if one or more of the following occur: if a BWP-InactivityTimer is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP) for the serving cell. An initial active DL BWP may be determined, for example, by: a location and number of contiguous PRBs; a subcarrier spacing; and/or a cyclic prefix (e.g., for the control resource set for a Type0-PDCCH common search space). A wireless device may be provided (e.g., by a higher layer) a parameter (e.g., initial-UL-BWP) for an initial active UL BWP for a random access procedure, for example, for operation on a primary cell. The wireless device may be provided (e.g., by a higher layer) a parameter (e.g., Active-BWP-DL-Pcell) for first active DL BWP for receptions, for example, if a wireless device has a dedicated BWP configuration. The wireless device may be provided (e.g., by a higher layer) a parameter (e.g., Active-BWP-UL-Pcell) for a first active UL BWP for transmissions on a primary cell, for example, if a wireless device has a dedicated BWP configuration.

The wireless device may be configured with a variety of parameters for a DL BWP and/or for an UL BWP in a set of DL BWPs and/or UL BWPs, respectively, for a serving cell. The wireless device may be configured with one or more of: a subcarrier spacing (e.g., provided by higher layer parameter DL-BWP-mu or UL-BWP-mu), a cyclic prefix (e.g., provided by higher layer parameter DL-BWP-CP or UL-BWP-CP), a PRB offset with respect to the PRB (e.g., determined by higher layer parameters offset-pointA-low-scs and ref-scs) and a number of contiguous PRBs (e.g., provided by higher layer parameter DL-BWP-BW or UL-BWP-BW), an index in the set of DL BWPs or UL BWPs (e.g., by respective higher layer parameters DL-BWP-index or UL-BWP-index), a DCI format 1_0 or DCI format 1_1 detection to a PDSCH reception timing values (e.g., provided by higher layer parameter DL-data-time-domain), a PDSCH reception to a HARQ-ACK transmission timing values (e.g., provided by higher layer parameter DL-data-DL-acknowledgement), and/or a DCI 0_0 or DCI 0_1 detection to a PUSCH transmission timing values (e.g., provided by higher layer parameter UL-data-time-domain).

A DL BWP from a set of configured DL BWPs (e.g., with an index provided by higher layer parameter DL-BWP-index) may be paired with an UL BWP from a set of configured UL BWPs (e.g., with an index provided by higher layer parameter UL-BWP-index). A DL BWP from a set of configured DL BWPs may be paired with an UL BWP from a set of configured UL BWPs, for example, if the DL BWP index and the UL BWP index are equal (e.g., for unpaired spectrum operation). A wireless device may not be expected to receive a configuration where the center frequency for a DL BWP is different from the center frequency for an UL BWP, for example, if the DL-BWP-index of the DL BWP is equal to the UL-BWP-index of the UL BWP (e.g., for unpaired spectrum operation).

A wireless device may be configured with control resource sets (e.g., coresets) for every type of common search space and/or for wireless device-specific search space, for example, for a DL BWP in a set of DL BWPs on a primary cell. The wireless device may not be expected to be configured without a common search space on the PCell, or on the PSCell, in the active DL BWP. The wireless device may be configured with control resource sets for PUCCH transmissions, for example, for an UL BWP in a set of UL BWPs. A wireless device may receive a PDCCH message and/or a PDSCH message in a DL BWP, for example, according to a configured subcarrier spacing and/or a CP length for the DL BWP. A wireless device may transmit via a PUCCH and/or via a PUSCH in an UL BWP, for example, according to a configured subcarrier spacing and CP length for the UL BWP.

The BWP indicator field value may indicate an active DL BWP, from the configured DL BWP set, for DL receptions, for example, if a BWP indicator field is configured in DCI format 1_1. The BWP indicator field value may indicate the active UL BWP, from the configured UL BWP set, for UL transmissions. A wireless device may be provided (e.g., for the primary cell) with a higher layer parameter (e.g., Default-DL-BWP, or any other a default DL BWP among the configured DL BWPs), for example, if a BWP indicator field is configured in DCI format 0_1. The default BWP may be the initial active DL BWP, for example, if a wireless device is not provided a default DL BWP by higher layer parameter Default-DL-BWP. A wireless device may be expected to detect a DCI format 0_1 indicating active UL BWP change, or a DCI format 1_1 indicating active DL BWP change, for example, if a corresponding PDCCH is received within first 3 symbols of a slot.

A wireless device may be provided (e.g., for a primary cell) with a higher layer parameter (e.g., Default-DL-BWP, or any other a default DL BWP among the configured DL BWPs). The default DL BWP may be the initial active DL BWP, for example, if a wireless device is not provided a default DL BWP by the higher layer parameter Default-DL-BWP. A wireless device may be provided with a higher layer parameter (e.g., BWP-InactivityTimer) for a timer value for the primary cell. The wireless device may increment the timer, if running, every interval of 1 millisecond for frequency range 1, every 0.5 milliseconds for frequency range 2, or any other interval, for example, if the wireless device may not detect a DCI format 1_1 for paired spectrum operation or, for example, if the wireless device may not detect a DCI format 1_1 or DCI format 0_1 for unpaired spectrum operation during the interval.

Wireless device procedures on the secondary cell may be same as on the primary cell. Wireless device procedures may use the timer value for the secondary cell and the default DL BWP for the secondary cell, for example, if a wireless device is configured for a secondary cell with a higher layer parameter (e.g., Default-DL-BWP) indicating a default DL BWP among the configured DL BWPs and the wireless device is configured with a higher layer parameter (e.g., BWP-InactivityTimer) indicating a timer value. The wireless device may use the indicated DL BWP and the indicated UL BWP on the secondary cell as the respective first active DL BWP and first active UL BWP on the secondary cell or carrier, for example, if a wireless device is configured by a higher layer parameter (e.g., Active-BWP-DL-SCell) for a first active DL BWP and by a higher layer parameter (e.g., Active-BWP-UL-SCell) for a first active UL BWP on a secondary cell or carrier.

A wireless device may have difficulty in determining whether DCI is indicating a BWP switching, a BWP activation, or a BWP deactivation, for example, if multiple active BWPs in a cell (e.g., PCell or SCell) are supported. A DCI format may be used (e.g., any legacy DCI format, a DCI format of NR Release 15, or any other DCI format). The DCI format may comprise a BWP index indicating a new BWP. Misalignment between a base station and the wireless device may occur regarding a state of a BWP. A base station may send (e.g., transmit) DCI comprising: a first field indicating a BWP, and/or a second field indicating a BWP action. The BWP action may comprise one or more of: switching to the BWP, activating the BWP, and/or deactivating the BWP. A base station may send (e.g., transmit) a MAC CE comprising an n-bit bitmap (e.g., an 8-bit bitmap associated with 4 bits for DL BWPs and/or 4 bits for UL BWPs, or any other quantity of bits) indicating that one or more BWPs may be activated/deactivated (e.g., activated or deactivated). A base station may designate a first BWP of a cell as a primary active BWP. The base station may send (e.g., transmit), via the primary active BWP, DCI activating/deactivating (e.g., activating or deactivating) a secondary BWP of the cell.

Multiple active BWPs may increase spectral efficiency, communication speed, interference mitigation, provide service-friendly BWP management, and/or other performance measures, for example, relative to a configuration supporting a single active BWP at a time (e.g., a single DL BWP and a single UL BWP at a time). Multiple active BWPs may support a plurality of active DL BWPs and/or a plurality of active UL BWPs. Configuring multiple active BWPS may require more complex BWP control protocols and technical designs, for example, relative to a single active BWP configuration. Some RRC signaling and/or DCI formats (e.g., legacy signaling and/or format, and/or other signaling and/or formats) may cause one or more problems, such as the misalignment between a base station and a wireless device regarding states of multiple BWPs.

One or more RRC signaling messages and/or one or more DCI formats may be enhanced. An RRC message may configure multiple active BWPs. An RRC message may configure one or more primary BWPs and one or more secondary BWPs. An RRC message may configure whether the one or more primary BWPs are switchable by DCI and/or a MAC CE. An RRC message may configure different BWPs for sending DCI for indicating a BWP change, for example, based on whether the one or more primary BWPs are switchable by DCI and/or a MAC CE. DCI may have a plurality of fields associated with a BWP control. A first field of DCI may indicate a BWP ID. A second field of the DCI may indicate an action associated with a BWP indicated by the BWP ID. The second field may have different sizes, for example, depending on different configurations and/or requirements. The size of the second field may be (e.g., semi-statically) changed (e.g., based on one or more RRC messages). The size of the second field may be determined, for example, based on whether a designated BWP is indicated as a primary active BWP and/or whether the designated BWP is allowed to be switched dynamically.

One or more MAC CEs may be configured for a plurality of BWP control, for example, if multiple active BWPs are supported. A MAC CE may comprise a bitmap associated with a plurality of DL BWPs and/or a plurality of UL BWPs. The MAC CE may indicate activation/deactivation of each of multiple BWPs.

Some communications (e.g., communications based on one or more DCIs) may enable dynamic BWP state changes without (or with reduced) processing delays and may avoid or reduce misalignments between a base station and a wireless device. These communications may be applicable, for example, if services, channel quality, and/or traffic loading on BWPs change frequently. Some other communications (e.g., communications based on one or more MAC CEs) may provide more robust BWP state controls and/or may reduce blind decoding complexity and/or power consumption of wireless devices. The latter communications may change states of a plurality of BWPs at the same time and may reduce signaling overhead. The latter communications may be applicable, for example, if services, channel quality, and/or traffic loading on BWPs change infrequently. Different communications may be used together or may be separately configured between a base station and a wireless device, for example, depending on varying requirements and signaling environments.

A base station may send (e.g., transmit) to, or receive from, a wireless device one or more data packets. The one or more data packets may be sent, or received, via one or more radio resources. The one or more date packets may be one or more URLLC (Ultra-Reliable Low Latency Communication) data packets with a small packet size (e.g., <100 bytes), which may require ultra-reliable (e.g., BLER less than $10^{\wedge(-5)}$) and low latency delivery (e.g., less than 1 millisecond) between the base station and the wireless device. The one or more data packets may be one or more eMBB (enhanced Mobile Broadband) data packets with a large packet size (e.g., >1000 bytes), which may require a large bandwidth (e.g., 400 MHz~1 GHz) and/or a large amount of radio resources for transmission. The one or more date packets may be one or more machine-type communication (e.g., MTC) data packets with a small packet size, which require a wide communication coverage (e.g., 10 KM~100 KM) or a transmission to a wireless device located in a basement. Other types of the one or more data packets may comprise vehicle to everything (V2X) packet(s) which may be transmitted between vehicles, or between vehicle and pedestrian, or between vehicle and roadside node, packet of industrial internet of things (IIOT), and the like. It may be beneficial to transmit a first type of service (eMBB, URLLC, MTC, V2X and/or IIOT) on a first active BWP of a cell and transmit a second type of service (eMBB, URLLC, V2X and/or IIOT) on a second active BWP of the cell, for example, if multiple services are launched in a cell. BWP and/or CA operation configurations may support at most one active BWP in a cell. The BWP and/or CA operation configurations may be less efficient and/or result in significant transmission latency, for example, if a base station attempts to send (e.g., transmit), to a wireless device, data packets for multiple services on multiple active BWPs. Activation/deactivation of an SCell based on a MAC CE (e.g., for adding an additional active BWP) may take a long time (e.g., several tens of milliseconds) and a significant delay may occur, for example, if the base station attempts to send the data packets by frequently activating and/or deactivating the multiple BWPs. Data transmission associated with some types of service on an additional active BWP of the SCell may not be tolerant of a delay caused by the activation/deactivation. The transmission latency may be improved, for example, by supporting multiple active BWPs in a cell.

A base station and/or a wireless device may be configured with multiple BWPs for a cell. A base station and a wireless device may communicate with each other via multiple active BWPs of the multiple BWPs in parallel (e.g., simultaneously or overlapped in time) to accommodate multiple services (e.g., eMBB, URLLC, VTX, IIOT, and/or MTC). A base station may send (e.g., transmit), via a first active BWP, an eMBB data packet to a wireless device. The base station may send (e.g., transmit), via a second active BWP, a URLLC data packet to the wireless device. The base station may send (e.g., transmit), via a third active BWP, an MTC data packet to the wireless device. Transmitting multiple data packets for different services via different active BWPs in parallel (e.g., simultaneously or overlapped in time) may reduce latency. Transmitting first data (e.g., eMBB data) and second data (e.g., URLLC data) via a single active BWP may cause interruption of one transmission (e.g., the eMBB data transmission) by another transmission (e.g., the URLLC data transmission). Transmitting multiple data packets for different services via different active BWPs in parallel (e.g., simultaneously or overlapped in time) may avoid the interruption. Physical and MAC layer procedures configured for the BWP operation configuration that does not support multiple active BWPs in a cell may not be suitable for the BWP operation configuration that supports multiple active BWPs in a cell (e.g., such an implementation may result in an inefficient BWP management process). Multiple active BWPs may not be efficiently supported in some systems (e.g., legacy systems and/or NR physical layer and MAC layer operation procedures). Physical layer and MAC layer procedures may be enhanced, and evolved signaling for an efficient BWP operation procedure may be configured to support multiple active BWPs operation in a cell.

A base station may send (e.g., transmit), to a wireless device, one or more messages comprising configuration parameters of a cell. The one or more messages may comprise one or more RRC messages (e.g., an RRC connection reconfiguration message, an RRC connection reestablishment message, and/or an RRC connection setup message). The cell may be a PCell (or a PSCell) or an SCell, for example, if a carrier aggregation or dual connectivity is configured. The cell may comprise a plurality of downlink BWPs. Each of the plurality of downlink BWPs may be associated with a BWP ID (e.g., a BWP-specific ID) and/or one or more parameters. The cell may comprise a plurality of uplink BWPs. Each of the plurality of uplink BWPs may be associated with a BWP ID (e.g., a BWP-specific ID) and/or one or more second parameters.

Each of the plurality of the downlink BWPs may be in one of an active state and an inactive state. A wireless device may perform operations via an active BWP (e.g., a DL BWP or an UL BWP). The operations may comprise transmitting an UL-SCH, transmitting a RACH, monitoring a PDCCH, transmitting a PUCCH, receiving a DL-SCH, and/or initializing (or reinitializing) any suspended configured uplink grants of configured grant Type 1 according to a stored configuration. For an inactive BWP (e.g., a DL BWP or an UL BWP), the wireless device may not transmit an UL-SCH, may not transmit a RACH, may not monitor a PDCCH, may not transmit a PUCCH, may not transmit an SRS, may not receive a DL-SCH, may clear any configured downlink assignment and configured uplink grant of configured grant Type 2, and/or may suspend any configured uplink grant of configured Type 1.

The one or more parameters (and/or the one or more second parameters) may comprise at least one of: a control resource set identified by a control resource set index; a subcarrier spacing; a cyclic prefix; a DM-RS scrambling sequence initialization value; a number of consecutive symbols; a set of resource blocks in frequency domain; a CCE-to-REG mapping; an REG bundle size; a cyclic shift for the REG bundle; an antenna port quasi-co-location; and/or an indication for a presence or absence of a TCI field for DCI format 1_0 or 1_1 transmitted on the control resource set. The one or more parameters may comprise cell-specific parameters. The one or more second parameters may comprise BWP-specific parameters. The configuration parameters may further indicate at least one of: an initial active DL BWP, of the plurality of DL BWPs, identified by a first BWP ID and/or a default DL BWP, of the plurality of DL BWPs, identified by a second BWP ID. The second BWP ID may be same as, or different from, the first BWP ID. The default DL BWP may be in inactive state, for example, if the second BWP ID is different from the first BWP ID of the initial active DL BWP.

The initial active DL BWP may be associated with one or more control resource set for one or more common search space (e.g., type0-PDCCH common search space). A wireless device may monitor a first PDCCH sent via the initial active DL BWP of a PCell (or a PSCell) to detect DCI in the first PDCCH, for example, if the wireless device switches from RRC idle state to RRC connected state.

A base station may activate an additional BWP dynamically (e.g., via DCI, a MAC CE, etc.), for example, if at least one of multiple types of services are triggered for transmission via the additional BWP. The base station may send (e.g., transmit) a first command to the wireless device to activate a second DL BWP, of the plurality of DL BWPs, indicated (e.g., identified) by a third BWP ID. The first command may be a MAC CE or DCI. The third BWP ID may be different from the first BWP ID and/or different from the second BWP ID. The wireless device may transition (e.g., switch) the second DL BWP from inactive state to active state and/or may maintain the initial active BWP in active state, for example, after or in response to the activating. The wireless device may monitor a first PDCCH sent via the initial active DL BWP. The wireless device may monitor a second PDCCH sent via the second DL BWP in parallel (e.g., simultaneously or overlapped in time), for example, after or in response to the activating. Activating the second DL BWP may not change the state of the initial active DL BWP.

FIG. 18A shows an example of configuring multiple active BWPs. The base station may send (e.g., transmit) the first command (e.g., at a time T1) to the wireless device to activate another BWP (e.g., an A-BWP2), for example, if there is at least one active DL BWP (e.g., an A-BWP1) of a plurality of active BWPs in a cell. The A-BWP2 may be different from the A-BWP1. The wireless device may transition (e.g., switch) the A-BWP2 from inactive state to active state and/or maintain the A-BWP1 in active state (e.g., at a time T2 after the time T1). Activating the A-BWP2 may not change the state of the A-BWP1.

A base station may send (e.g., transmit), to a wireless device, one or more RRC messages comprising configuration parameters indicating a first active DL BWP and at least one second active DL BWP of a PCell (or a PSCell), for example, if multiple active BWPs are supported by the wireless device. The wireless device may monitor a first PDCCH sent via the first active DL BWP of a PCell (or a PSCell) and monitor at least one second PDCCH sent via the at least one second active DL BWP of the PCell (or the PSCell). The wireless device may monitor the first PDCCH and the at least one second PDCCH to detect one or more DCIs (e.g., when the wireless device is in RRC connected mode or the wireless devices switches from RRC idle state to RRC connected state). Configuring multiple active BWPs by the one or more RRC messages may reduce signaling overhead for BWP activation.

A base station may send (e.g., transmit), to a wireless device, one or more RRC messages comprising configuration parameters indicating a first active DL BWP of an SCell and at least one second active DL BWP of the SCell, for example, if multiple active BWPs are supported by the wireless device. The wireless device may monitor a first PDCCH sent via the first active DL BWP and at least one second PDCCH sent via the at least one second active DL BWP of the SCell. The wireless device may monitor the first PDCCH and the at least one second PDCCH to detect one or more DCIs (e.g., after or in response to the SCell being activated by a MAC CE or DCI). Configuring multiple active BWPs by the one or more RRC messages may reduce signaling overhead for BWP activation.

FIG. 18B shows an example of a BWP switching if multiple active BWPs are supported. A base station may send (e.g., transmit) a second command to a wireless device to switch from an A-BWP1 to an A-BWP3 (at a time T2), for example, if there are at least two active DL BWPs (e.g., the A-BWP1 and an A-BWP2) of a plurality of active BWPs in a cell (at a time T1 before the time T2). The A-BWP1 may be the initial active DL BWP configured by the one or more messages. The A-BWP2 may be a DL BWP activated by the first command. The second command may be a MAC CE or DCI. The A-BWP3 may be different from the A-BWP1 and from the A-BWP2. The wireless device may transition (e.g., switch) the A-BWP1 from active state to inactive state, transition (e.g., switch) the A-BWP3 from inactive state to active state, and/or maintain the A-BWP2 in active state, for example, after or in response to the switching. The wireless device may monitor a first PDCCH sent via the A-BWP3 and/or monitor a second PDCCH sent via the A-BWP2 in parallel (e.g., simultaneously or overlapped in time), for example, after or in response to the switching. Switching to the A-BWP3 from A-BWP1 may comprise deactivating the A-BWP1 and activating the A-BWP3.

FIG. 18C shows an example of BWP deactivation if multiple active BWPs are supported. A base station may send (e.g., transmit) a third command to a wireless device to deactivate an A-BWP2, for example, if there are at least two active DL BWPs (e.g., an A-BWP1 and the A-BWP2) of a plurality of active BWPs in a cell. The third command may be a MAC CE or DCI. The base station and/or the wireless device may deactivate the A-BWP2, for example, after or in response to an expiration of a BWP inactivity timer (e.g., associated with the A-BWP2 or associated with the cell). The deactivating may comprise transiting (e.g., switching) the A-BWP2 from active state to inactive state and/or maintaining the A-BWP1 in active state (e.g., at a time T2). The wireless device may monitor a first PDCCH sent via the A-BWP1 and/or stop monitoring a second PDCCH associated with the A-BWP2, for example, after or in response to the deactivating. The deactivating the A-BWP2 may not change the state of the A-BWP1 (e.g., the active state of the A-BWP1).

A base station and/or a wireless device may communicate via more than two active DL BWPs in a cell. The base station and/or the wireless device may perform BWP activation, BWP deactivation, and BWP switching, for example, to flexibly provide different services. A base station and/or a wireless device may maintain a first active DL BWP for a first transmission of a first service. The base station may activate a second DL BWP to be a second active DL BWP, for example, if a second service is triggered. The wireless device may monitor one or more PDCCHs and/or receive data packets on both the first active DL BWP and the second active DL BWP, for example, after or in response to the activating. The base station and/or the wireless device may activate a third DL BWP to be a third active DL BWP, for example, if a third service is triggered. The wireless device may monitor one or more PDCCHs and/or receive data packets on the first active DL BWP, the second active DL BWP, and the third active DL BWP, for example, after or in response to the activating.

A base station may cross-BWP schedule a second active DL BWP based on a first active DL BWP, for example, which may reduce blind decoding complexity. Cross-BWP scheduling may comprise scheduling, by a base station, a transmission (e.g., downlink or uplink transmissions) on a shared channel (e.g., downlink or uplink shared channels) of a second BWP via control channels of a first BWP. The first active DL BWP may be configured with a first number of control resource sets and/or a second number of search spaces. The second active DL BWP may be configured with a third number of control resource sets, and/or a fourth number of search spaces. The first number may be greater than the third number. The second number may be greater than the fourth number. The second active DL BWP may be configured with no PDCCH resource.

Figures 19A, 19B:
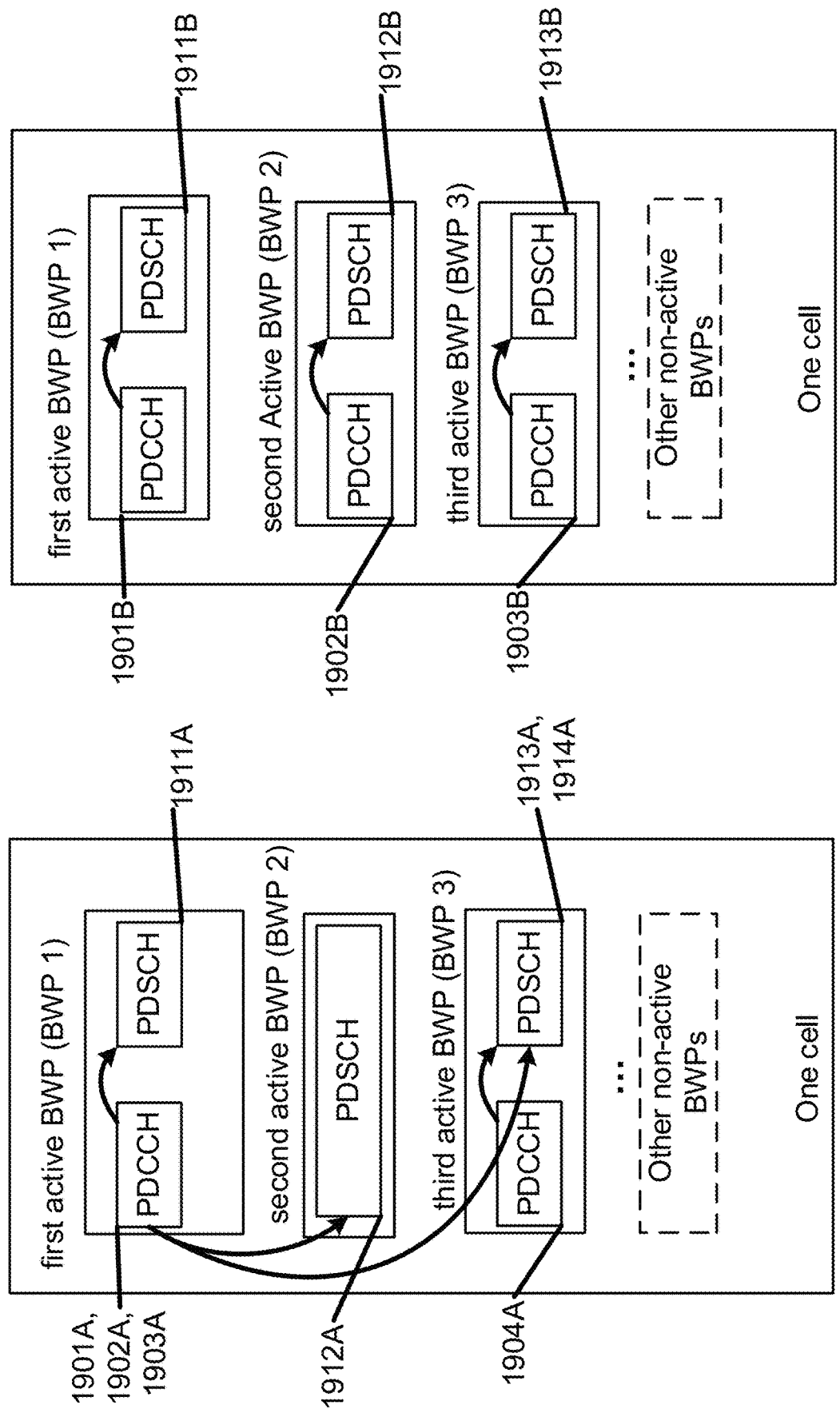
FIG. 19A and FIG. 19B show examples of BWP scheduling.

FIG. 19A shows an example of a cross-BWP scheduling. A base station may send (e.g., transmit), to a wireless device, a first PDCCH 1901A via a first active DL BWP (e.g., a BWP 1) to schedule a first PDSCH 1911A of the BWP 1. The base station may send (e.g., transmit) a second PDCCH 1902A via the BWP 1 to schedule a second PDSCH 1912A of a second active BWP (e.g., a BWP 2), for example, if the BWP 2 is configured to be cross-BWP scheduled by the BWP 1. The base station may send (e.g., transmit) a third PDCCH 1903A via the BWP 1 to schedule a third PDSCH 1913A of a third active BWP (e.g., a BWP 3), for example, if the BWP 3 is configured to be cross-BWP scheduled by the BWP 1. The base station may send (e.g., transmit) a fourth PDCCH 1904A via the BWP 3 to schedule a fourth PDSCH 1914A of the BWP 3, for example, if BWP 3 is configured to be self-scheduled. A wireless device may monitor one or more PDCCHs sent via the BWP 1 for at least one second BWP, for example, if the cross-BWP scheduling is supported and the at least one second BWP is configured to be cross-BWP scheduled by the BWP 1. The first PDCCH 1901A, the second PDCCH 1902A, and the third PDCCH 1903A may be three distinct PDCCHs on a same search space. Each of the three distinct PDCCHs may be sent via different locations in the same search space.

FIG. 19B shows an example of a self-BWP scheduling. A PDSCH of an active BWP may be self-scheduled by a PDCCH of the active BWP. A base station may schedule a first PDSCH resource 1911B on a first active BWP (e.g., a BWP 1) by a first PDCCH 1901B on the first active BWP. The base station may schedule a second PDSCH resource 1912B on a second active BWP (e.g., a BWP 2) by a second PDCCH 1902B on the second active BWP. The base station may schedule a third PDSCH resource 1913B on a third active BWP (e.g., a BWP 3) by a third PDCCH 1903B on the third active BWP.

A wireless device may monitor one or more PDCCHs in one or more common search spaces on the multiple active DL BWPs, for example, with multiple active DL BWPs in a cell (e.g., as shown in FIG. 18A, FIG. 18B and FIG. 18C). Each of the multiple active DL BWPs may be associated with one of the one or more common search spaces. Configuring a common search space for each of multiple active DL BWPs may not be efficient for a PDCCH resource utilization in the cell. Configuring a common search space for each of the multiple active DL BWPs may require a wireless device to monitor multiple common search spaces for the multiple active DL BWPs, which may consume battery power in an inefficient manner PDCCH resource utilization efficiency and battery power efficiency may be improved by one or more configurations described herein. The one or more configurations may comprise designating a first active DL BWP, of multiple active DL BWPs, as a primary active DL BWP (PBWP). The primary active DL BWP may be the initial active DL BWP configured in the one or more messages. The primary active DL BWP may be associated with one or more common search spaces, and/or one or more wireless device-specific search spaces (e.g., UE-specific search spaces). The primary active BWP may be a BWP via which the wireless device may perform an initial connection establishment procedure or may initiate a connection re-establishment procedure. The primary active DL BWP may be associated with one or more common search spaces for one or more DCI formats with CRC scrambled by one of SI-RNTI, RA-RNTI, TC-RNTI, P-RNTI, INT-RNTI, SFI-RNTI, TPC-PUSCH-RNTI, TPC-PUCCH-RNTI, TPC-SRS-RNTI, CS-RNTI, SP-CSI-RNTI, and/or C-RNTI. The one or more common search spaces may comprise at least one of: a type0-PDCCH common search space; a type0A-PDCCH common search space; a type1-PDCCH common search space; a type2-PDCCH common search space; and/or a type3-PDCCH common search space. The one or more DCI formats may comprise at least one of: a DCI format 0_0; a DCI format 0_1; a DCI format 1_0; a DCI format 1_1; a DCI format 2_0; a DCI format 2_1; a DCI format 2_2; and/or a DCI format 2_3.

The determination of the PBWP may be indicated by an RRC message, a first MAC CE, and/or first DCI. At least one second active DL BWP of the multiple active DL BWPs may be designated as at least one secondary active DL BWP (SBWP). The determination of the at least one SBWP may be indicated by a second MAC CE and/or second DCI. A secondary active DL BWP may be associated with one or more wireless device-specific search spaces. A wireless device may monitor one or more common search spaces and one or more first wireless device-specific search spaces on a PBWP of the cell and/or one or more second wireless device-specific search spaces on an SBWP of the cell, for example, if the PBWP and the SBWP are designated in the cell.

FIG. 20A shows an example of a PBWP switching. A base station may designate, from the multiple active DL BWPs, a first active DL BWP as a PBWP (e.g., a PBWP1), and a second active DL BWP as an SBWP (e.g., an SBWP1), for example, if multiple DL BWPs are in active states in a cell. A wireless device may monitor a first PDCCH on the PBWP1 and a second PDCCH on the SBWP1 (e.g., at a time T1). A base station may send (e.g., transmit), to a wireless device, a first command to instruct a switch from the PBWP1 to a third BWP as a new primary BWP (e.g., a PBWP2). The wireless device may transition (e.g., switch) the PBWP1 from active state to inactive state and transition (e.g., switch) the third BWP (e.g., the PBWP2) from inactive state to active state, for example, after or in response to switching from the PBWP1 to the PBWP2. The activated third BWP may be a primary active BWP, for example, after or in response to the switching. The wireless device may monitor a first PDCCH on common search spaces and first wireless device-specific search spaces on the PBWP2 and/or may monitor a second PDCCH on second wireless device-specific search spaces on the SBWP1, for example, after or in response to the switching from the PBWP1 to the PBWP2.

FIG. 20B shows an example of SBWP activation. A base station may send (e.g., transmit) a second command to a wireless device to activate a second DL BWP (e.g., an SBWP1) as a secondary BWP, for example, if a primary active BWP (e.g., a PBWP1) of a plurality of active BWPs are designated in a cell. The second DL BWP may be different from the PBWP1 and/or the plurality of active BWPs. The wireless device may transition (e.g., switch) the second DL BWP from inactive state to active state and maintain the PBWP1 in active state, for example, after or in response to the activating. The second DL BWP may be designated as an SBWP (e.g., an SBWP1), for example, after or in response to the activation. The wireless device may monitor a first PDCCH on common search spaces and first wireless device-specific search spaces on the PBWP1 and may monitor a second PDCCH on second wireless device-specific search spaces on the SBWP1, for example, after or in response to the activation.

FIG. 20C shows an example of SBWP switching. A base station may assign, to a wireless device and/or from the multiple active DL BWPs, a first active DL BWP as a PBWP (e.g., a PBWP1) and a second active DL BWP as an SBWP (e.g., an SBWP1), for example, if a primary active BWP (e.g., the PBWP1) of a plurality of active BWPs is designated in a cell. The wireless device may monitor a first PDCCH on a PBWP1 and/or a second PDCCH on an SBWP1. The base station may send (e.g., transmit), to the wireless device, a third command to switch from the SBWP1 to a third BWP (e.g., an SBWP2) as a new secondary BWP. The wireless device may transition (e.g., switch) the SBWP1 from active state to inactive state and/or transition (e.g., switch) the third BWP from inactive state to active state, for example, after or in response to switching from the SBWP1 to the SBWP2. The activated third BWP may be a secondary active BWP, for example, after or in response to the switching. The wireless device may monitor the first PDCCH on common search spaces and/or first wireless device-specific search spaces on the PBWP1 and/or a third PDCCH on second wireless device-specific search spaces on the SBWP2, for example, after or in response to the switching from the SBWP1 to the SBWP2.

FIG. 20D shows an example of SBWP deactivation from a configuration in which multiple active DL BWPs are supported. A base station may send (e.g., transmit) a fourth command to a wireless device to deactivate an SBWP1, for example, if a primary active BWP (e.g., a PBWP1) and a secondary active BWP (e.g., the SBWP1) of a plurality of active DL BWPs are designated in a cell. The fourth command may be a MAC CE or DCI. The base station and/or the wireless device may deactivate the SBWP1, for example, after or in response to an expiration of a BWP inactivity timer. The BWP inactivity timer may be associated with the SBWP1. The wireless device may transition (e.g., switch) the SBWP1 from active state to inactive state and/or maintain the PBWP1 in active state, for example, after or in response to the deactivating. The wireless device may monitor a first PDCCH on (e.g., sent via) the PBWP1 and/or stop monitoring a second PDCCH on (e.g., associated with) the SBWP1, for example, after or in response to the deactivating. Deactivating the SBWP1 may not change the state of the PBWP1.

A base station and/or a wireless device may not allow a PBWP switching to a second active BWP by a MAC CE or by DCI, for example, in a configuration in which multiple active DL BWPs comprise a PBWP and at least one SBWP in a cell. The base station and/or the wireless device may trigger an SBWP deactivation, an SBWP activation, and/or an SBWP switching. Configuring the PBWP to be unswitchable may simplify signaling designs and/or reduce implementation complexity of the wireless device. The PBWP may be switched to the second PBWP, for example, only by an RRC message but not by a MAC CE or DCI. The RRC message triggering a PBWP switching may enable a base station to statically (or semi-statically) switch the PBWP. FIG. 21A, FIG. 21B and FIG. 21C show examples of configurations in which a PBWP is configured to be unswitchable (e.g., always active), such as by DCI. Configuring a PBWP to be unswitchable (e.g., at least by DCI) may simplify implementation of procedures for a base station and a wireless device, reduce signaling overhead, and/or reduce battery consumption of the wireless device. A wireless device may switch the PBWP to a new PBWP, for example, after or in response to receiving an RRC message indicating PBWP switching.

FIG. 21A shows an example of SBWP activation. A base station may send (e.g., transmit) a first command to a wireless device to activate a second DL BWP as a secondary BWP (e.g., an SBWP1), for example, if a primary active BWP (e.g., a PBWP1) of a plurality of active DL BWPs is designated in a cell. The second DL BWP may be different from the PBWP1 and/or the plurality of active BWPs. The wireless device may transition (e.g., switch) the second DL BWP from inactive state to active state and may maintain the PBWP1 in active state, for example, after or in response to the activating. The second DL BWP may be designated as an SBWP (e.g., an SBWP1), for example, after or in response to the activation. The wireless device may monitor a first PDCCH on common search spaces and/or first wireless device-specific search spaces on PBWP1 and/or a second PDCCH on second wireless device-specific search spaces on the SBWP1, for example, after or in response to the activation.

FIG. 21B shows an example of SBWP deactivation. A base station may send (e.g., transmit) a second command to a wireless device to deactivate the SBWP1, for example, if a primary active BWP (e.g., a PBWP1) and a secondary active BWP (e.g., the SBWP1) of a plurality of active DL BWPs are designated in a cell. The second command may be a MAC CE or DCI. The base station and/or the wireless device may deactivate the SBWP1, for example, after or in response to an expiration of a BWP inactivity timer. The BWP inactivity timer may be associated with the SBWP1. The wireless device may transition (e.g., switch) the SBWP1 from active state to inactive state and/or may maintain the PBWP1 in active state, for example, after or in response to the deactivating. The wireless device may monitor a first PDCCH on (e.g., sent via) the PBWP1 and/or may stop monitoring a second PDCCH on (e.g., associated with) the SBWP1, for example, after or in response to the deactivating.

FIG. 21C shows an example of SBWP switching. A base station may assign, to a wireless device and/or from multiple DL active BWPs, a first active DL BWP as a PBWP (e.g., a PBWP1) and a second active DL BWP as an SBWP (e.g., an SBWP1), for example, if the multiple DL active BWPs are configured in a cell. The wireless device may monitor a first PDCCH on (e.g., sent via) the PBWP1 and a second PDCCH on (e.g., sent via) the SBWP1. A base station may send (e.g., transmit), to the wireless device, a third command to switch from the SBWP1 to a third BWP as a secondary BWP (e.g., the SBWP2). The wireless device may transition (e.g., switch) the SBWP1 from active state to inactive state and/or transition (e.g., switch) the third BWP from inactive state to active state, for example, after or in response to switching from the SBWP1 to the SBWP2. The activated third BWP may be the secondary active BWP (e.g., the SBWP2). The wireless device may monitor the first PDCCH on common search spaces and/or first wireless device-specific search spaces on the PBWP1 and/or a third PDCCH on second wireless device-specific search spaces on the SBWP2, for example, after or in response to the switching from the SBWP1 to the SBWP2.

In an A base station may send (e.g., transmit), to a wireless device, one or more messages comprising configuration parameters of a plurality of DL BWPs in a cell. Multiple DL BWPs of a plurality of DL BWPs may be activated as active DL BWPs. A wireless device and/or a base station may communicate via the active DL BWPs comprising a PBWP and an SBWP. The PBWP may switch to a first DL BWP as a new PBWP. The SBWP may switch to a second DL BWP as a new SBWP. The SBWP may be deactivated. A third BWP may be activated as a second SBWP. A base station may send (e.g., transmit) one or more DCIs indicating a PBWP switching, an SBWP activation, an SBWP deactivation, an SBWP switching, and/or a PDSCH scheduling on a PBWP or on an SBWP. The indication by the one or more DCIs may be, for example, based on at least one of: one or more values of one or more fields of the one or more DCI; and/or whether the one or more DCI is transmitted via a PBWP or an SBWP. The one or more DCIs may be sent (e.g., transmitted) with DCI format 1_0 or 1_1 indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for a scheduled PUCCH; and/or a PDSCH-to-HARQ_feedback timing indicator. Reusing an existing DCI format (e.g., DCI format 1_0 or 1_1) for a BWP operation supporting multiple active BWPs may reduce blind decoding complexity at a wireless device.

A wireless device may switch the PBWP to a first BWP as a new PBWP indicated (e.g., identified) by the BWP indicator, for example, based on at least one of: the one or more DCI being transmitted via the PBWP; the BWP indicator indicating the first BWP different from the PBWP and the SBWP (e.g., if configured); and/or a value of the first field and/or the second field being different from a first value (e.g., all zeros) and/or a second value (e.g., all ones). The first value and/or the second value may be predefined (e.g., fixed). The wireless device may switch the SBWP to a second BWP as a new SBWP indicated (e.g., identified) by the BWP indicator, for example, based on at least one of: the one or more DCIs being transmitted via the SBWP; the BWP indicator indicating the second BWP different from the PBWP and from the SBWP; and/or a value of the first field and/or the second field being different from the first value (e.g., all zeros) and/or the second value (e.g., all ones).

The wireless device may activate a third BWP as a new SBWP indicated (e.g., identified) by the BWP indicator, for example, based on at least one of: the BWP indicator indicating the third BWP different from the PBWP and from the SBWP; and/or the value of the first field and/or the second field being the first value (e.g., all zeros). The wireless device may deactivate the SBWP, for example, based on at least one of: the one or more DCIs being transmitted via the PBWP; the BWP indicator indicating the SBWP; and/or the value of the first field or the second field being the second value (e.g., all ones).

The wireless device may receive a DL assignment via a PBWP (e.g., without a PBWP switching), for example, based on at least one of: the BWP indicator indicating the PBWP; and/or the value of the first field or the second field being different from the first value (e.g., all zeros) and/or the second value (e.g., all ones). The wireless device may receive a DL assignment via an SBWP (e.g., without an SBWP switching/activation/deactivation), for example, based on at least one of: the BWP indicator indicating the SBWP; and/or the value of the first field or the second field being different from the first value (e.g., all zeros) and/or the second value (e.g., all ones). The wireless device may receive one or more DL data packets from a first PDSCH on (e.g., sent via) the PBWP, for example, after or in response to receiving the DL assignment on the PBWP. The wireless device may receive one or more DL data packets from a second PDSCH on (e.g., sent via) the SBWP, for example, after or in response to receiving the DL assignment via the SBWP.

A base station and/or a wireless device may support, for example, a PBWP and at most one SBWP of a plurality of BWPs. Supporting the PBWP and the at most one SBWP, compared with one single active BWP in a cell, may improve spectrum efficiency and maintain an acceptable level of implementation complexity of the base station and/or the wireless device.

A base station may send (e.g., transmit) one or more DCIs indicating a PBWP switching, an SBWP activation, and/or a PDSCH scheduling on a PBWP or on an SBWP, for example, based on at least one of: one or more values of one or more fields of the one or more DCIs; and/or whether the one or more DCIs are transmitted via a PBWP or an SBWP. The one or more DCIs may be sent, for example, if a PBWP and at most one SBWP of a plurality of DL BWPs are supported. Activation of an SBWP may comprise deactivating a first SBWP and activating a first inactive BWP as an SBWP (e.g., at a time). Activation of an SBWP may comprise activating a first inactive BWP as an SBWP (e.g., if there is no SBWP before the activating).

A base station may send (e.g., transmit) one or more DCIs indicating a PBWP switching, for example, if a PBWP and at most one SBWP of a plurality of BWPs are supported. The base station may send the one or more DCIs indicating the PBWP switching based on at least one of: the BWP indicator indicating a first BWP different from the PBWP and from the SBWP; the one or more DCIs being transmitted via the PBWP; and/or one or more value of the first field and/or the second field being different from a first value (e.g., all zeros) and/or a second value (e.g., all ones). The first value and/or the second value may be predefined (e.g., fixed).

A base station may send (e.g., transmit) one or more DCIs indicating an SBWP activation, for example, if a PBWP and at most one SBWP of a plurality of BWPs are supported. The base station may send the one or more DCIs indicating the SBWP activation based on at least one of: the BWP indicator indicating a BWP different from the PBWP (e.g., if there is no SBWP in the cell); the BWP indicator indicating the BWP different from the SBWP; the one or more DCIs being transmitted via the PBWP; the one or more DCIs being transmitted via the SBWP; one or more value of the first field and/or the second field being the first value (e.g., all zeros); and/or the value of the first field or the second field being the second value (e.g., all ones).

A base station may send (e.g., transmit), to a wireless device, a MAC CE to activate or deactivate an SBWP, for example, if an SBWP activation or deactivation is not urgent (e.g., not time sensitive). The base station may send (e.g., transmit) DCI to switch from a first PBWP to a second BWP as a second PBWP and/or to switch from a first SBWP to a third BWP as a second SBWP. The base station may send the DCI to switch a BWP, for example, if BWP switching is urgent (e.g., time sensitive, such as for URLLC).

A MAC CE may comprise at least one of: one or more first fields indicating activation or deactivation of one or more DL BWPs; and/or one or more second fields indicating activation or deactivation of one or more UL BWPs. The one or more first fields may comprise a quantity of bits (e.g., D4, D3, D2, and D1 for four bits associated with four DL BWPs, respectively). Di may indicate activation/deactivation (e.g., activation or deactivation) of the DL BWP associated with DL BWP ID=i (e.g., i=1, 2, 3, and 4). Di (i=1, 2, 3, and 4) may correspond to four most significant bits of an octet 2 (Oct 2). The Oct 2 may comprise 8 bits and each of the 8 bits may be associated with an index (e.g., index k=0, 1, 2, 3, 4, 5, 6, and 7). k may be i+3, for example, if Di (i=1, 2, 3, and 4) corresponds to four most significant bits of the Oct 2 identified by the indexes (k=4, 5, 6, and 7). Each of the number of bits may indicate activation of a corresponding DL BWP, for example, based on the bit being set to a first value (e.g., 1). Each of the number of bits may indicate deactivation of a corresponding DL BWP, for example, based on the bit being set to a second value (e.g., 0). D4 being set to the first value may indicate a DL BWP associated with a BWP ID 4 is activated if the DL BWP is configured. D4 being set to the second value may indicate the DL BWP associated with the BWP ID 4 is deactivated if the DL BWP is configured. The wireless device may ignore the value of D4, for example, if the DL BWP associated with the BWP ID 4 is not configured. The wireless device may activate/deactivate a DL BWP associated with a BWP ID 3 based on a value of D3, for example, if the DL BWP associated with the BWP ID 3 is configured. The wireless device may activate/deactivate a DL BWP associated with a BWP ID 2 based on a value of D2, for example, if the DL BWP associated with the BWP ID 2 is configured. The wireless device may activate/deactivate a DL BWP associated with a BWP ID 1 based on a value of D1, for example, if the DL BWP associated with the BWP ID 1 is configured. An RRC message may indicate an association between a DL BWP and a BWP ID (e.g., the mapping relationships between the BWP ID 1 and a first DL BWP, between the BWP ID 2 and a second DL BWP, between the BWP ID 3 and a third DL BWP, and/or between the BWP ID 4 and a fourth DL BWP). An RRC message may not use the indexes i, j and/or k. The RRC message may indicate that the four DL BWPs and/or the four UL BWPs are associated with one of the eight indexes (e.g., the index k).

The one or more second fields may comprise a quantity of bits (e.g., U4, U3, U2, and U1 for 4 bits associated with four UL BWPs, respectively). Uj may indicate activation/deactivation (e.g., activation or deactivation) of the UL BWP associated with UL BWP ID=j (e.g., j=1, 2, 3, and 4). Uj (j=1, 2, 3, and 4) may correspond to four least significant bits of the Oct 2. k may be j−1, for example, if Uj (j=1, 2, 3, and 4) corresponds to four least significant bits of the Oct 2 identified by the indexes (k=0, 1, 2, and 3). Each of the number of bits may indicate activation of a corresponding UL BWP, for example, based on the bit being set to a first value (e.g., 1), if the UL BWP is configured. Each of the number of bits may indicate deactivation of a corresponding UL BWP, for example, based on the bit being set to a second value (e.g., 0), if the UL BWP is configured. The wireless device may ignore the value of Uj, for example, if the UL BWP associated with the UL BWP ID j is not configured.

A MAC CE may comprise at least one of: one or more first fields indicating activation or deactivation of one or more DL BWPs; and/or one or more second fields indicating activation or deactivation of one or more UL BWPs. Uj (j=1, 2, 3, and 4) may correspond to four most significant bits of the Oct 2 identified by the indexes (k=4, 5, 6, and 7). Di (i=1, 2, 3, and 4) may correspond to four least significant bits of the Oct 2 identified by the indexes (k=0, 1, 2, and 3). k may be j+3, and k may be i−1.

A MAC CE may comprise at least one of: one or more first fields indicating activation or deactivation of one or more DL BWPs; and/or one or more second fields indicating activation or deactivation of one or more UL BWPs. Uj (j=1, 2, 3, and 4) may correspond to four odd-numbered bits of the Oct 2 identified by the indexes (k=1, 3, 5, and 7). Di (i=1, 2, 3, and 4) may correspond to four even-numbered bits of the Oct 2 identified by the indexes (k=0, 2, 4, and 6). k may be 2j−1, and/or k may be 2i−2. Also or alternatively, Uj (j=1, 2, 3, and 4) may correspond to four even-numbered bits of the Oct 2 identified by the indexes (k=0, 2, 4, and 6) and Di (i=1, 2, 3, and 4) may correspond to four odd-numbered bits of the Oct 2 identified by the indexes (k=1, 3, 5, and 7). k may be 2j−2, and/or k may be 2i−1. A base station and/or a wireless device may dynamically use the eight bits of the Oct 2. The four most significant bits may be used for other purposes or may be reserved, for example, if the wireless device is configured with two DL BWPs (e.g., DL BWPs associated with D1 and D2) and with two UL BWPs (e.g., UL BWPs associated with U1 and U2). Two least significant bits (e.g., associated with D1 and U1) may always have the first value (e.g., 1), for example, a primary DL BWP and a primary UL BWP are designated (e.g., semi-statically). The two least significant bits may always have the first value (e.g., 1), for example, for the configurations of FIGS. 21A, 21B, and 21C (e.g., the primary DL BWP and the primary UL BWP are unswitchable).

A MAC subheader may be used for BWP activation/deactivation. The MAC subheader may comprise at least one of: a reserved field; a flag field; an LCID field with a first value indicating the MAC CE for BWP activation/deactivation; and/or a length field. The LCID field may indicate the first value different from other LCID values. The MAC subheader may not comprise the length field, for example, based on the MAC CE for SBWP activation/deactivation having a fixed bit length.

The base station may send (e.g., transmit) one or more DCIs to switch from a first PBWP to a second BWP as a second PBWP or switch from a first SBWP to a third BWP as a second SBWP, for example, if one or more MAC CEs are used for activating/deactivating one or more SBWPs. The base station may send the one or more DCIs to switch from the first PBWP to the second BWP or switch from the first SBWP to the third BWP, for example, based on at least one of: one or more values of one or more fields of the one or more DCIs; and/or whether the one or more DCIs are transmitted on a PBWP or an SBWP.

The wireless device may switch the PBWP to a first BWP as a new PBWP indicated (e.g., identified) by the BWP indicator, for example, based on at least one of: the one or more DCIs being transmitted on the PBWP; and/or the BWP indicator indicating the first BWP different from the PBWP and from the SBWP (e.g., if configured). The wireless device may switch the SBWP to a second BWP as a new SBWP indicated (e.g., identified) by the BWP indicator, for example, based on at least one of: the one or more DCIs being transmitted on the SBWP; and/or the BWP indicator indicating the second BWP different from the PBWP and from the SBWP.

The wireless device may receive a DL assignment on (e.g., sent via) a PBWP (e.g., without PBWP switching), for example, after or in response to the BWP indicator indicating the PBWP. The wireless device may receive a DL assignment on (e.g., sent via) an SBWP (e.g., without SBWP switching/activation), for example, after or in response to the BWP indicator indicating the SBWP. The wireless device may receive one or more DL data packets from a first PDSCH mapped on the PBWP, for example, after or in response to receiving the DL assignment via the PBWP. The wireless device may receive one or more DL data packets from a second PDSCH mapped on the SBWP, for example, after or in response to receiving the DL assignment via the SBWP.

A base station may send (e.g., transmit) one or more DCIs indicating a PBWP switching or a PDSCH scheduling on a PBWP or on an SBWP, for example, if the PBWP and at most one SBWP of a plurality of BWPs are supported and/or one or more MAC CEs are used for activating/deactivating an SBWP. The base station may send the one or more DCIs indicating the PBWP switching or the PDSCH scheduling on the PBWP or on the SBWP, for example, based on a BWP indicator. The wireless device may switch the PBWP to a first BWP as a new PBWP indicated (e.g., identified) by the BWP indicator, for example, based on the BWP indicator indicating the first BWP different from the PBWP and from the SBWP (e.g., if configured). The wireless device may receive a DL assignment on (e.g., sent via) a PBWP (e.g., without PBWP switching), for example, after or in response to the BWP indicator indicating the PBWP. The wireless device may receive a DL assignment on (e.g., sent via) an SBWP (e.g., without SBWP switching/activation), for example, after or in response to the BWP indicator indicating the SBWP. The wireless device may receive one or more DL data packets from a first PDSCH mapped on the PBWP, after or in response to receiving the DL assignment via the PBWP. The wireless device may receive one or more DL data packets from a second PDSCH mapped on the SBWP, for example, after or in response to receiving the DL assignment via the SBWP. Combining MAC CE for SBWP activation/deactivation and DCI for PBWP/SBWP switching may reduce blind decoding complexity and dynamical signaling overhead (e.g., DCI for SBWP activation/deactivation) to support multiple active BWPs in a cell.

One or more MAC CEs for SBWP activation/deactivation may introduce intolerant transition latency (e.g., scheduling the MAC CE in PDSCH resources and sending one or more HARQ feedback for the MAC CE in PUCCH/PUSCH resources) for some services (e.g., URLLC services). A wireless device may receive multiple types of services, at least some of which may require a quick SBWP activation/deactivation. The transition latency may be reduced and/or avoided by introducing a first DCI format, different from one or more other (e.g., existing) DCI formats (e.g., DCI format 1_0/1_1). The first DCI format may comprise one or more fields indicating a PBWP switching, an SBWP activation, an SBWP deactivation, and/or an SBWP switching based on one or more values of the one or more fields of the first DCI format. The first DCI format may comprise at least one of: a BWP indicator; and/or a second field (e.g., BWP action/mode indication) indicating one of a PBWP switching, an SBWP activation, an SBWP deactivation, and/or an SBWP switching.

A DCI format may comprise a BWP ID field and a second field. The second field may be an action indication field (e.g., a field indicating an action associated with a BWP indicated by the BWP ID field). A wireless device may switch a PBWP to a first BWP as a new PBWP, for example, if the wireless device receives one or more DCIs based on the first DCI format. The wireless device may switch the PBWP to the first BWP, for example, based on at least one of: the BWP indicator (e.g., a BWP ID in the BWP ID field) indicating the first BWP; the first BWP being different from the PBWP; and/or the second field being set to a first value (e.g., "00" if a size of the second field corresponds to two bits). The wireless device may receive a DL assignment on (e.g., sent via) a PBWP (e.g., without PBWP switching), for example, based on the BWP indicator indicating the PBWP and/or the second field being set to the first value (e.g., "00").

The wireless device may activate a second BWP as an SBWP, for example, if the wireless device receives the one or more DCIs based on the first DCI format. The wireless device may activate the second BWP, for example, based on at least one of: the BWP indicator indicating the second BWP; and/or the second field being set to a second value (e.g., "01" if the size of the second field corresponds to two bits).

The wireless device may deactivate an SBWP, for example, if the wireless device receives the one or more DCIs based on the first DCI format. The wireless device may deactivate the SBWP, for example, based on at least one of: the BWP indicator indicating the SBWP; and the second field being set to a third value (e.g., "10").

The wireless device may switch an SBWP to a third BWP, for example, if the wireless device receives the one or more DCIs based on the first DCI format. The wireless device may switch the SBWP to the third BWP, for example, based on at least one of: the BWP indicator indicating the third BWP; the third BWP being different from the PBWP and from the SBWP; and/or the second field being set to a fourth value (e.g., "11" if the size of the second field corresponds to two bits). The wireless device may receive a DL assignment on (e.g., sent via) an SBWP (e.g., without SBWP switching), for example, after or in response to the BWP indicator indicating the SBWP and/or the second field being set to the fourth value (e.g., "11").

A base station may send (e.g., transmit) first DCI based on an existing DCI format (e.g., DCI format 1_0/1_1) indicating PBWP/SBWP switching and/or indicating a DL scheduling on the PBWP/SBWP. A base station may send (e.g., transmit) second DCI based on second DCI format (e.g., different from the existing DCI format) indicating SBWP activation/deactivation. The second DCI format may comprise at least one of: a BWP indicator; and/or a second field indicating activation or deactivation of an SBWP.

A DCI format may comprise a BWP ID field and a second field. A wireless device may switch from the PBWP to a first BWP as a new PBWP, for example, if the wireless device receives the first DCI based on a particular DCI format (e.g., an existing DCI format, such as DCI format 1_0/1_1, or any other DCI format). The wireless device may receive first DCI, for example, based on the BWP indicator indicating the first BWP different from the PBWP and/or first DCI being transmitted via the PBWP. The wireless device may receive a DL assignment on (e.g., sent via) the PBWP, for example, after or in response to the BWP indicator indicating the PBWP.

A wireless device may switch from the SBWP to a second BWP as a new SBWP, for example, if the wireless device receives first DCI based on a particular DCI format (e.g., an existing DCI format such as DCI format 1_0/1_1, or any other DCI format). The wireless device may receive the first DCI, for example, based on the BWP indicator indicating the second BWP different from the SBWP and/or the first DCI being transmitted via the SBWP. The wireless device may receive a DL assignment on (e.g., sent via) the SBWP, for example, after or in response to the BWP indicator indicate the SBWP.

A wireless device may activate a third BWP indicated by the BWP indicator as a second SBWP, for example, if the wireless device receives the second DCI based on the second DCI format (e.g., different from DCI format 1_0/1_1). The wireless device may activate the third BWP, for example, based on the second field of the second DCI being a first value (e.g., "1" if a size of the second fields corresponds to one bit).

A wireless device may deactivate the SBWP indicated by the BWP indicator, for example, if the wireless device receives the second DCI based on the second DCI format (e.g., different from DCI format 1_0/1_1). The wireless device may deactivate the SBWP, for example, based on the second field of the second DCI being a second value (e.g., "0").

A base station may send (e.g., transmit) DCI based on a third DCI format (e.g., different from an existing format such as DCI format 1_0/1_1, or any other DCI format) indicating a PBWP switching or an SBWP activation, for example, if at most one SBWP is supported. The third DCI format may comprise at least one of: a BWP indicator; and/or a second field indicating a PBWP switching or an SBWP activation. The PBWP switching or the SBWP activation may be indicated based on a value of the second field. Activation of a BWP as a new SBWP may deactivate an active SBWP and activate the BWP as the new SBWP (e.g., at a time), for example, if at most one SBWP is supported.

A base station may send (e.g., transmit) the DCI based on the third DCI format to a wireless device. The wireless device may switch from the PBWP to a first BWP indicated by the BWP indicator, as a new PBWP, for example, if the wireless device receives the DCI and at most one SBWP is supported. The wireless device may switch from the PBWP to the first BWP, for example, based on the second field being a first value (e.g., "1" if a size of the second field corresponds to one bit). The wireless device may receive a DL assignment on (e.g., sent via) the PBWP, for example, if the BWP indicator indicates the PBWP.

The wireless device may activate a second BWP indicated by the BWP indicator, as a new SBWP, for example, if the wireless device receives the DCI based on the third DCI format and at most one SBWP is supported. The wireless device may activate the second BWP, for example, based on the second field being a second value (e.g., "0" if a size of the second field corresponds to one bit). The wireless device may deactivate a first SBWP (e.g., if the first SBWP is configured and in active state), for example, after or in response to activating the second BWP. The wireless device may receive a DL assignment on (e.g., sent via) the SBWP, for example, if the BWP indicator indicates the SBWP.

A base station may send (e.g., transmit) one or more DCIs (e.g., DCI format 1_0/1_1), to a wireless device, indicating an SBWP activation, an SBWP deactivation, or an SBWP switching, for example, based on at least one of: one or more values of one or more fields of the one or more DCIs; and/or whether the one or more DCIs are transmitted via a PBWP or via an SBWP. The one or more DCIs may be transmitted based on DCI format 1_0 or 1_1 indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for a scheduled PUCCH; and/or a PDSCH-to-HARQ_feedback timing indicator. Reusing an existing DCI format (e.g., DCI format 1_0 or 1_1) for a BWP operation supporting multiple active BWPs may reduce blind decoding complexity at a wireless device. A PBWP may be in active state, for example, at least until receiving an RRC message.

The wireless device may switch the SBWP to a first BWP as a new SBWP indicated (e.g., identified) by the BWP indicator, for example, based on at least one of: the one or more DCIs being transmitted via the SBWP; the BWP indicator indicating the first BWP different from the PBWP and from the SBWP; a value of the first field or the second field being different from a first value (e.g., all zeros); and/or the value of the first field or the second field being different from a second value (e.g., all ones). The first value and/or the second value may be predefined (e.g., fixed).

The wireless device may activate a second BWP as a new SBWP indicated (e.g., identified) by the BWP indicator, for example, based on at least one of: the BWP indicator indicating the second BWP different from the PBWP and from the SBWP; and/or the value of the first field or the second field being the first value (e.g., all zeros). The wireless device may deactivate the SBWP, for example, based on at least one of: the one or more DCIs being transmitted via the PBWP; the BWP indicator indicating the SBWP different from the PBWP; and/or the value of the first field or the second field being the second value (e.g., all ones).

The wireless device may receive a DL assignment on (e.g., sent via) a PBWP, for example, based on the BWP indicator indicating the PBWP. The wireless device may receive a DL assignment on (e.g., sent via) an SBWP (e.g., without SBWP switching/activation/deactivation), for example, based on the BWP indicator indicating the SBWP. The wireless device may receive one or more DL data packets from a first PDSCH mapped on the PBWP, for example, after or in response to receiving the DL assignment via the PBWP. The wireless device may receive one or more DL data packets from a second PDSCH mapped on the SBWP, for example, after or in response to receiving the DL assignment via the SBWP.

The base station and the wireless device may dynamically activate an SBWP, deactivate an SBWP, and/or switch an SBWP to a new SBWP, for example, based on one or more fields of one or more DCIs. Transition latency and/or implementation cost of the wireless device may be reduced, and/or multiple active BWPs may be flexibly supported.

A base station may send (e.g., transmit) one or more DCIs indicating an SBWP activation, for example, if a PBWP and at most one SBWP are supported. The base station may send the one or more DCIS indicating the SBWP activation, for example, based on at least one of: the BWP indicator indicating a BWP different from the PBWP (e.g., if there is no SBWP in the cell); the BWP indicator indicating the BWP different from the SBWP; the one or more DCIs being transmitted via the PBWP; and/or the one or more DCIs being transmitted via the SBWP.

Activation of an SBWP may comprise deactivating a first SBWP and activating a first inactive BWP as the SBWP (e.g., at a time). Activation of an SBWP may comprise activating a first inactive BWP as the SBWP, for example, if there is no active SBWP before the activating.

The wireless device may receive a DL assignment via a PBWP (e.g., without PBWP switching), for example, based on the BWP indicator indicating the PBWP. The wireless device may receive a DL assignment via an SBWP (e.g., without SBWP switching/activation), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP. Blind decoding complexity and/or implementation cost of the wireless device may be reduced, and/or a PBWP and an SBWP (e.g., at most one SBWP) may be flexibly supported.

A base station may send (e.g., transmit), to a wireless device, a MAC CE to activate or deactivate an SBWP, for example, if an SBWP activation or deactivation is not urgent (or time sensitive). The base station may send (e.g., transmit) DCI to switch from a first SBWP to a second BWP as a second SBWP, for example, if a PBWP is in an active state until switched by an RRC message. A MAC CE and a corresponding MAC subheader may be used for one or more SBWP activation/deactivation.

The base station may send (e.g., transmit) one or more DCIs (e.g., DCI format 1_0/1_1) to switch from a first SBWP to a second BWP as a second SBWP, for example, if one or more MAC CEs are used for activating/deactivating an SBWP and the PBWP is always in active state until switched by an RRC message. The base station may send the one or more DCIs to switch from the first SBWP to the second BWP, for example, based on at least one of: one or more values of one or more fields of the one or more DCIs; and/or whether the one or more DCIs are transmitted via a PBWP or via an SBWP. The wireless device may switch a first SBWP to a second BWP as a second SBWP indicated (e.g., identified) by the BWP indicator, for example, based on at least one of: the one or more DCIs being transmitted via the first SBWP; and/or the BWP indicator indicating the second BWP different from the PBWP and from the first SBWP.

The wireless device may receive a DL assignment via a PBWP, for example, based on the BWP indicator indicating the PBWP. The wireless device may receive a DL assignment via an SBWP (e.g., without SBWP switching), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP.

A base station may send (e.g., transmit) one or more DCIs indicating a PDSCH scheduling on a PBWP or an SBWP, for example, if a PBWP and at most one SBWP of a plurality of BWPs are supported and one or more MAC CEs are used for activating/deactivating an SBWP. The base station may send the one or more DCIs indicating the PDSCH scheduling, for example, based on a BWP indicator of the one or more DCIs. The wireless device may receive a DL assignment via a PBWP, for example, based on the BWP indicator indicating the PBWP. The wireless device may receive a DL assignment via an SBWP (e.g., without SBWP switching/activation), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP.

A wireless device may perform SBWP switching based on the one or more MAC CEs. A base station may send (e.g., transmit) the one or more MAC CEs indicating an activation of a second SBWP and/or a deactivation of a first SBWP, for example, by setting a second field of the one or more first fields corresponding the second SBWP to a first value (e.g., "1") and/or setting a first field of the one or more first fields corresponding to the first SBWP to a second value (e.g., "0"). The wireless device may switch from the first SBWP to the second SBWP, for example, after or in response to receiving the one or more MAC CEs. Combining MAC CE for SBWP activation/deactivation and DCI for SBWP switching may reduce blind decoding complexity and/or dynamic signaling overhead (e.g., DCI for SBWP activation/deactivation) to support multiple active BWPs in a cell.

One or more MAC CEs for SBWP activation/deactivation may introduce intolerant transition latency (e.g., which may be caused by scheduling the MAC CE in PDSCH resources at a base station and sending one or more HARQ feedbacks for the MAC CE in PUCCH/PUSCH resources at a wireless device) for some services (e.g., URLLC). A wireless device may receive multiple types of services, which may require a quick SBWP activation/deactivation. The transition latency may be reduced, for example, by introducing a first DCI format, which may be different from one or more other DCI formats (e.g., an existing DCI format such as DCI format 1_0/1_1, or any other DCI format). The first DCI format may comprise one or more fields indicating SBWP activation/deactivation/switching based on one or more values of the one or more fields of the first DCI format. The first DCI format may comprise at least one of: a BWP indicator; a second field (e.g., BWP action/mode indication) indicating one of SBWP activation, SBWP deactivation, and/or SBWP switching, for example, if a PBWP is in active state until switched/deactivated by an RRC message.

A DCI format may comprise a BWP ID field and an action indication field (e.g., a second field for indicating a change of a BWP). A wireless device may receive a DL assignment via a PBWP, for example, if the wireless device receives one or more DCIs based on the first DCI format. The wireless device may receive the DL assignment via the PBWP, for example, based on a BWP indicator indicating the PBWP and/or the second field being set to a first value (e.g., "00" if a size of the second field corresponds to two bits). A wireless device may receive a DL assignment via an SBWP, for example, if the wireless device receives one or more DCIs based on the first DCI format. The wireless device may receive the DL assignment via the SBWP, for example, based on the BWP indicator indicating the SBWP and/or the second field being set to a first value (e.g., "00").

The wireless device may activate a first BWP as an SBWP, for example, if the wireless device receives the one or more DCIs based on the first DCI format. The wireless device may activate the first BWP as an SBWP, for example, based on at least one of: the BWP indicator indicating the first BWP; and/or the second field being set to a second value (e.g., "01" if a size of the second field corresponds to two bits).

The wireless device may deactivate an SBWP, for example, if the wireless device receives the one or more DCIs based on the first DCI format. The wireless device may deactivate the SBWP, for example, based on at least one of: the BWP indicator indicating the SBWP; and the second field being set to a third value (e.g., "10").

The wireless device may switch an SBWP to a second BWP, for example, if the wireless device receives the one or more DCIs based on the first DCI format. The wireless device may switch the SBWP to the second BWP, for example, based on at least one of: the BWP indicator indicating the second BWP; the second BWP being different from the PBWP and from the SBWP; and/or the second field being set to a fourth value (e.g., "11").

A DCI format may comprise a BWP ID field and an action indication field (e.g., a second field for indicating a change of a BWP). A base station may send (e.g., transmit) first DCI based on a DCI format (e.g., an existing DCI format such as DCI format 1_0/1_1, or any other DCI format) indicating SBWP switching, or DL scheduling on the PBWP/SBWP. A base station may send (e.g., transmit) second DCI based on the second DCI format (e.g., different from the existing DCI format, such as DCI format 1_0/1_1, or any other DCI format) indicating SBWP activation/deactivation. The second DCI format may comprise at least one of: a BWP indicator; and/or a second field indicating activation or deactivation of an SBWP.

A wireless device may switch from the SBWP to a first BWP as a new SBWP, for example, if the wireless device receives the first DCI based on the DCI format (e.g., an existing such as DCI format 1_0/1_1, or any other DCI format). The wireless device may switch from the SBWP to the first BWP, for example, based on the BWP indicator indicating the first BWP different from the SBWP and/or the first DCI being transmitted via the SBWP.

A wireless device may activate a second BWP indicated by the BWP indicator as a second SBWP, for example, if the wireless device receives the second DCI based on the second DCI format (e.g., different from DCI format 1_0/1_1 or another DCI format). The wireless device may activate the second BWP as the second SBWP, for example, based on the second field of the second DCI being a first value (e.g., "1" if a size of the second field corresponds to one bit). A wireless device may deactivate the SBWP indicated by the BWP indicator, for example, if the wireless device receives the second DCI based on the second DCI format (e.g., different from DCI format 1_0/1_1 or another DCI format). The wireless device may deactivate the SBWP indicated by the BWP indicator, for example, based on the second field of the second DCI being a second value (e.g., "0").

A base station may send (e.g., transmit) DCI based on a DCI format (e.g., an existing DCI format such as DCI format 1_0/1_1, or any other DCI format) indicating an SBWP activation, for example, if at most one SBWP is supported. A wireless device may activate a first BWP as a second SBWP, for example, based on the BWP indicator indicating the first BWP is different from a first SBWP and from the PBWP. The activating the first BWP as the second SBWP may comprise deactivating the first SBWP and activating the first BWP as the second SBWP (e.g., at a time), for example, if at most one SBWP is supported and the PBWP is in active state at least until switched/deactivated by an RRC message. The activating the first BWP as the second SBWP may comprise activating the first BWP as the second SBWP, for example, if there is no SBWP before the activating and/or if at most one SBWP is supported and the PBWP is in an active state at least until switched/deactivated by an RRC message.

A wireless device may support a plurality of active BWPs in a cell, for example, if a determination of a PBWP or an SBWP of the plurality of active BWPs is not performed. A base station may send (e.g., transmit) one or more DCIs indicating an active BWP switching, a BWP activation, a BWP deactivation, or a PDSCH scheduling on the active BWP, for example, based on at least one of: one or more values of one or more fields of the one or more DCIs. The one or more DCIs may be sent (e.g., transmitted) based on a DCI format (e.g., DCI format 1_0 or 1_1, or any other DCI format) indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for scheduled PUCCH; and/or a PDSCH-to-HARQ_feedback timing indicator. Reusing a DCI format (e.g., an existing DCI format such as DCI format 1_0 or 1_1, or any other DCI format) for a BWP operation supporting multiple active BWPs may reduce blind decoding complexity at a wireless device.

A wireless device (e.g., with active BWPs in active state) may switch from a first active BWP to a second BWP indicated (e.g., identified) by the BWP indicator, for example, based on at least one of: the one or more DCIs being transmitted via the first active BWP; the BWP indicator indicating the second BWP different from the active BWPs; one or more values of the first field and/or the second field being different from a first value (e.g., all zeros); and/or the value of the first field or the second field being different from a second value (e.g., all ones).

A wireless device (e.g., with active BWPs in active state) may activate a third BWP indicated (e.g., identified) by the BWP indicator, for example, based on at least one of: the BWP indicator indicating the third BWP different from the active BWPs; and/or the value of the first field or the second field being the first value (e.g., all zeros). A wireless device (e.g., with active BWPs in active state) may deactivate an active BWP, for example, based on at least one of: the BWP indicator indicating the active BWP; and/or the value of the first field or the second field being the second value (e.g., all ones).

A wireless device may receive a DL assignment via an active BWP (e.g., without active BWP switching), for example, based on at least one of: the BWP indicator indicating the active BWP; the value of the first field or the second field not being the first value (e.g., all zeros); and/or the value of the first field or the second field not being the second value (e.g., all ones). The wireless device may receive one or more DL data packets from a PDSCH via the active BWP, for example, after or in response to receiving the DL assignment via the active BWP.

A base station and/or a wireless device may dynamically switch/activate/deactivate a BWP based on one or more fields of one or more DCIs. Blind decoding complexity and implementation cost of the wireless device may be reduced and/or multiple active BWPs may be flexibly supported.

A wireless device may support a plurality of active BWPs in a cell, for example, if a determination of a PBWP or an SBWP of the plurality of active BWPs is not performed. A base station may send (e.g., transmit), to a wireless device, a MAC CE to activate or deactivate a BWP, for example, if BWP activation or deactivation is not urgent (e.g., not time sensitive). The base station may send (e.g., transmit) DCI to switch from a first active BWP to a second BWP as a second active BWP. FA MAC CE and a corresponding MAC subheader may be used for one or more BWP activation/deactivation.

A wireless device (e.g., with active BWPs in active state) may switch from a first active BWP to a second BWP indicated (e.g., identified) by the BWP indicator, for example, based on at least one of: the BWP indicator indicating the second BWP different from the active BWPs; and/or the DCI being transmitted via the first active BWP. A wireless device may receive a DL assignment via an active BWP (e.g., without active BWP switching), for example, based on the BWP indicator indicating the active BWP. A wireless device may receive one or more DL data packets from a PDSCH via the active BWP, for example, after or in response to receiving the DL assignment via the active BWP.

A wireless device may support a plurality of active BWPs in a cell, for example, if a determination of a PBWP or an SBWP of the plurality of active BWPs is not performed. One or more MAC CEs for SBWP activation/deactivation may introduce intolerant transition latency (e.g., caused by scheduling the MAC CE in PDSCH resources and sending one or more HARQ feedbacks for the MAC CE in PUCCH/PUSCH resources) for some services (e.g., URLLC). A wireless device may receive one or more of multiple types of services, at least some of which may require quick SBWP activation/deactivation. The transition latency by introducing a first DCI format, different from one or more other DCI formats (e.g., an existing DCI format such as DCI format 1_0/1_1, or any other DCI format), may be improved. The first DCI format may comprise one or more fields indicating one of BWP switching, BWP activation, and/or BWP deactivation, for example, based on one or more values of the one or more fields of the first DCI format. The first DCI format may comprise at least one of: a BWP indicator; and/or a second field (e.g., BWP action/mode indication) indicating one of BWP switching, BWP activation, and/or BWP deactivation.

A first DCI format may comprise a BWP ID field and an action indication field (e.g., a second field for indicating a change of a BWP). A wireless device may switch a first active BWP to a first BWP as a second active BWP, for example, if the wireless device receives one or more DCIs based on the first DCI format and multiple BWPs are in active state. The wireless device may switch the first active BWP to the first BWP, for example, based on at least one of: the BWP indicator indicating the first BWP; the first BWP being different from the multiple BWPs; and/or the second field being set to a first value (e.g., "00" if a size of the second field corresponds to two bits). The wireless device may receive a DL assignment via an active BWP (e.g., without BWP switching), for example, based on the BWP indicator indicating the active BWP and/or the second field being set to a first value (e.g., "00" if a size of the second field corresponds to two bits).

The wireless device may activate a second BWP as an active BWP, for example, if the wireless device receives the one or more DCIs based on the first DCI format and multiple BWPs are in active state. The wireless device may activate the second BWP as an active BWP, for example, based on at least one of: the BWP indicator indicating the second BWP; and/or the second field being set to a second value (e.g., "01" if the size of the second field corresponds to two bits).

The wireless device may deactivate an active BWP, for example, if the wireless device receives the one or more DCIs based on the first DCI format and multiple BWPs are in active state. The wireless device may deactivate the active BWP, for example, based on at least one of: the BWP indicator indicating the active BWP; and the second field being set to a third value (e.g., "10" if the size of the second field corresponds to two bits).

The wireless device may switch a first active BWP to a third BWP, for example, if the wireless device receives the one or more DCIs based on the first DCI format and multiple BWPs are in active state. The wireless device may switch the first active BWP to the third BWP, for example, based on at least one of: the BWP indicator indicating the third BWP; the third BWP being different from the multiple BWPs; and/or the second field being set to a fourth value (e.g., "11" if the size of the second field corresponds to two bits).

A DCI format may comprise a BWP ID field and an action indication field (e.g., a second field for indicating a change of a BWP). A base station may send (e.g., transmit) first DCI based on a DCI format (e.g., an existing DCI format such as DCI format 1_0/1_1, or any other DCI format) indicating BWP switching, and/or DL scheduling on an active BWP.

A base station may send (e.g., transmit) second DCI based on the second DCI format (e.g., different from the first DCI format and/or different from an existing DCI format) indicating BWP activation/deactivation. The second DCI format may comprise at least one of: a BWP indicator; and/or a second field indicating activation or deactivation of a BWP.

A wireless device may switch from a first active BWP to a first BWP as a second active BWP, for example, if the wireless device receives the first DCI based on a DCI format (e.g., an existing DCI format such as DCI format 1_0/1_1, or any other DCI format) and multiple BWPs are in active states. The wireless device may switch from the first active BWP to the first BWP, for example, based on the BWP indicator indicating the first BWP different from the multiple active BWPs and/or the first DCI being transmitted via the first active BWP. The wireless device may receive a DL assignment via the first active BWP, for example, if the BWP indicator indicates the first active BWP.

A wireless device may activate a third BWP indicated by the BWP indicator as a second active BWP, for example, if the wireless device receives the second DCI based on the second DCI format (e.g., different from DCI format 1_0/1_1 or another DCI format). The wireless device may activate the third BWP as the second active BWP, for example, based on the second field of the second DCI being a first value (e.g., "1" if a size of the second field corresponds to one bit).

A wireless device may deactivate an active BWP indicated by the BWP indicator, for example, if the wireless device receives the second DCI based on the second DCI format (e.g., different from DCI format 1_0/1_1). The wireless device may deactivate the active BWP, for example, based on the second field of the second DCI being a second value (e.g., "0" if the size of the second field corresponds to one bit).

A wireless device may be configured to use one or more resources (e.g., bandwidth parts (BWPs)). At least some wireless devices (e.g., legacy wireless devices, wireless devices compliant with 3GPP Release 15, or any other wireless device) may be configured to up to a maximum quantity of resources (e.g., up to four BWPs, or up to any other quantity of resources). For example, at least some wireless devices may activate only one of four BWPs at a time. For such wireless devices, at most one BWP (e.g., uplink BWP, downlink BWP) may be active in a cell (e.g., primary cell, secondary cell, etc.) at a given time. At least some wireless devices may stop a BWP timer (e.g., BWP inactivity timer) of the primary cell (PCell), for example, if the wireless device receives (e.g., from a base station) a random-access response (msg2) for a random-access procedure on an active downlink BWP of the PCell (e.g., if the wireless device initiates a random-access procedure for a secondary cell (SCell)). The wireless device may start monitoring an active downlink BWP of the PCell for the random-access response, for example, after sending (e.g., transmitting) a random-access preamble (e.g., msg1) for the random-access procedure. A wireless device may activate at least two downlink BWPs on a PCell, for example, if multiple active downlink BWPs are supported for a cell. Monitoring all of the active downlink BWPs (e.g., at least two downlink BWPs) by a wireless device may result in increased power consumption. This increase in power consumption may occur when the wireless device initiates a random-access procedure for an SCell, for example, based on sending (e.g., transmitting) a random-access preamble for the random-access procedure, for example, if the wireless device does not know in advance which active downlink BWP(s), of the at least two downlink BWPs, the wireless device should monitor for a random-access response.

A wireless device may select a downlink BWP, among the at least two downlink BWPs, with the lowest or highest BWP index. The wireless device may select a downlink BWP, among the at least two downlink BWPs, designated as a primary BWP (e.g., default BWP, initial downlink BWP, etc.). The wireless device may select a downlink BWP, among the at least two downlink BWPs, configured with one or more common control channels. The base station may send, and the wireless device may receive, a PDCCH order indicating a downlink BWP ID associated with the downlink BWP. The wireless device may refrain from stopping the BWP timer (e.g., BWP inactivity timer) of all the active downlink BWPs (e.g., at least two downlink BWPs). The wireless device may stop the BWP timer (e.g., BWP inactivity timer) of the selected downlink BWP.

A wireless device may send (e.g., transmit) a random-access preamble for a random-access procedure via an active uplink BWP of a cell, for example, if the wireless device initiates a random-access procedure. A wireless device may activate at least two uplink BWPs on a cell, for example, if multiple active uplink BWPs are supported for a cell. A wireless device may not know which active uplink BWP, of the at least two uplink BWPs, the wireless device should select to send (e.g., transmit) the random-access preamble, for example, if the wireless device initiates a random-access procedure for the cell.

The wireless device may select an active uplink BWP, among the at least two uplink BWPs, having the lowest or highest BWP index. The wireless device may select an active uplink BWP, among the at least two uplink BWPs, designated as a primary BWP (e.g., initial uplink BWP, etc.). The wireless device may select an active uplink BWP, among the at least two uplink BWPs, having the earliest random-access occasion to send (e.g., transmit) the random-access preamble. The wireless device may select an active uplink BWP, among the at least two uplink BWPs, having an uplink BWP ID that is the same as a downlink BWP ID of an active downlink BWP.

A base station may send (e.g., transmit) one or more messages comprising configuration parameters of a plurality of cells. At least one cell of the plurality of cells may comprise a plurality of BWPs, among which one BWP may be designated a default BWP. The configuration parameters may indicate that the at least one cell may be associated with a BWP timer (e.g., BWP inactivity timer) and/or a timer value. A first timer value associated with a first cell of the at least one cell may be the same as or different from a second timer value associated with a second cell of the at least one cell. The base station and/or the wireless device may switch to the default BWP as an active BWP, for example, based on or in response to an expiry of the BWP timer associated with the at least one cell.

A base station may send (e.g., transmit), to a wireless device, a PDCCH on or using a first active BWP. The wireless device may receive, from the base station, the PDCCH on the first active BWP. The wireless device may start the BWP timer (e.g., BWP inactivity timer) having a timer value, for example, after or in response to receiving the PDCCH on the first active BWP.

A base station may send (e.g., transmit) first DCI via a PDCCH on or using a first active BWP of a first active cell of the at least one cell. The first DCI may be used for scheduling a second BWP of a second active cell of the at least one cell, for example, if cross-carrier scheduling is supported. A wireless device may receive, from the base station, the first DCI on or using the first active BWP of the first active cell. The wireless device may transition (e.g., switch) the second BWP of the second cell from an inactive state to an active state, for example, if the second BWP is in an inactive state at a time of (or prior to) receiving the first DCI. The wireless device may start and/or restart a first BWP timer using a timer value associated with the first cell (and/or the first active BWP), for example, after or in response to receiving the first DCI. The wireless device may start and/or restart a second BWP timer using a timer value associated with the second cell (and/or the second BWP), for example, after or in response to receiving the first DCI on the first active BWP. A base station and/or a wireless device may switch to a default BWP as an active BWP, for example, based on or in response to an expiry of a BWP timer associated with the at least one cell.

Some devices (e.g., legacy devices and/or other devices) may allow at most one active resource (e.g., BWP) in a cell. The cell may be associated with a resource timer (e.g., BWP timer) associated with a timer value. A wireless device may start the resource timer (e.g., BWP timer) (e.g., using the timer value), for example, after or in response to receiving first DCI on a first resource (e.g., BWP, such as an active BWP). The wireless device may switch to a second resource (e.g., a second BWP), for example, after or in response to receiving the first DCI for resource switching (e.g., BWP switching) from the first resource (e.g., first BWP) to the second resource (e.g., second BWP). The wireless device may start and/or restart the BWP timer (e.g., using the timer value), for example, after or in response to the resource switching (e.g., BWP switching) from the first resource (e.g., first BWP) to the second resource (e.g., second BWP). At least some devices may not support multiple active resources (e.g., multiple active BWPs) in a cell. Such devices may not efficiently manage a state (e.g., an active state or inactive state) of multiple active BWPs, for example, if multiple active BWPs are supported and/or if multiple BWP timers are associated with the multiple active BWPs. Efficient BWP operation mechanisms may support multiple active BWPs operating within a cell. Efficient BWP timer management may support multiple active BWPs operating in a cell.

A base station and/or a wireless device may communicate on or using multiple active resources (e.g., multiple active BWPs) of a plurality of resources (e.g., a plurality of BWPs) for sending/receiving multiple types of services in a cell. Each of the plurality of resources (e.g., plurality of BWPs) may be in one of an active state or an inactive state. The plurality of resources (e.g., plurality of BWPs) may comprise a default resource (e.g., a default BWP). The default resource (e.g., BWP) may be in an inactive state if the default resource (e.g., default BWP) is different from one or more of the multiple active resources (e.g., multiple active BWPs). A wireless device may switch a first active resource (e.g., a first active BWP) of the multiple active resources (e.g., multiple active BWPs) to the default resource (e.g., default BWP), for example, after or in response to at least one of: receiving DCI for resource switching (e.g., BWP switching) to the default resource (e.g., default BWP); and/or a first resource timer (e.g., first BWP timer) associated with the first active resource (e.g., first active BWP) expiring. A wireless device may switch a second active resource (e.g., second active BWP) of the multiple active resources (e.g., multiple active BWPs) to the default resource (e.g., the default BWP), for example, after or in response to at least one of: receiving DCI for resource switching (e.g., BWP switching) to the default resource (e.g., default BWP); or a second resource timer (e.g., second BWP timer) associated with the second active resource (e.g., second active BWP) expiring. The first inactivity timer may be associated with a first timer value. The second inactivity timer may be associated with a second timer value. The second timer value may be different from or the same as the first timer value.

A base station may send (e.g., transmit) one or more messages comprising configuration parameters indicating a cell comprising a default BWP and/or a plurality of BWPs. The configuration parameters may indicate that each of the plurality of BWPs may be associated with a BWP-specific timer and/or a BWP timer value. A first BWP timer value associated with a first BWP of the plurality of BWPs may be the same or different from a second BWP timer value associated with a second BWP of the plurality of BWPs. The configuration parameters may indicate that each of the plurality of BWPs may be associated with a BWP-specific timer and a cell timer value. The BWP timers of the plurality of BWPs may be associated with the same cell timer value.

A base station may send (e.g., transmit) one or more messages comprising configuration parameters. The configuration parameters may indicate a cell comprising a default BWP and/or a plurality of BWP groups. The configuration parameters may indicate each BWP group of the plurality of BWP groups that may be associated with a BWP group-specific timer and/or that may be associated with a BWP group timer value.

A wireless device may receive first DCI via a first PDCCH on or using a first BWP of the plurality of BWPs. The wireless device may start and/or restart a first BWP-specific timer associated with a first BWP (and/or cell) timer value, for example, after or in response to receiving the first DCI on or using the first BWP. A wireless device may receive second DCI via a second PDCCH on or using a second BWP of the plurality of BWPs. The wireless device may start and/or restart a second BWP-specific timer associated with a second BWP (and/or cell) timer value, for example, after or in response to receiving the second DCI on or using the second BWP. The wireless device may manage the first BWP-specific timer of the first BWP and the second BWP-specific timer of the second BWP independently.

The wireless device may start and/or restart a first BWP group-specific timer associated with a first BWP group (and/or cell) timer value, for example, after or in response to receiving DCI on or using a first BWP of a first BWP group of the plurality of BWP groups. The wireless device may start and/or restart a second BWP group-specific timer associated with a second BWP group (and/or cell) timer value, for example, after or in response to receiving DCI on or using a second BWP of a second BWP group of the plurality of BWP groups. The wireless device may manage the first BWP group-specific timer of the first BWP group and the second BWP group-specific timer of the second BWP group independently.

A base station may send (e.g., transmit) one or more messages comprising configuration parameters. The configuration parameters may indicate a cell comprising a primary active BWP and/or a plurality of BWPs in a cell. The configuration parameters may indicate that each of the plurality of BWPs may be associated with a BWP-specific timer, a BWP timer value, and/or a cell-specific timer value. The primary active BWP may remain in an active state, for example, at least until receiving a second command indicating a primary active BWP switching. The second command may be an RRC message, a MAC CE, and/or DCI (e.g., DCI indicating a primary active BWP switching). The primary active BWP may refrain from being associated with a BWP-specific timer. The wireless device may manage a first BWP-specific timer of a first BWP of the plurality of BWPs and the second BWP-specific timer of a second BWP of the plurality of BWPs independently. The wireless device may keep the primary active BWP active, for example, at least until receiving the second command.

A base station may send (e.g., transmit) first DCI on or using a first BWP (e.g., a first DL BWP) of the plurality of BWPs. The DCI may indicate a DL assignment and/or a UL grant for a second BWP of the plurality of BWPs. The first BWP may be associated with a first BWP-specific timer and/or a first BWP timer value (and/or a cell timer value). The first BWP may be a primary active BWP. The second BWP may be associated with a second BWP-specific timer and/or a second BWP timer value (and/or a cell timer value). The wireless device may start and/or restart the first BWP-specific timer (e.g., based on the first BWP timer value and/or the cell timer value), for example, after or in response to receiving the first DCI. The wireless device may start and/or restart the second BWP-specific timer (e.g., based on the second BWP timer value and/or the cell timer value), for example, after or in response to receiving the first DCI.

The first DCI sent (e.g., transmitted) on or using the first BWP may indicate a configured (and/or dynamic) downlink assignment on the second BWP (e.g., a second DL BWP). The first DCI sent (e.g., transmitted) on or using the first BWP may indicate a configured (and/or dynamic) uplink grant on or using the second BWP (e.g., a UL BWP). The first DCI sent (e.g., transmitted) on or using the first BWP may be sent (e.g., transmitted) via a PDCCH addressed to a first identifier on the first BWP. The first identifier may be at least one of: a C-RNTI and/or a CS-RNTI. The first identifier may be at least one of: a SI-RNTI, a RA-RNTI, a TC-RNTI, a P-RNTI, a INT-RNTI, a SFI-RNTI, a TPC-PUSCH-RNTI, a TPC-PUCCH-RNTI, a TPC-SRS-RNTI, a CS-RNTI, a SP-CSI-RNTI, and/or a C-RNTI.

A base station may send (e.g., transmit) second DCI (and/or a MAC CE) on or using a first BWP of the plurality of BWPs. The second DCI may indicate activating a second BWP of the plurality of BWPs. The first BWP may be associated with a first BWP-specific timer and/or a first BWP timer value (and/or a cell timer value). The first BWP may be a primary active BWP. The second BWP may be associated with a second BWP-specific timer and/or a second BWP timer value (and/or a cell timer value). The wireless device may start and/or restart the first BWP-specific timer (e.g., based on the first BWP timer value and/or the cell timer value), for example, after or in response to receiving the second DCI. The wireless device may activate the second BWP, for example, after or in response to receiving the second DCI. The wireless device may start and/or restart the second BWP-specific timer (e.g., based on the second BWP timer value and/or the cell timer value), for example, after or in response to activating the second BWP. A gap between a first time at which DCI for the activation is received and a second time at which the activation is completed may be zero or a value greater than zero.

A base station may send (e.g., transmit) third DCI (and/or a MAC CE) on or using a first BWP of the plurality of BWPs. The third DCI may indicate deactivating a second BWP of the plurality of BWPs. The first BWP may be associated with a first BWP-specific timer and/or a first BWP timer value (and/or a cell timer value). The first BWP may be a primary active BWP. The second BWP may be associated with a second BWP-specific timer and/or a second BWP timer value (and/or a cell timer value). The wireless device may not start and/or restart the first BWP-specific timer (e.g., based on the first BWP timer value and/or the cell timer value), for example, after or in response to receiving the second DCI. The wireless device may deactivate the second BWP, for example, after or in response to receiving the second DCI. The wireless device may reset the second BWP-specific timer (e.g., based on the second BWP-specific timer value and/or the cell-specific timer value). The wireless device may refrain from starting the second BWP-specific timer, for example, after or in response to deactivating the second BWP.

A base station may send (e.g., transmit) fourth DCI on or using a first active BWP of the plurality of BWPs. The fourth DCI may indicate switching from a second active BWP to a third BWP as a third active BWP. The first active BWP may be associated with a first BWP-specific timer and/or a first BWP timer value (and/or a cell timer value). The first BWP may be a primary active BWP. The second active BWP may be associated with a second BWP-specific timer and/or a second BWP timer value (and/or a cell timer value). The third BWP may be associated with a third BWP-specific timer and/or a third BWP timer value (and/or a cell timer value). The wireless device may start and/or restart the first BWP-specific timer (e.g., based on the first BWP timer value and/or the cell timer value), for example, after or in response to receiving the fourth DCI. The wireless device may deactivate the second active BWP and/or activate the third BWP as the third active BWP, for example, after or in response to receiving the fourth DCI. The wireless device may reset the second BWP-specific timer (e.g., based on the second BWP timer value and/or the cell timer value). The wireless device may refrain from starting the second BWP-specific timer, for example, after or in response to deactivating the second active BWP. The wireless device may start and/or restart the third BWP-specific timer (e.g., based on the third BWP timer value and/or the cell timer value), for example, after or in response to activating the third BWP. A gap between a first time at which DCI for the switching is received by the wireless device and a second time at which the switching is completed may be zero or a value greater than zero.

A base station may send (e.g., transmit) one or more messages comprising configuration parameters indicating a cell comprising a default BWP and/or a plurality of BWPs in a cell. The configuration parameters may indicate that each of the plurality of BWPs may be associated with a BWP-specific timer and a BWP timer value or a cell timer value. A first active BWP of multiple active BWPs of the plurality of BWPs may be designated as a primary active BWP (PBWP). At least a second active BWP of multiple active BWPs of the plurality of BWPs may be designated as a secondary active BWP (SBWP). The default BWP may be in an inactive state, for example, if the default BWP is different from the PBWP.

A wireless device may start and/or restart a first BWP-specific timer, for example, after or in response to receiving a first command indicating at least one of: the PBWP being activated; a PBWP switching; and/or a DL assignment/UL grant on the PBWP. The wireless device may start and/or restart a second BWP-specific timer, for example, after or in response to receiving a second command indicating at least one of: the SBWP being activated; a SBWP switching; and/or a DL assignment/UL grant on the SBWP.

The wireless device may monitor a first PDCCH on the PBWP, for example, after or in response to the first BWP-specific timer running (e.g., starting to run or still running) The wireless device may monitor a second PDCCH on the SBWP, for example, after or in response to the second BWP-specific timer running (e.g., starting to run or still running).

The wireless device may deactivate the SBWP, for example, after or in response to the second BWP-specific timer expiring and the first BWP-specific timer running (e.g., starting to run or still running) The wireless device may keep the PBWP in an active state, for example, after or in response to the second BWP-specific timer expiring and the first BWP-specific timer running (e.g., starting to run or still running) The wireless device may keep the default BWP in an inactive state, for example, after or in response to the second BWP-specific timer expiring and the first BWP-specific timer running (e.g., starting to run or still running).

The wireless device may switch from the PBWP to the default BWP, for example, after or in response to the second BWP-specific timer expiring and the first BWP-specific timer expiring. The wireless device may switch from the PBWP to the default BWP, for example, after or in response to one or more BWP-specific timers expiring. The one or more BWP-specific timers may comprise at least the second BWP-specific timer and/or the first BWP-specific timer. The wireless device may activate the default BWP and/or deactivate the PBWP, for example, after or in response to the switching from the PBWP to the default BWP. A gap between a first time at which the switching is started and a second time at which the switching is completed may be zero or a value greater than zero.

A base station may send (e.g., transmit) one or more messages comprising configuration parameters indicating a cell comprising a default BWP and a plurality of BWPs in a cell. The configuration parameters may indicate that each of the plurality of BWPs may be associated with a BWP-specific timer, a BWP timer value, and/or a cell timer value. A first active BWP of multiple active BWPs of the plurality of BWPs may be designated as a primary active BWP (PBWP). At least a second active BWP of multiple active BWPs of the plurality of BWPs may be designated as a secondary active BWP (SBWP). The default BWP may be in an inactive state, for example, if the default BWP is different from the PBWP. One or more devices may refrain from configuring the SBWP with a PDCCH. A base station may send (e.g., transmit) a downlink scheduling and/or an uplink grant for the SBWP via a PDCCH on or using the PBWP. One or more devices may refrain from associating the SBWP with a BWP-specific timer, for example, if the SBWP is not configured with a PDCCH on the SBWP.

A wireless device may start and/or restart a first BWP-specific timer, for example, after or in response to receiving a first command indicating at least one of: the PBWP being activated; a PBWP switching; and/or a DL assignment/UL grant on the PBWP. The wireless device may start and/or restart a second BWP-specific timer (e.g., if configured), for example, after or in response to receiving a second command indicating at least one of: the SBWP being activated; a SBWP switching; or a DL assignment/UL grant on the SBWP.

The wireless device may monitor a first PDCCH on the PBWP, for example, if the first BWP-specific timer is running. The wireless device may monitor the first PDCCH and/or a second PDCCH on the PBWP for the SBWP, for example, if the second BWP-specific timer is running.

The wireless device may switch from the PBWP to the default BWP, for example, after or in response to the first BWP-specific timer expiring and/or if the second BWP-specific timer (e.g., if configured) is running. The wireless device may deactivate the PBWP and/or activate the default BWP, for example, after or in response to the switching from the PBWP to the default BWP. The wireless device may deactivate the SBWP, for example, after or in response to the switching from the PBWP to the default BWP. A gap between a first time at which the switching is started and a second time at which the switching is completed may be zero or a value greater than zero.

A base station may send (e.g., transmit) one or more messages comprising configuration parameters indicating a cell comprising a default BWP and a plurality of BWPs in a cell. The configuration parameters may indicate that each of the plurality of BWPs may be associated with a BWP-specific timer, a BWP timer value, and/or a cell timer value.

A wireless device may start and/or restart a first BWP-specific timer, for example, after or in response to receiving a first command indicating at least one of: a first BWP being activated and/or a DL assignment/UL grant on the first BWP. The wireless device may start and/or restart a second BWP-specific timer (e.g., if configured), for example, after or in response to receiving a second command indicating at least one of: a second BWP being activated and/or a DL assignment/UL grant on the second BWP.

The wireless device may monitor a first PDCCH on the first BWP, for example, if the first BWP-specific timer is running. The wireless device may monitor a second PDCCH on the second BWP, for example, if the second BWP-specific timer is running.

The wireless device may switch from the second BWP to the default BWP, for example, after or in response to the second BWP-specific timer expiring and/or if the first BWP-specific timer is running (e.g., starting to run and/or still running) The wireless device may deactivate the second BWP and/or activate the default BWP, for example, after or in response to the switching from the second BWP to the default BWP. The wireless device may keep the first BWP in an active state, for example, based on the switching from the second BWP to the default BWP. A gap between a first time at which the switching is started and a second time at which the switching is completed may be zero or a value greater than zero. The wireless device may deactivate the first BWP and/or keep the default BWP in an active state, for example, after or in response to one or more BWP-specific timers expiring. The one or more BWP-specific timers may comprise at least: the first BWP-specific timer; and/or the second BWP-specific timer.

A base station may send (e.g., transmit) one or more messages comprising configuration parameters indicating a cell comprising a default BWP and/or a plurality of BWPs in a cell. The configuration parameters may indicate that each of the plurality of BWPs may be associated with a BWP-specific timer, a BWP timer value, and/or a cell timer value.

A wireless device may start and/or restart a first BWP-specific timer, for example, after or in response to receiving a first command indicating at least one of: a first BWP being activated and/or a DL assignment/UL grant on the first BWP. The wireless device may start and/or restart a second BWP-specific timer (e.g., if configured), for example, after or in response to receiving a second command indicating at least one of: a second BWP being activated and/or a DL assignment/UL grant on the second BWP.

The wireless device may monitor a first PDCCH on the first BWP, for example, if the first BWP-specific timer is running. The wireless device may monitor a second PDCCH on the second BWP, for example, if the second BWP-specific timer is running.

The wireless device may deactivate the second BWP, for example, after or in response to the second BWP-specific timer expiring and/or if the first BWP-specific timer is running (e.g., starting to run or still running). The wireless device may deactivate the second BWP, for example, after or in response to the switching. The wireless device may keep the first BWP in an active state, for example, based on the switching. A gap between a first time at which the switching is started and a second time at which the switching is completed may be zero or a value greater than zero.

The wireless device may switch to the default BWP, for example, after or in response to one or more BWP-specific timers expiring. The one or more BWP-specific timers may comprise at least: the first BWP-specific timer; and/or the second BWP-specific timer. The wireless device may deactivate the first BWP, deactivate, the second BWP, and/or activate the default BWP, for example, after or in response to the switching.

A base station and/or a wireless device may align multiple BWP timers, for example, if multiple active BWPs are supported. A wireless device may reduce power consumption if multiple active BWPs are supported. A base station may reduce signaling overhead to maintain time alignments and/or synchronization on multiple active BWPs.

At least some wireless devices (e.g., legacy wireless devices and/or any other wireless device) may stop a BWP timer (e.g., BWP inactivity timer) associated with an active DL BWP of the secondary cell, for example, if a wireless device initiates a random access procedure for a secondary cell. The wireless device may stop the BWP timer (e.g., BWP inactivity timer) to avoid an expiry of the BWP timer, for example, during the random access procedure. The expiry of the BWP timer (e.g., BWP inactivity timer) may interrupt the random access procedure on the active DL BWP.

The wireless device may receive a random access response of the random access procedure for the secondary cell on a primary cell. The wireless device may stop a second BWP timer (e.g., BWP inactivity timer) associated with a second active DL BWP of the primary cell, for example, based on the initiating of random access for the secondary cell. The wireless device may still receive (e.g., avoid missing receiving) the random access response, for example, by stopping the second BWP timer. The wireless device may stop the BWP timer (e.g., BWP inactivity timer) associated with an active DL BWP of the secondary cell and/or may stop the second BWP timer (e.g., BWP inactivity timer) associated with the second active DL BWP of the primary cell, for example, based on initiating random access.

Figure 22A:
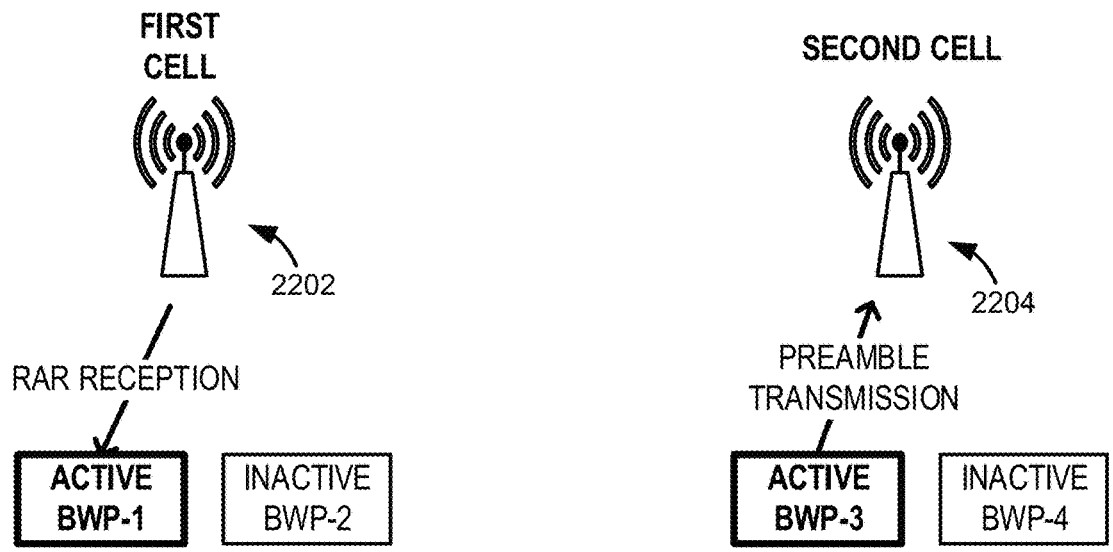
FIG. 22A and FIG. 22B show examples of BWP operations for random access for a secondary cell.
Figure 22B:
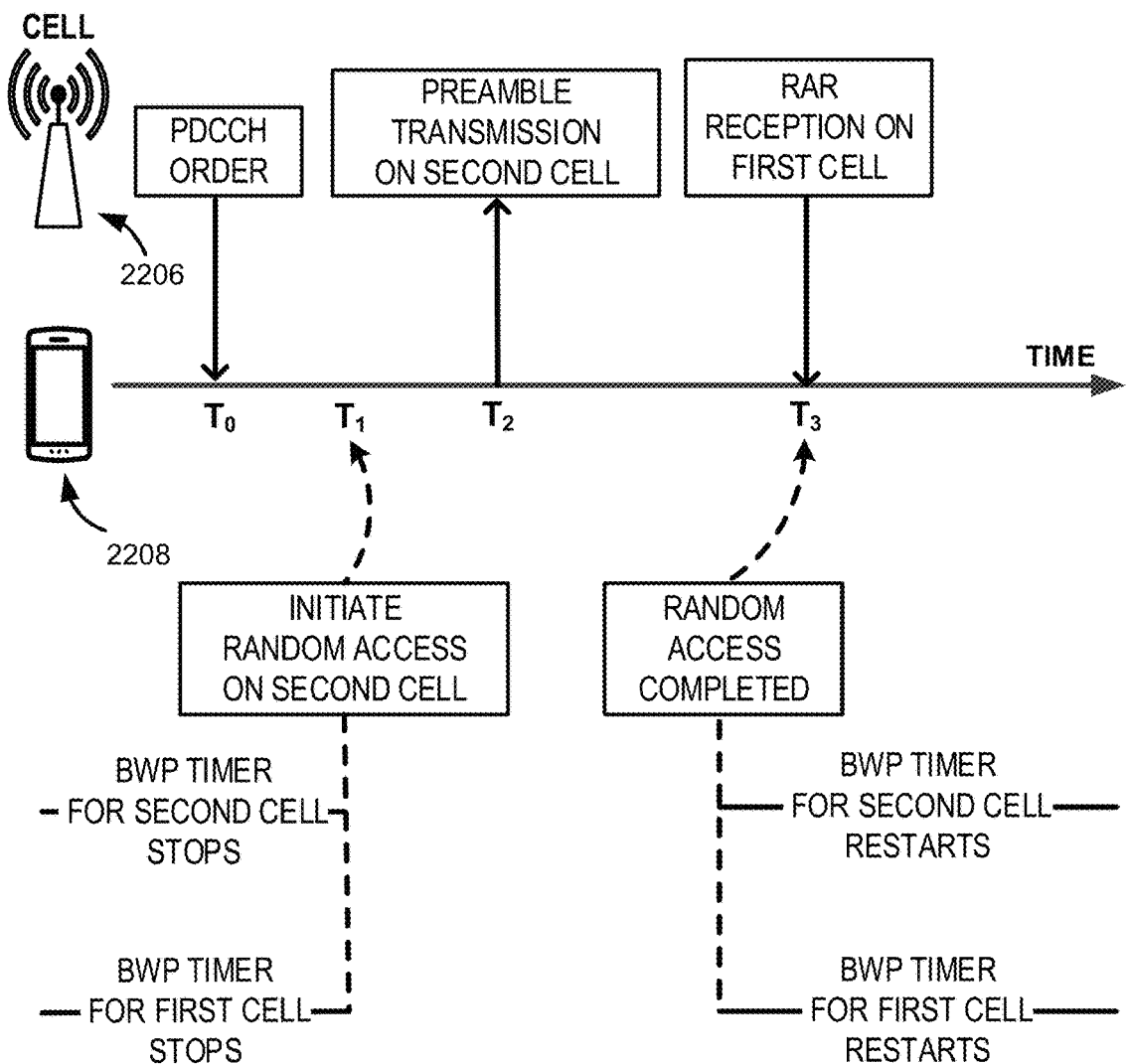

FIG. 22A and FIG. 22B show examples of BWP operations for random access (e.g., for a secondary cell). The random access may use a second cell 2204 for a preamble transmission on a third active BWP (e.g., active BWP-3) and a first cell 2202 for a random access response (RAR) on a first active BWP (e.g., active BWP-1). The first cell 2202 may comprise the first active BWP (e.g., active BWP-1) and at least one inactive BWP (e.g., inactive BWP-2). The second cell 2204 may comprise the third active BWP (e.g., active BWP-3) and at least one inactive BWP (e.g., inactive BWP-4). A base station 2206 may send, to a wireless device 2208, a PDCCH order (e.g., at time $T_0$). The wireless device 2208 may initiate a random access on a second cell (e.g., at time $T_1$). The wireless device 2208 may initiate the random access on the second cell based on the PDCCH order. The wireless device 2208 may stop a BWP timer for the second cell and/or stop a BWP timer for a first cell (e.g., at time $T_1$). The wireless device 2208 may send (e.g., transmit), to the base station 2206, a preamble on a second cell (e.g., at time $T_2$). The base station 2206 may send (e.g., transmit), to the wireless device 2206, a random access response on the first cell (e.g., at time $T_3$). The random access response may be completed, for example, if the wireless device 2208 receives the random access response. The wireless device may restart the BWP for the second cell and/or restart the BWP timer for the first cell, for example, based on or in response to receiving the random access response.

A misalignment may arise between a BWP on which a random access response is sent (e.g., transmitted) (such as BWP-1) and a BWP on which a wireless device 2208 monitors for the random access response (such as BWP-3), for example, if the wireless device 2208 supports multiple active BWPs in a cell. The wireless device 2208 may stop a BWP timer (e.g., BWP inactivity timer) of the BWP which the wireless device 2208 monitors for the random access response. This misalignment may lead to, for example, unnecessary delay, data loss, and/or signaling overhead. Recovery from the misalignment that may be caused by the wireless device 2208 missing the random access response may result in a transmission delay and/or signaling overhead, which may increase the latency of a random access procedure and, in turn, may result in a waste of radio resources for redundant transmission of the random access response.

A wireless device 2208 may have multiple active UL BWPs in a cell. The wireless device 2208 may select an UL BWP of the multiple active UL BWPs to send (e.g., transmit) a random access preamble, for example, if the wireless device 2208 initiates random access (e.g., contention-free or contention-based). A wireless device 2208 may have multiple active DL BWPs in a cell. The wireless device 2208 may select a DL BWP of the multiple active DL BWPs to monitor for a random access response, for example, if the wireless device 2208 initiates random access (e.g., contention-free or contention-based). The wireless device 2208 may refrain from monitoring the multiple active DL BWPs to receive the random access response, which may lead to a more efficient operation and/or reducing power consumption.

A wireless device 2208 may support multiple active BWPs in a cell, for example, to improve upon random access procedures such as by increasing downlink radio efficiency and/or reducing uplink signaling overhead. A base station 2206 may send (e.g., transmit), to one or more wireless devices 2208, one or more messages comprising configuration parameters. A wireless device 2208 may receive, from the base station 2206, one or more messages comprising the configuration parameters. The one or more messages may comprise one or more RRC messages (e.g., an RRC connection reconfiguration message, RRC connection reestablishment message, and/or RRC connection setup message). The configuration parameters may comprise configuration parameters for a primary cell (e.g., associated with a first base station 2202) and/or one or more secondary cells (e.g., associated with one or more second base stations 2204). The one or more secondary cells may comprise a first secondary cell. The configuration parameters may comprise BWP configuration parameters for a plurality of BWPs. The plurality of BWPs may comprise a first plurality of BWPs of the primary cell comprising a first DL BWP and/or a second DL BWP. The plurality of BWPs may comprise a second plurality of BWPs of the first secondary cell comprising a third DL BWP.

Some or all of the plurality of BWPs may be indicated (e.g., identified) by a BWP-specific index. Some or all of the plurality of BWPs may be associated with a BWP-specific inactivity timer.

A wireless device 2208 may receive (e.g., in a first slot) first DCI indicating switching a first active BWP of the primary cell from a first active DL BWP to the first DL BWP. The first DCI may comprise a first BWP indicator. The wireless device 2208 may determine that the first DCI indicates BWP switching, for example, based on the first BWP indicator indicating a BWP different from the first active DL BWP. The wireless device 2208 may start a first inactivity timer associated with the first DL BWP, for example, based on switching the first active BWP from the first active DL BWP to the first DL BWP.

A wireless device 2208 may receive (e.g., in a first slot) first DCI and/or a first MAC CE indicating activating the first DL BWP of the primary cell. The first DCI and/or the first MAC CE may comprise a first BWP indicator. The wireless device 2208 may determine that the first DCI and/or the first MAC CE indicates BWP activating, for example, based on the first BWP indicator indicating the first DL BWP. The wireless device 2208 may start a first inactivity timer associated with the first DL BWP, for example, based on activating the first DL BWP.

A wireless device 2208 may receive (e.g., in a second slot) second DCI indicating switching a second active BWP of the primary cell from a second active DL BWP to the second DL BWP. The second DCI may comprise a second BWP indicator. The wireless device 2208 may determine that the second DCI indicates BWP switching from the second active DL BWP to the second DL BWP, for example, based on the second BWP indicator indicating a BWP different from the second active DL BWP. The wireless device 2208 may start a second inactivity timer associated with the second DL BWP, for example, based on switching the second active BWP from the second active DL BWP to the second DL BWP.

A wireless device 2208 may receive (e.g., in a second slot) second DCI and/or a second MAC CE indicating activating the second DL BWP of the primary cell. The second DCI and/or the second MAC CE may comprise a second BWP indicator. The wireless device may determine that the second DCI and/or the second MAC CE indicates BWP activating, for example, based on the second BWP indicator indicating the second DL BWP. The wireless device 2208 may start a second inactivity timer associated with the second DL BWP, for example, based on activating the second DL BWP.

A wireless device 2208 may receive (e.g., in a third slot) third DCI indicating switching a third active BWP of the first secondary cell from a third active DL BWP to the third DL BWP. The third DCI may comprise a third BWP indicator. The wireless device 2208 may determine that the third DCI indicates BWP switching, for example, based on the third BWP indicator indicating a BWP different from the third active DL BWP. The wireless device 2208 may start a third inactivity timer associated with the third DL BWP, for example, based on switching the third active BWP from the third active DL BWP to the third DL BWP.

A wireless device 2208 may receive (e.g., in a third slot) third DCI and/or a third MAC CE indicating activating the third DL BWP of the first secondary cell. The third DCI and/or the third MAC CE may comprise a third BWP indicator. The wireless device 2208 may determine that the third DCI and/or the third MAC CE indicates BWP activating, for example, based on the third BWP indicator indicating the third DL BWP. The wireless device 2208 may start a third inactivity timer associated with the third DL BWP, for example, based on activating the third DL BWP. The wireless device 2208 may start the third inactivity timer of the third DL BWP, for example, based on receiving an SCell activation/deactivation MAC CE signal activating the first secondary cell.

The wireless device 2208 may activate at least two BWPs (e.g., the first DL BWP and the second DL BWP) of the first plurality of BWPs and at least one BWP (e.g., the third DL BWP) of the second plurality of BWPs. Activating each BWP of the at least two BWPs of the primary cell and each BWP of the at least one BWP of the first secondary cell may be performed in different time slots. The wireless device 2208 may start the BWP-specific inactivity timer of each of the at least two BWPs and/or the BWP-specific inactivity timer of each of the at least one BWP, for example, based on activating the BWPs.

The first DL BWP and the second DL BWP of the first plurality of BWPs of the primary cell, and the third DL BWP of the second plurality of BWPs of the first secondary cell, may be active at the same time. The first inactivity timer, the second inactivity timer, and the third inactivity timer may be running at the same time.

Figure 23A:
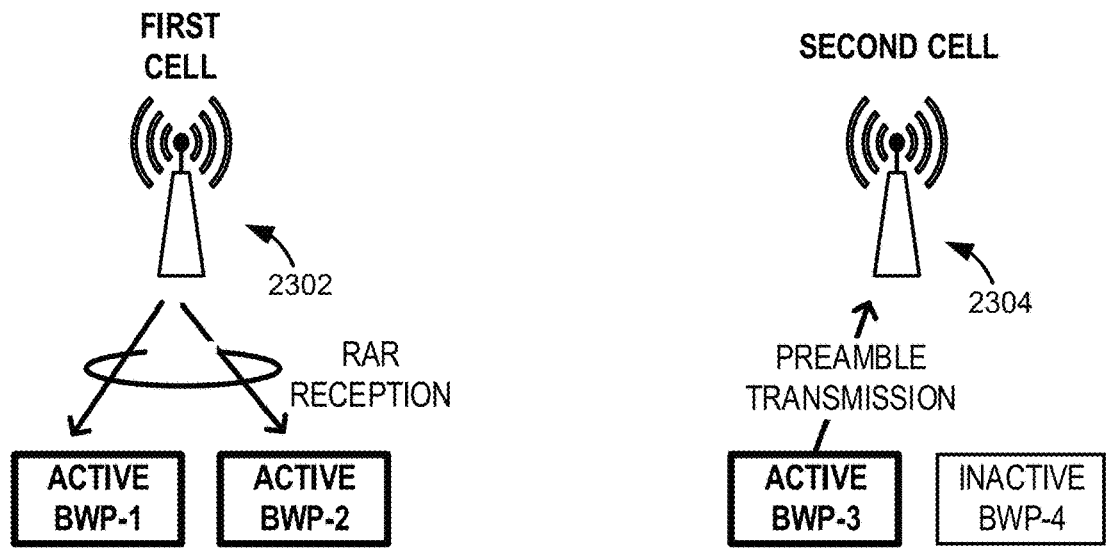
FIG. 23A and FIG. 23B show examples of multiple active BWP operations.
Figure 23B:
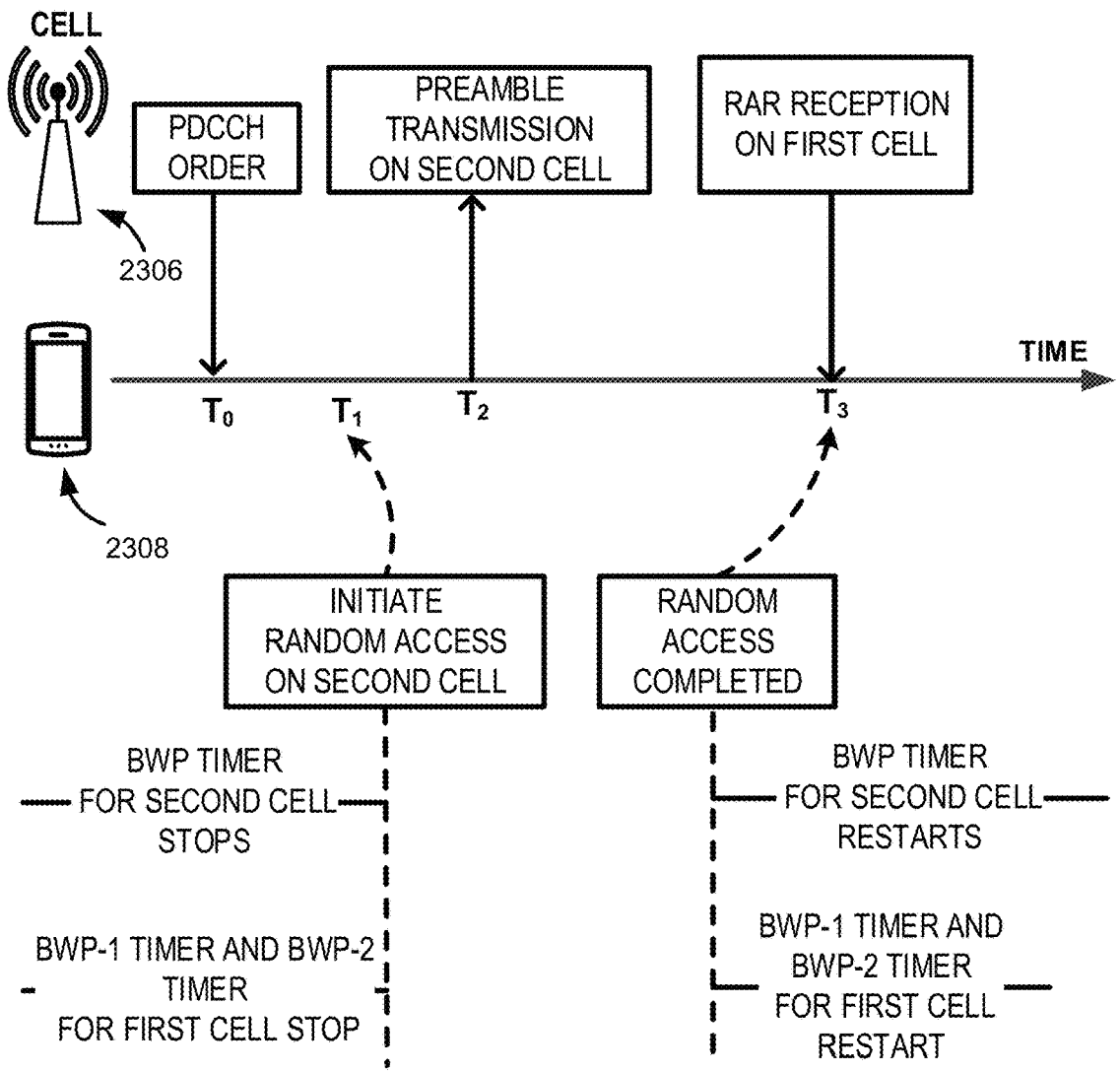

FIG. 23A and FIG. 23B show examples of BWP operations for random access (e.g., for a secondary cell). The random access procedures may comprise sending messages via a second cell 2304, such as for a preamble transmission on a third active BWP (e.g., active BWP-3). The random access procedures may comprise sending messages via a first cell 2302, such as for a random access response (RAR) on a first active BWP (e.g., active BWP-1) or a second active BWP (e.g., active BWP-2). The first cell 2302 may be a primary cell. The second cell 2304 may be a secondary cell. The first cell 2302 may comprise the first active BWP (e.g., active BWP-1) and the second active BWP (e.g., active BWP-2). The second cell 2304 may comprise the third active BWP (e.g., active BWP-3) and at least one inactive BWP (e.g., inactive BWP-4). A base station 2306 may send, to a wireless device 2308, a PDCCH order (e.g., at time $T_0$). The wireless device 2308 may initiate the random access on the second cell (e.g., at time $T_1$). The wireless device 2308 may initiate the random access on the second cell based on the PDCCH order. The wireless device 2308 may initiate the random access on the second cell based on detecting, by the wireless device 2308, a beam failure (e.g., at time $T_0$). The wireless device 2308 may stop a BWP timer for the second cell and/or stop BWP timers (e.g., BWP-1 timer and BWP-2 timer) for a first cell (e.g., at time $T_1$). The wireless device 2308 may send, to the base station 2306, a preamble on a second cell (e.g., at time T2). The base station 2306 may send, to the wireless device 2306, a random access response on the first cell (e.g., at time $T_3$). The random access response may be completed, for example, if the wireless device 2308 receives the random access response. The wireless device 2308 may restart the BWP timer for the second cell and/or restart the at least two BWP timers for the first cell (e.g., BWP-1 timer and BWP-2 timer), for example, based on or in response to receiving the random access response.

The wireless device 2308 may send (e.g., transmit) a random access preamble, for example, based on initiating random access for a first secondary cell (e.g., at time $T_2$ in FIG. 23B). The random access preamble may be dedicated to the wireless device 2308. The random access preamble may be wireless device-specific and may be configured for the wireless device 2308, for example, by the base station 2306.

The wireless device 2308 may select at least one BWP of the at least two BWPs (e.g., BWP-1, BWP-2), for example, based on initiating a random access procedure and one or more criteria. The wireless device 2308 may stop the BWP-specific inactivity timer of some or all of the at least two BWPs (e.g., the first DL BWP and/or the second DL BWP, or BWP-1 and/or BWP-2) and/or the BWP-specific inactivity timer of some or all of the at least one BWP (e.g., third DL BWP, BWP-1, and/or BWP-2), for example, based on initiating random access. The wireless device 2308 may stop the first inactivity timer of the first DL BWP (e.g., BWP-1) and the second inactivity timer of the second DL BWP (e.g., BWP-2) of the primary cell and the third inactivity timer of the third DL BWP of the first secondary cell (e.g., at time $T_1$ in FIG. 23B).

The wireless device 2308 may monitor at least one PDCCH occasion for DCI on some or all of the at least two BWPs (e.g., BWP-1 and/or BWP-2), for example, based on the stopping of the BWP-specific inactivity timer of some or all of the at least two BWPs (e.g., BWP-1 and/or BWP-2). The wireless device 2308 may start a first response window (e.g., RA-ResponseWindow) at a first PDCCH occasion on the first DL BWP of the primary cell, for example, from the end of sending (e.g., transmitting) the random access preamble. The wireless device 2308 may start a second response window (e.g., RA-ResponseWindow) at a second PDCCH occasion on the second DL BWP of the primary cell, for example, from the end of sending (e.g., transmitting) the random access preamble. The first response window and/or the second response window may be configured by a higher layer (e.g., MAC, RRC).

The wireless device 2308 may monitor the first PDCCH occasion for DCI, for example, if the first response window is running. The wireless device 2308 may monitor the second PDCCH occasion for the DCI, for example, if the second response window is running. The DCI may be indicated (e.g., identified, scrambled, etc.) by an RA-RNTI of the wireless device 2308. The DCI may be indicated (e.g., identified, scrambled, etc.) by a C-RNTI of the wireless device 2308.

The base station 2306 may select a DL BWP (e.g., BWP-1 or BWP-2) to send (e.g., transmit) the DCI. The DCI may be for a random access response (e.g., msg2). Selecting the DL BWP may be based on a base station implementation. The base station 2306 may select the first DL BWP to send (e.g., transmit) the DCI. The base station 2306 may select the second DL BWP to send (e.g., transmit) the DCI. The base station 2306 may send (e.g., transmit) the DCI on some or all of the at least two BWPs (e.g., the first DL BWP, the second DL BWP, BWP-1, or BWP-2).

The random access procedure may be completed successfully (e.g., at time $T_3$), for example, if the wireless device 2308 receives the DCI (e.g., on the first DL BWP, the second DL BWP, BWP-1, or BWP-2). The wireless device 2308 may restart the BWP-specific inactivity timer of some or all of the at least two BWPs (e.g., the first DL BWP, the second DL BWP, BWP-1, or BWP-2) and/or the BWP-specific inactivity timer of some or all of the at least one BWP (e.g., third DL BWP), for example, if the random access is successfully completed. The wireless device 2308 may restart the first inactivity timer of the first DL BWP (e.g., BWP-1), the second inactivity timer of the second DL BWP (e.g., BWP-2), and/or the third inactivity timer of the third BWP (e.g., at time $T_3$).

FIG. 23A shows that the wireless device 2308 may stop some or all of the BWP-specific inactivity timers of each active DL BWP of the first cell (e.g., Active BWP-1 and Active BWP-2), for example, after or in response to initiating random access for a second cell. The wireless device 2308 may stop a BWP-specific inactivity timer of at least one active BWP of the second cell (e.g., Active BWP-3), for example, after or in response to initiating random access.

The base station 2302 may send (e.g., transmit) a random access response on at least one of the active DL BWPs of the primary cell (e.g., BWP-1 and/or BWP-2). The base station 2302 may send (e.g., transmit) the random access response on Active BWP-1. The base station 2302 may send (e.g., transmit) the random access response on Active BWP-2. The base station 2302 may send (e.g., transmit) the random access response on both Active BWP-1 and Active BWP-2.

The wireless device 2308 may monitor some or all of the active DL BWPs of the first cell (e.g., Active BWP-1 and/or Active BWP-2) for the random access response. The wireless device 2308 may complete the random access procedure successfully, for example, based on receiving the random access response on at least one of the active DL BWPs of the primary cell. The wireless device 2308 may restart each BWP-specific inactivity timer of some or all of the active DL BWPs of the primary cell (e.g., Active BWP-1 and/or Active BWP-2) and/or the BWP-specific inactivity timer of the at least one active BWP of the secondary cell (e.g., Active BWP-3), for example, based on completing the random access procedure successfully.

A base station 2306 may refrain from configuring a DL BWP (e.g., BWP-1, BWP-2) with a common search space. A wireless device 2308 may refrain from receiving a DCI identified by an RA-RNTI, for example, if not configured with the common search space.

FIG. 23A shows that the wireless device 2308 may stop some or all of the BWP-specific inactivity timers of each active DL BWP of the primary cell (e.g., BWP-1, BWP-2) configured with a common search space, for example, after or in response to initiating random access. The wireless device 2308 may stop a BWP-specific inactivity timer of at least one active BWP of the secondary cell (e.g., Active BWP-3), for example, after or in response to initiating random access.

The base station 2302 may send (e.g., transmit) a random access response on at least one of the active DL BWPs of the primary cell (e.g., BWP-1, BWP-2) configured with a common search space. The base station 2302 may send (e.g., transmit) the random access response on Active BWP-1, for example, if the Active BWP-1 is configured with a common search space. The base station 2302 may send (e.g., transmit) the random access response on Active BWP-2, for example, if the Active BWP-2 is configured with a common search space. The base station 2302 may send (e.g., transmit) the random access response on both Active BWP-1 and Active BWP-2, for example, if both the Active BWP-1 and Active BWP-2 are configured with a common search space.

The wireless device 2308 may monitor some or all of the active DL BWPs, of the primary cell, configured with a common search space (e.g., Active BWP-1, Active BWP-2, or both) for the random access response. The wireless device 2308 may complete random access successfully, for example, based on receiving the random access response on at least one of the active DL BWPs of the primary cell.

The wireless device 2308 may restart some or all of the BWP-specific inactivity timers of some or all of the active DL BWPs, of the primary cell, configured with a common search space (e.g., Active BWP-1, Active BWP-2, or both), for example, based on completing the random access procedure successfully. The wireless device 2308 may restart the BWP-specific inactivity timer of the at least one active BWP of the secondary cell (e.g., Active BWP-3), for example, based on completing random access successfully.

The at least one selected BWP of the at least two BWPs (e.g., BWP-1, BWP-2) may comprise BWPs of the primary cell configured with a common search space. The wireless device 2308 may stop the BWP-specific inactivity timer of some or all of the BWPs of a first subset of the at least two BWPs (e.g., first DL BWP and/or the second DL BWP, or BWP-1 and/or BWP-2), for example, based on initiating random access. Some or all of the BWPs of the first subset may be configured with a common search space.

The first DL BWP (e.g., BWP-1) of the wireless device 2308 may be configured with a common search space. The second DL BWP (e.g., BWP-2) of the wireless device 2308 may refrain from being configured with a common search space. The wireless device 2308 may stop the first inactivity timer of the first DL BWP (e.g., BWP-1) of the primary cell and/or the third inactivity timer of the third DL BWP (e.g., BWP-3) of the first secondary cell (e.g., at time $T_1$), for example, based on initiating a random access procedure.

The wireless device 2308 may start a first response window (e.g., RA-ResponseWindow) at a first PDCCH occasion on the first DL BWP (e.g., BWP-1) of the primary cell from the end of sending (e.g., transmitting) the random access preamble. The first response window may be configured by a higher layer (e.g., MAC, RRC).

The wireless device 2308 may monitor the first PDCCH occasion for DCI, for example, if the first response window is running. The DCI may be identified by an RA-RNTI. The DCI may be identified by a C-RNTI of the wireless device 2308.

Random access may be completed successfully (e.g., at time $T_3$), for example, if the wireless device 2308 receives the DCI on the first DL BWP (e.g., BWP-1). The wireless device 2308 may restart (e.g., at time $T_3$) the first inactivity timer of the first DL BWP (e.g., BWP-1) and/or the third inactivity timer of the third BWP (e.g., BWP-3), for example, based on random access being successfully completed.

The first DL BWP (e.g., BWP-1) and/or the second DL BWP (BWP-2) of the wireless device 2308 may be configured with a common search space. The wireless device 2308 may stop the first inactivity timer of the first DL BWP (e.g., BWP-1) and/or the second inactivity timer of the second DL BWP (e.g., BWP-2) of the primary cell and/or the third inactivity timer of the third DL BWP (e.g., BWP-3) of the first secondary cell (e.g., at time $T_1$), for example, based on initiating random access.

Figure 24A:
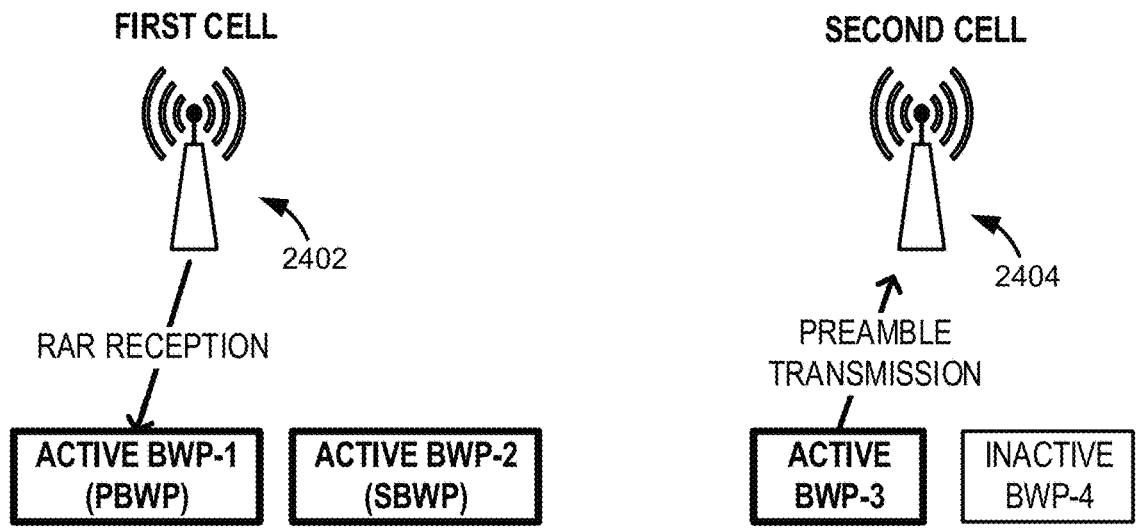
FIG. 24A and FIG. 24B show examples of multiple active BWP operations.
Figure 24B:
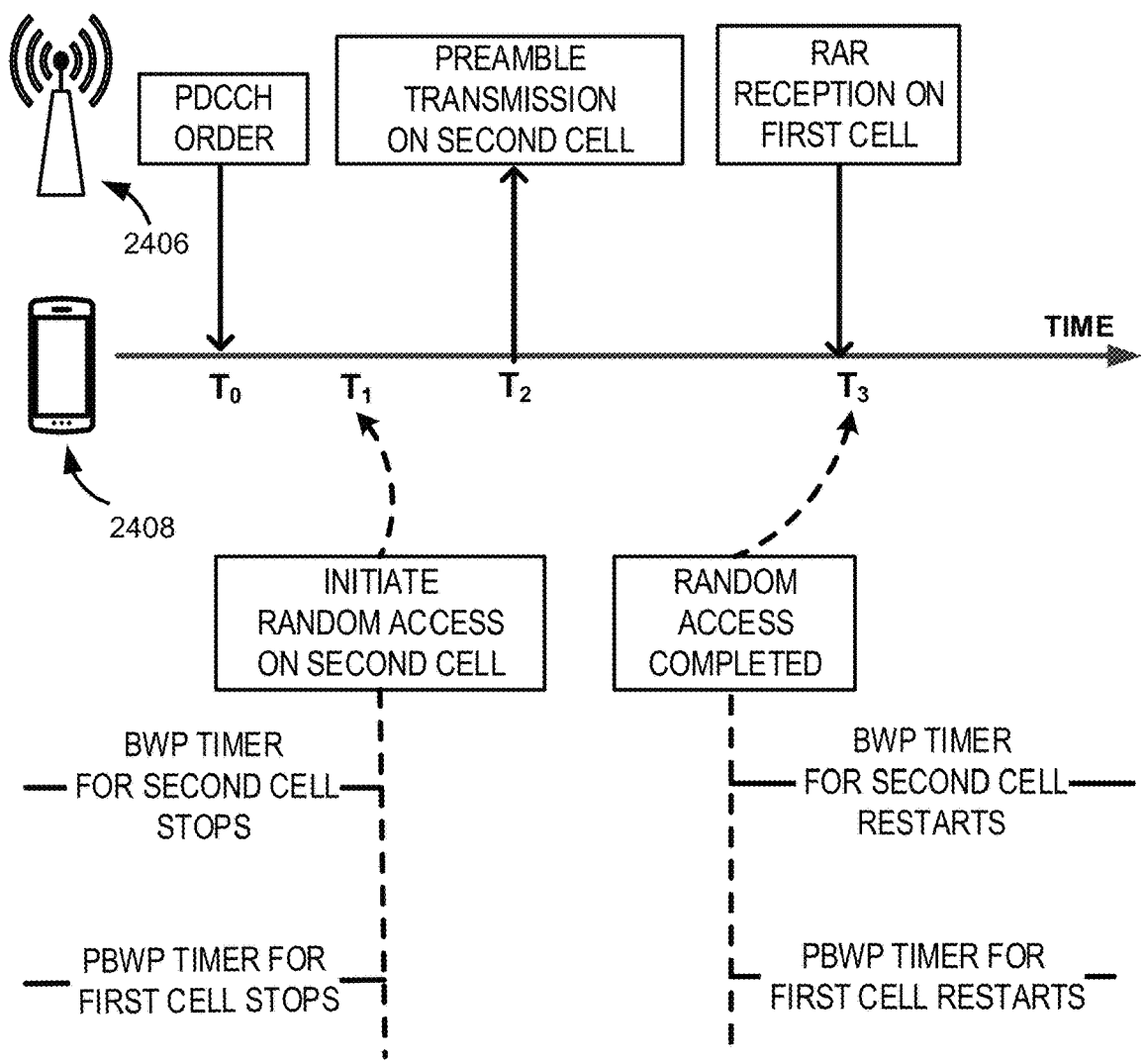

FIG. 24A and FIG. 24B show examples of BWP operations for random access (e.g., for a secondary cell). The random access may use a second cell 2404 for a preamble transmission on a third active BWP (e.g., active BWP-3) and a first cell 2402 for a random access response (RAR) on a first active BWP (e.g., active BWP-1). The first cell 2402 may comprise the first active BWP (e.g., active BWP-1) and the second active BWP (e.g., active BWP-2). The second cell 2404 may comprise the third active BWP (e.g., active BWP-3) and at least one inactive BWP (e.g., inactive BWP-4). A base station 2406 may send, to a wireless device 2408, a PDCCH order (e.g., at time $T_0$). The wireless device 2408 may initiate random access for a second cell (e.g., at time $T_1$). The wireless device 2408 may initiate the random access on the second cell based on the PDCCH order. The wireless device 2408 may initiate the random access on the second cell based on detecting, by the wireless device 2408, a beam failure (e.g., at time $T_0$). The wireless device 2408 may stop a BWP timer for the second cell and/or stop a PBWP timer for a first cell (e.g., at time $T_1$). The wireless device 2408 may send (e.g., transmit), to the base station 2406, a preamble on a second cell (e.g., at time $T_2$). The base station 2406 may send, to the wireless device 2406, a random access response on the first cell (e.g., at time $T_3$). The random access response may be completed, for example, if the wireless device 2408 receives the random access response. The wireless device 2408 may restart the BWP for the second cell and/or restart the PBWP timer for the first cell, for example, based on or in response to receiving the random access response.

The wireless device 2408 may send (e.g., transmit) a random access preamble, for example, based on initiating random access for the first secondary cell (e.g., at time $T_2$). The random access preamble may be dedicated to the wireless device 2408. The random access preamble may be wireless device-specific and may be configured for the wireless device 2408 by the base station 2406.

The at least one selected BWP of the at least two BWPs (e.g., BWP-1, BWP-2) may comprise a BWP designated as a primary BWP (e.g., PBWP) of the primary cell. The first DL BWP may be designated, by a base station 2406, as a primary BWP (e.g., PBWP). The second DL BWP may be designated, by the base station 2406, as a secondary BWP (e.g., SBWP). The wireless device 2408 may stop the first inactivity timer of the PBWP (e.g., first DL BWP) of the primary cell and the third inactivity timer of the third DL BWP of the first secondary cell (e.g., at time $T_1$), for example, based on initiating random access.

The wireless device 2408 may start a first response window (e.g., RA-ResponseWindow) at a first PDCCH occasion on the PBWP of the primary cell from the end of sending (e.g., transmitting) the random access preamble. The first response window may be configured by a higher layer (e.g., MAC, RRC).

The wireless device 2408 may monitor the first PDCCH occasion for DCI, for example, if the first response window is running. The DCI may be identified by an RA-RNTI. The DCI may be identified by a C-RNTI of the wireless device 2408. The base station 2402 may send (e.g., transmit) the DCI on the PBWP of the primary cell.

Random access may be completed successfully (e.g., at time $T_3$), for example, if the wireless device 2408 receives the DCI on the PBWP. The wireless device 2408 may restart the first inactivity timer of the PBWP (e.g., the first DL BWP) and/or the third inactivity timer of the third BWP (e.g., at time $T_3$), for example, if random access is successfully completed.

FIG. 24A shows a base station 2402 may designate a first DL BWP of the primary cell (e.g., Active BWP-1) as a primary BWP (PBWP) and/or a second DL BWP of the primary cell (e.g., Active BWP-2) as a secondary BWP (SBWP). The wireless device 2408 may stop a BWP-specific inactivity timer of the PBWP of the primary cell, for example, based on initiating random access for a secondary cell. The wireless device 2408 may stop a BWP-specific inactivity timer of at least one active BWP of the second cell (e.g., Active BWP-3 in FIG. 24A), for example based on initiating random access.

The base station 2402 may send (e.g., transmit) a random access response on the PBWP of the primary cell. The wireless device 2408 may monitor the PBWP of the primary cell for the random access response. The wireless device 2408 may complete random access successfully, for example, based on receiving the random access response on the PBWP of the primary cell. The wireless device 2408 may restart the BWP-specific inactivity timer of the PBWP of the primary cell (e.g., Active BWP-1) and/or the BWP-specific inactivity timer of the at least one active BWP of the secondary cell (e.g., Active BWP-3), for example, based on completing random access successfully.

Further, referring back to FIG. 24A and FIG. 24B that show examples of BWP operations for random access (e.g., for a secondary cell), the wireless device 2408 may initiate random access for the first secondary cell (e.g., at time $T_1$). The initiating of random access may be based on receiving, by the wireless device 2408, a PDCCH order (e.g., at time $T_0$). The initiating of random access may be based on detecting, by the wireless device 2408, a beam failure (e.g., at time $T_0$).

The wireless device 2408 may send (e.g., transmit) a random access preamble, for example, based on initiating random access for the first secondary cell (e.g., at time $T_2$). The random access preamble may be dedicated to the wireless device 2408. The random access preamble may be wireless device-specific and may be configured for the wireless device by the base station 2404.

The at least one selected BWP of the at least two BWPs (e.g., BWP-1, BWP-2) may comprise a BWP, among the at least two BWPs, with a lowest BWP-specific index. The at least one selected BWP of the at least two BWPs may comprise a BWP, among the at least two BWPs, with a highest BWP-specific index.

The first DL BWP may be identified by a first DL BWP index. The second DL BWP may be identified by a second DL BWP index. The first DL BWP index and the second DL BWP index may be configured for the wireless device 2408 by the base station 2406.

The first DL BWP index may be lower than the second DL BWP index. The wireless device 2408 may determine that the first DL BWP index is lower than the second DL BWP index. The wireless device 2408 may stop the first inactivity timer of the first DL BWP of the primary cell, for example, based on determining that the first DL BWP index is lower than the second DL BWP index and/or on initiating random access. The wireless device 2408 may stop the third inactivity timer of the third DL BWP of the first secondary cell (e.g., at time $T_1$), for example, based on initiating random access.

The first DL BWP index may be greater than the second DL BWP index. The wireless device 2408 may determine that the first DL BWP index is greater than the second DL BWP index. The wireless device 2408 may stop the first inactivity timer of the first DL BWP of the primary cell, for example, based on determining that the first DL BWP index is greater than the second DL BWP index and/or on initiating random access. The wireless device 2408 may stop the third inactivity timer of the third DL BWP of the first secondary cell (e.g., at time $T_1$), for example, based on initiating random access.

The wireless device 2408 may start a first response window (e.g., RA-ResponseWindow) at a first PDCCH occasion on the first DL BWP of the primary cell, for example, from the end of sending (e.g., transmitting) the random access preamble, for example, based on determining that the first DL BWP index is greater than the second DL BWP index. The first response window may be configured by a higher layer (e.g., MAC, RRC).

The wireless device 2408 may monitor the first PDCCH occasion for DCI, for example, if the first response window is running. The DCI may be identified by an RA-RNTI. The DCI may be identified by a C-RNTI of the wireless device 2408. The base station 2402 may send (e.g., transmit) the DCI on the first DL BWP of the primary cell. The base station 2402 may select the first DL BWP, for example, based on the first DL BWP index being lower (or greater) than the second DL BWP index.

The random access may be completed successfully (e.g., at time $T_3$), for example, if the wireless device 2408 receives the DCI on the first DL BWP. The wireless device 2408 may restart the first inactivity timer of the first DL BWP and the third inactivity timer of the third BWP (e.g., at time $T_3$), for example, based on the random access procedure being successfully completed.

A base station 2402 may configure a wireless device 2408 with a plurality of DL BWPs of a primary cell. At least two BWPs of the plurality of DL BWPs may be active (e.g., Active BWP-1 and Active BWP-2). Each of the plurality of DL BWPs may be identified with a BWP-specific index. Each of the plurality of DL BWPs may be associated with a BWP-specific inactivity timer.

An active DL BWP of the at least two BWPs (e.g., BWP-1, BWP-2) may have a lowest BWP-specific index among the at least two BWPs. The wireless device 2408 may stop a BWP-specific inactivity timer of the active DL BWP configured with the lowest BWP-specific index (e.g., Active BWP-1), for example, based on initiating random access for a secondary cell. The wireless device 2408 may stop a BWP-specific inactivity timer of at least one active BWP of the secondary cell (e.g., Active BWP-3), for example, based on initiating random access.

An active DL BWP of the at least two BWPs may have a lowest BWP-specific index among the at least two BWPs and may be configured with a common search space. The wireless device 2408 may stop a BWP-specific inactivity timer of the active DL BWP configured with the lowest BWP-specific index and the common search space (e.g., Active BWP-1), for example, based on initiating random access for a secondary cell. The wireless device 2408 may stop a BWP-specific inactivity timer of at least one active BWP of the secondary cell (e.g., Active BWP-3), for example, based on initiating random access.

An active DL BWP of the at least two BWPs (e.g., BWP-1, BWP-2) may have a highest BWP-specific index among the at least two BWPs. The wireless device 2408 may stop a BWP-specific inactivity timer of the active DL BWP configured with the highest BWP-specific index (e.g., Active BWP-1), for example, based on initiating random access for a secondary cell. The wireless device 2408 may stop a BWP-specific inactivity timer of at least one active BWP of the secondary cell (e.g., Active BWP-3), for example, based on initiating random access.

An active DL BWP of the at least two BWPs (e.g., BWP-1, BWP-2) may have a highest BWP-specific index among the at least two BWPs and/or may be configured with a common search space. The wireless device 2408 may stop a BWP-specific inactivity timer of the active DL BWP configured with the highest BWP-specific index and the common search space (e.g., Active BWP-1), for example, based on initiating random access for a second cell. The wireless device 2408 may stop a BWP-specific inactivity timer of at least one active BWP of the secondary cell (e.g., Active BWP-3), for example, based on initiating random access.

The base station 2402 may send (e.g., transmit) a random access response on the active DL BWP, of the primary cell, configured with the lowest (or the highest) BWP-specific index. FIG. 24A shows that the base station 2402 may send (e.g., transmit) the random access response on Active BWP-1, for example, if a BWP-specific index of the Active BWP-1 is less (or greater) than a BWP-specific index of the Active BWP-2.

The wireless device 2408 may monitor the active DL BWP of the primary cell (e.g., Active BWP-1) for the random access response. The wireless device 2408 may complete random access successfully, for example, based on receiving the random access response on the active DL BWP of the primary cell. The wireless device 2408 may restart the BWP-specific inactivity timer of the active DL BWP (e.g., Active BWP-1), of the primary cell, configured with the lowest (or highest) BWP-specific index (e.g., Active BWP-1) and/or the BWP-specific inactivity timer of the at least one active BWP of the second cell (e.g., Active BWP-3), for example, based on completing the random access procedure successfully.

Figure 25A:
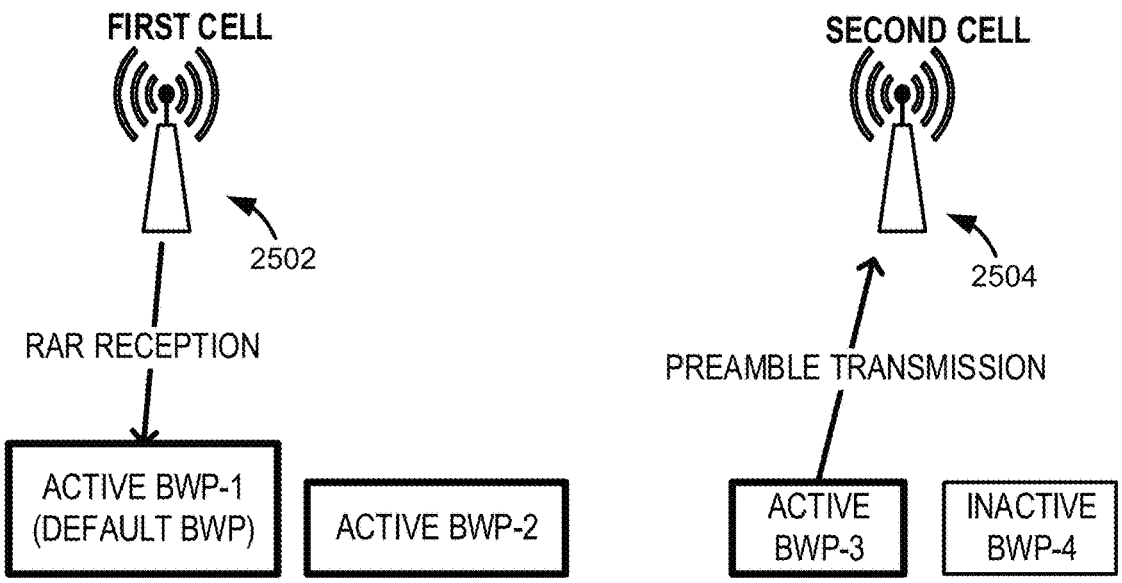
FIG. 25A and FIG. 25B show examples of multiple active BWP operations.
Figure 25B:
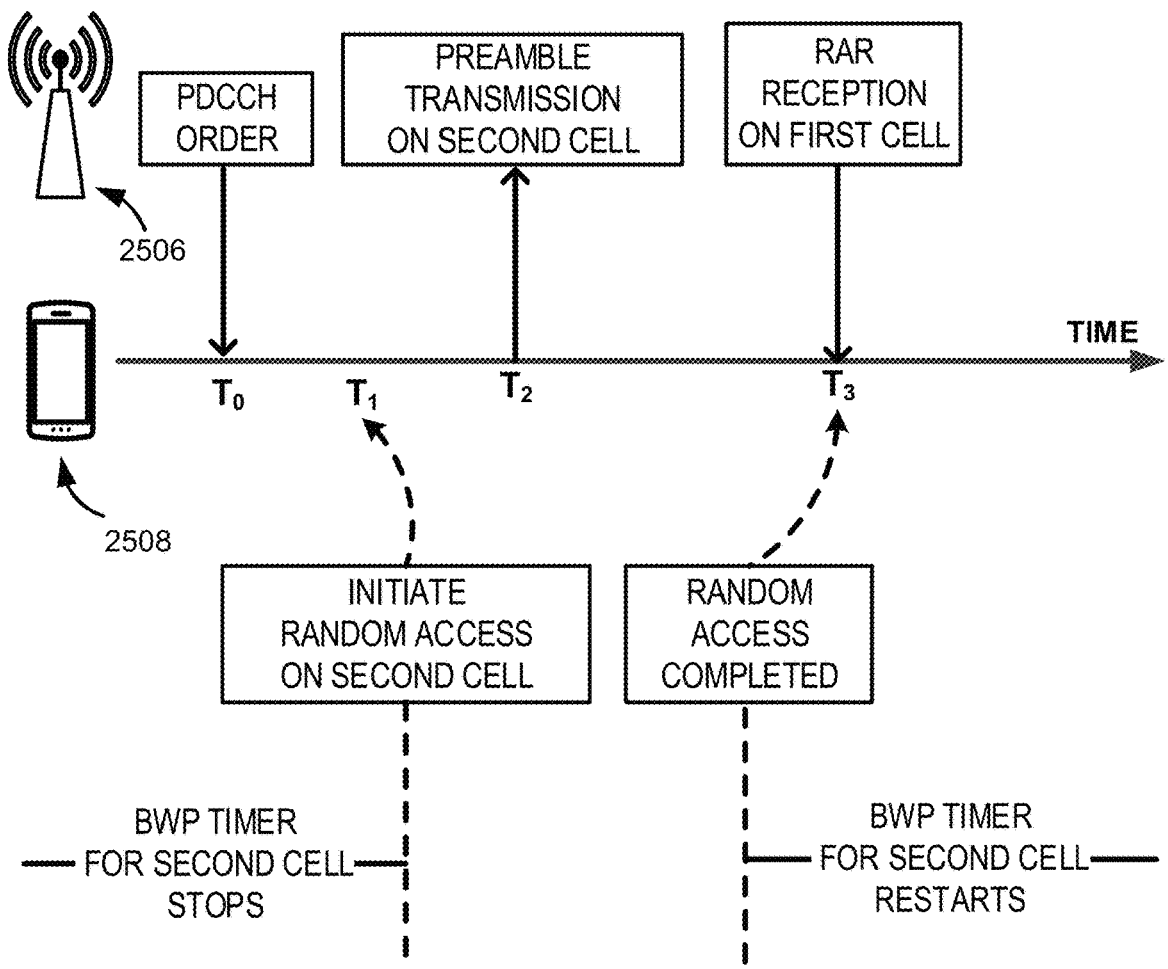

FIG. 25A and FIG. 25B show examples of BWP operations for random access (e.g., for a secondary cell). The random access may use a second cell 2504 for a preamble transmission on a third active BWP (e.g., active BWP-3) and a first cell 2502 for a random access response (RAR) on a default active BWP (e.g., active BWP-1). The first cell 2502 may comprise the default active BWP (e.g., active BWP-1) and the second active BWP (e.g., active BWP-2). The second cell 2504 may comprise the third active BWP (e.g., active BWP-3) and at least one inactive BWP (e.g., inactive BWP-4). A base station 2506 may send, to a wireless device 2508, a PDCCH order (e.g., at time $T_0$). The wireless device 2508 may initiate random access on the second cell (e.g., at time $T_1$). The wireless device 2508 may initiate the random access on the second cell based on receiving, by the wireless device 2508, a PDCCH order (e.g., at time $T_0$). The wireless device 2508 may initiate the random access on the second cell based on detecting, by the wireless device 2508, a beam failure (e.g., at time $T_0$). The wireless device 2508 may stop a BWP timer for the second cell (e.g., at time $T_1$). The wireless device 2508 may send (e.g., transmit), to the base station 2506, a preamble on a second cell (e.g., at time $T_2$). The base station 2506 may send, to the wireless device 2506, a random access response on the first cell (e.g., at time T3). The random access response may be completed, for example, if the wireless device 2508 receives the random access response. The wireless device 2508 may restart the BWP timer for the second cell, for example, based on or in response to receiving the random access response.

The wireless device 2508 may send (e.g., transmit) a random access preamble, for example, based on initiating random access for the first secondary cell (e.g., at a time T2 in FIG. 25B). The random access preamble may be dedicated to the wireless device 2508. The random access preamble may be wireless device-specific and may be configured for the wireless device 2508 by the base station 2506.

The first DL BWP may be a default BWP. The first DL BWP may always be active when at least two DL BWPs (including the first DL BWP) of the primary cell are active, for example, based on the first DL BWP being the default BWP. The first DL BWP may not be associated (e.g., configured) with a first inactivity timer.

The wireless device 2508 may stop the third inactivity timer of the third DL BWP of the first secondary cell (e.g., at a time T1 in FIG. 25B), for example, based on initiating the random access procedure. The wireless device 2508 may not stop BWP-specific timers (if configured) of active BWPs (e.g., first DL BWP and/or second DL BWP) of the primary cell. The wireless device 2508 may not stop the first inactivity timer (not configured) of the first DL BWP and the second inactivity timer of the second DL BWP of the primary cell.

The wireless device 2508 may start a first response window (e.g., RA-ResponseWindow) at a first PDCCH occasion on the default BWP (e.g., the first DL BWP) of the primary cell from the end of sending (e.g., transmitting) the random access preamble. The first response window may be configured by a higher layer (e.g., MAC, RRC).

The wireless device 2508 may monitor the first PDCCH occasion for DCI if the first response window is running. The DCI may be identified by an RA-RNTI. The DCI may be identified by a C-RNTI of the wireless device 2508. The base station 2502 may send (e.g., transmit) the DCI on the default BWP (e.g., the first DL BWP) of the primary cell.

Random access may be completed successfully (e.g., at a time T3 in FIG. 25B) if the wireless device 2508 receives the DCI on the default BWP (e.g., the first DL BWP The wireless device 2508 may restart the third inactivity timer of the third BWP (e.g., at a time T3 in FIG. 25B), for example, based on random access being successfully completed.

FIG. 25A shows that a first active DL BWP (e.g., Active BWP-1) may be a default BWP. A second active DL BWP (e.g., Active BWP-2) may be a non-default BWP. The Active BWP-1 may not be deactivated (e.g., always in active state) if there is another active DL BWP (e.g., Active BWP-2). The Active BWP-1 may not be configured with a BWP-specific inactivity timer.

FIG. 25A shows that the wireless device may not stop each BWP-specific inactivity timer (if configured) of each active DL BWP of the primary cell, for example, based on initiating random access for the second cell. The wireless device may only stop a BWP-specific inactivity timer of at least one active BWP of the second cell (e.g., Active BWP-3 in FIG. 25A), for example, based on initiating random access.

The base station 2502 may send (e.g., transmit) a random access response on the Active BWP-1 (e.g., default BWP) of the primary cell. The wireless device 2508 may monitor for the random access response in the Active BWP-1 of the primary cell. The wireless device 2508 may complete random access successfully, for example, based on receiving the random access response on the Active BWP-1 of the first cell. The wireless device 2508 may restart the BWP-specific inactivity timer of the at least one active BWP of the secondary cell (e.g., Active BWP-3 in FIG. 25A), for example, based on completing random access successfully.

Figure 26:
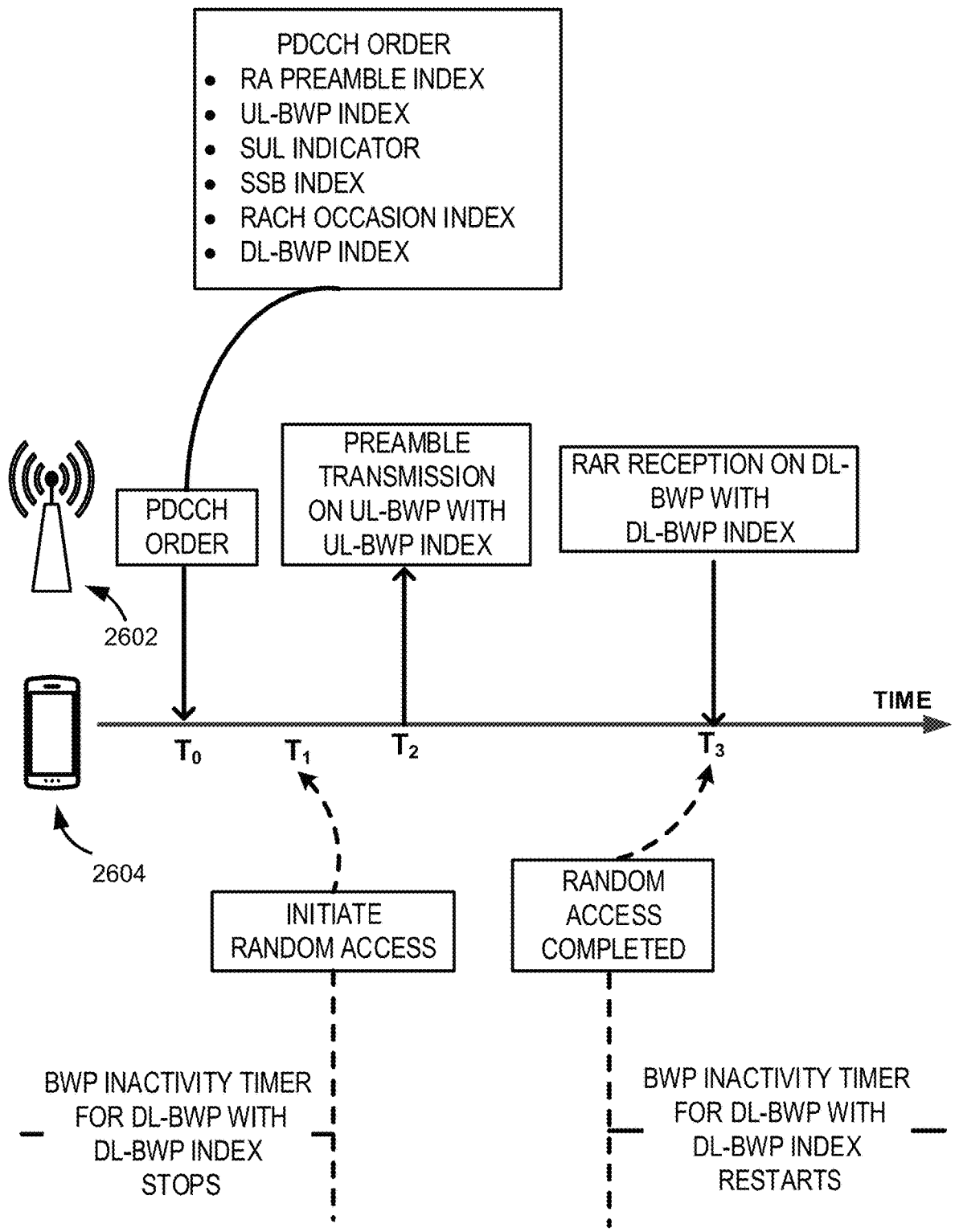
FIG. 26 shows an example of multiple active BWP operations.

FIG. 26 shows an example of BWP operations for random access on a cell. A base station 2602 may send, to a wireless device 2604, a PDCCH order (e.g., at time $T_0$). The PDCCH order may include an RA preamble index, an UL-BWP index, an SUL indicator, an SSB index, a RACH occasion index, and a DL-BWP index. The wireless device 2604 may initiate the random access process on the cell based on receiving, by the wireless device 2604, the PDCCH order (e.g., at time $T_0$). The wireless device 2604 may initiate the random access process on the cell based on detecting, by the wireless device 2604, a beam failure (e.g., at time $T_0$). The wireless device 2604 may stop a BWP timer (e.g., BWP inactivity timer) for the DL-BWP with DL-BWP index (e.g., at time $T_1$). The wireless device 2604 may send (e.g., transmit), to the base station 2602, a preamble on an UL-BWP of a cell with UL-BWP index (e.g., at time $T_2$). The base station 2602 may send, to the wireless device 2604, a random access response on a DL-BWP of a cell with DL-BWP index (e.g., at time $T_3$). The random access response may be completed, for example, if the wireless device 2604 receives the random access response. The wireless device 2604 may restart the BWP timer for the DL-BWP of the cell with DL-BWP index restarts, for example, based on or in response to receiving the random access response. The wireless device 2604 may also receive, from the base station 2602, one or more messages comprising configuration parameters (e.g., at time $T_1$). The one or more messages may comprise one or more RRC messages (e.g., RRC connection reconfiguration message, RRC connection reestablishment message, or RRC connection setup message). The configuration parameters may comprise configuration parameters for a primary cell. The configuration parameters may comprise BWP configuration parameters for a plurality of BWPs. The plurality of BWPs may comprise a first plurality of BWPs of the primary cell comprising a first DL BWP (e.g., Active BWP-1), a second DL BWP (e.g., Active BWP-2), and a plurality of UL BWPs comprising a first UL BWP (e.g., Active BWP-3).

A wireless device 2604 may receive, in a first slot, first DCI indicating switching a first active BWP of the primary cell from a first active DL BWP to the first DL BWP. The first DCI may comprise a first BWP indicator. The wireless device 2604 may determine that the first DCI indicates BWP switching, for example, based on the first BWP indicator indicating a BWP different from the first active DL BWP. The wireless device 2604 may start a first inactivity timer associated with the first DL BWP, for example, based on switching the first active BWP from the first active DL BWP to the first DL BWP.

A wireless device 2604 may receive, in a first slot, first DCI or a first MAC CE indicating activating the first DL BWP of the primary cell. The first DCI or the first MAC CE may comprise a first BWP indicator. The wireless device 2604 may determine that the first DCI or the first MAC CE indicates BWP activating, for example, based on the first BWP indicator indicating the first DL BWP. The wireless device 2604 may start a first inactivity timer associated with the first DL BWP, for example, based on activating the first DL BWP.

A wireless device 2604 may receive, in a second slot, second DCI indicating switching a second active BWP of the primary cell from a second active DL BWP to the second DL BWP. The second DCI may comprise a second BWP indicator. The wireless device 2604 may determine that the second DCI indicates BWP switching, for example, based on the second BWP indicator indicating a BWP different from the second active DL BWP. The wireless device 2604 may start a second inactivity timer associated with the second DL BWP, for example, based on switching the second active BWP from the second active DL BWP to the second DL BWP.

A wireless device 2604 may receive, in a second slot, second DCI or a second MAC CE indicating activating the second DL BWP of the primary cell. The second DCI or the second MAC CE may comprise a second BWP indicator. The wireless device 2604 may determine that the second DCI or the second MAC CE indicates BWP activating, for example, based on the second BWP indicator indicating the second DL BWP. The wireless device 2604 may start a second inactivity timer associated with the second DL BWP, for example, based on activating the second DL BWP.

The first DL BWP, the second DL BWP and the first UL BWP of the plurality of BWPs of the primary cell may be active at the same time. The first inactivity timer and the second inactivity timer may be running at the same time.

The wireless device 2604 may initiate random access at a time T1. Initiating random access (e.g., contention-based, or contention-free) may be based on receiving, by the wireless device, a PDCCH order (e.g., at a time T0). Initiating random access may be based on detecting, by the wireless device 2604, a beam failure at a time T0.

The wireless device 2604 may send (e.g., transmit) a random access preamble via the first UL BWP, for example, based on initiating random access (e.g., at a time T2). The random access preamble may be dedicated to the wireless device 2604. The random access preamble may be wireless device-specific and may be configured for the wireless device 2604 by the base station 2602. The random access preamble may not be wireless device-specific (e.g., for contention-based random access).

The PDCCH order may comprise at least one of random access preamble index, supplementary uplink (SUL) indicator, SSB index, RACH occasion index, UL-BWP index, and DL-BWP index. The random access preamble index may indicate a random access preamble to use in performing random access (e.g., contention-free or contention-based). The SUL indicator may indicate whether to send (e.g., transmit) the random access preamble on an SUL carrier or a normal uplink carrier. The SSB index may indicate an indicated SSB index to identify a group of RACH occasions. The RACH occasion index may indicate a relative RACH occasion index that corresponds to the indicated SSB index. The UL-BWP index may indicate a UL-BWP of the plurality of UL BWPs on which to send (e.g., transmit) the random access preamble. The DL-BWP index may indicate a DL-BWP on which the wireless device 2604 may receive a random access response (e.g., msg 2).

The DL-BWP index of the PDDCH order may indicate the first DL BWP. The wireless device 2604 may receive the PDDCH order on the first DL BWP or the second DL BWP. The wireless device 2604 may stop the first inactivity timer of the first DL BWP (indicated by the DL-BWP index of the PDCCH order) at a time T1, for example, based on initiating random access. The wireless device 2604 may keep the second inactivity timer of the second DL BWP running, for example, based on the DL-BWP index indicating the first DL BWP.

The PDCCH order may not indicate a DL-BWP index to receive a random access response. The wireless device 2604 may receive the PDCCH order on the first DL BWP. The wireless device 2604 may stop the first inactivity timer of the first DL BWP if the wireless device 2604 initiates random access, for example, based on receiving the PDCCH order on the first DL BWP. The wireless device 2604 may keep the second inactivity timer running, for example, based on receiving the PDCCH order on the first DL BWP.

Each of the plurality of BWPs may be identified by a BWP-specific index. The first DL BWP, the second DL BWP and the first UL BWP may be identified by a first DL BWP index, a second DL BWP index and a first UL BWP index, respectively.

The wireless device 2604 may select a DL BWP of the at least two BWPs, for example, based on initiating random access via the first UL BWP. The selected DL BWP may be associated with a DL BWP index same as the first UL BWP index of the first UL BWP. The wireless device 2604 may stop a BWP-specific inactivity timer associated with the selected DL BWP. The wireless device 2604 may keep a BWP-specific inactivity timer associated with an DL BWP other than the selected DL BWP running, for example, based on the selecting.

The wireless device 2604 may stop an inactivity timer of a DL BWP (if active) identified by a DL BWP index, for example, based on initiating random access. The DL BWP may be selected among the at least two BWPs (e.g., first DL BWP, second DL BWP) with a lowest BWP-specific index. The wireless device 2604 may stop the first inactivity timer of the first DL BWP if the first DL BWP index of the first DL BWP is lower than the second DL BWP index of the second DL BWP, for example, based on initiating random access.

The wireless device 2604 may stop an inactivity timer of a DL BWP (if active) identified by a DL BWP index, for example, based on initiating random access. The DL BWP may be selected among the at least two BWPs (e.g., first DL BWP, second DL BWP) with a highest BWP-specific index. The wireless device 2604 may stop the first inactivity timer of the first DL BWP if the first DL BWP index of the first DL BWP is higher than the second DL BWP index of the second DL BWP, for example, based on initiating random access.

The wireless device 2604 may stop a subset of the at least two BWPs (e.g., first DL BWP, second DL BWP) of the primary cell. The subset of the at least two BWPs may be configured with a common control channel. The first DL BWP may be configured with a first common control channel and a first wireless device-specific control channel. The second DL BWP may be configured with a second wireless device-specific control channel. The wireless device 2604 may stop the first inactivity timer of the first DL BWP when the wireless device 2604 initiates the random access procedure, for example, based on the first DL BWP being configured with the first common control channel.

The first DL BWP may be configured with a first common control channel and a first wireless device-specific control channel. The second DL BWP may be configured with a second common control channel and a second wireless device-specific control channel. The wireless device 2604 may stop the first inactivity timer of the first DL BWP and the second inactivity timer of the second DL BWP, if the wireless device 2604 initiates random access, for example, based on the first DL BWP being configured with the first common control channel and the second DL BWP being configured with the second common control channel.

A base station 2602 may designate one of the at least two BWPs (e.g., first DL BWP, second DL BWP) of the primary cell as a primary BWP (e.g., PBWP). The wireless device 2604 may stop a BWP-specific timer (if configured) of the designated primary BWP (e.g., PBWP), for example, based on initiating random access.

The first DL BWP may be the primary BWP. The wireless device 2604 may stop the first inactivity timer of the first DL BWP when the wireless device 2604 initiates the random access procedure, for example, based on the first DL BWP being configured/designated as the primary BWP.

One of the at least two BWPs (e.g., first DL BWP, second DL BWP) of the primary cell may be a default BWP. The one of the at least two BWPs (e.g., default BWP) may always be in active state if at least two DL BWPs (e.g., first DL BWP, second DL BWP) of the primary cell are in active state. The one of the at least two BWPs (e.g., default BWP) may not be associated (or configured) with a BWP-specific inactivity timer.

The base station 2602 may send (e.g., transmit) a random access response on the one of the at least two BWPs (e.g., default BWP) if at least two DL BWPs (e.g., first DL BWP, second DL BWP) of the primary cell are in active state. The wireless device may keep BWP-specific timers (if configured) of the at least two BWPs (e.g., first DL BWP and second DL BWP) running.

The first DL BWP may be a default BWP. The wireless device 2604 may keep the BWP-specific timer of the at least two BWPs (if configured) running, for example, based on the first DL BWP being the default BWP and at least two DL BWPs being in active state.

The wireless device 2604 may start a first response window (e.g., RA-ResponseWindow) at a first PDCCH occasion on the first DL BWP of the primary cell from the end of sending (e.g., transmitting) the random access preamble, if the wireless device 2604 stops the first BWP timer (e.g., BWP inactivity timer) of the first DL BWP, for example, based on sending (e.g., transmitting) the random access preamble. The first response window may be configured by a higher layer (e.g., MAC, RRC).

The wireless device 2604 may monitor the first PDCCH occasion for DCI if the first response window is running. The DCI may be identified by an RA-RNTI. The DCI may be identified by a C-RNTI of the wireless device 2604.

Random access may be completed successfully (e.g., at a time T3), if the wireless device 2604 receives the DCI on the first DL BWP. The wireless device 2604 may restart the first inactivity timer of the first DL BWP (e.g., at a time T3), for example, based on random access being successfully completed.

A PDCCH order may comprise a DL BWP index. A wireless device 2604 may monitor a DL BWP indicated by the DL BWP index of the PDCCH order for a random access response of random access.

The wireless device 2604 may stop a BWP-specific inactivity timer of the DL BWP indicated by the DL BWP index, for example, based on initiating random access. A base station 2602 may configure the BWP-specific inactivity timer of the DL BWP.

The base station 2602 may send (e.g., transmit) the random access response on the DL BWP indicated by the DL BWP index. The wireless device 2604 may monitor the DL BWP indicated by the DL-BWP index for the random access response. The wireless device 2604 may complete random access successfully, for example, based on receiving the random access response on the DL BWP indicated by the DL-BWP index.

The wireless device 2604 may restart the BWP-specific inactivity timer of the DL BWP indicated by the DL-BWP index, for example, based on successfully completing a random access procedure. The wireless device 2604 may stop a BWP-specific inactivity timer of each of the at least two BWPs (e.g., the first DL BWP and the second DL BWP), for example, based on initiating random access. The wireless device 2604 may stop the first inactivity timer of the first DL BWP and the second inactivity timer of the second DL BWP of the primary cell (e.g., at a time T1), for example, based on initiating random access.

The wireless device 2604 may start a first response window (e.g., RA-ResponseWindow) at a first PDCCH occasion on the first DL BWP of the primary cell from the end of sending (e.g., transmitting) the random access preamble. The wireless device 2604 may start a second response window (e.g., RA-ResponseWindow) at a second PDCCH occasion on the second DL BWP of the primary cell from the end of sending (e.g., transmitting) the random access preamble. The first response window and the second response window may be configured by a higher layer (e.g., MAC, RRC).

The wireless device 2604 may monitor a first PDCCH on the first DL BWP for DCI if the first response window is running. The wireless device 2604 may monitor a second PDCCH on the second DL BWP for the DCI if the second response window is running. The DCI may be identified by an RA-RNTI. The DCI may be addressed to the wireless device identified by a C-RNTI.

The base station 2602 may select a DL BWP to send (e.g., transmit) the DCI. The DCI may be for a random access response (e.g., msg2). Selecting the DL BWP may be based on base station implementation. The base station 2602 may select the first DL BWP to send (e.g., transmit) the DCI. The base station 2602 may select the second DL BWP to send (e.g., transmit) the DCI. The base station 2602 may send (e.g., transmit) the DCI on both the first DL BWP and the second DL BWP.

Random access may be completed successfully (e.g., at a time T3), if the wireless device 2604 receives the DCI (e.g., on the first DL BWP or the second DL BWP). The wireless device 2604 may restart the first inactivity timer of the first DL BWP and the second inactivity timer of the second DL BWP (e.g., at a time T3), for example, based on random access being successfully completed.

The wireless device 2604 may stop each BWP-specific inactivity timer of each active DL BWP of a cell, for example, based on initiating random access. Random access (e.g., contention-free or contention-based) may be based on a PDCCH order. The PDDCH order may be received on one of the active DL BWPs of the cell. Random access may be based on a beam failure detection.

The base station 2602 may send (e.g., transmit) a random access response on at least one of the active DL BWPs of the cell. The wireless device 2604 may monitor each active DL BWP of the cell for the random access response. The wireless device 2604 may complete random access successfully, for example, based on receiving the random access response on the at least one of the active DL BWPs of the primary cell. The wireless device 2604 may restart each BWP-specific inactivity timer of each active DL BWP of the cell, for example, based on completing random access successfully.

Figure 27:
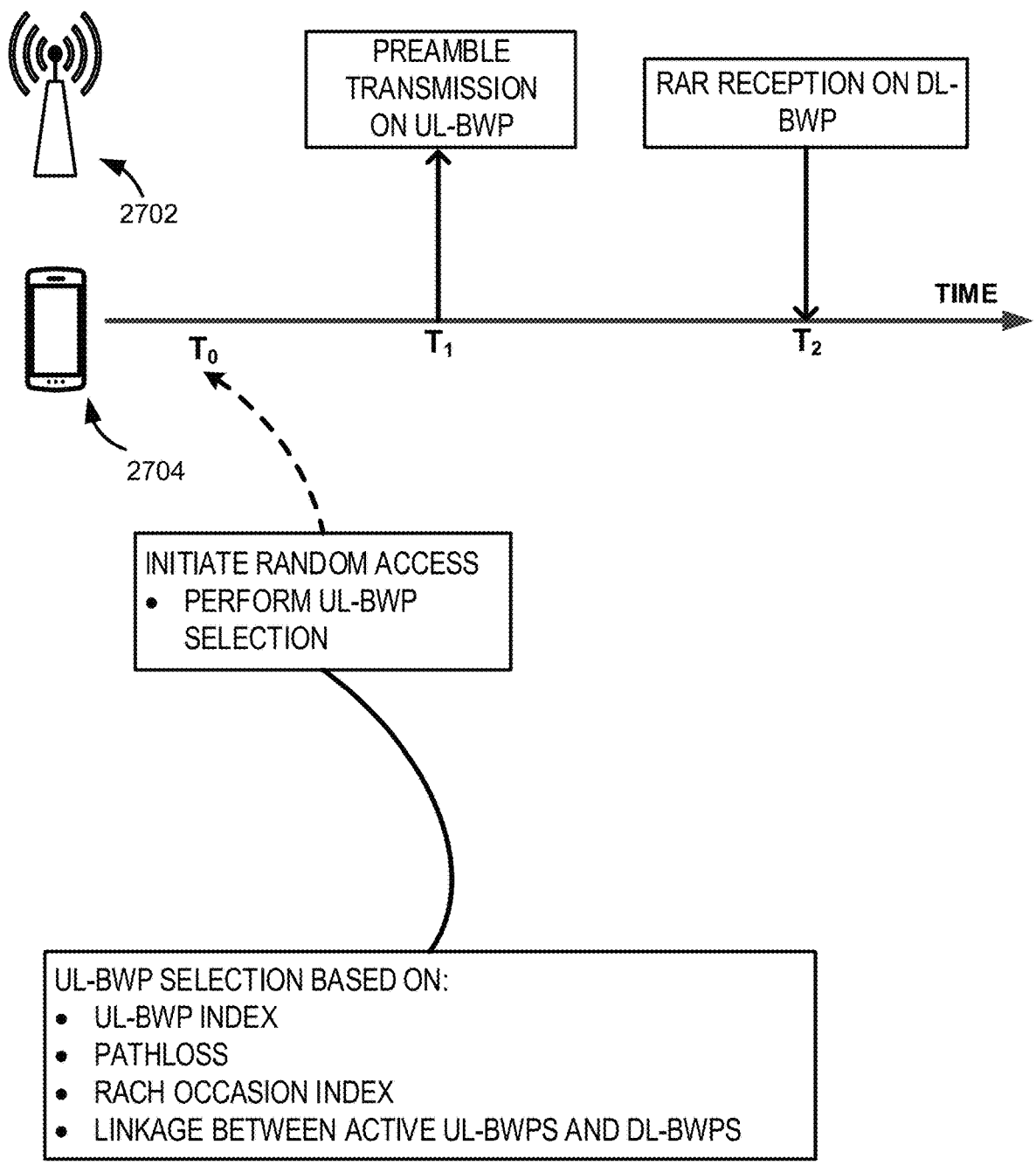
FIG. 27 shows an example of multiple active BWP operations.

FIG. 27 shows an example of BWP operations for random access on a cell. A wireless device 2704 may initiate a random access procedure (e.g., at time T$_0$), for example, including performing UL-BWP selection. The UL-BWP selection may be through communications between a base station 2702 and the wireless device 2704. The UL-BWP selection may be based on, for example, an UL-BWP index, pathloss, a RACH occasion index, and a linkage between active UL-BWPs and DL-BWPs. The wireless device 2704 may receive, from a base station 2702, one or more messages comprising configuration parameters. The one or more messages may comprise one or more RRC messages (e.g., RRC connection reconfiguration message, RRC connection reestablishment message, or RRC connection setup message). The configuration parameters may comprise configuration parameters for a cell. The configuration parameters may comprise BWP configuration parameters for a plurality of BWPs. The plurality of BWPs may comprise a first plurality of BWPs of the cell comprising a first UL BWP (e.g., Active BWP-1), a second UL BWP (e.g., Active BWP-2), and a first DL BWP (e.g., Active BWP-3). The wireless device 2704 may send (e.g., transmit) a preamble transmission to the base station 2702 on an active UL-BWP (e.g., at time T$_1$). The base station 2702 may send (e.g., transmit) an RAR to the wireless device 2704 (e.g., at time T$_2$), for example, on DL-BWP. The wireless device 2704 may receive the RAR on DL-BWP (e.g., at time T3).

A wireless device 2704 may receive, in a first slot, first DCI indicating switching a first active BWP of the cell from a first active UL BWP to the first UL BWP. The wireless device 2704 may set the first UL BWP as a second active uplink BWP of the cell, for example, based on the switching. The first DCI may comprise a first BWP indicator. The wireless device 2704 may determine that the first DCI indicates BWP switching, for example, based on the first BWP indicator indicating a BWP different from the first active UL BWP.

A wireless device 2704 may receive, in a first slot, first DCI or a first MAC CE indicating activating the first UL BWP of the cell. The first DCI or the first MAC CE may comprise a first BWP indicator. The wireless device 2704 may determine that the first DCI or the first MAC CE indicates BWP activating, for example, based on the first BWP indicator indicating the first UL BWP.

A wireless device 2704 may receive, in a second slot, second DCI indicating switching a second active BWP of the cell from a second active UL BWP to the second UL BWP. The second DCI may comprise a second BWP indicator. The wireless device 2704 may determine that the second DCI indicates BWP switching, for example, based on the second BWP indicator indicating a BWP different from the second active UL BWP.

A wireless device 2704 may receive, in a second slot, second DCI or a second MAC CE indicating activating the second UL BWP of the cell. The second DCI or the second MAC CE may comprise a second BWP indicator. The wireless device 2704 may determine that the second DCI or the second MAC CE indicates BWP activating, for example, based on the second BWP indicator indicating the second UL BWP.

A wireless device 2704 may receive, in a third slot, third DCI indicating switching a third active BWP of the cell from a first active DL BWP to the first DL BWP. The third DCI may comprise a third BWP indicator. The wireless device 2704 may determine that the third DCI indicates BWP switching, for example, based on the third BWP indicator indicating a BWP different from the first active DL BWP. The wireless device 2704 may start a first inactivity timer associated with the first DL BWP, for example, based on switching the third active BWP from the first active DL BWP to the first DL BWP. The first UL BWP, the second UL BWP and the first DL BWP of the plurality of BWPs of the cell may be active at the same time.

Further regarding FIG. 27 that shows an example of multiple active BWPs operation, a wireless device 2704 may initiate random access (e.g., contention-free random access or contention-based random access) at a time T0. The wireless device 2704 may select a UL BWP of the at least two active UL BWPs (e.g., the first UL BWP, the second UL BWP) based on one or more criteria and, for example, based on initiating random access. The selecting may comprise selecting the UL BWP of the at least two active UL BWPs that is a primary BWP. A base station 2702 may designate the selected UL BWP of the at least two active UL BWPs (e.g., first UL BWP, second UL BWP) as a primary UL BWP (e.g., PBWP). The wireless device 2704 may send (e.g., transmit) a random access preamble via the primary UL BWP (e.g., selected UL BWP), for example, based on initiating random access.

The first UL BWP may be the primary UL BWP. The wireless device 2704 may send (e.g., transmit) a random access preamble via the first UL BWP if the wireless device 2704 initiates random access, for example, based on the first UL BWP being configured/designated as the primary UL BWP.

Each of the plurality of BWPs may be identified by a BWP-specific index. The first UL BWP, the second UL BWP, and the first DL BWP may be identified by a first UL BWP index, a second UL BWP index, and a first DL BWP index.

The one or more criteria upon which the selecting of the UL BWP is based may be based on a value of a BWP-specific index. The selecting of the UL BWP may comprise selecting a UL BWP with a lowest BWP-specific index among at least two BWP-specific indexes of the at least two active UL BWPs. The wireless device 2704 may send (e.g., transmit) a random access preamble via the selected UL BWP if the wireless device initiates random access, for example, based on the selected UL BWP being associated with the lowest BWP-specific index.

The first UL BWP index of the first UL BWP may be lower than the second UL BWP index of the second UL BWP. The wireless device 2704 may send (e.g., transmit) a random access preamble via the first UL BWP if the wireless device 2704 initiates random access, for example, based on the first UL BWP being associated with a lowest UL BWP-specific index.

The one or more criteria upon which the selecting of the UL BWP is based may be based on a value of a BWP-specific index. The selecting of the UL BWP may comprise selecting a UL BWP with a highest BWP-specific index among at least two BWP-specific indexes of the at least two active UL BWPs. The wireless device 2704 may send (e.g., transmit) a random access preamble via the selected UL BWP if the wireless device 2704 initiates random access, for example, based on the selected UL BWP being associated with the highest BWP-specific index.

The first UL BWP index of the first UL BWP may be higher than the second UL BWP index of the second UL BWP. The wireless device 2704 may send (e.g., transmit) a random access preamble via the first UL BWP if the wireless device 2704 initiates random access, for example, based on the first UL BWP being associated with a highest UL BWP-specific index.

The selecting of the UL BWP may comprise selecting a UL BWP with a lowest pathloss among the at least two active UL BWPs. The probability of completing random access via the selected UL BWP with the lowest pathloss may be high. The wireless device 2704 may send (e.g., transmit) a random access preamble via the selected UL BWP if the wireless device 2704 initiates random access, for example, based on the selected UL BWP having the lowest pathloss. The wireless device 2704 may select one UL BWP (e.g., first UL BWP or second UL BWP) of the two multiple active UL BWPs to send (e.g., transmit) a random access preamble if there are two multiple active UL BWPs comprising a first UL BWP and a second UL BWP.

The selecting of the UL BWP may be based on a threshold. The threshold may be configured by RRC. The wireless device 2704 may select the first UL BWP if a pathloss of an active DL BWP is lower than the threshold. The wireless device 2704 may select the second UL BWP to send (e.g., transmit) the random access preamble if a pathloss of an active DL BWP is higher than the threshold.

A first DL BWP may be associated (e.g., linked) to a first UL BWP. A second DL BWP may be associated (e.g., linked) to a second UL BWP. A first DL pathloss associated with the first UL BWP may be lower than a second DL pathloss associated with the second UL BWP. The wireless device 2704 may send (e.g., transmit) a random access preamble via the first UL BWP if the wireless device 2704 initiates random access, for example, based on the first UL BWP having a lowest DL pathloss.

A first DL pathloss associated with the first DL BWP may be lower than a second DL pathloss associated with the second DL BWP. The base station 2702 may send (e.g., transmit) a random access response on the first DL BWP, for example, based on the first DL BWP having a lowest DL pathloss. The wireless device 2704 may monitor the first DL BWP for the random access response.

The selecting of the UL BWP may comprise selecting a UL BWP of the at least two active UL BWPs with an earliest random access occasion after initiating random access. The wireless device 2704 may complete random access earlier, for example, based on selecting the selected UL BWP with the earliest random access occasion. The wireless device 2704 may send (e.g., transmit) a random access preamble via the selected UL BWP if the wireless device 2704 initiates random access, for example, based on the selected UL BWP having the earliest random access occasion.

A first PRACH time resources of the first UL BWP may be earlier in time than a second PRACH time resources of the second UL BWP if the wireless device 2704 initiated random access. The wireless device 2704 may send (e.g., transmit) a random access preamble via the first UL BWP if the wireless device 2704 initiates random access, for example, based on the first PRACH time resources being earlier in time than the second PRACH time resources.

The wireless device 2704 may stop the first inactivity timer of the first DL BWP, for example, based on initiating random access via the selected UL BWP. The wireless device 2704 may start a first response window (e.g., RA-ResponseWindow) at a first PDCCH occasion on the first DL BWP of the cell from the end of sending (e.g., transmitting) the random access preamble. The first response window may be configured by a higher layer (e.g., MAC, RRC).

The wireless device 2704 may monitor the PDCCH on the first UL BWP for DCI if the first response window is running. The DCI may be addressed to an RA-RNTI of the wireless device. The DCI may be addressed to a C-RNTI of the wireless device.

The random access may be completed successfully if the wireless device 2704 receives the DCI on the first DL BWP and the random access is contention-free. The wireless device 2704 may restart the first inactivity timer of the first DL BWP, for example, based on the random access being successfully completed. The wireless device may send (e.g., transmit) a signal (e.g., msg3) if the wireless device receives the DCI on the first DL BWP and random access is contention-based.

The wireless device 2704 may monitor for a response (e.g., msg4) comprising second DCI, for example, based on sending (e.g., transmitting) the signal. The random access may be completed successfully if the wireless device 2704 receives the second DCI on the first DL BWP. The wireless device 2704 may restart the first inactivity timer of the first DL BWP, for example, based on random access being successfully completed. The second DCI may be addressed to a C-RNTI of the wireless device.

A wireless device 2704 may receive, from a base station 2702, one or more messages. The one or more messages may comprise one or more configuration parameters of a primary cell. The primary cell may comprise a plurality of bandwidth parts (BWPs). Each of the plurality of BWPs may be identified by a BWP-specific index.

Each of the plurality of BWPs may be in one of an active state and an inactive state. The active state of a first UL BWP may comprise sending (e.g., transmitting) a first uplink signal (e.g., PUCCH, PUSCH, etc) via the first UL BWP. The inactive state of a first UL BWP may comprise not sending (e.g., transmitting) a first uplink signal (e.g., PUCCH, PUSCH, etc) via the first UL BWP.

The wireless device 2704 may activate at least two BWPs of the plurality of BWPs. Activating the at least two BWPs may comprise activating a first BWP of the at least two BWPs in a first slot and activating a second BWP of the at least two BWPs in a second slot. The first slot and the second slot may be different.

The wireless device 2704 may initiate random-access. The wireless device may select at least one UL BWP of the at least two BWPs, for example, based on initiating a random access procedure and based on one or more criteria.

The one or more criteria may be based on a value of a BWP-specific index. Determining at least one UL BWP of the at least two BWPs may comprise selecting a BWP with a lowest BWP-specific index among at least two BWP-specific indexes of the at least two BWPs. Determining at least one UL BWP of the at least two BWPs may comprise selecting a BWP with a highest BWP-specific index among at least two BWP-specific indexes of the at least two BWPs. Determining at least one UL BWP of the at least two BWPs may comprise selecting a BWP based on a pathloss and a threshold. Determining at least one UL BWP of the at least two BWPs may comprise selecting a BWP of the at least two BWPs that is a primary BWP. Determining at least one UL BWP of the at least two BWPs may comprise selecting a BWP with a lowest numerology index among the at least two BWPs. Determining at least one UL BWP of the at least two BWPs may comprise selecting a BWP with a highest numerology index among the at least two BWPs. Determining at least one UL BWP of the at least two BWPs may comprise selecting one or more BWPs of the at least two BWPs. The one or more BWPs may be configured with a common search space. The wireless device may monitor the common search space to receive a random-access response. The wireless device 2704 may send (e.g., transmit) a preamble via the at least one selected UL BWP, for example, based on selecting the at least one UL BWP.

A wireless device 2704 may receive, from a base station 2702, one or more messages. The one or more messages may comprise one or more configuration parameters of a primary cell and a secondary cell. The primary cell may comprise a plurality of bandwidth parts (BWPs). Each of the plurality of BWPs may be identified by a BWP-specific index. Each of the plurality of BWPs may be associated with a BWP-specific inactivity timer.

Each of the plurality of BWPs may be in one of an active state and an inactive state. The active state of a first BWP may comprise monitoring a downlink control channel of the first BWP. The inactive state of a first BWP may comprise not monitoring a downlink control channel of the first BWP.

The wireless device 2704 may activate at least two BWPs of the plurality of BWPs. Activating the at least two BWPs may comprise activating a first BWP of the at least two BWPs in a first slot and activating a second BWP of the at least two BPWs in a second slot. The first slot and the second slot may be different.

The wireless device 2704 may start BWP-specific inactivity timer of each of the at least two BWPs, for example, based on activating at least two BWPs. Starting the BWP-specific inactivity timer of each of the at least two BWPs may comprise starting a first BWP-specific inactivity timer of a first BWP of the at least two BWPs, for example, based on activating the first BWP, and starting a second BWP-specific inactivity timer of a second BWP of the at least two BWPs, for example, based on activating the second BWP.

The wireless device 2704 may initiate random access for the secondary cell. Initiating random access may comprise receiving a PDCCH order for the secondary cell. Initiating random access procedure may comprise detecting a beam failure on the secondary cell. The wireless device 2704 may select at least one BWP of the at least two BWPs, for example, based on initiating a random access procedure and/or one or more criteria.

The one or more criteria may be based on a value of a BWP-specific index. Determining at least one BWP of the at least two BWPs may comprise selecting a BWP with a lowest BWP-specific index among at least two BWP-specific indexes of the at least two BWPs. Determining at least one BWP of the at least two BWPs may comprise selecting a BWP with a highest BWP-specific index among at least two BWP-specific indexes of the at least two BWPs. Determining at least one BWP of the at least two BWPs may comprise selecting a BWP of the at least two BWPs that is a primary BWP. Determining at least one BWP of the at least two BWPs may comprise selecting a BWP with a lowest numerology index among the at least two BWPs. Determining at least one BWP of the at least two BWPs may comprise selecting a BWP with a highest numerology index among the at least two BWPs. Determining at least one BWP of the at least two BWPs may comprise selecting one or more BWPs of the at least two BWPs. The one or more BWPs may be configured with a common search space. The wireless device 2704 may monitor the common search space to receive a random access response. The wireless device 2704 may stop the BWP-specific inactivity timer of the at least one selected BWP, for example, based on selecting at least one BWP of the at least two BWPs.

Figure 28:
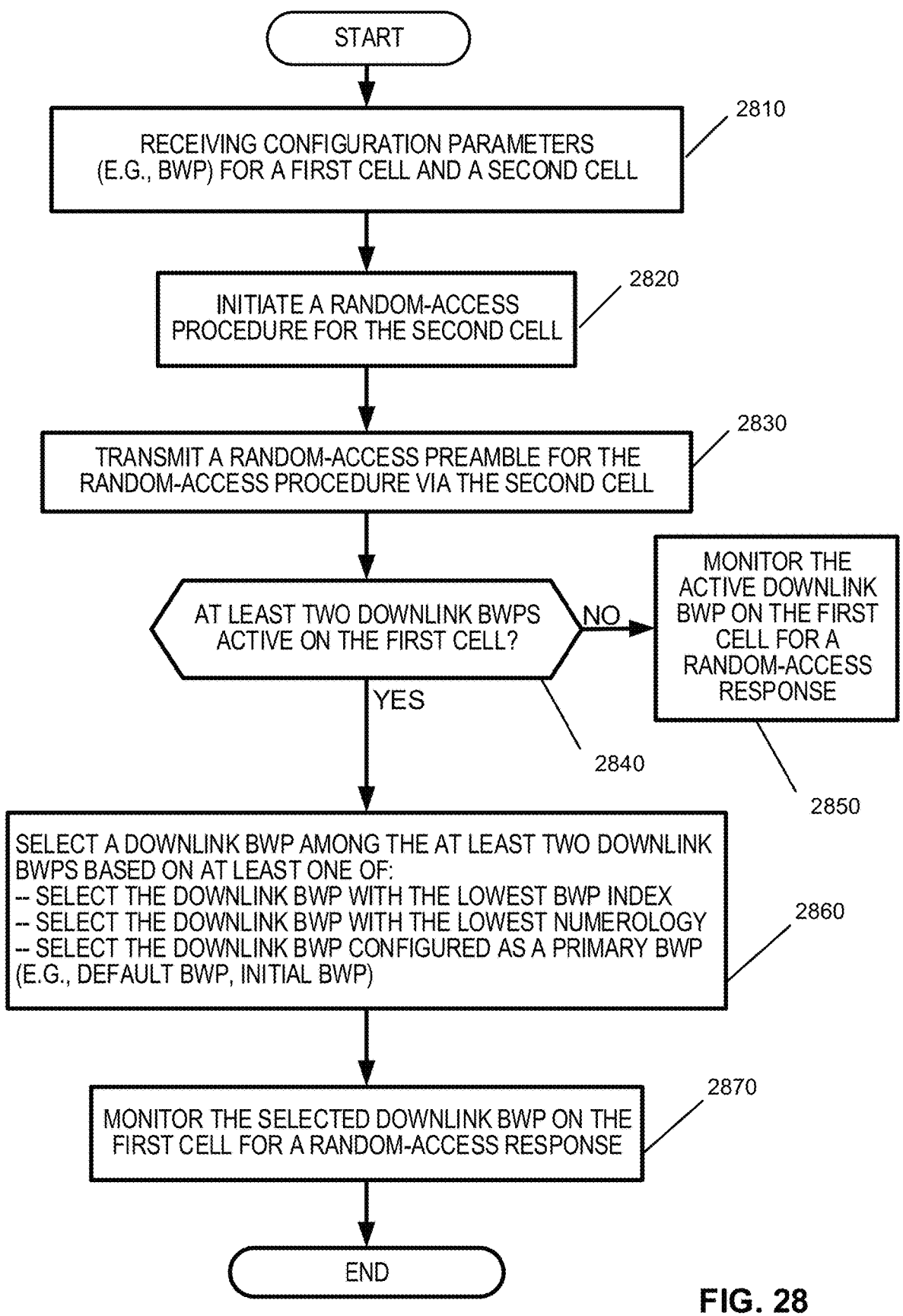
FIG. 28 shows an example method of multiple active BWP operations.

FIG. 28 shows an example method of BWPs operation. The method of FIG. 28 facilitates a base station and a wireless device to communicate over multiple BWPs efficiently. Initially, at step 2810, a wireless device receives configuration parameters (e.g., BWP parameters) for a primary cell and a secondary cell. One or more base stations may send (e.g., transmit) the configuration parameters to the wireless device. At step 2820, the wireless device may initiate random access for the secondary cell, based at least on the configuration parameters. At step 2830, the wireless device may send (e.g., transmit) a random access preamble for random access via the second cell, based on initiating random access. At step 2840, the wireless device may determine whether at least two downlink BWPs are active on the primary cell. The determination may be based at least on the received configuration parameters. At step 2850, the wireless device may monitor the active downlink BWP on the primary cell for a random access response, if the wireless device determines that there are less than two downlink BWP active on the primary cell in operation 2840. In operation 2860, the wireless device may select a downlink BWP among the at least two downlink BWPs that are active on the primary cell, if the wireless device determines that there are at least two downlink BWP active on the primary cell in operation 2840. The wireless device may select the downlink BWP based on at least one characteristic of the downlink BWPs including the BWP index, the BWP numerology, the status of the BWP as a primary BWP, the status of the BWP as a default BWP, or the status of the BWP as an initial BWP. The wireless device may select the downlink BWP based at least on the downlink BWP having the lowest BWP index among the at least two downlink BWPs. The wireless device may select the downlink BWP based at least on the downlink BWP having the lowest BWP numerology among the at least two downlink BWPs. The wireless device may select the downlink BWP based at least on the downlink BWP being configured as a primary BWP, default BWP, or initial BWP. In operation 2870, the wireless device may monitor the selected downlink BWP on the primary cell for a random access response, after determining the downlink BWP.

Figure 29:
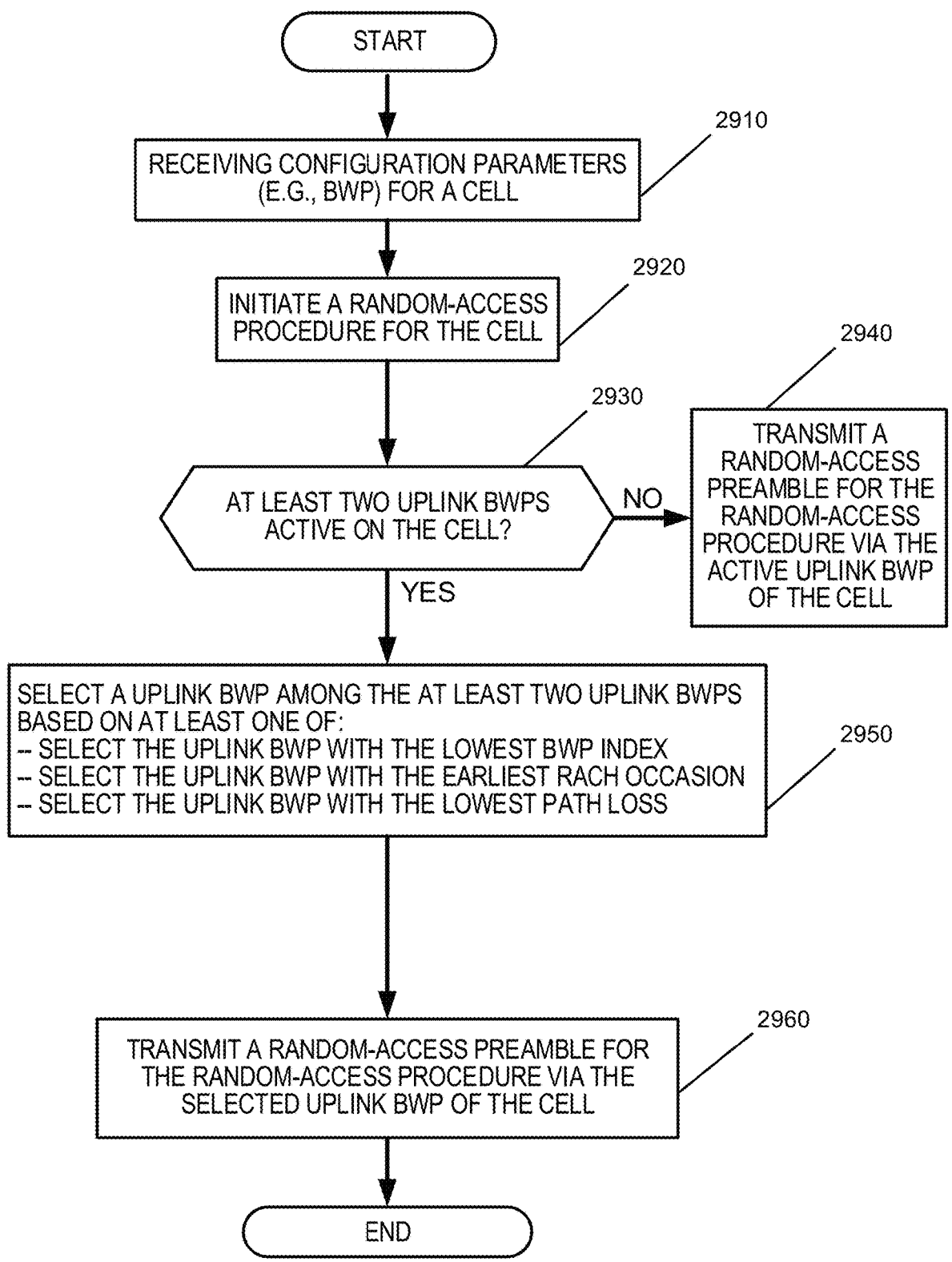
FIG. 29 shows an example method of multiple active BWP operations.

FIG. 29 shows an example method of multiple active BWPs operation. The method of FIG. 29 facilitates a base station and a wireless device to communicate over multiple BWPs efficiently. Initially, at step 2910, a wireless device receives configuration parameters (e.g., BWP parameters) for a cell. One or more base stations may send (e.g., transmit) the configuration parameters to the wireless device. At step 2920, the wireless device may initiate random access for the cell, based at least on the configuration parameters. At step 2930, the wireless device may determine whether at least two uplink BWPs are active on the cell. The determination may be based at least on the received configuration parameters. At step 2940, the wireless device may send (e.g., transmit) a random access preamble for random access via the active uplink BWP of the cell, if the wireless device determines that there are less than two uplink BWPs active on the cell in operation 2930. At step 2950, the wireless device may select an uplink BWP among the at least two uplink BWPs that are active on the cell, if the wireless device determines that there are at least two uplink BWPs active on the cell in operation 2930. The wireless device may select the uplink BWP based on at least one characteristic of the at least two uplink BWPs including the BWP index, the timing of the RACH occasions, or the path loss of the BWP. The wireless device may select the uplink BWP based at least on the uplink BWP having the lowest BWP index among the at least two uplink BWPs. The wireless device may select the uplink BWP based at least on the uplink BWP having the earliest RACH occasion among the at least two uplink BWPs. The wireless device may select the uplink BWP based at least on the uplink BWP having the lowest path loss among the uplink BWPs. At step 2960, the wireless device may send (e.g., transmit) a random access preamble for random access via the uplink BWP of the cell, after determining the uplink BWP.

A base station may send, to a wireless device that may receive, one or more configuration parameters for a plurality of downlink bandwidth parts (BWPs). The wireless device may activate at least two downlink BWPs of the plurality of downlink BWPs. The wireless device may send a random access preamble for a random access procedure. The wireless device may determine a downlink BWP, of the at least two downlink BWPs, for monitoring for a random access response to the random access preamble. The wireless device may monitor the downlink BWP for the random access response. The wireless device may receive, via the determined downlink BWP, the random access response. The wireless device may receive one or more configuration parameters for a plurality of uplink BWPs. The wireless device may activate at least two uplink BWPs of the plurality of uplink BWPs. The wireless device may Select an uplink BWP, of the at least two uplink BWPs, for the random access procedure. The wireless device may send the random access preamble via the uplink BWP. The wireless device may refrain from monitoring (e.g., may not monitor) a downlink BWP, of the at least two downlink BWPs, for the random-access response. The downlink BWP may be different from the determined downlink BWP for the monitoring. Each of the at least two downlink BWPs may be associated with a BWP specific inactivity timer. The wireless device may start, based on the activating the at least two downlink BWPs, a BWP-specific inactivity timer for each of the at least two downlink BWPs. The wireless device may stop, based on the determining the downlink BWP for the monitoring, the BWP-specific inactivity timer of the downlink BWP. The wireless device may refrain from stopping (e.g., may not stop) the BWP specific inactivity timer of the downlink BWP based on the determining the downlink BWP for the monitoring. Each of the plurality of downlink BWPs may be in one of an active state and an inactive state. The active state of a first downlink BWP may comprise monitoring a downlink control channel of the first downlink BWP. The inactive state of a first downlink BWP may comprise refraining from monitoring (e.g., not monitoring) a downlink control channel of the first downlink BWP. The wireless device may activate a first downlink BWP of the at least two downlink BWPs in a first slot. The wireless device may activate a second downlink BWP of the at least two downlink BWPs in a second slot. The wireless device may start the BWP specific inactivity timer of each of the at least two downlink BWPs. The wireless device may start a first BWP specific inactivity timer of the first downlink BWP, for example, based on or in response to activating the first downlink BWP. The wireless device may start a second BWP specific inactivity timer of the second downlink BWP, for example, based on or in response to activating the second downlink BWP. Each of the plurality of downlink BWPs may be associated with a BWP specific index. Determining the downlink BWP for the monitoring may comprise determining (e.g., selecting) a downlink BWP associated with at least one of: a lowest or highest downlink BWP-specific index relative to each downlink BWP-specific index associated with the at least two downlink BWPs; and/or a lowest or highest BWP-specific numerology relative to each BWP-specific numerology associated with the at least two downlink BWPs. The wireless device may select, for the monitoring, a downlink BWP of the at least two downlink BWPs that is a primary BWP of a primary cell. The wireless device may determine a downlink BWP (e.g., a selected downlink BWP), among the at least two downlink BWPs, configured with a common search space set. The wireless device may receive a physical downlink control channel (PDCCH) order, for initiating the random access procedure, that indicates information on which to base the determining the downlink BWP for the monitoring. The determining may comprise determining a downlink BWP (e.g., a selected downlink BWP) indicated by the PDCCH order. The PDCCH order may comprise a downlink BWP-specific index of the selected downlink BWP. The determining may comprise determining a downlink BWP (e.g., a selected downlink BWP) based on receiving the PDCCH order on the selected downlink BWP. The random access procedure may be for a secondary cell.

A base station may send, to a wireless device that may receive, one or more messages. The one or more messages may comprise one or more configuration parameters of a primary cell and a secondary cell. The primary cell may comprise a plurality of downlink bandwidth parts (BWPs). The wireless device may activate at least two downlink BWPs of the plurality of downlink BWPs. The wireless device may initiate a random access procedure for the secondary cell. The wireless device may determine, based on one or more criteria, a selected downlink BWP of the at least two downlink BWPs for the random access procedure. The wireless device may monitor the selected downlink BWP for a random-access response of the random access procedure. The wireless device may complete the random-access procedure based on receiving the random access response on the selected downlink BWP.

A base station may send, to a wireless device that may receive, one or more configuration parameters for a plurality of uplink bandwidth parts (BWPs). The wireless device may activate at least two uplink BWPs of the plurality of uplink BWPs. The wireless device may initiate a random access procedure. The wireless device may determine an uplink BWP, of the at least two uplink BWPs, for the random access procedure. The wireless device may send, via the determined uplink BWP, a random access preamble. The wireless device may determine, based on the determined uplink BWP, a downlink BWP for monitoring for a random access response. The wireless device may receive, via the determined downlink BWP, the random access response. The wireless device may refrain from transmitting (e.g., may not transmit), via a second uplink BWP of the at least two uplink BWPs, a random-access preamble. The second uplink BWP may be different from the uplink BWP. The wireless device may determining an uplink BWP with an earliest random access occasion relative random access occasions associated with the at least two uplink BWPs, for example, for the determining. The wireless device may determine an uplink BWP with a lowest path loss relative to path losses associated with the at least two uplink BWP, for example, for the determining. The wireless device may select an uplink BWP associated with at least one of: a lowest or highest downlink BWP-specific index relative to each downlink BWP-specific index associated with the at least two uplink BWPs; and/or a lowest or highest BWP-specific numerology relative to each BWP-specific numerology associated with the at least two uplink BWPs. The wireless device may select an uplink BWP of the at least two uplink BWPs that is a primary BWP of a primary cell. The wireless device may initiate the random access procedure based on receiving a physical downlink control channel (PDCCH) order. The PDCCH order may indicate information for the determining the uplink BWP for the random access procedure. The random access procedure may be for a secondary cell.

A base station may send, to a wireless device that may receive, one or more configuration parameters for a plurality of bandwidth parts (BWPs). The wireless device may activate at least two BWPs of the plurality of BWPs. The wireless device may select, based on one or more criteria and from the at least two BWPs, a first activated BWP for a random access procedure and a second activated BWP for the random access procedure. The wireless device may send, via the first activated BWP, a random access preamble for the random access procedure. The wireless device may monitor the second activated BWP for a random access response. The wireless device may receive, via the second activated BWP, the random access response. The first activated BWP may comprise an uplink BWP and the second activated BWP may comprise a downlink BWP. The wireless device may select a downlink BWP associated with at least one of: a lowest or highest downlink BWP-specific index relative to each downlink BWP-specific index associated with the at least two BWPs; and/or a lowest or highest BWP-specific numerology relative to each BWP-specific numerology associated with the at least two BWPs. The wireless device may select a downlink BWP of the at least two BWPs that is a primary downlink BWP of a primary cell. The wireless device may select an uplink BWP of the at least two BWPs that is a primary uplink BWP of a primary cell. The wireless device may receive a physical downlink control channel (PDCCH) order, for initiating the random access procedure, that indicates information on which to base the determining the first activated BWP and the second activated BWP. The random access procedure may be for a secondary cell.

Some wireless devices (e.g., legacy wireless devices, wireless devices compliant with 3GPP Release 15, and/or any other wireless device) may be configured for multiple resources (e.g., multiple BWPs). For example, some wireless devices (such as wireless devices that may be compliant with 3GPP Release 15) may be configured for up to four bandwidth parts (BWPs). Other wireless devices may be configured for any other quantity of resources (e.g., 8 BWPs, 16 BWPs, etc.). Some wireless device may activate one BWP of a plurality of configured BWPs (e.g., 4 BWPs, 8 BWPs, 16 BWPs, etc.) at a time. One BWP (e.g., which may comprise an uplink BWP and/or a downlink BWP) may be active in a cell (e.g., a primary cell, a secondary cell, etc.). A wireless device may switch to a second downlink BWP with a second downlink BWP index that may be the same as or similar to an uplink BWP index, for example, based on a wireless device initiating a random access procedure for a primary cell (e.g., PCell) and/or based on an uplink BWP index of the active uplink BWP being different from a first downlink BWP index of the active downlink BWP. The wireless may perform the random access procedure via the active uplink BWP and/or via the second downlink BWP. A wireless device may activate at least two downlink BWPs via a PCell, for example, based on multiple active downlink BWPs being supported for a cell. The wireless device may switch to a second downlink BWP associated with a second downlink BWP index that may be the same as or similar to the uplink BWP index, for example, based on the wireless device initiating a random access procedure, and/or the downlink BWP indexes of the at least two downlink BWPs being different from an uplink BWP index of the active uplink BWP. A misalignment may result between the base station and the wireless device, for example, based on the base station not knowing which active downlink BWP(s) has been or is being switched by the wireless device.

A wireless device may use a predefined rule to select a BWP (e.g., a downlink BWP and/or an uplink BWP), for example, which may resolve issues that arise (e.g., mismatched indexes, etc.) from random access procedures using multiple BWPs (e.g., multiple downlink BWPs and/or multiple uplink BWPs). The wireless device may determine (e.g., select) to switch a BWP, among the at least two BWPs, with the lowest and/or highest BWP index. The wireless device may select a BWP, for example, among the at least two BWPs, designated as a primary and/or secondary BWP (e.g., default BWP, initial downlink BWP, etc.) to switch. The wireless device may select a BWP to switch, for example, among the at least two BWPs, configured with one or more common control channels. The wireless device may activate a deactivated BWP with a downlink BWP index the same as or similar to the uplink BWP index. A wireless device may use a predefined rule to select a BWP from a group of BWPs, based on a random access procedure. The selection of the BWP may be based on, for example: a lowest BWP index, a highest BWP index, designation as a primary BWP, designation as a secondary BWP, one or more common control channels, and/or a downlink BWP index the same or similar to the uplink BWP index. This selection and/or switching of the BWP may improve radio efficiency, reduce uplink signaling overhead, and/or efficient BWP switching management for multiple active BWP operations in a cell.

Switching BWPs based on a matching index for a random access procedure may enhance existing random access procedures to improve downlink radio efficiency and reduce uplink signaling overhead, for example, based on a wireless device supporting multiple active BWPs in a cell. The switching may provide a more efficient BWP operation mechanism for supporting multiple active BWPs operation in a cell. The switching may provide more efficient BWP switching management for supporting multiple active BWPs operation in a cell.

At least two wireless devices may operate via a first uplink BWP of a cell. The at least two wireless devices may operate via different downlink BWPs of the cell. The base station may not be able to successfully and timely identify an identity of a wireless device of the at least two wireless devices sending the random access preamble, for example, based on a base station receiving a random access preamble of a random access procedure (e.g., contention-based random access) via the first uplink BWP. The base station may not be able to successfully and timely determine via which downlink BWP to send a random access response, for example, based on not being able to successfully and timely identify the identity of the wireless device. The base station may send a random access response via the different downlink BWPs, which may result in waste of resources and/or signaling overhead.

The wireless device of the at least two wireless devices initiating the random access procedure may switch to a downlink BWP to receive the random access response. The base station may send the random access response via the switched downlink BWP. The switching of the downlink BWP may enable the base station to send the random access response of the random access procedure via a single downlink BWP. This switching of the downlink BWP may reduce a number of random access responses sent by the base station. The switching of the downlink BWP may be based on a linkage between a first uplink BWP-specific index of the first uplink BWP and a downlink BWP-specific index of the downlink BWP. The base station and the wireless device may be aware of the linkage. The linkage may be configured by higher layers (e.g., RRC).

Figure 30A:
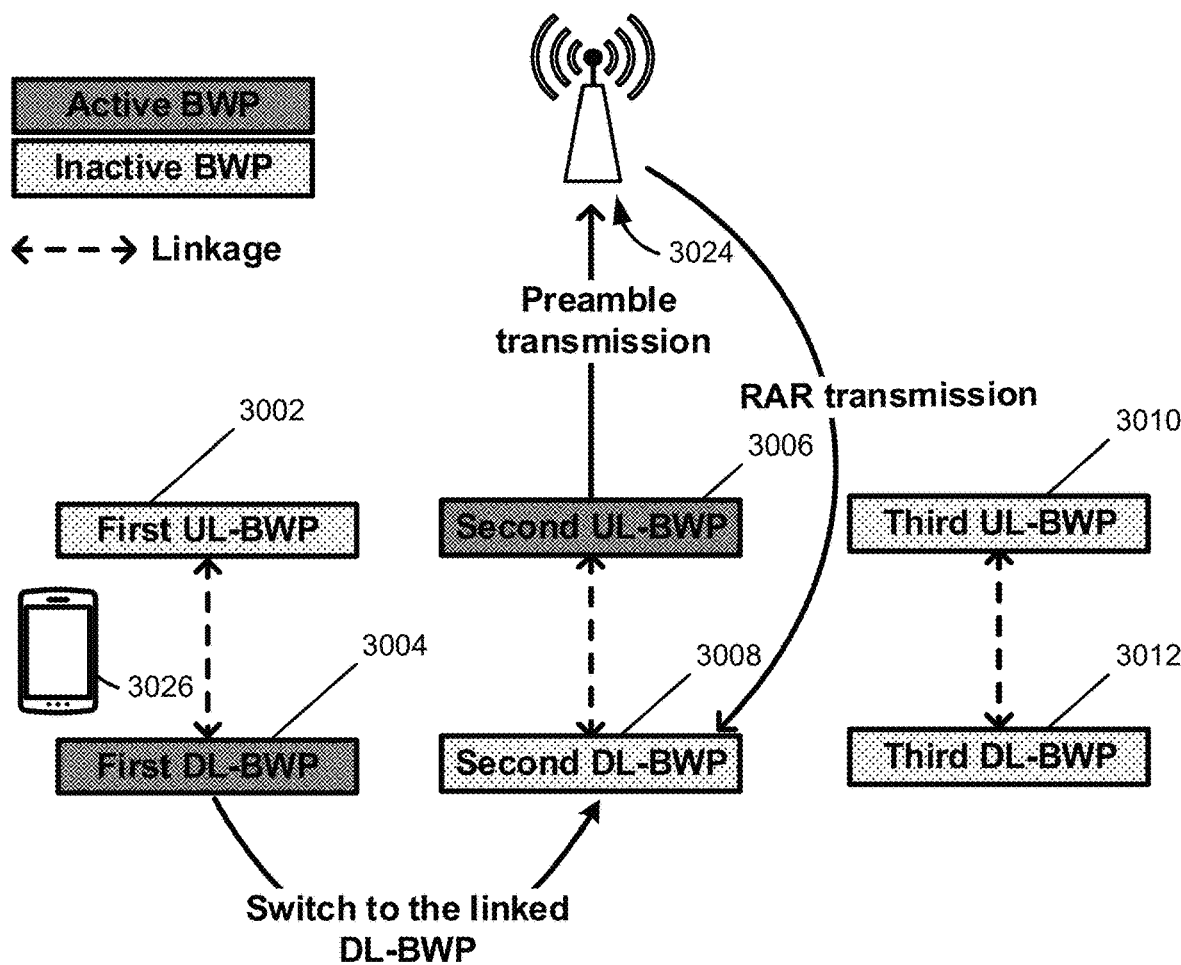
FIG. 30A and FIG. 30B show an example of a system for a random access procedure using BWP switching.
Figure 30B:
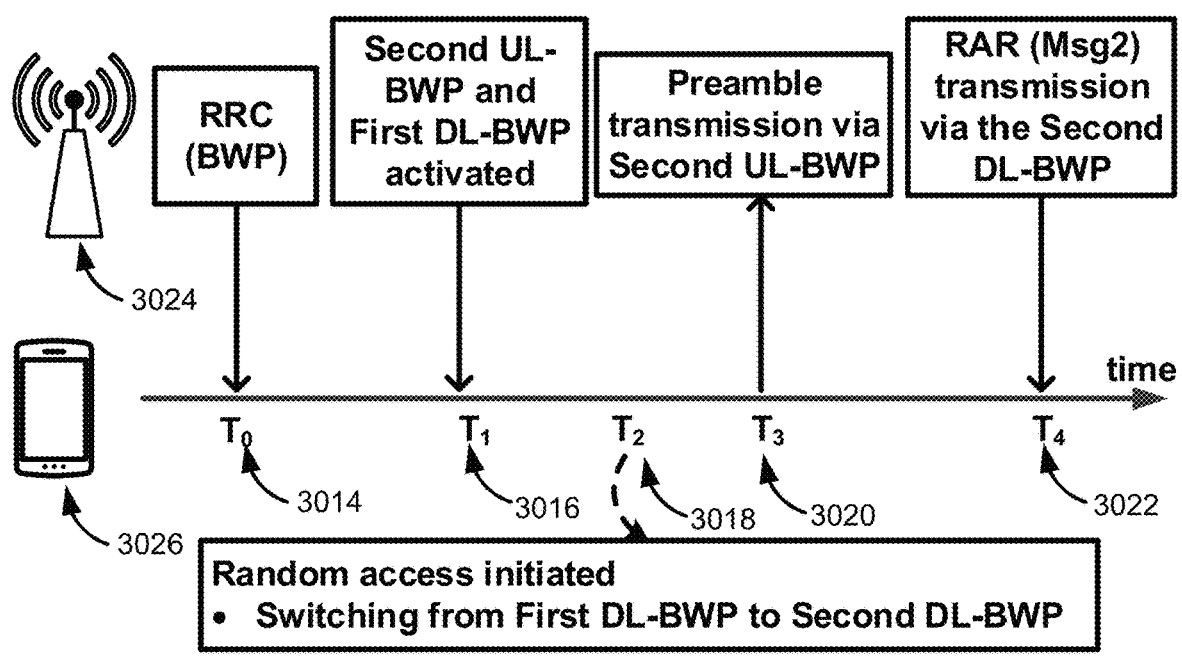

FIG. 30A and FIG. 30B show examples of a system for random access procedure with BWP switching. The wireless device 3026 may switch to a downlink BWP based on a linkage between the downlink BWP and an active uplink BWP, for example, based on starting a random access procedure. The wireless device 3026 and the base station 3024 may be configured to use a first uplink BWP 3002, a second uplink BWP 3006, a third uplink BWP 3010, a first downlink BWP 3004, a second downlink BWP 3008, and/or a third downlink BWP 3012. The wireless device 3026 may receive an RRC message from the base station 3014, for example, at time $T_0$ (3014), configuring the BWPs. The base station 3024 may cause the first downlink BWP 3004 and the second uplink BWP 3006 to become active between the base station 3024 and the wireless device 3026, for example, at time $T_1$ (3016). The wireless device 3026 may initiate a random access procedure, for example, at time $T_2$ (3018), and begin switching from the first downlink BWP 3004 to the second downlink BWP 3008, for example, based on a linkage between the second uplink BWP 3006 and the second downlink BWP 3008 (e.g., numerology, shared control channel, etc.). The wireless device 3026 may send a preamble transmission to the base station 3024 via the second uplink BWP 3006, for example, at time T3 (3020). The base station 3024 may send a random access response (RAR) via the second downlink BWP 3008, for example, at time $T_4$.

A wireless device may operate via a first uplink BWP of a cell and a first downlink BWP of the cell. The wireless device may initiate a random access procedure (e.g., contention based, contention-free, etc.) via the first uplink BWP. The wireless device may switch from the first downlink BWP to an initial downlink BWP and/or switch from the first uplink BWP to an initial uplink BWP, for example, based on one or more PRACH occasions not being configured, by a base station, for the first uplink BWP. The wireless device may perform the random access procedure via the initial uplink BWP and the initial downlink BWP.

A wireless device may operate via a first uplink BWP of a cell and a first downlink BWP of the cell. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may perform the random access procedure via the first uplink BWP and the first downlink BWP, for example, based on one or more PRACH occasions being configured, by a base station, for the first uplink BWP, and/or based on the first uplink BWP-specific index being the same as the first downlink BWP-specific index.

A wireless device may operate via a first uplink BWP of a cell and a first downlink BWP of the cell. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may switch from the first downlink BWP to a third downlink BWP of the cell associated with a third downlink BWP-specific index, for example, based on one or more PRACH occasions being configured, by a base station, for the first uplink BWP, and/or based on the first downlink BWP-specific index being different from the first uplink BWP-specific index. The third downlink BWP-specific index may be same as or different from the first uplink BWP-specific index. The wireless device may perform the random access procedure via the first uplink BWP and the third downlink BWP, for example, based on the switching. The random access procedure may be a contention-based random access procedure. The base station and the wireless device may operate in a paired spectrum (e.g., frequency division duplex (FDD)).

Figure 31:
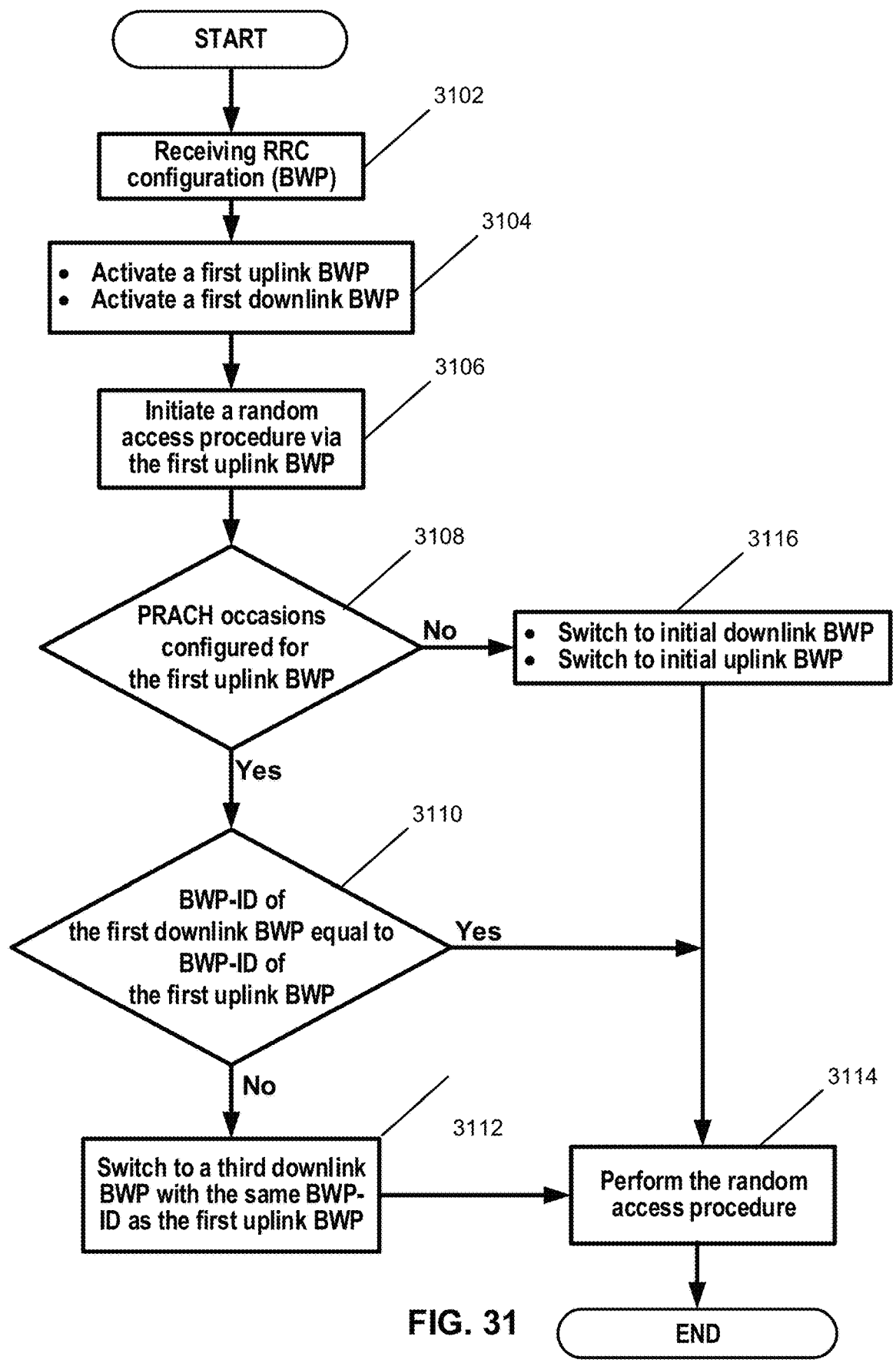
FIG. 31 shows an example method for BWP switching for a random access procedure.

FIG. 31 shows an example method for BWP switching for a random access procedure. A wireless device may determine to switch or to refrain from switching to a downlink BWP, based starting a random access procedure and based on a BWP-ID match between an active downlink BWP and an active uplink BWP. The method may be accomplished by systems and apparatuses described herein, for example, the base station 3024 and wireless device 3026 of FIG. 30A and/or FIG. 30B. At step 3102, the wireless device may receive an RRC configuration regarding the BWPs. At step 3104, the wireless device may activate a first uplink BWP and a first downlink BWP. At step 3106, the wireless device may initiate a random access procedure via the first uplink BWP. At step 3108, the wireless device may determine that the PRACH occasions are configured for the first uplink BWP. At step 3110, the wireless device may determine that the BWP-ID of the first downlink BWP is not equal to the BWP-ID of the first uplink BWP. At step 3112, the wireless device may switch to a third downlink BWP with a same BWP-ID as the first uplink BWP. At step 3114, the wireless device may perform the random access procedure.

Alternate processes may also be possible using the method. At step 3110, the wireless device may determine that the BWP-ID of the first downlink BWP is equal to the BWP-ID of the first uplink BWP. At step 3114, the wireless device may perform the random access procedure. At step 3108, the wireless device may determine that the PRACH occasions are not configured for the first uplink BWP. At step 3116, the wireless device may switch to an initial downlink BWP and/or switch to an initial uplink BWP. At step 3114, the wireless device may perform the random access procedure.

A base station may receive a random access preamble, from a wireless device, for a random access procedure via an uplink BWP. The uplink BWP may be indicated (e.g., identified) with an uplink BWP-specific index. The base station may send a random access response, to the wireless device, via a downlink BWP, for example, based on receiving the random access preamble. The downlink BWP may be indicated (e.g., identified) with a downlink BWP-specific index. The downlink BWP-specific index may be the same as (or different from) the uplink BWP-specific index.

The wireless device may use multiple active downlink BWPs and/or one or more active uplink BWPs. The wireless device may initiate a random access procedure via at least one of the one or more active uplink BWPs. The wireless device may not successfully receive the random access response, for example, if the multiple active downlink BWPs lack a downlink BWP via which the base station may send the random access response. This not receiving the random access response may result in a failure of the random access procedure. The failure of the random access procedure may lead to radio link failure (RLF).

The wireless device may switch at least one downlink BWP of the multiple active BWPs to the downlink BWP, for example, based on the initiating the random access procedure. The switching may enable the wireless device to successfully receive (e.g., avoid missing receiving) the random access response. The switching the at least one downlink BWP of the multiple active BWPs to the downlink BWP may be performed, by the wireless device, autonomously. The base station may not be aware of the switching. The base station may send at least one downlink signal via the switched at least one downlink BWP, for example, based on not being aware of the switching. This transmission of the at least one downlink signal may result in a misalignment between the base station and the wireless device, for example, based on lacking a predetermined selection rule. A predetermined selection rule may be used to select at least one downlink BWP of the multiple active BWPs.

The base station may send at least one downlink signal via the switched at least one downlink BWP, for example, based on a misalignment between the base station and the wireless device (e.g., via the switched at least one downlink BWP). The base station may not be aware of the wireless device switching the at least one downlink BWP. The wireless device may not monitor at least one downlink signal via the at least one downlink BWP, for example, based on the switching. This misalignment may lead to unnecessary delay, data loss, and/or signaling overhead. Recovery from the misalignment caused by the wireless device may result in a transmission delay and signaling overhead. This misalignment may increase the latency of a downlink transmission and/or an uplink transmission, which may result in a waste of radio resources.

Figure 32:
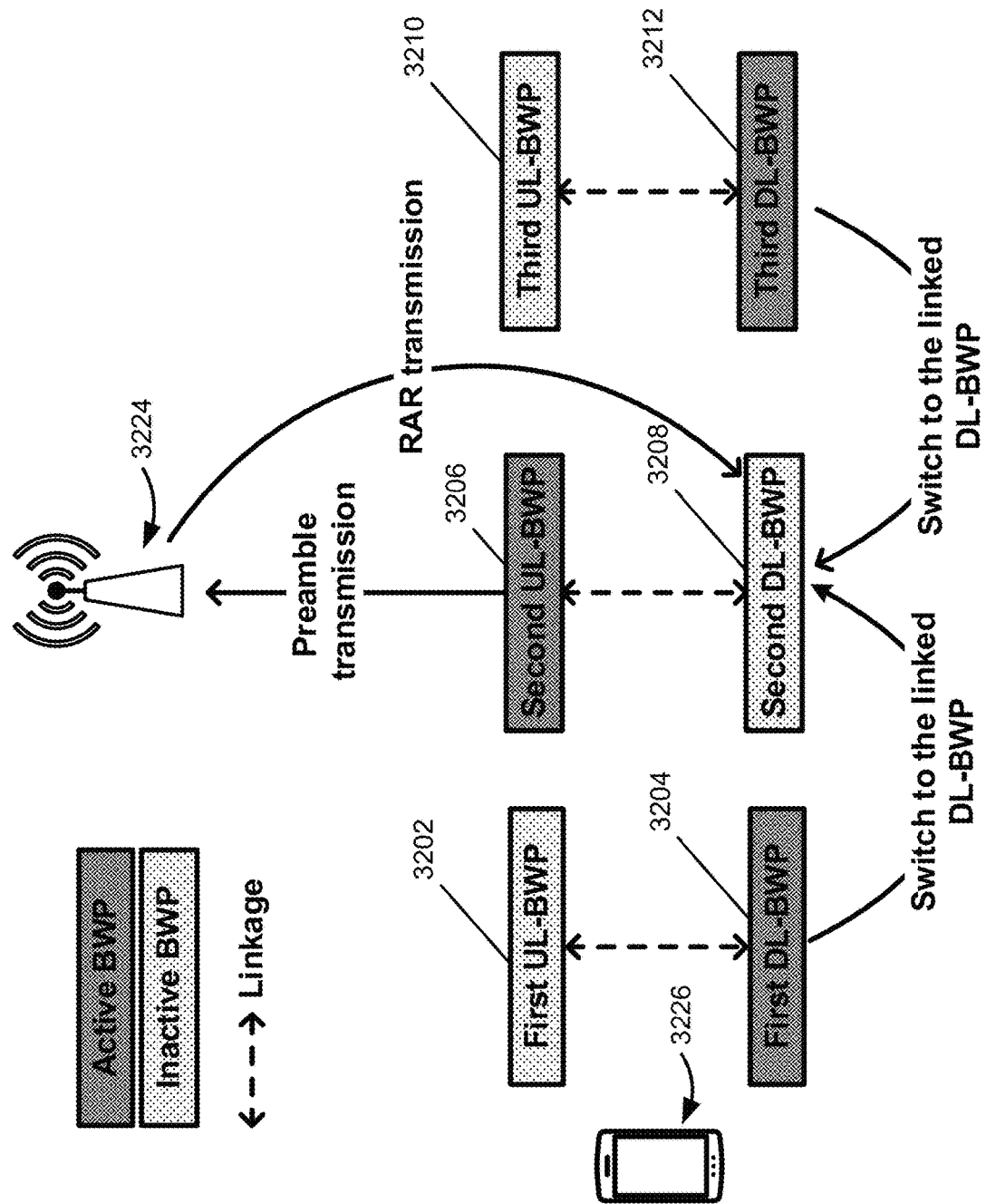
FIG. 32 shows an example of a system for a random access procedure with BWP switching using multiple active BWPs.

FIG. 32 shows an example of a system for a random access procedure with BWP switching using multiple active BWPs. A wireless device 3226 may determine to switch to a downlink BWP and deactivate one or more BWPs, for example, based on starting a random access procedure and a linkage between a downlink BWP and an active uplink BWP. The wireless device 3226 and the base station 3224 may be configured to use a first uplink BWP 3202, a second uplink BWP 3206, a third uplink BWP 3210, a first downlink BWP 3204, a second downlink BWP 3208, and/or a third downlink BWP 3212. The wireless device 3226 may receive a message from the base station 3224 configuring the BWPs. The base station 3224 may cause the first downlink BWP 3204, the third downlink BWP 3212, and the second uplink BWP 3206 to become active between the base station 3224 and the wireless device 3226. The wireless device 3226 may initiate a random access procedure switch from the first downlink BWP 3204 and the third downlink BWP 3212 to the second downlink BWP 3208, for example, based on a linkage between the second uplink BWP 3206 and the second downlink BWP 3208 (e.g., numerology, shared control channel, etc.). The wireless device 3226 may send a preamble to the base station 3224 via the second uplink BWP. The base station 3224 may send a random access response (RAR) via the second downlink BWP 3208.

A wireless device may receive, from a base station, one or more messages comprising configuration parameters for a cell. The one or more messages may comprise one or more RRC messages (e.g. an RRC connection reconfiguration message, or an RRC connection reestablishment message, and/or an RRC connection setup message). The configuration parameters may comprise resource configuration parameters (e.g., BWP configuration parameters) for a first plurality of downlink resources (e.g., downlink BWPs) of the cell and a second plurality of uplink resources (e.g., uplink BWPs) of the cell. The configuration parameters may comprise downlink BWP-specific indexes for the first plurality of downlink BWPs and uplink BWP-specific indexes for the second plurality of uplink BWPs.

The wireless device may activate at least two downlink BWPs of the first plurality of downlink BWPs and/or at least one uplink BWP of the second plurality of uplink BWPs. The at least two downlink BWPs may comprise a first downlink BWP and/or a second downlink BWP. The at least one uplink BWP may comprise a first uplink BWP.

A wireless device may receive (e.g., in a first slot) first DCI indicating switching a first active BWP of the cell from a first active downlink BWP to the first downlink BWP. The first DCI may comprise a first BWP indicator. The wireless device may determine that the first DCI indicates BWP switching, for example, based on the first BWP indicator indicating a BWP different from the first active downlink BWP.

A wireless device may receive (e.g., in a first slot) first DCI and/or a first MAC CE indicating activating the first downlink BWP of the cell. The first DCI and/or the first MAC CE may comprise a first BWP indicator. The wireless device may determine that the first DCI and/or the first MAC CE indicates BWP activating, for example, based on the first BWP indicator indicating the first downlink BWP.

A wireless device may receive (e.g., in a second slot) second DCI indicating switching a second active BWP of the cell from a second active downlink BWP to the second downlink BWP. The second DCI may comprise a second BWP indicator. The wireless device may determine that the second DCI indicates BWP switching, for example, based on the second BWP indicator indicating a BWP different from the second active downlink BWP.

A wireless device may receive (e.g., in a second slot) second DCI and/or a second MAC CE indicating activating the second downlink BWP of the cell. The second DCI and/or the second MAC CE may comprise a second BWP indicator. The wireless device may determine that the second DCI and/or the second MAC CE indicates BWP activating, for example, based on the second BWP indicator indicating the second downlink BWP.

A wireless device may receive (e.g., in a third slot) third DCI indicating switching a third active BWP of the cell from a first active uplink BWP to the first uplink BWP. The third DCI may comprise a third BWP indicator. The wireless device may determine that the third DCI indicates BWP switching, for example, based on the third BWP indicator indicating a BWP different from the first active uplink BWP.

A wireless device may receive (e.g., in a third slot) third DCI and/or a third MAC CE indicating activating the first uplink BWP of the cell. The third DCI and/or the third MAC CE may comprise a third BWP indicator. The wireless device may determine that the third DCI and/or the third MAC CE indicates BWP activating, for example, based on the third BWP indicator indicating the first uplink BWP. The first downlink BWP, the second downlink BWP, and/or the first uplink BWP of the cell may be active at the same time.

The wireless device may initiate a random access procedure (e.g., contention-free random access, contention-based random access, etc.) via the first uplink BWP of the at least one uplink BWP. The first uplink BWP may be indicated (e.g., identified) by, or associated with, a first uplink BWP-specific index. The wireless device may determine that at least two downlink BWP-specific indexes of the at least two downlink BWPs (e.g., the first downlink BWP and the second downlink BWP) may be different from the first uplink BWP-specific index of the first uplink BWP, for example, based on initiating the random access procedure.

The wireless device may select, based on one or more criteria, at least one downlink BWP (e.g., the first downlink BWP and/or the second downlink BWP) of the at least two downlink BWPs (e.g., the first downlink BWP and the second downlink BWP), for example, based on the determining that the at least a two downlink BWP-specific indexes of the at least two downlink BWPs are different from the first uplink BWP-specific index of the first uplink BWP. The wireless device may switch from the at least one downlink BWP to a third downlink BWP of the first plurality of downlink BWPs. The third downlink BWP may be indiciated (e.g., identified) by, or associated with, a third downlink BWP-specific index. The third downlink BWP-specific index may be same as (or different from) the first uplink BWP-specific index. The wireless device may send a random access preamble via a PRACH resource of the first uplink BWP, for example, based on the switching to the third downlink BWP.

The wireless device may start a response window (e.g. ra-ResponseWindow) at a first PDCCH occasion via the third downlink BWP of the cell. The response window may begin from the end of the sending the random access preamble. The response window may be configured by a higher layer (e.g., MAC, RRC, etc.). The wireless device may monitor at least one downlink control channel via the third downlink BWP for DCI (e.g., a random access response), for example, based on the response window running. The DCI may be indicated (e.g., identified, scrambled, etc.) by a RA-RNTI. The DCI may be addressed to the wireless device indicated (e.g., identified) by a C-RNTI. The random access procedure may be completed successfully, for example, based on the wireless device receiving the DCI via the third downlink BWP.

The wireless device may switch from the at least two downlink BWPs to the third downlink BWP, for example, based on the determining that at least a downlink BWP-specific index is different from an uplink BWP-specific index. The selected at least one downlink BWP may be the same as or similar to the at least two downlink BWPs. The switching from the at least two downlink BWPs to the third downlink BWP may comprise deactivating each of the at least two downlink BWPs and activating the third downlink BWP.

A first downlink BWP-specific index of the first downlink BWP and a second downlink BWP-specific index of the second downlink BWP may be different from the first uplink BWP-specific index of the first uplink BWP. The wireless device may switch the first downlink BWP and the second downlink BWP to a third downlink BWP, for example, based on initiating a random access procedure (e.g., contention-based). The third downlink BWP may be indicated (e.g., identified) by, or associated with, a third downlink BWP-specific index. The third downlink BWP-specific index may be the same as or similar to the first uplink BWP-specific index.

The wireless device may select at least one downlink BWP of the at least two downlink BWPs, for example, based on the based on determining that at least a downlink BWP-specific index is different from an uplink BWP-specific index. The determining of the at least one downlink BWP may be based on whether the at least one downlink BWP is configured with a common search space. The base station may refrain from configuring the at least one downlink BWP with a common search space.

The first downlink BWP may be configured with a common search space and the second downlink BWP may not be configured with a common search space. The wireless device may switch the second downlink BWP to a third downlink BWP and keep the first downlink BWP in active state, for example, based on initiating a random access procedure (e.g., contention-based) via a first uplink BWP. The third downlink BWP may be indicated (e.g., identified) by, or associated with, a third downlink BWP-specific index. The third downlink BWP-specific index may be the same as or similar to the first uplink BWP-specific index of the first uplink BWP. The wireless device may keep the first downlink BWP in active state, for example, based on the wireless initiating the random access procedure and based on the wireless device being configured with a common search space.

The wireless device may switch the first downlink BWP to a third downlink BWP, for example, based on initiating a random access procedure (e.g., contention-based) via a first uplink BWP, the first downlink BWP being configured with a common search space, and/or the second downlink BWP not being configured with a common search space. The third downlink BWP may be indicated (e.g., identified by), or associated with, a third downlink BWP-specific index. The third downlink BWP-specific index may be the same as or similar to the first uplink BWP-specific index of the first uplink BWP. The wireless device may keep the second downlink BWP in active state, for example, based on not being configured with a common search space and the wireless initiating the random access procedure.

The wireless device may switch the first downlink BWP and the second downlink BWP to a third downlink BWP, for example, based on initiating a random access procedure (e.g., contention-based) via a first uplink BWP, the first downlink BWP being configured with a first common search space, and/or the second downlink BWP being configured with a second common search space. The third downlink BWP may be indicated (e.g., identified) by, or associated with, a third downlink BWP-specific index. The third downlink BWP-specific index may be same as (or different from) the first uplink BWP-specific index of the first uplink BWP.

The one or more criteria may be based on a value of a BWP-specific index. The determining may comprise determining at least one downlink BWP with a lowest BWP-specific index among at least two downlink BWP-specific indexes of the at least two downlink BWPs. The at least one downlink BWP with the lowest BWP-specific index may be a BWP via which the wireless device receives system information. Monitoring via the at least one downlink BWP with a lowest or lower BWP-specific index among one or more downlink BWPs may help maintain a noninterrupted link with a base station for receiving system information.

A wireless device may initiate a random access procedure via a first uplink BWP associated with a first uplink BWP-specific index. The wireless device may select the first downlink BWP, for example, based on the first downlink BWP-specific index being lower than the second downlink BWP-specific index, the initiating the random access procedure, and/or the wireless determining that a first downlink BWP-specific index of the first downlink BWP and a second downlink BWP-specific index of the second downlink BWP are different from the first uplink BWP-specific index. The wireless device may switch the first downlink BWP to a third downlink BWP, for example, based on the determining the first downlink BWP. The third downlink BWP may be indicated (e.g., identified) by, or associated with, a third downlink BWP-specific index. The third downlink BWP-specific index may be same as (or different from) the first uplink BWP-specific index of the first uplink BWP.

The wireless device may select the second downlink BWP, for example, based on the second downlink BWP-specific index being lower than the first downlink BWP-specific index, the initiating the random access procedure, and/or the wireless determining that a first downlink BWP-specific index of the first downlink BWP and a second downlink BWP-specific index of the second downlink BWP are different from the first uplink BWP-specific index. The wireless device may switch the second downlink BWP to a third downlink BWP. The third downlink BWP may be indicated (e.g., identified) by, or associated with, a third downlink BWP-specific index. The third downlink BWP-specific index may be the same as or similar to the first uplink BWP-specific index of the first uplink BWP.

One or more criteria may be based on a value of a BWP-specific index. The determining of a downlink BWP may comprise determining at least one downlink BWP with a highest BWP-specific index among at least two downlink BWP-specific indexes of the at least two downlink BWPs.

The determining of a downlink BWP may comprise determining a BWP of the at least two downlink BWPs that is a secondary downlink BWP.

The at least one downlink BWP with a highest BWP-specific index may be a BWP via which the wireless device receives urgent data packets (e.g., URLLC). Monitoring via the at least one downlink BWP with a highest BWP-specific index may help maintain a noninterrupted link with a base station for urgent data receiving.

The wireless device may select at least one downlink BWP of the at least two downlink BWPs, for example, based on the determining that at least a downlink BWP-specific index is different from an uplink BWP-specific index. At least one downlink BWP of the at least two downlink BWPs may comprise a BWP designated as a secondary downlink BWP (SBWP) of the cell.

The base station may designate the first downlink BWP as a primary downlink BWP. The base station may designate the second downlink BWP as a secondary downlink BWP. The wireless device may switch the second downlink BWP to a third downlink BWP, for example, based on the second downlink BWP being designated as the secondary downlink BWP and the wireless device initiating a random access procedure (e.g., contention-based) via a first uplink BWP. The third downlink BWP may be indicated (e.g., identified) by, or associated with, a third downlink BWP-specific index. The third downlink BWP-specific index may be the same as or similar to the first uplink BWP-specific index of the first uplink BWP. The wireless device may keep the first downlink BWP in an active state, for example, based on the wireless initiating the random access procedure and/or the first downlink BWP being designated as the primary downlink BWP. The determining of a downlink BWP may comprise determining a BWP of the at least two downlink BWPs that is a primary downlink BWP.

The primary downlink BWP may be a BWP via which the wireless device may perform an initial connection establishment procedure, may initiate a connection re-establishment procedure, and/or may monitor PDCCH candidates in one or more common search spaces for DCI formats with CRC scrambled by a SI-RNTI, RA-RNTI, TC-RNTI, P-RNTI, INT-RNTI, SFI-RNTI, TPC-PUSCH-RNTI, TPC-PUCCH-RNTI, TPC-SRS-RNTI, CS-RNTI, SP-CSI-RNTI, and/or C-RNTI. The primary downlink BWP may be a BWP which may maintain in active state at least until being switched to another BWP (e.g., by an RRC message). The primary downlink BWP may be a first BWP in a licensed band. The secondary downlink BWP may be a second BWP in an unlicensed band. The primary downlink BWP may be a first BWP used with a first radio interface (e.g., an Uu interface between a base station and a wireless device). The secondary downlink BWP may be a second BWP used with a second radio interface (e.g., a sidelink interface between a first wireless device and a second wireless device).

The determining of a downlink BWP may comprise determining a BWP of the at least two downlink BWPs that is a not a default BWP (e.g., non-default BWP). A default BWP of the at least two downlink BWPs may be in an active state, for example, based on there being at least two active downlink BWPs in the cell. A default BWP of the at least two downlink BWPs may be in an inactive state, for example, if there are at least two active downlink BWPs in the cell. A default BWP may be in an inactive state, for example, based on there being at most one active downlink BWP in the cell.

The wireless device may select at least one downlink BWP of the at least two downlink BWPs, for example, based on determining that at least a downlink BWP-specific index is different from an uplink BWP-specific index. The at least one downlink BWP of the at least two downlink BWPs may comprise a BWP designated as a non-default BWP of the cell.

The first downlink BWP may be a default BWP. The second downlink BWP may be a non-default BWP. The first downlink BWP may stay in an active state, for example, based on at least two downlink BWPs (e.g., the first downlink BWP and the second downlink BWP) of the cell being active.

The wireless device may switch the second downlink BWP to a third downlink BWP, for example, based on the second downlink BWP being a non-default BWP and/or the wireless device initiating a random access procedure (e.g., contention-based) via a first uplink BWP. The third downlink BWP may be indicated (e.g., identified) by, or associated with, a third downlink BWP-specific index. The third downlink BWP-specific index may be the same as or similar to the first uplink BWP-specific index of the first uplink BWP. The wireless device may keep the first downlink BWP in an active state, for example, based on the wireless initiating the random access procedure, and/or based on the first downlink BWP being the default BWP.

The one or more criteria may be based on a value of a numerology index. A determining of a downlink BWP may comprise determining at least one downlink BWP with a numerology index among at least two numerology indexes of the at least two downlink BWPs. The numerology index of the at least one downlink BWP may be the same as or similar to a numerology index of the third downlink BWP of the cell.

A wireless device may initiate a random access procedure via a first uplink BWP associated with a first uplink BWP-specific index. A first downlink BWP-specific index of the first downlink BWP and a second downlink BWP-specific index of the second downlink BWP may be different from the first uplink BWP-specific index. A third downlink BWP-specific index of the third downlink BWP may be the same as or similar to the first uplink BWP-specific index. The base station may configure the first downlink BWP, the second downlink BWP, and the third downlink BWP with a first numerology index, a second numerology index, and a third numerology index, respectively.

The wireless device may select the first downlink BWP, for example, based on the first numerology index of the first downlink BWP being the same as or similar to the third numerology index of the third downlink BWP, initiating the random access procedure, and the wireless device determining that the first downlink BWP-specific index and the second downlink BWP-specific index are different from the first uplink BWP-specific index. The wireless device may switch the first downlink BWP to the third downlink BWP, for example, based on selecting the downlink BWP.

The wireless device may select the second downlink BWP, for example, based on the second numerology index of the second downlink BWP being the same as or similar to the third numerology index of the third downlink BWP, for example, based on the initiating the random access procedure, and the wireless device determining that the first downlink BWP-specific index and the second downlink BWP-specific index are different from the first uplink BWP-specific index. The wireless device may switch the second downlink BWP to the third downlink BWP, for example, based on the selecting the downlink BWP.

One or more criteria for determining a downlink BWP may comprise at least one of: a BWP-specific index, a numerology index, common control channel configuration, primary downlink BWP configuration, or second downlink BWP configuration. The determining of the downlink BWP may be based on at least two criteria. The determining of the downlink BWP may comprise the determining a BWP of the at least two downlink BWPs that is a secondary downlink BWP and configured with a common control channel. The determining of the downlink BWP may comprise determining a BWP with a lowest BWP-specific index among at least two BWP-specific indexes of the at least two downlink BWPs and being configured with a common control channel.

Figure 33:
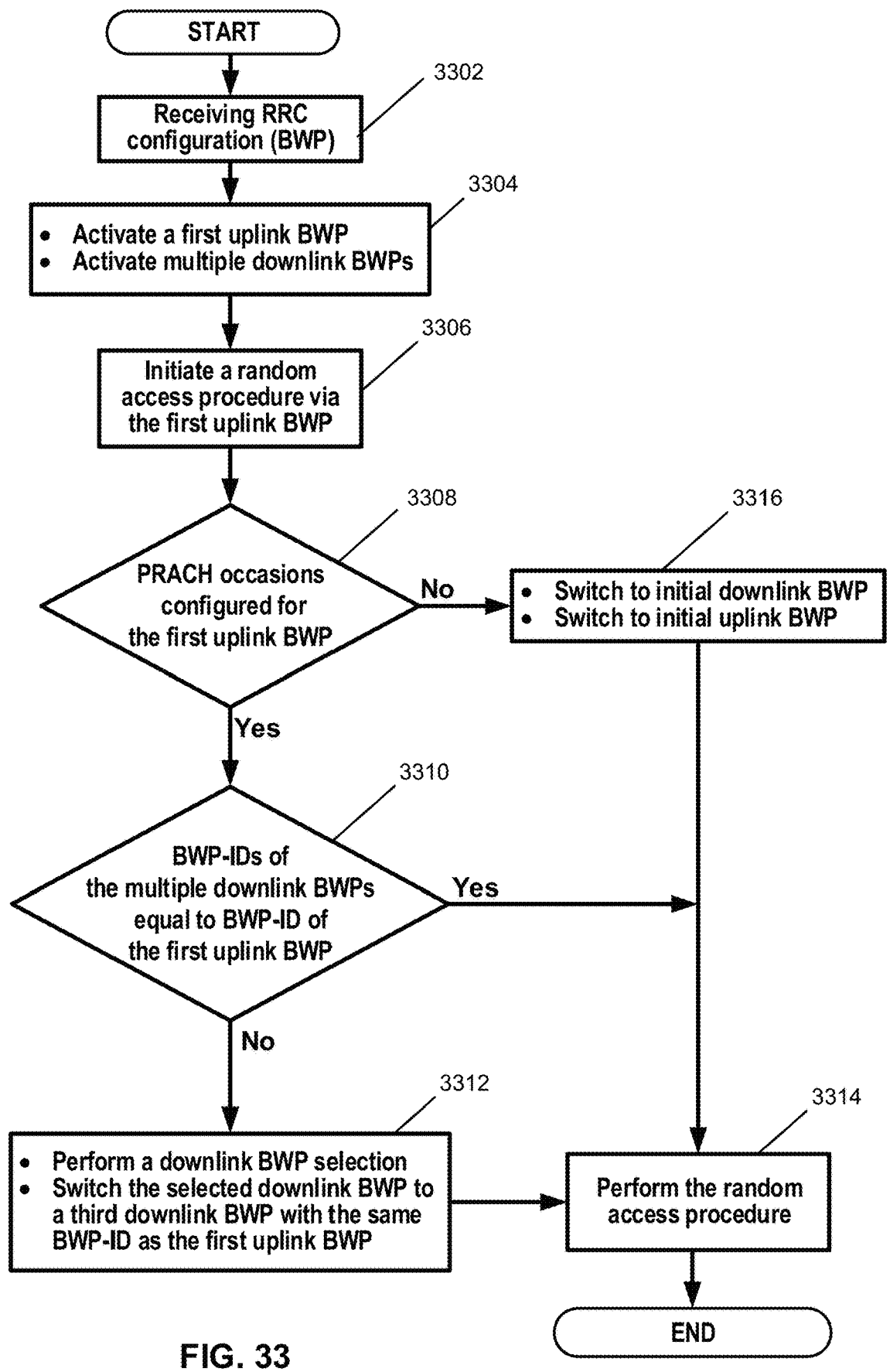
FIG. 33 shows an example method for BWP switching for a random access procedure using multiple active BWPs.

FIG. 33 shows an example method for BWP switching for a random access procedure using multiple active BWPs. A wireless device may determine to switch or to refrain from switching an active downlink BWP to a downlink BWP from one or more BWPs, based on starting a random access procedure and a match of BWP-IDs between a downlink BWP and an active uplink BWP. The method may be accomplished systems and apparatuses described herein, for example, the base station 3224 and wireless device 3226 of FIG. 32. At step 3302, the wireless device may receive an RRC configuration regarding BWPs. At step 3304, the wireless device may activate a first uplink BWP and a multiple downlink BWPs. At step 3306, the wireless device may initiate a random access procedure via the first uplink BWP. At step 3308, the wireless device may determine that the PRACH occasions are configured for the first uplink BWP. At step 3310, the wireless device may determine that the BWP-IDs of the multiple downlink BWPs are not equal to the BWP-ID of the first uplink BWP. At step 3312, the wireless device may perform a downlink BWP selection and switch to a selected downlink BWP to a third downlink BWP associated with a same BWP-ID as the first uplink BWP. At step 3314, the wireless device may perform the random access procedure.

Alternate processes may also be possible through the method. At step 3310, the wireless device may determine that at least one of the BWP-IDs of the multiple downlink BWPs are equal to the BWP-ID of the first uplink BWP. At step 3314, the wireless device may perform the random access procedure. At step 3308, the wireless device may determine that the PRACH occasions are not configured for the first uplink BWP. At step 3316, the wireless device may switch to an initial downlink BWP and/or switch to an initial uplink BWP. At step 3314, the wireless device may perform the random access procedure.

A wireless device may operate via a first uplink BWP of a cell and a first downlink BWP of the cell, for example, in a NR network. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may switch from the first downlink BWP to a third downlink BWP of the cell associated with a third downlink BWP-specific index, for example, based on one or more PRACH occasions being configured, by a base station, for the first uplink BWP, and/or the first downlink BWP-specific index being different from the first uplink BWP-specific index. The third downlink BWP-specific index may be same as or similar to the first uplink BWP-specific index. The wireless device may perform the random access procedure via the first uplink BWP and the third downlink BWP, for example, based on the switching of the downlink BWP.

The base station may not be aware of the wireless device switching from the first downlink BWP to the third downlink BWP. The base station may be aware of the wireless device switching from the first downlink BWP to the third downlink BWP, for example, based on the base station receiving an uplink signal (e.g., msg3) of the random access procedure. The uplink signal may identify an identity of the wireless device. The base station may determine the wireless device operating via the third downlink BWP, for example, based on receiving the uplink signal.

The base station may send at least one downlink signal to the wireless device via the first downlink BWP, for example, based on a time duration between the switching and the determining that at least a downlink BWP-specific index is different from an uplink BWP-specific index. The wireless device may refrain from monitoring the at least one downlink signal via the first downlink BWP, for example, based on the switching of the downlink BWP. The wireless device may miss receiving (e.g., not sucessfully receive) the at least one downlink signal. The missing receiving the at least one downlink signal may lead to unnecessary delay, data loss, and/or signaling overhead.

Figure 34:
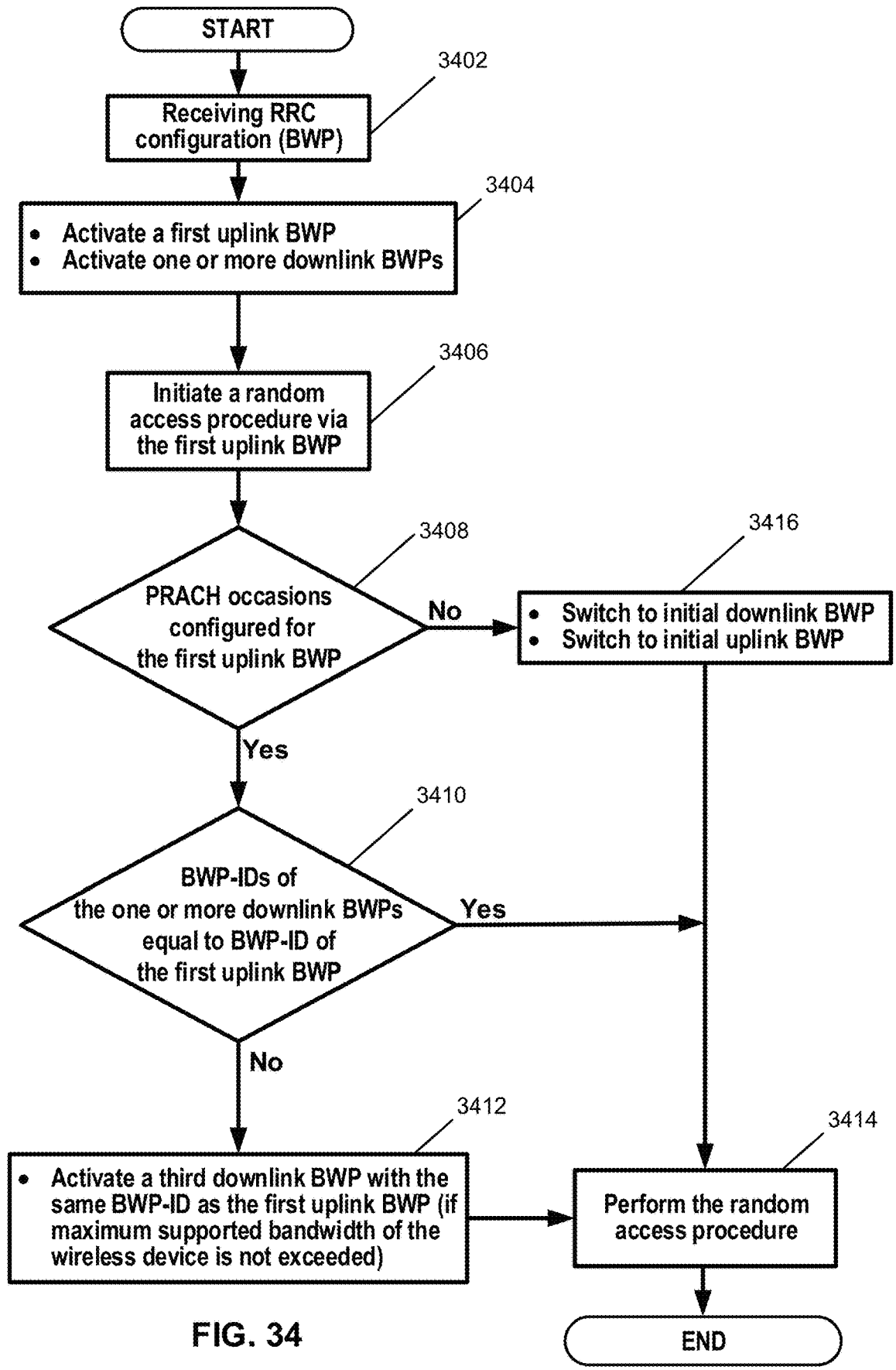
FIG. 34 shows an example method for BWP activation for a random access procedure using multiple active BWPs.

FIG. 34 shows an example method for BWP activation for a random access procedure using multiple active BWPs. A wireless device may determine to activate a downlink BWP or to refrain from activating a downlink BWP, for example, based on matching BWP-IDs between a downlink BWP and an active uplink BWP, not exceeding a maximum supported bandwidth, and/or starting a random access procedure. The method may be accomplished by systems and apparatuses described herein, for example, the base station 3224 and wireless device 3226 of FIG. 32. At step 3402, the wireless device may receive an RRC configuration regarding BWPs. At step 3404, the wireless device may activate a first uplink BWP and a multiple downlink BWPs. At step 3406, the wireless device may initiate a random access procedure via the first uplink BWP. At step 3408, the wireless device may determine that the PRACH occasions are configured for the first uplink BWP. At step 3410, the wireless device may determine that the BWP-IDs of the multiple downlink BWPs are not equal to the BWP-ID of the first uplink BWP. At step 3412, the wireless device may activate a third downlink BWP with a same BWP-ID as the first uplink BWP, for example, based on a maximum supported bandwidth not being exceeded. At step 3414, the wireless device may perform the random access procedure.

Alternate processes may also be possible through the method. At step 3410, the wireless device may determine that at least one of the BWP-IDs of the multiple downlink BWPs are equal to the BWP-ID of the first uplink BWP. At step 3414, the wireless device may perform the random access procedure. At step 3408, the wireless device may determine that the PRACH occasions are not configured for the first uplink BWP. At step 3416, the wireless device may switch to an initial downlink BWP and/or switch to an initial uplink BWP. At step 3414, the wireless device may perform the random access procedure.

A wireless device may operate via a first uplink BWP of a cell and a first downlink BWP of the cell. The first uplink BWP may be indicated (e.g., identified) by a first uplink BWP-specific index. The first downlink BWP may be indicated (e.g., identified) by a first downlink BWP-specific index. The wireless device may initiate a random access procedure (e.g., contention based, contention-free, etc.) via the first uplink BWP. The wireless device may activate a third downlink BWP, of the cell, associated with a third downlink BWP-specific index, for example, based on one or more PRACH occasions are configured, by a base station, for the first uplink BWP, and/or based on the first downlink BWP-specific index being different from the first uplink BWP-specific index. The third downlink BWP-specific index may be same as (or different from) the first uplink BWP-specific index. The wireless device may keep the first downlink BWP in an active state.

The wireless device may activate a third downlink BWP, for example, based on the wireless device supporting multiple active BWPs (e.g., the first downlink BWP and the third downlink BWP) in the cell, and/or based on a total bandwidth of the multiple active BWPs of the cell comprising the third downlink BWP not exceeding a maximum bandwidth the wireless device is able to support. The wireless device may perform the random access procedure via the first uplink BWP and the third downlink BWP, for example, based on the activating the third downlink BWP. The wireless device may continue monitoring the first downlink BWP, for example, based on the random access procedure.

A wireless device may receive, from a base station, one or more configuration parameters. The one or more configuration parameters may comprise downlink BWP-specific indexes for downlink BWPs and uplink BWP-specific indexes for uplink BWPs. Each of the uplink BWPs may be in one of an active state or an inactive state. The active state of a first uplink BWP may comprise sending a first uplink signal (e.g., PUCCH, PUSCH, etc.) via the first uplink BWP. The inactive state of a first uplink BWP may comprise refraining from sending a first uplink signal (e.g., PUCCH, PUSCH, etc.) via the first uplink BWP. Each of the downlink BWPs may be in one of an active state or an inactive state. The active state of a first downlink BWP may comprise monitoring a downlink control channel of the first downlink BWP. The inactive state of a first downlink BWP may comprise refraining from monitoring a downlink control channel of the first downlink BWP.

The wireless device may activate at least two downlink BWPs of the downlink BWPs and/or a first uplink BWP of the uplink BWPs. The activating the at least two downlink BWPs may comprise activating a first downlink BWP of the at least two downlink BWPs in a first slot and activating a second downlink BWP of the at least two downlink BWPs in a second slot. The wireless device may activate the first uplink BWP in a third slot. The first slot, the second slot, and/or the third slot may be different.

The wireless device may initiate a random-access procedure via the first uplink BWP. The first uplink BWP may be indicated (e.g., identified) by, or associated with, a first uplink BWP-specific index. The random-access procedure may be contention-based. 15861 The wireless device may determine that at least two downlink BWP-specific indexes of the at least two downlink BWPs may be different from the first uplink BWP-specific index of the first uplink BWP, for example, based on initiating the random access procedure. The wireless device may select at least one downlink BWP of the at least two downlink BWPs, for example, based on one or more criteria and/or based on determining that at least a downlink BWP-specific index is different from an uplink BWP-specific index. The wireless device may switch from the at least one downlink BWP to a second downlink BWP associated with a second downlink BWP-specific index. The second downlink BWP-specific index may be the same as (or different from) the first uplink BWP-specific index.

One or more criteria of determining a downlink BWP may be based on a value of a BWP-specific index. The determining of a downlink BWP may comprise selecting a BWP with a lowest downlink BWP-specific index among at least two downlink BWP-specific indexes of the at least two downlink BWPs. The determining of the downlink BWP may comprise selecting a BWP with a highest downlink BWP-specific index among at least two downlink BWP-specific indexes of the at least two downlink BWPs. The determining of the downlink BWP may comprise selecting a BWP of the at least two downlink BWPs that is a secondary downlink BWP.

A determining of the downlink BWP may comprise selecting a BWP with a lowest numerology index among the at least two downlink BWPs. The determining may comprise selecting a BWP with a highest numerology index among the at least two downlink BWPs. The determining of the downlink BWP may comprise selecting a BWP of the at least two downlink BWPs with a numerology index the same as or similar to a second numerology index of the second downlink BWP.

A determining of a downlink BWP may comprise selecting one or more BWPs of the at least two downlink BWPs. The one or more BWPs may be configured with a common search space. The wireless device may monitor the common search space to receive a random-access response.

The wireless device may send a preamble via a PRACH resource of the first uplink BWP, for example, based on the switching of the downlink BWP. The wireless device may monitor at least one downlink control channel of the second downlink BWP for detecting a random access response, for example, based on sending the preamble.

A base station may send, to a wireless device that may receive, one or more configuration parameters comprising: downlink bandwidth part (BWP)-specific indexes for downlink BWPs; and uplink BWP-specific indexes for uplink BWPs. The wireless device may activate at least two downlink BWPs of the downlink BWPs. The wireless device may activate a first uplink BWP of the uplink BWPs. The wireless device may initiate a random access procedure via the first uplink BWP. The wireless device may determine that each downlink BWP-specific index of the at least two downlink BWPs is different from an uplink BWP-specific index of the first uplink BWP. The wireless device may select a first downlink BWP of the at least two downlink BWPs based on the determining. The wireless device may switch from the first downlink BWP to a second downlink BWP, of the downlink BWPs, associated with a second downlink BWP-specific index that is the same as the uplink BWP-specific index. The wireless device may send, via the first uplink BWP for the random access procedure, a preamble. The wireless device may monitor at least one downlink control channel of the second downlink BWP for a random access response. The wireless device may activate the second downlink BWP. The wireless device may refrain from switching (e.g., may not switch) from a downlink BWP, of the at least two downlink BWPs, to the second downlink BWP. The downlink BWP may be different from the first downlink BWP. Each of the downlink BWPs may be in one of an active state and an inactive state. The active state of a first downlink BWP may comprises monitoring a downlink control channel of the first downlink BWP. The inactive state of a first downlink BWP may comprise refraining from monitoring (e.g., not monitoring) a downlink control channel of the first downlink BWP. The wireless device may activate the first downlink BWP in a first slot. The wireless device may activate the second downlink BWP in a second slot. The wireless device may activate first uplink BWP in a third slot. Each of the first slot, the second slot, and the third slot may be different slots. The wireless device may select a downlink BWP associated with at least one of: a lowest or highest downlink BWP-specific index relative to downlink BWP-specific indexes associated with the at least two downlink BWPs; or a lowest or highest BWP-specific numerology relative to BWP-specific numerologies associated with the at least two downlink BWPs. The wireless device may select a first downlink BWP based on whether the first downlink BWP is a primary BWP or a secondary BWP. The wireless device may select a downlink BWP, of the at least two downlink BWPs, that is a secondary BWP. Each of the downlink BWPs may be associated with a BWP-specific numerology. The wireless device may determine a first downlink BWP baaed on a selected BWP specific numerology among at least two BWP specific numerologies of the at least two downlink BWPs, wherein the selected BWP specific numerology may be same as a second BWP specific numerology of the second downlink BWP. The wireless device may determine a selected downlink BWP, among the at least two downlink BWPs, configured with a common search space set. The wireless device may select a downlink BWP, among the at least two downlink BWPs, without a common search space set. The wireless device may select a downlink BWP based on whether the downlink BWP is a default BWP or a non-default BWP. The wireless device may select a downlink BWP, of the at least two downlink BWPs, that is a non-default BWP. The wireless device may switch from the first downlink BWP to the second downlink BWP. The wireless device may maintain the first downlink BWP in an active state. The wireless device may deactive the first downlink BWP. The wireless device switching from the first downlink BWP to the second downlink BWP may comprise the wireless device deactivating the first downlink BWP.

A base station may send, to a wireless device that may receive, one or more configuration parameters. The one or more configuration parameters may comprise downlink bandwidth part (BWP)-specific indexes for downlink BWPs and/or uplink BWP-specific indexes for uplink BWPs. The wireless device may activate a first downlink BWP of the downlink BWPs and a first uplink BWP of the uplink BWPs. The wireless device may initiate a random access procedure via the first uplink BWP. The wireless device may determine that a downlink BWP-specific index of the first downlink BWP is different from an uplink BWP-specific index of the first uplink BWP. The wireless device may activate a second downlink BWP, of the downlink BWPs, associated with a second downlink BWP-specific index that is the same as the uplink BWP-specific index. The wireless device may activate the second downlink BWP based on determining that a downlink BWP-specific index of the first downlink BWP is different from an uplink BWP-specific index of the first uplink BWP. The wireless device may send, via the first uplink BWP for the random access procedure, a preamble. The wireless device may monitor at least one downlink control channel of the second downlink BWP for a random access response. Based on activating the second downlink BWP, the wireless device may deactivate the first downlink BWP. Activating the first downlink BWP, the first uplink BWP, and the second BWP may comprise: activating the first downlink BWP in a first slot; activating the second downlink BWP in a second slot; and/or activating the first uplink BWP in a third slot. Each of the first slot, the second slot, and the third slot may be different slots. The wireless device may select the first downlink BWP from the downlink BWPs by determining a downlink BWP associated with at least one of: a lowest or highest downlink BWP-specific index relative to downlink BWP-specific indexes associated with the downlink BWPs; and/or a lowest or highest BWP-specific numerology relative to BWP-specific numerologies associated with the downlink BWPs. The wireless device may select the first downlink BWP, for example, based on whether a downlink BWP is a primary BWP or a secondary BWP. The wireless device may select the first downlink BWP, for example, based on whether the downlink BWP is a default BWP or a non-default BWP. The wireless device may switch from the first downlink BWP to the second downlink BWP. The wireless device may deactivate the first downlink BWP. The switching from the first downlink BWP to the second downlink BWP may comprise deactivating the first downlink BWP.

A base station may send, to a wireless device that may receive, one or more configuration parameters. The one or more configuration parameters may comprise downlink bandwidth part (BWP)-specific indexes for downlink BWPs, and/or uplink BWP-specific indexes for uplink BWPs. The wireless device may activate a first downlink BWP of the downlink BWPs and a first uplink BWP of the uplink BWPs. The wireless device may initiate a random access procedure via the first uplink BWP. The wireless device may determine that a downlink BWP-specific index of the first downlink BWP is different from an uplink BWP-specific index of the first uplink BWP. Based on the determining that a downlink BWP-specific index of the first downlink BWP is different from an uplink BWP-specific index of the first uplink BWP, the wireless device may perform at least one of: activating a second downlink BWP, of the downlink BWPs, associated with a second downlink BWP-specific index that is the same as the uplink BWP-specific index; deactivating the first downlink BWP; or switching from the first downlink BWP to the second downlink BWP. The wireless device may monitor at least one downlink control channel of the second downlink BWP for a random access response. Performing at least one of the above steps may be based on at least one of: a downlink BWP-specific index of the first downlink BWP; a BWP-specific numerology of the first downlink BWP; a downlink BWP-specific index of the second downlink BWP; and/or a BWP-specific numerology of the second downlink BWP. The base station may send, to the wireless device that may receive, via the at least one downlink control channel of the second downlink BWP, a random access response. The wireless device may switch from the first downlink BWP to the second downlink BWP, for example, based on the receiving the random access response. The wireless device may initiate a random access procedure. The wireless device may initiate the random access procedure, for example, by receiving a physical downlink control channel (PDCCH) order. The wireless device may send a random access preamble via the first uplink BWP, for example, based on the PDCCH order. Some wireless devices may be configured with up to a maximum quantity of resources (e.g., BWPs). For example, some wireless devices may be configured with up to four BWPs. Other wireless devices may be configured with up to any other quantity of BWPs (e.g., 8, 16, etc.). Some wireless devices (e.g., legacy wireless devices, wireless devices compatible with 3GPP Release 15, or other wireless devices) may activate only one BWP of up to four BWPs at a time. For such wireless devices, at most one BWP (e.g., an uplink BWP and/or a downlink BWP) can be active in a cell (e.g., a primary cell, a secondary cell, etc). Such wireless devices may initiate a random-access procedure associated with a cell (e.g., PCell, SCell), for example, if the active uplink BWP is not configured with random access channel (RACH) resources. Such wireless device switches may switch both the active uplink BWP to the initial uplink BWP and the active downlink BWP to the initial downlink BWP. Such wireless devices may perform the random-access procedure via the initial downlink/uplink BWP.

Some other wireless devices may activate at least two uplink BWPs on a cell, for example, if multiple active uplink BWPs are supported for a cell. A wireless device and/or a base station may have difficulty determining to which active uplink BWP(s) of the at least two uplink BWPs the wireless device and/or the base station should switch from to the initial uplink BWP, for example, if the wireless device initiates random access and the at least two uplink BWPs are not configured with RACH resources. A wireless device and/or a base station may have difficulty determining to which active downlink BWP(s) of the at least two downlink BWPs the wireless device should switch to from the initial downlink BWP, for example, if there are multiple active downlink BWPs (e.g., at least two downlink BWPs on the cell). A misalignment between the base station and the wireless device may result, for example, if the base station does not know which active downlink BWP(s) is switched by the wireless device.

The wireless device may address the above issues, for example, by determining an uplink BWP and/or a downlink BWP based on a predefined rule. The wireless device may select an uplink BWP, among the at least two uplink BWPs, based on the selected uplink BWP having the lowest or highest BWP index among the at least two uplink BWPs. The wireless device may select an uplink BWP, among the at least two uplink BWPs, designated as a primary or secondary BWP (e.g., default BWP, initial uplink BWP, etc.), or based on any other indication (e.g., per a predetermined rule).

Some wireless devices (e.g., legacy wireless devices and/or other wireless devices) may send (e.g., transmit) a random access preamble via an active uplink BWP, for example, if the wireless device initiates random access. The wireless device may start a random-access response window. The wireless device may monitor an active downlink BWP for a random-access response, for example, if the random access response window is running. The random access response window may be running based on sending (e.g., transmitting) the random access preamble. The base station may retransmit the random access preamble, for example, after the random access response window expires. The base station may configure a duration of the random access response window in terms of slots in the active uplink BWP. The absolute time duration of a random access response window may be different in each downlink BWP, for example, based on subcarrier spacing (SCS) configuration (or numerology). Each downlink BWP may have an independent SCS configuration (or numerology). The random access response window may be four (4) slots (or any other quantity of slots or durations) which may be equal to 2 ms, 1 ms, or 0.5 ms, for example, if the SCS of the active downlink BWP is 15 kHz, 30 kHz, or 15 kHz, respectively. The wireless device may monitor some or all of the active downlink BWPs for a random access response, for example, if the wireless device activates multiple active downlink BWPs. The wireless device may activate multiple active downlink BWPs, for example, based on sending (e.g., transmitting) the random access preamble. Each downlink BWP may have a different absolute time. A first random access response window of a first active downlink BWP may expire before a second random access response window of a second active downlink BWP expires. The wireless device may retransmit two (or more) random access preambles, for example: a first random access preamble if the first random access response window expires, and a second random access preamble if the second random access response window expires. The wireless device may retransmit the random access preamble based on or in response to an expiry of the random access response window. Retransmission of random access preambles may increase interference to other cells and/or users and/or may require the wireless device to monitor two (or more) random access responses which may increase the power consumption of the wireless device.

A wireless device may be enhanced to avoid the above issues, for example, by being configured to resend (e.g., retransmit) a random access preamble only if all (or at least more than one of) the random access response windows of multiple active downlink BWPs expire (e.g., if multiple active downlink BWPs are monitored for a random-access response). For example, the wireless device may resend (e.g., retransmit) a random-access preamble only if the random access response window with the longest absolute time duration expires.

Figure 35:
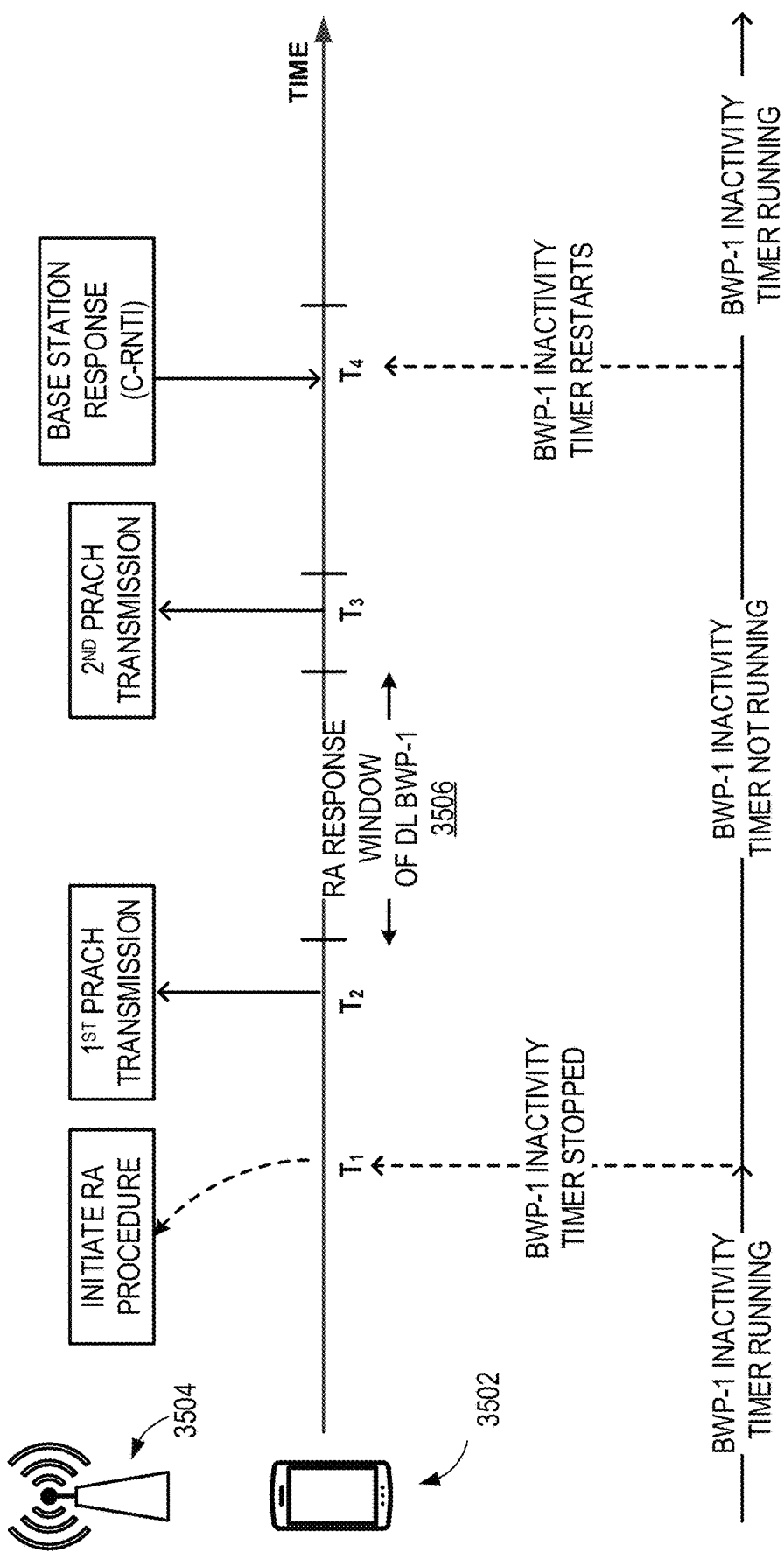
FIG. 35 shows an example of BWP operations.

FIG. 35 shows an example of an RA procedure. A wireless device 3502 may be configured to use an active downlink BWP (e.g., DL BWP-1 in FIG. 28) and an active uplink BWP. The wireless device 3502 may stop a BWP timer (e.g., BWP inactivity timer, such as BWP-1 inactivity timer in FIG. 35), if running, associated with the active downlink BWP, based on initiating an RA procedure (e.g., a contention free RA procedure), at time $T_1$. The wireless device 3502 may send (e.g., transmit) an RA preamble (e.g., a first PRACH transmission) for the RA procedure via the active uplink BWP at time $T_2$. The wireless device 3502 may start an RA response window (e.g., an RA response window of DL BWP-1 3506) to monitor an RA response on the active downlink BWP, for example, after or in response to sending (e.g., transmitting) the RA preamble.

The wireless device 3502 may not successfully receive an RA response, for example, at least until after a RA response window 3506 expires. The wireless device 3502 may resend (e.g., retransmit) an RA preamble (e.g., a second PRACH transmission) via the active uplink BWP (e.g., at time $T_3$), for example, if the wireless device 3502 does not successfully receive an RA response prior to the RA response window 3506 expiring. The wireless device 3502 may complete the RA procedure successfully, for example, if the wireless device receives the RA response at a time that an RA response window is running. The RA response may be addressed to a C-RNTI of the wireless device 3502. The wireless device 3502 may restart the BWP timer (e.g., at time $T_4$), based on receiving the RA response addressed to the C-RNTI of the wireless device 3502.

Some wireless devices (e.g., legacy wireless devices and/or other wireless devices) may stop a BWP timer (e.g., BWP inactivity timer) associated with an active DL BWP of a secondary cell, for example, if the wireless device initiates an RA procedure for the secondary cell. Such wireless device may avoid an expiry of the BWP timer during the RA procedure, for example, by the stopping the BWP timer. The expiry of the BWP timer may interrupt an RA procedure on the active DL BWP.

A wireless device may receive an RA response of the RA procedure for a secondary cell on a primary cell. The wireless device may stop a second BWP timer (e.g., BWP inactivity timer) associated with a second active DL BWP of a primary cell, for example, based on the initiating the RA procedure for the secondary cell. The wireless device may successfully receive (e.g., may not miss the receiving of) the RA response, for example, by the stopping the second BWP timer. The wireless device may stop the BWP timer (e.g., BWP inactivity timer) associated with an active DL BWP of the secondary cell and the second BWP timer (e.g., BWP inactivity timer) associated with the second active DL BWP of the primary cell, for example, based on initiating the RA procedure.

Figure 36A:
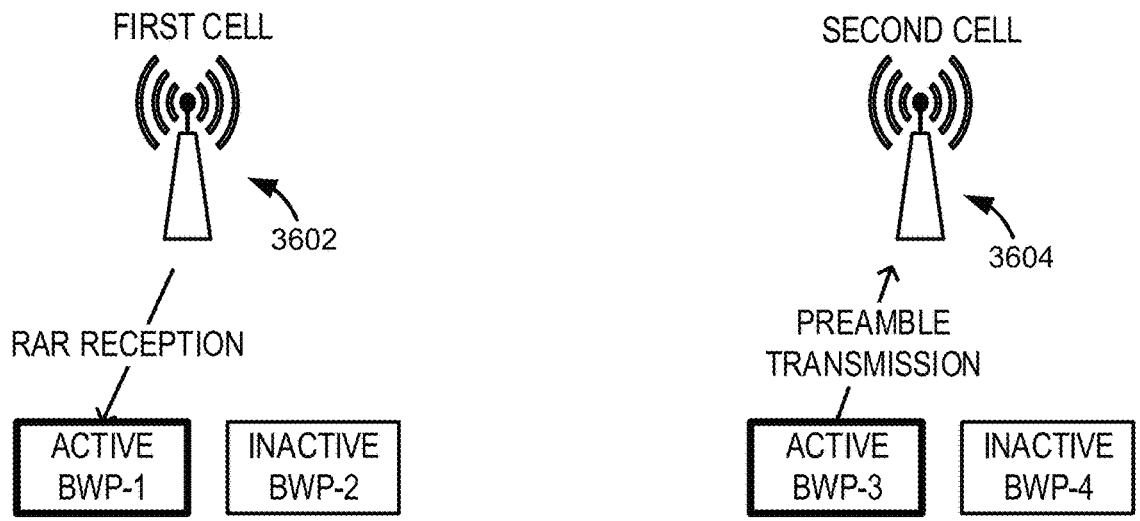
FIG. 36A and FIG. 36B show an example of BWP operations.
Figure 36B:
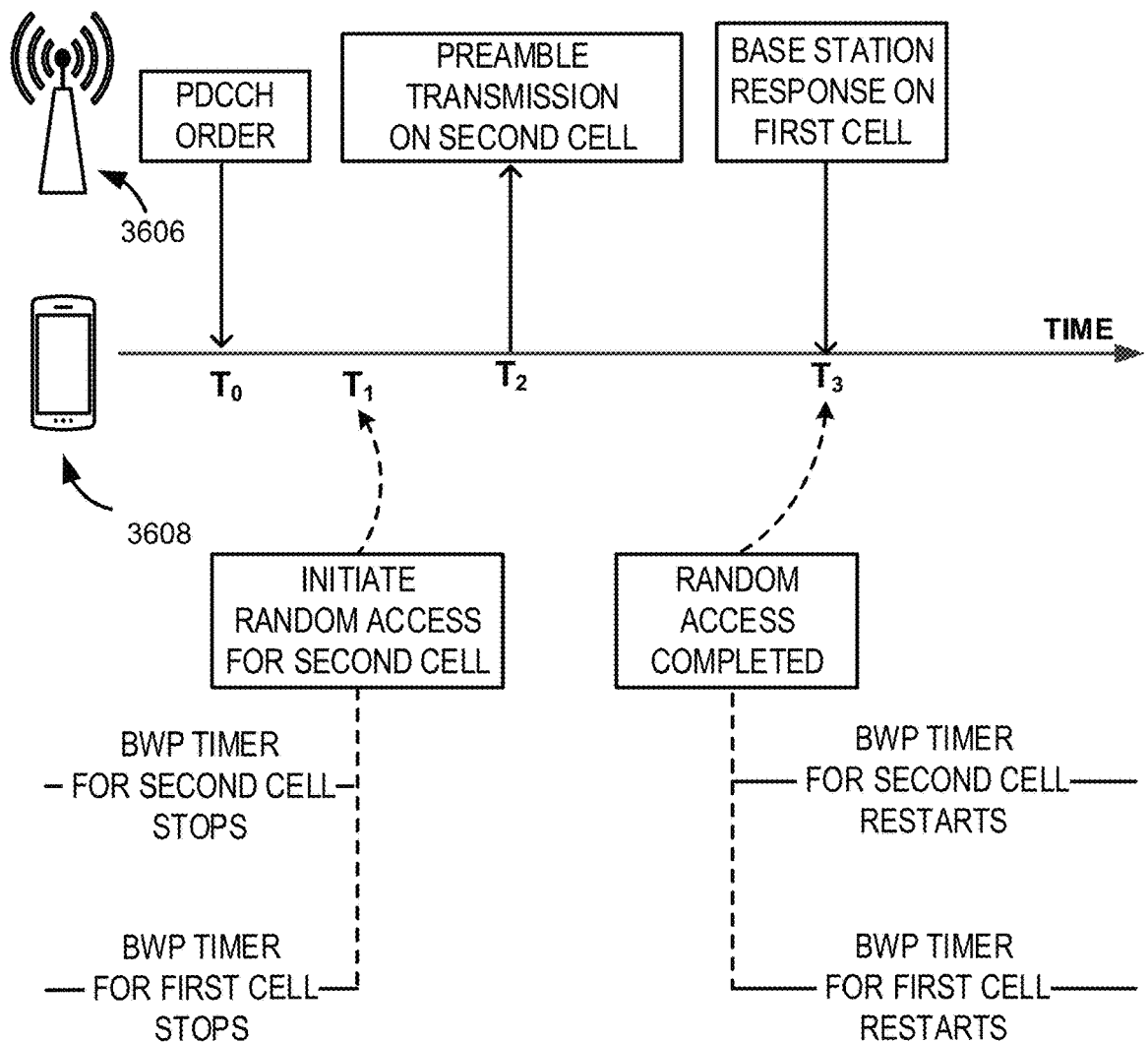

FIG. 36A and FIG. 36B show an example RA procedure for an SCell. A wireless device 3608 may be configured to use a first active downlink BWP (e.g., active BWP-1) of a first cell 3602 (e.g., a PCell) and a second active downlink BWP (e.g., active BWP-3 in FIG. 36A) of a second 3604 (e.g., an SCell) and an active uplink BWP of the second 3604.

The wireless device 3608 may receive a PDCCH order to initiate a RA procedure for the second cell 3604 (e.g., at time $T_0$). The wireless device 3608 may initiate an RA procedure for a beam failure recovery of the second cell 3604 (e.g., at time $T_1$). The wireless device 3608 may stop a first BWP timer (e.g., BWP inactivity timer) (e.g., if running) associated with the first active downlink BWP and may stop a second BWP timer (e.g., BWP inactivity timer) (e.g., if running) associated with the second active downlink BWP, for example, based on initiating an RA procedure (e.g., a contention-free RA procedure), at time $T_1$. The wireless device 3608 may send (e.g., transmit) an RA preamble for the RA procedure via the active uplink BWP, for example, at time $T_2$. The wireless device 3608 may start an RA response window to monitor an RA response on the first active downlink BWP, for example, after or in response to sending (e.g., transmitting) the RA preamble.

The wireless device 3608 may not successfully receive an RA response, for example, by the time that the RA response window expires. The wireless device 3608 may retransmit an RA preamble via the active uplink BWP based on not successfully receiving an RA response at least by the time that the RA response window expires. The wireless device 3608 may complete the RA procedure for a second cell (e.g., an SCell) successfully, for example, if the wireless device 3608 receives the RA response at a time that the RA response window is running. The RA response may be addressed to C-RNTI of the wireless device 3608. The wireless device 3608 may restart the first BWP timer (e.g., BWP inactivity timer) and the second BWP timer (e.g., BWP inactivity timer) at time T3, for example, after or in response to receiving the RA response addressed to the C-RNTI of the wireless device 3608.

A misalignment may occur between a BWP on which a RA response is sent (e.g., transmitted) and a BWP on which a wireless device monitors for the RA response, for example, if the wireless device supports multiple active BWPs in a cell. The wireless device may stop a BWP timer (e.g., BWP inactivity timer) of the BWP on which the wireless device monitors for the RA response. This misalignment may lead to unnecessary delay, data loss, and/or signaling overhead. Recovery from the misalignment caused by the wireless device not successfully receiving (e.g., missing) an RA response may result in a transmission delay and/or signaling overhead, which may increase the latency of the RA procedure and/or waste radio resources due to redundant transmission(s) of the RA response.

A wireless device may be configured with multiple active UL BWPs in a cell. A wireless device may select an UL BWP, from among multiple active UL BWPs, to send (e.g., transmit) an RA preamble, for example, if the wireless device initiates an RA procedure (e.g., a contention-free RA procedure, a contention-based RA procedure, etc.). A wireless device may have multiple active DL BWPs in a cell. A wireless device may select an DL BWP, from among multiple active DL BWPs, to monitor an RA response, for example, if the wireless device initiates an RA procedure (e.g., contention-free RA procedure, a contention-based RA procedure, etc.). The wireless device may refrain from monitoring the multiple active DL BWPs to receive the RA response. By refraining from monitoring all (or at least some) of multiple active DL BWPs, a wireless device may increase efficiency and reduce power consumption.

A wireless device may be configured with multiple active DL BWPs in a cell, such as BWP-1 and BWP-2. The wireless device may monitor the multiple active DL BWPs (e.g., BWP-1 and BWP-2) to receive an RA response of an RA procedure, for example, if the wireless device initiates an RA procedure (e.g., contention-free RA procedure, a contention-based RA procedure, etc.). The BWP-1 and the BWP-2 may be configured, for example, with different numerologies (e.g., subcarrier spacings). A first absolute time duration of an RA response window of the BWP-1 may be different from (e.g., shorter or longer than) a second absolute time duration of an RA response window of the BWP-2. A first absolute time duration of an RA response window of the BWP-1 may be four times longer than a second absolute time duration of an RA response window of the BWP-2, for example, if the BWP-1 is configured with 15 KHz subcarrier spacing and the BWP-2 is configured with 60 KHz subcarrier spacing. The wireless device may resend (e.g., retransmit) a first RA preamble for the RA procedure, for example, if the first absolute time duration ends and the second absolute time duration is running. The wireless device may resend (e.g., retransmit) a second RA preamble for the RA procedure, for example, if the second absolute time duration ends. Sending (e.g., transmitting) multiple preambles (e.g., the first preamble and the second RA preamble), for example, may be inefficient and/or may increase interference due to multiple preamble transmissions, possibly each with an increased transmission power.

A wireless device may start a first RA response window and a second RA response window to receive an RA response (e.g., a same response), for example, after or in response to sending (e.g., transmitting) a first preamble. Sending (e.g., transmitting) a second preamble, for example, after or in response to the first RA response window (or the second RA response window) expiring, may be inefficient and/or consume excessive power. RA procedures may be improved, for example, to provide greater downlink radio efficiency and reduced uplink signaling overhead if a wireless device supports multiple active BWPs in a cell.

A wireless device may receive, from a base station, one or more messages comprising configuration parameters. The one or more messages may comprise one or more RRC messages (e.g., RRC connection reconfiguration message, RRC connection reestablishment message, and/or RRC connection setup message). The configuration parameters may comprise, for example, configuration parameters for a cell. The configuration parameters may comprise, for example, BWP configuration parameters for a plurality of BWPs. The plurality of BWPs may comprise a first plurality of BWPs of the cell comprising a first DL BWP and a second DL BWP. Each of the plurality of BWPs may be identified by a BWP-specific index. Each of the plurality of BWPs may be associated with a BWP-specific inactivity timer.

A wireless device may receive (e.g., in a first slot) first DCI indicating switching a first active BWP of the cell from a first active DL BWP to the first DL BWP. The first DCI may comprise a first BWP indicator. The wireless device may determine that the first DCI indicates BWP switching, for example, based on the first BWP indicator indicating a BWP different from the first active DL BWP. The wireless device may start a first inactivity timer associated with the first DL BWP, for example, after or in response to switching the first active BWP from the first active DL BWP to the first DL BWP.

A wireless device may receive (e.g., in a first slot) first DCI and/or a first MAC CE indicating activating the first DL BWP of the cell. The first DCI and/or the first MAC CE may comprise a first BWP indicator. The wireless device may determine that the first DCI and/or the first MAC CE indicates BWP activation, for example, based on the first BWP indicator indicating the first DL BWP. The wireless device may start a first inactivity timer associated with the first DL BWP, for example, after or in response to activating the first DL BWP.

A wireless device may receive (e.g., in a second slot) second DCI indicating switching a second active BWP of the cell from a second active DL BWP to the second DL BWP. The second DCI may comprise a second BWP indicator. The wireless device may determine that the second DCI indicates BWP switching, for example, based on the second BWP indicator indicating a BWP different from the second active DL BWP. The wireless device may start a second inactivity timer associated with the second DL BWP, for example, after or in response to switching the second active BWP from the second active DL BWP to the second DL BWP.

A wireless device may receive (e.g., in a second slot) second DCI and/or a second MAC CE indicating activating the second DL BWP of the cell. The second DCI and/or the second MAC CE may comprise a second BWP indicator. The wireless device may determine that the second DCI and/or the second MAC CE indicates BWP activating, for example, based on the second BWP indicator indicating the second DL BWP. The wireless device may start a second inactivity timer associated with the second DL BWP, for example, after or in response to the activating the second DL BWP.

The wireless device may activate, for example, at least two BWPs (e.g., the first DL BWP and the second DL BWP) of the first plurality of BWPs. The activating each BWP of the at least two BWPs of the cell may be performed, for example, in different time slots. The wireless device may start a BWP-specific inactivity timer of the each of the at least two BWPs, for example, after or in response to activation the each of the at least two BWPs. The first DL BWP and the second DL BWP of the first plurality of BWPs of the cell may be active at the same time. The first inactivity timer and the second inactivity timer may be, for example, running at the same time.

Figure 37:
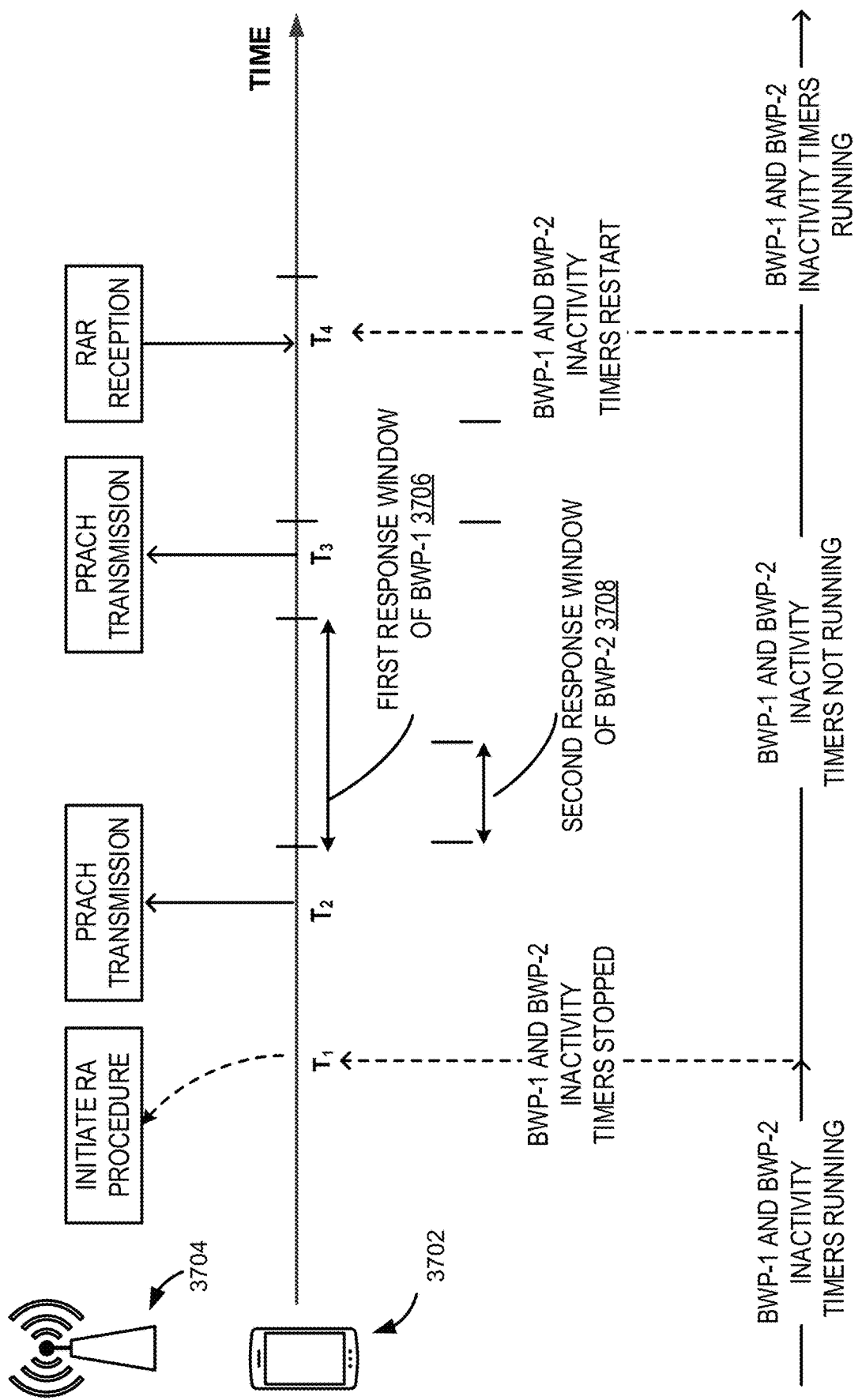
FIG. 37 shows an example of multiple active BWP operations.

FIG. 37 shows an example of multiple active BWP operations. A wireless device may initiate an RA procedure (e.g., a contention free RA procedure), for example, at time $T_1$. The RA procedure may be for a second cell (e.g., SCell). The RA procedure may be for a first cell (e.g., PCell). The RA procedure may be for a beam failure recovery procedure (e.g., a beam failure recovery procedure of the first cell or of a second cell). The initiating the RA procedure may be triggered, for example, after or in response to the wireless device receives a PDCCH order. The initiating the RA procedure may be triggered, for example, by detecting, by the wireless device, a beam failure.

A wireless device 3702 may stop BWP-specific inactivity timers corresponding to at least two BWPs (e.g., a first DL BWP and a second DL BWP) of the cell. The wireless device 3702 may stop a first inactivity timer of the first DL BWP (e.g., BWP-1) and a second inactivity timer of the second DL BWP (e.g., BWP-2) of the cell (e.g., at time $T_1$). The wireless device 3702 may stop a third BWP-specific inactivity timer associated with a third active DL BWP of the second cell, for example, based on the initiating the RA procedure if the RA procedure is for the second cell.

The wireless device may send (e.g., transmit) an RA preamble, for example, based on initiating a RA procedure (e.g., at time $T_2$). The RA preamble may be associated with (e.g., dedicated to) the wireless device 3702. The random access preamble may be wireless device-specific and/or may be configured for the wireless device 3702 by a base station 3704.

The wireless device 3702 may send (e.g., transmit), to the base station 3704, the RA preamble. The wireless device 3702 may send (e.g., transmit) the RA preamble via uplink resources of the second cell, for example, if the RA procedure is for the second cell. The wireless device 3702 may send (e.g., transmit) the RA preamble via uplink resources of the first cell, for example, if the RA procedure is for the first cell. Each of the at least two BWPs may be configured, for example, with at least one control channel (e.g., common control channel, wireless device-specific control channel, etc). At least one BWP of the at least two BWPs may not be configured with at least one control channel.

The wireless device 3702 may monitor at least one PDCCH occasion for DCI on each of the at least two BWPs. The wireless device 3702 may monitor the at least one PDCCH occasion, for example, based on sending (e.g., transmitting) the RA preamble and/or base on stopping the BWP-specific inactivity timers corresponding to the at least two BWPs. The wireless device 3702 may start a first response window 3706 (e.g., an ra-ResponseWindow) at a first PDCCH occasion on the first DL BWP of the cell, for example, based on sending (e.g., transmitting) the RA preamble. The wireless device 3702 may start a second response window 3708 (e.g. ra-ResponseWindow) at a second PDCCH occasion on the second DL BWP of the cell, for example, based on sending (e.g., transmitting) the RA preamble. The first response window 3706 and the second response window 3708 may be configured, for example, by a higher layer (e.g., a MAC layer, an RRC layer, etc.).

The wireless device 3702 may monitor the first PDCCH occasion for DCI, for example, if the first response window 3706 is running. The wireless device 3702 may monitor the second PDCCH occasion for the DCI, for example, if the second response window 3708 is running. The DCI may be indicated (e.g., identified, scrambled, etc.) by an RA-RNTI of the wireless device 3702. The DCI may be indicated (e.g., identified, scrambled, etc.) by a C-RNTI of the wireless device 3702.

The base station 3704 may select a DL BWP to send (e.g., transmit) the DCI. The DCI may be for an RA response. The determining the DL BWP may be based on an implementation of the base station 3704. The base station 3704 may select, for example, the first DL BWP to send (e.g., transmit) the DCI. The base station 3704 may select, for example, the second DL BWP to send (e.g., transmit) the DCI. The base station 3704 may send (e.g., transmit) the DCI, for example, on each of the at least two BWPs (e.g., on the first DL BWP and the second DL BWP).

The RA procedure may be completed successfully, for example, if the wireless device 3702 receives the DCI (e.g., on the first DL BWP or on the second DL BWP). The wireless device 3702 may reset the first response window 3706 and/or the second response window 3708 (e.g., if running), for example, if the wireless device 3702 receives the DCI on the first PDCCH occasion. The wireless device 3702 may reset the second response window 3708 and/or the first response window 3706 (e.g., if running), for example, if the wireless device 3702 receives the DCI on the second PDCCH occasion. The first response window 3706 may be longer than the second response window 3708. The wireless device 3702 may not receive the DCI on the second PDCCH occasion, for example, if the second response window 3708 is running (e.g., at least until the second response window 3708 expires). The wireless device 3702 may refrain from sending (e.g., transmitting) a second RA preamble, for example, based on not receiving the DCI on the second PDCCH occasion in the second response window (e.g., if the first response window is running) The wireless device 3702 may send (e.g., transmit) a second RA preamble, for example, based on not receiving the DCI on the second PDCCH occasion in the second response window 3708 (e.g., if the first response window 3706 is not running and/or the first response window 3706 has expired). The wireless device 3702 may send (e.g., transmit) the second RA preamble, for example, if a corresponding response window of each of the at least two BWPs expires. At least one BWP of the at least two BWPs may have a longest response window. The wireless device 3702 may send (e.g., transmit) the second RA preamble, for example, if the longest response window expires (e.g., at time T3). The wireless device 3702 may refrain from sending (e.g., transmitting) the second RA preamble at least until a corresponding response window of each of the at least two BWPs expires.

The RA procedure may be completed successfully, for example, if the wireless device 3702 receives the DCI (e.g., on the first DL BWP or the second DL BWP). The wireless device 3702 may restart BWP-specific inactivity timers corresponding to the at least two BWPs (e.g., first DL BWP and the second DL BWP), for example, based on the RA procedure being successfully completed. The wireless device 3702 may restart the first inactivity timer of the first DL BWP and the second inactivity timer of the second DL BWP (e.g., at time $T_4$).

A base station (e.g., the base station 3702) may refrain from configuring a DL BWP with a common search space. A wireless device (e.g., the wireless device 3704) may not successfully receive DCI identified by an RA-RNTI, for example, if the wireless device 3704 is not configured with the common search space. The wireless device 3704 may stop each BWP-specific inactivity timer of each active DL BWP configured with a common search space, for example, based on the initiating the RA procedure.

A base station may send (e.g., transmit) an RA response (e.g., DCI) on or using at least one of the active DL BWPs of the cell configured with a common search space. The base station may send (e.g., transmit) the RA response on or using BWP-1, for example, if the BWP-1 is configured with a common search space. The base station may send (e.g., transmit) the RA response on or using BWP-2, for example, if the BWP-2 is configured with a common search space. The base station may send (e.g., transmit) the RA response on both BWP-1 and BWP-2, for example, if both the BWP-1 and BWP-2 are configured with a common search space.

A wireless device may monitor for the RA response in each active DL BWP configured with a common search space (e.g., BWP-1 and/or BWP-2). The wireless device may complete the RA procedure successfully, for example, based on receiving the RA response on at least one of the active DL BWPs of the cell. The wireless device may restart each BWP-specific inactivity timer of each active DL BWP of the cell configured with a common search space (e.g., BWP-1 and/or BWP-2) based on completing the RA procedure successfully.

At least one selected BWP of the at least two BWPs may comprise BWPs of a cell that are configured with a common search space. A wireless device may stop a BWP-specific inactivity timer of each BWP of a first subset of the at least two BWPs (e.g., the first DL BWP and the second DL BWP), for example, based on initiating the RA procedure. Each BWP of the first subset may be configured with a common search space.

The first DL BWP of the wireless device may be configured with a common search space. A second DL BWP of the wireless device may not be configured with a common search space. The wireless device may stop the first inactivity timer of the first DL BWP of the cell, for example, based on initiating the RA procedure.

The wireless device may start a first response window (e.g., ra-ResponseWindow) at a first PDCCH occasion on the first DL BWP of the cell, for example, after or in response to sending (e.g., transmitting) the RA preamble. The first response window may be configured by a higher layer (e.g., a MAC layer, an RRC layer, etc.). The wireless device may monitor the first PDCCH occasion for DCI, for example, if the first response window is running. The DCI may be indicated (e.g., identified, scrambled, etc.) by an RA-RNTI. The DCI may be indicated (e.g., identified, scrambled, etc.) by a C-RNTI of the wireless device.

The RA procedure may be completed successfully, for example, if the wireless device receives the DCI on the first DL BWP. The wireless device may restart the first inactivity timer of the first DL BWP, for example, after or in response to the RA procedure being completed successfully.

The first DL BWP and the second DL BWP of the wireless device may be configured with a common search space. The wireless device may stop the first inactivity timer of the first DL BWP and the second inactivity timer of the second DL BWP of the cell, for example, based on initiating the RA procedure.

The wireless device may determine, based on one or more criteria, at least one BWP (e.g., selected BWP(s)) of the at least two (downlink) BWPs. The wireless device may select the at least one BWP based on initiating the RA procedure. The selected BWP(s) of the at least two BWPs may comprise a BWP, among the at least two BWPs, comprising a lowest numerology (e.g., subcarrier spacing). The selected BWP with the lowest numerology may have a longest RA response window. The wireless device may receive an RA response of the RA procedure, for example, after an expiry of a corresponding RA response window of each of the at least two BWPs except the selected BWP(s).

The selected BWP(s) may comprise a BWP, among the at least two BWPs, a highest numerology (e.g., subcarrier spacing). The selected BWP comprising the highest numerology may have a shortest RA response window. The wireless device may resend (e.g., retransmit) a preamble faster in time, for example, if the one selected BWP is a BWP with the highest numerology.

The first DL BWP may be indicated (e.g., identified) by a first subcarrier spacing. The second DL BWP may be indicated (e.g., identified) by a second subcarrier spacing. The first subcarrier spacing and the second subcarrier spacing may be configured for the wireless device by the base station.

A first subcarrier spacing (e.g., 15 KHz) may be less than a second subcarrier spacing (e.g., 60 KHz). The wireless device may determine that the first subcarrier spacing is less than the second subcarrier spacing. The wireless device may stop the first inactivity timer of the first DL BWP of the cell, for example, based on determining that the first subcarrier spacing is less than the second subcarrier spacing.

A first subcarrier spacing (e.g., 60 KHz) may be greater than a second subcarrier spacing (e.g., 15 KHz). The wireless device may determine that the first subcarrier spacing is greater than the second subcarrier spacing. The wireless device may stop the first inactivity timer of the first DL BWP of the cell, for example, based on determining that the first subcarrier spacing is greater than the second subcarrier spacing.

The wireless device may start a first response window (e.g., ra-ResponseWindow) at a first PDCCH occasion on the first DL BWP of the cell, for example, starting from the end of the sending (e.g., transmitting) the RA preamble. The first response window may be configured by a higher layer (e.g., a MAC layer, an RRC layer, etc.).

The wireless device may monitor the first PDCCH occasion for DCI, for example, if the first response window is running. The DCI may be indicated (e.g., identified, scrambled, etc.) by an RA-RNTI. The DCI may be indicated (e.g., identified, scrambled, etc.) by a C-RNTI of the wireless device. The base station may send (e.g., transmit) the DCI on the first DL BWP of the cell. The base station may select the first DL BWP, for example, based on the first subcarrier spacing being less (or greater) than the second subcarrier spacing.

The RA procedure may be completed successfully, for example, if the wireless device receives the DCI on the first DL BWP. The wireless device may restart the first inactivity timer of the first DL BWP, for example, after or in response to the RA procedure being successfully completed.

A wireless device may receive from a base station, one or more messages. The one or more messages may comprise one or more configuration parameters of a first cell and a second cell. The first cell may comprise a BWPs. A wireless device may activate at least two BWPs of the plurality of BWPs. Each of the at least two BWPs may comprise at least one control channel. Each of the at least two BWPs may be associated with an RA response (RAR) monitoring timer. Activating the at least two BWPs may comprise activating a first BWP of the at least two BWPs in a first slot and activating a second BWP of the at least two BPWs in a second slot. The first slot and the second slot may be different.

A wireless device may initiate an RA procedure. The RA procedure may be for the second cell. The RA procedure may be a contention-free RA procedure of the first cell. A wireless device may send (e.g., transmit) at least one preamble via at least one RA channel resource. The at least one RA channel resource may be on the second cell, for example, if the RA procedure is for the second cell. The at least one RA channel resource may be on the first cell, for example, if the RA procedure is for the first cell.

The wireless device may start a RAR monitoring timer of each of the at least two BWPs, for example, after or in response to sending (e.g., transmitting) the at least one preamble. The wireless device may monitor, for DCI, the at least one control channel of each of the at least two BWPs based on starting the RAR monitoring timer. The DCI may be addressed to C-RNTI. The DCI may be addressed to RA-RNTI. The wireless device may determine an expiry of the RAR monitoring timer of each of the at least two BWPs. The wireless device may send (e.g., transmit) at least one second preamble for the RA procedure, for example, after or in response to determining the expiry of the RAR monitoring timer of the each of the at least two BWPs. The wireless device may determine an expiry of an RAR monitoring timer of all the active BWPs (e.g., at least two BWPs). The wireless device may send (e.g., transmit) at least one second preamble for the RA procedure, for example, after or in response to determining the expiry of the RAR monitoring timer of all active BWPs.

Figure 38:
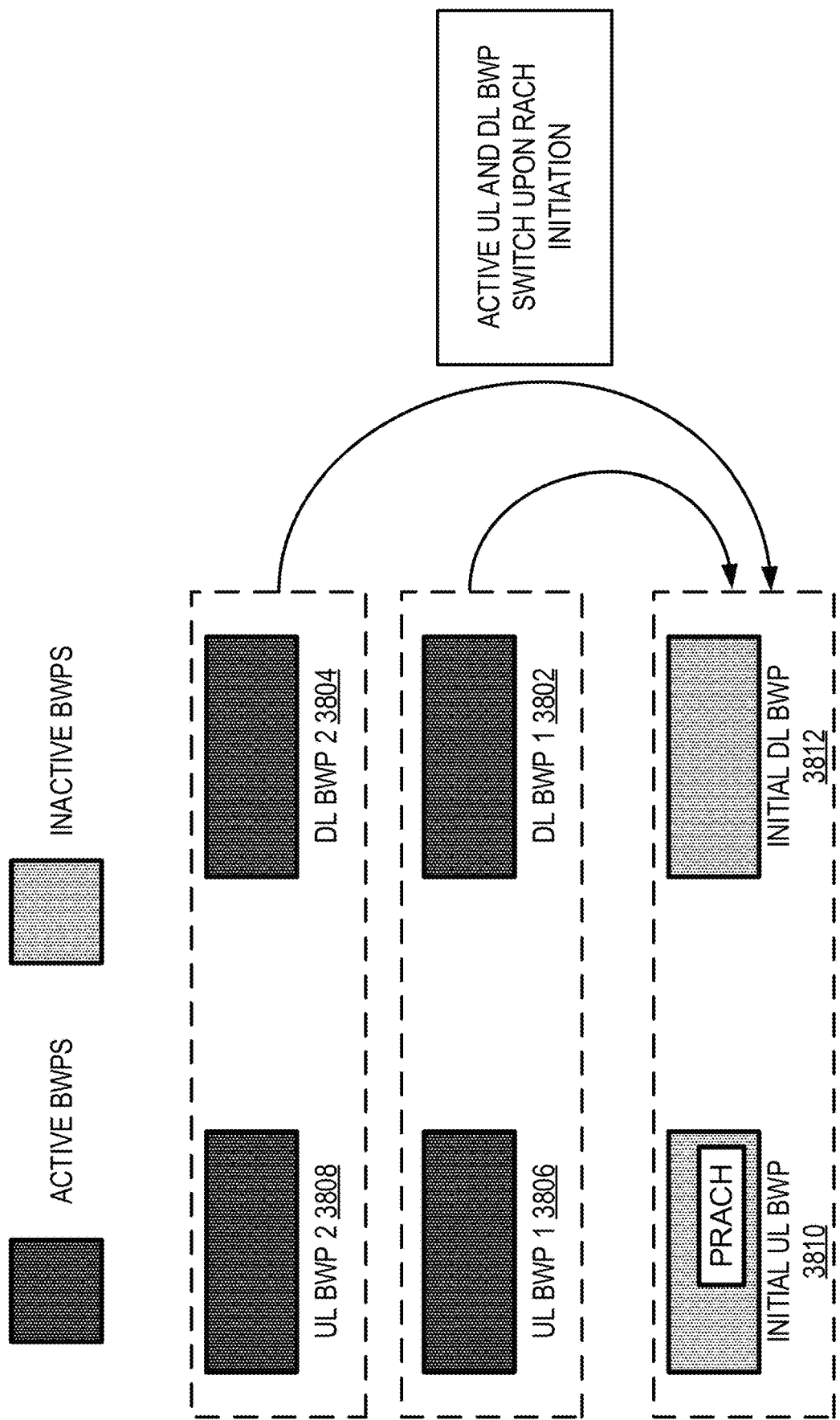
FIG. 38 shows an example of multiple active BWP operations.

FIG. 38 shows an example of multiple active BWP operations. A wireless device may receive, from a base station, one or more messages. The one or more messages may comprise one or more configuration parameters of a first cell. The first cell may comprise a plurality of DL BWPs and a plurality of UL BWPs. Each of the plurality of DL BWPs and each of the plurality of UL BWPs may be indicated (e.g., identified) by a BWP-specific index. Each of the plurality of DL BWPs may be associated with a BWP-specific inactivity timer.

Each of the plurality of DL BWPs and UL BWPs may be in one of an active state and an inactive state. The active state of a first DL BWP may comprise monitoring a DL control channel of the first BWP. The inactive state of a first DL BWP may comprise refraining from monitoring a DL control channel of the first BWP.

The wireless device may activate at least two DL BWPs (e.g., DL BWP 1 3802 and DL BWP 2 3804) of the plurality of DL BWPs. Activating the at least two DL BWPs may comprise activating a first DL BWP of the at least two DL BWPs in a first slot and activating a second DL BWP of the at least two DL BWPs in a second slot. The first slot and the second slot may be different.

The wireless device may activate at least two UL BWPs (e.g., UL BWP 1 3806 and UL BWP 2 3808) of the plurality of UL BWPs. Activating the at least two UL BWPs may comprise activating a first UL BWP of the at least two UL BWPs in a third slot and activating a second UL BWP of the at least two UL BWPs in a fourth slot. The second slot and the fourth slot may be different.

The wireless device may start BWP-specific inactivity timers corresponding to the at least two DL BWPs, for example, after or in response to the activating the at least two DL BWPs. The wireless device may start BWP inactivity timers of the at least two downlink BWPs (e.g., first BWP inactivity timer of the DL BWP-1 and second BWP inactivity timer of the DL BWP-2), for example, if the wireless device activates at least two downlink BWPs (e.g., DL BWP-1 and DL-BWP-2). The starting the BWP-specific inactivity timers corresponding to the at least two DL BWPs may comprise (i) starting a first BWP-specific inactivity timer of a first DL BWP of the at least two DL BWPs, for example, after or in response to activating the first DL BWP, and/or (ii) starting a second BWP-specific inactivity timer of a second DL BWP of the at least two DL BWPs, for example, after or in response to activating the second DL BWP.

At least one of the at least two UL BWPs (e.g., the UL BWP 3806 and/or the UL BWP 2 3808), for example, may be configured with PRACH resources. The wireless device may initiate an RA procedure, for example, if at least one of the at least two UL BWPs (e.g., the UL BWP 3806 and/or the UL BWP 2 3808) are configured with PRACH resources. The at least two UL BWPs (e.g., the UL BWP 1 3806 and/or the UL BWP 2 3808) may not be configured with PRACH resources. The wireless device may select, based on one or more criteria, at least one DL BWP (e.g., selected DL BWP(s)) of the at least two DL BWPs and at least one UL BWP (e.g., selected UL BWP(s)) of the at least two UL BWPs, if the at least two UL BWPs are not configured with PRACH resources, for example, after or in response to initiating the RA procedure.

The wireless device may switch from the selected DL BWP(s) to an initial DL BWP 3812 and/or from the selected UL BWP(s) to an initial UL BWP 3810, for example, after or in response to determining of the selected DL BWP(s) and the selected UL BWP(s). The wireless device may perform the RA procedure on the initial UL BWP 3810 and/or the initial DL BWP 3812, for example, based on the switching.

The one or more criteria for determining BWPs (e.g., DL BWP(s) and/or UL BWP(s)) may be based on a value of a BWP-specific index. The determining may comprise, for example, selecting an UL BWP with a lowest UL BWP-specific index among at least two UL BWP-specific indexes of the at least two UL BWPs. The determining may comprise, for example, selecting a DL BWP with a lowest DL BWP-specific index among at least two DL BWP-specific indexes of the at least two DL BWPs. The determining may comprise, for example, selecting a DL BWP with a highest DL BWP-specific index among at least two DL BWP-specific indexes of the at least two DL BWPs. The determining may comprise, for example, selecting a UL BWP with a highest UL BWP-specific index among at least two UL BWP-specific indexes of the at least two UL BWPs.

The determining may comprise, for example, selecting a DL BWP, of the at least two DL BWPs, that is a primary DL BWP. The determining may comprise, for example, selecting an UL BWP, of the at least two UL BWPs, that is a primary UL BWP. The determining may comprise, for example, selecting a DL BWP, of the at least two DL BWPs, that is a secondary DL BWP. The determining may comprise, for example, selecting an UL BWP, of the at least two UL BWPs, that is a secondary UL BWP.

The determining may comprise, for example, selecting an UL BWP associated with a lowest numerology index among the at least two UL BWPs. The determining may comprise, for example, selecting an UL BWP associated with a highest numerology index among the at least two UL BWPs. The determining may comprise, for example, selecting a DL BWP with a lowest numerology index among the at least two DL BWPs. The determining may comprise, for example, selecting a DL BWP with a highest numerology index among the at least two DL BWPs. The determining may comprise, for example, selecting the at least two DL BWPs and the at least two UL BWPs. The determining may comprise, for example, selecting all of active DL BWPs and all of active UL BWPs.

Figure 39:
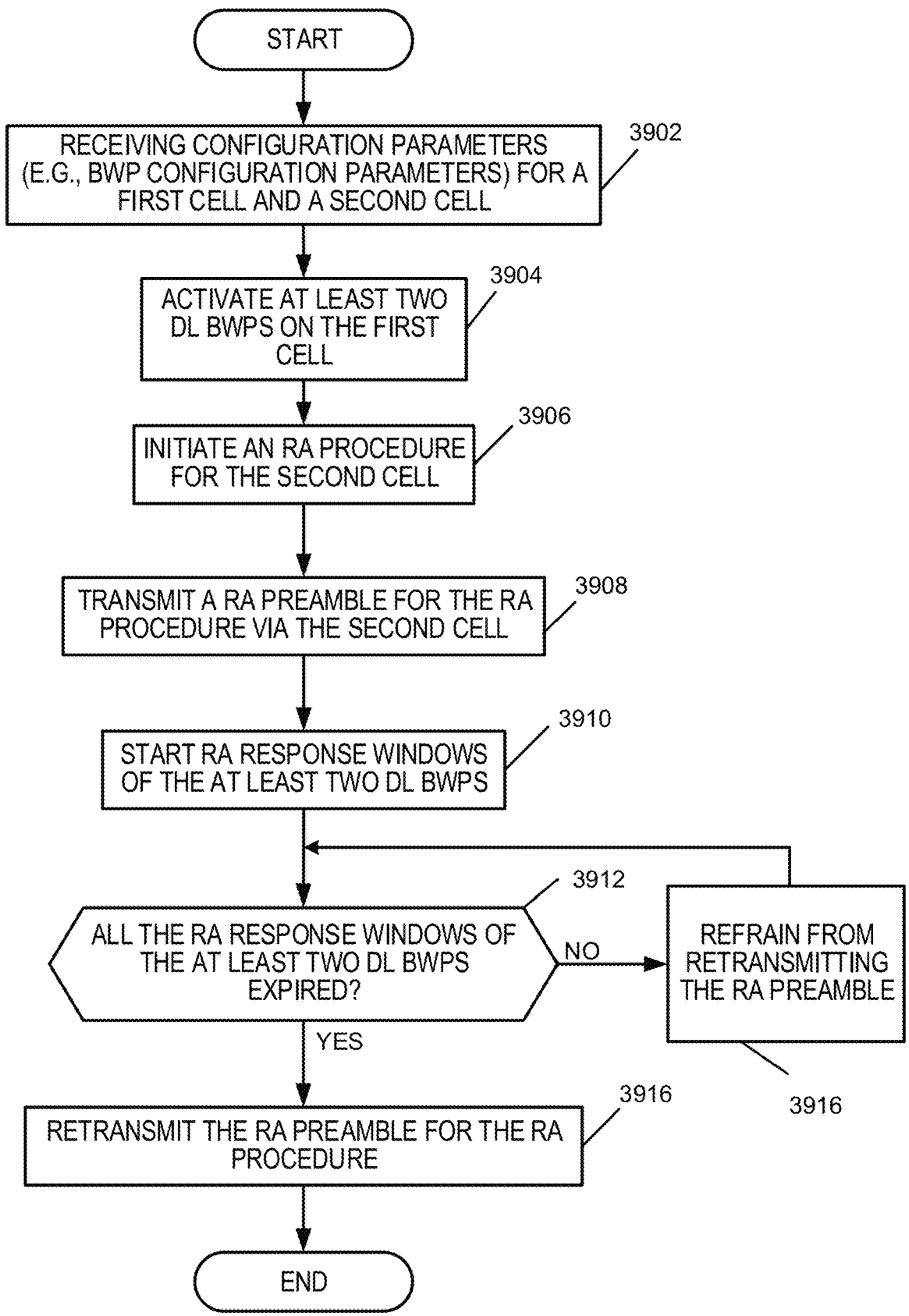
FIG. 39 shows an example method for multiple active BWP operations.

FIG. 39 shows an example method for multiple active BWPs operations. At step 3902, a wireless device may receive configuration parameters (e.g., BWP configuration parameters) for a first cell (e.g., PCell) and a second cell (e.g., SCell). At step 3904, the wireless device may activate at least two DL BWPs (e.g., a first DL BWP and a second DL BWP) that are active of the first cell. At step 3906, the wireless device may initiate an RA procedure for the second cell. At step 3908, the wireless device may send (e.g., transmit), via the second cell, an RA preamble for the RA procedure. At step 3910, the wireless device may start a RA response windows at the at least two DL BWPs (e.g., a first RA response window of the first DL BWP and a second RA response window of the second DL BWP). At step 3912, the wireless device may determine whether all of the RA response windows (e.g., the first RA response window and the second RA response window) have expired. At step 3916, the wireless device may refrain from resending (e.g., retransmitting) the RA preamble, for example, if the wireless device determines that all of the RA response windows (e.g., the first RA response window and the second RA response window) have not expired. At step 3916, the wireless device may resend (e.g., retransmit) the RA preamble, for example, if the wireless device determines that all of the RA response windows (e.g., the first RA response window and the second RA response window) have expired.

Figure 40:
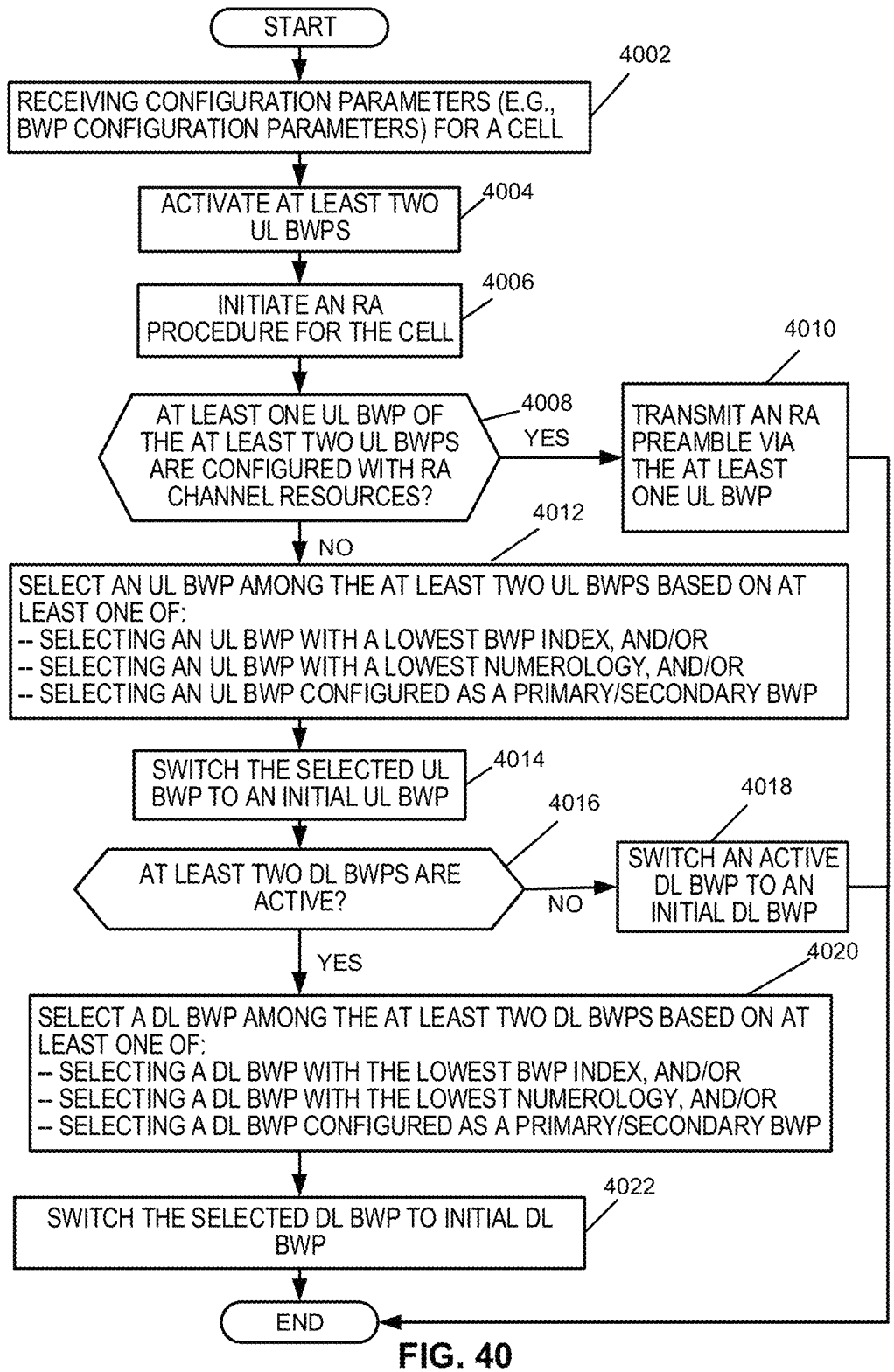
FIG. 40 shows an example method for multiple active BWP operations.

FIG. 40 shows an example method for multiple active BWPs operation. At step 4002, a wireless device may receive configuration parameters (e.g., BWP configuration parameters) for a cell. At step 4004, the wireless device may activate at least two UL BWPs. At step 4006, the wireless device may initiate an RA procedure for the cell. At step 4008, the wireless device may determine whether at least one UL BWP of the two UL BWPs is configured with RA channel resources. At step 4010, the wireless device may transmit an RA preamble, for example, if the wireless device determines that at least one UL BWP of the two UL BWPs is configured with RA channel resources. At step 4012, the wireless device may select an UL BWP from among the at least two UL BWPs, for example, based on at least one of: (i) selecting an UL BWP with a lowest BWP index, (ii) selecting an UL BWP with a lowest numerology, and/or (iii) selecting an UL BWP configured as a primary/secondary BWP. At step 4014, the wireless device may switch the selected UL BWP to an initial UL BWP. At step 4016, the wireless device may determine whether at least two DL BWPs are active. At step 4018, the wireless device may switch an active DL BWP to an initial DL, for example, if the wireless device determines that at least two DL BWPs are not active. At step 4020, the wireless device may select a DL BWP from among the at least two DL BWPs, for example, based on at least one of: (i) selecting a DL BWP with a lowest BWP index, (ii) selecting a DL BWP with a lowest numerology, and/or (iii) selecting a DL BWP configured as a primary/secondary BWP. At step 4022, the wireless device may switch the selected DL BWP to an initial DL BWP.

A base station may send, to a wireless device that may receive, one or more configuration parameters for uplink bandwidth parts (BWPs) of a cell. The wireless device may activate at least two uplink BWPs of the uplink BWPs. The wireless device may initiate a random access procedure for the cell. The wireless device may select, based on determining that the at least two uplink BWPs are not configured with random access channel resources, a first uplink BWP of the at least two uplink BWPs. The wireless device may switch from the first uplink BWP to an initial uplink BWP of the uplink BWPs. The wireless device may send, via the initial uplink BWP, a preamble for the random access procedure. The wireless device may activate a first downlink BWP and a second downlink BWP of at least two downlink BWPs. The first downlink BWP may be associated with a first random access response (RAR) monitoring window. The second downlink BWP may be associated with a second RAR monitoring window. The wireless device may start, based on sending the preamble, the first RAR monitoring window and the second RAR monitoring window for monitoring a random access response to the preamble. The wireless device may determine that the first RAR monitoring window and/or the second RAR monitoring window have expired. The wireless device may send, based on determining that the first RAR monitoring window and/or that the second RAR monitoring window has expired, at least one second preamble. The wireless device may refrain from switching (e.g., may not switch) from a second uplink BWP, of the at least two uplink BWPs, to the initial uplink BWP. The second uplink BWP may be different from the uplink BWP. The wireless device may activate the at least two uplink BWPs by activating a first uplink BWP of the at least two uplink BWPs in a first slot and/or activating a second uplink BWP of the at least two uplink BWPs in a second slot. The one or more configuration parameters may indicate a BWP-specific index for each of the uplink BWPs. The wireless device may select the first uplink BWP based on a first BWP-specific index associated with the first uplink BWP. The wireless device may select the first uplink BWP based on a highest or a lowest BWP-specific index relative to BWP-specific indexes of the at least two uplink BWPs. The wireless device may select the first uplink BWP based on the first uplink BWP being a primary uplink BWP. The wireless device may select the first uplink based on the first uplink BWP being a secondary uplink BWP. The one or more configuration parameters may indicate a BWP-specific numerology for each of the uplink BWPs. The wireless device may select an uplink BWP based on a highest or lowest BWP-specific numerology relative to BWP-specific numerologies of the at least two uplink BWPs. The base station may send, to the wireless device that may receive, one or more configuration parameters for downlink BWPs of the cell. The wireless device may activate at least two downlink BWPs of the downlink BWPs. The wireless device may select a first downlink BWP of the at least two downlink BWPs, for example, based on determining that the at least two uplink BWPs are not configured with random access channel resources. The wireless device may switch from the first downlink BWP to an initial downlink BWP of the downlink BWPs. The one or more configuration parameters may indicate a BWP specific index for each of the downlink BWPs. The wireless device may select a first downlink BWP based on the first downlink BWP being a primary downlink BWP. The wireless device may select a first downlink BWP based on the first downlink BWP being a secondary downlink BWP. The one or more configuration parameters may indicate a BWP specific numerology for each of the downlink BWPs. The wireless device may refrain from switching (e.g., may not switch) from a second downlink BWP, of the at least two downlink BWPs, to the initial downlink BWP. The second downlink BWP may be different from the downlink BWP. The wireless device may activate a first downlink BWP of the at least two downlink BWPs in a first slot. The wireless device may activate a second downlink BWP of the at least two downlink BWPs in a second slot.

A base station may send, to a wireless device that may receive, one or more configuration parameters for bandwidth parts (BWPs) of a cell. The wireless device may activate at least two BWPs of the BWPs. The wireless device may initiate a random access procedure for the cell. The wireless device may select, based on determining that the at least two BWPs are not configured with random access channel resources, a first BWP of the at least two BWPs. The wireless device may switch from the first BWP to a different BWP of the BWPs. The wireless device may send, via the different BWP, a preamble for the random access procedure. The first BWP may comprise a first uplink BWP that may be associated with a first random access response (RAR) monitoring window. A second BWP of the at least two BWPs may comprise a second uplink BWP that may be associated with a second RAR monitoring window. The wireless device may start, based on sending the preamble, the first RAR monitoring window and the second RAR monitoring window for monitoring a random access response to the preamble. The wireless device may determine that the first RAR monitoring window and/or the second RAR monitoring window have expired. The wireless device may send, based on determining that the first RAR monitoring window and/or the second RAR monitoring window have expires, at least one second preamble. The wireless device may activate the first BWP in a first slot. The wireless device may activate a second BWP of the at least two BWPs in a second slot. The one or more configuration parameters may indicate a BWP-specific index for each of the at least two BWPs. The wireless device may select the first BWP based on a first BWP-specific index associated with the first BWP. The wireless device may select the first BWP based on a highest or a lowest BWP-specific index relative to BWP-specific indexes of the at least two BWPs. The wireless device may select the first BWP based on the first BWP being a primary BWP. The wireless device may select the first BWP based on the first BWP being a secondary uplink BWP. The one or more configuration parameters may indicate a BWP-specific numerology for each of the BWPs. The wireless device may select the first BWP based on a highest or lowest BWP-specific numerology relative to BWP-specific numerologies of the at least two BWPs. The at least two BWPs may comprise at least two downlink BWPs and at least one uplink BWP.

A base station may send, to a wireless device that may receive, one or more configuration parameters for a first BWP of a first cell and a second BWP of the first cell. The wireless device may activate the first BWP. The wireless device may activate the second BWP. The first BWP may be associated with a first random access response (RAR) monitoring window. The second BWP may be associated with a second RAR monitoring window. The wireless device may send, via a second cell, at least one preamble for a random access procedure. The wireless device may start, based on sending the at least one preamble, the first RAR monitoring window and the second RAR monitoring window for monitoring a random access response to the at least one preamble. The wireless device may determine that the first RAR monitoring window and the second RAR monitoring window have expired. The wireless device may send, based on the determining, at least one second preamble. The wireless device may switch, based on determining that the first RAR monitoring window and/or the second RAR monitoring window have expired, from the first BWP to a third BWP of the first cell.

Figure 41:
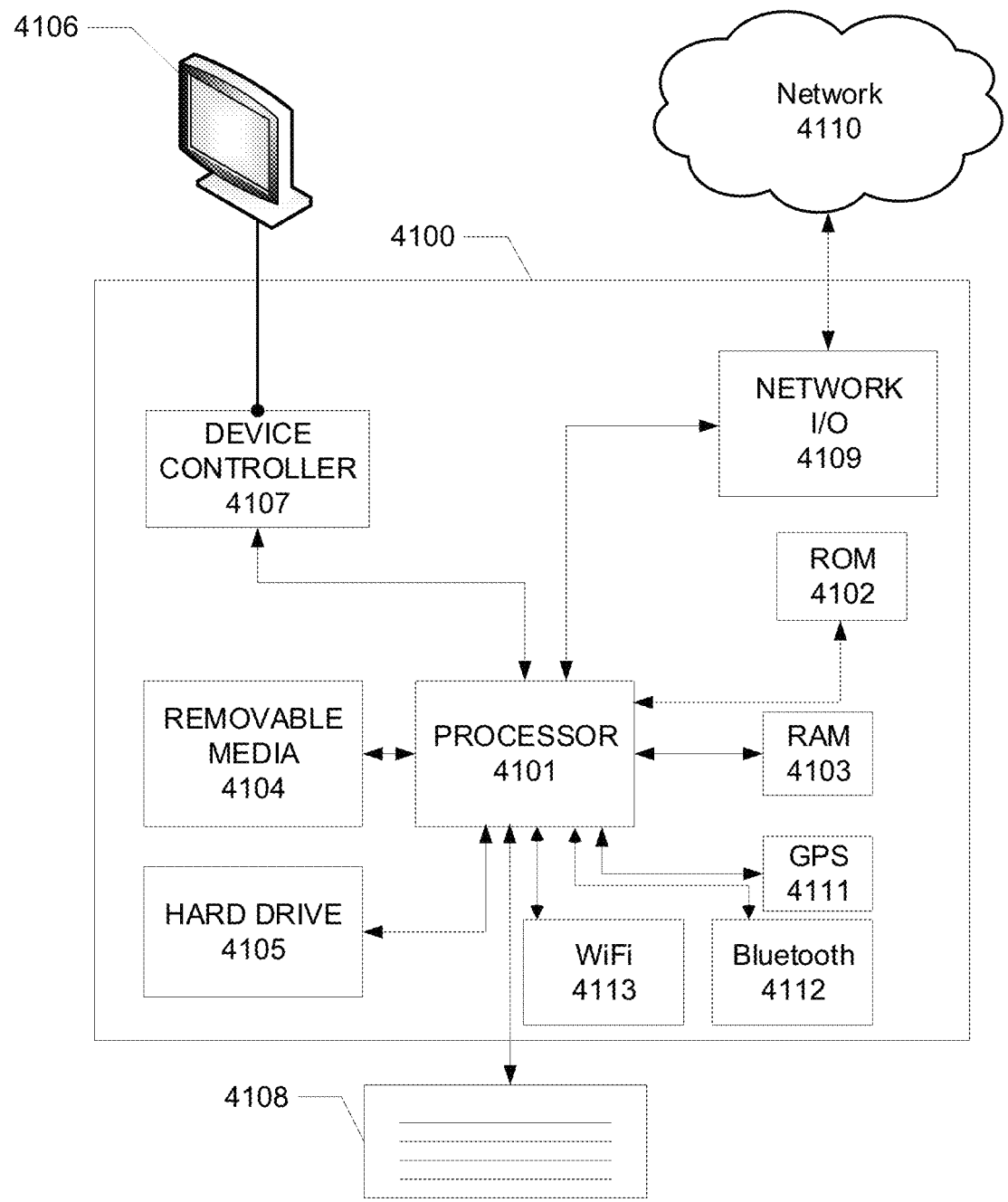
FIG. 41 shows example elements of a computing device that may be used to implement any of the various devices described herein.

FIG. 41 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4100 may include one or more processors 4101, which may execute instructions stored in the random access memory (RAM) 4103, the removable media 4104 (such as a Universal Serial Bus (USB) drive, compact disk (CD) or digital versatile disk (DVD), or floppy disk drive), or any other desired storage medium. Instructions may also be stored in an attached (or internal) hard drive 4105. The computing device 4100 may also include a security processor (not shown), which may execute instructions of one or more computer programs to monitor the processes executing on the processor 4101 and any process that requests access to any hardware and/or software components of the computing device 4100 (e.g., ROM 4102, RAM 4103, the removable media 4104, the hard drive 4105, the device controller 4107, a network interface 4109, a GPS 4111, a Bluetooth interface 4112, a WiFi interface 4113, etc.). The computing device 4100 may include one or more output devices, such as the display 4106 (e.g., a screen, a display device, a monitor, a television, etc.), and may include one or more output device controllers 4107, such as a video processor. There may also be one or more user input devices 4108, such as a remote control, keyboard, mouse, touch screen, microphone, etc. The computing device 4100 may also include one or more network interfaces, such as a network interface 4109, which may be a wired interface, a wireless interface, or a combination of the two. The network interface 4109 may provide an interface for the computing device 4100 to communicate with a network 4110 (e.g., a RAN, or any other network). The network interface 4109 may include a modem (e.g., a cable modem), and the external network 4110 may include communication links, an external network, an in-home network, a provider's wireless, coaxial, fiber, or hybrid fiber/coaxial distribution system (e.g., a DOCSIS network), or any other desired network. Additionally, the computing device 4100 may include a location-detecting device, such as a global positioning system (GPS) microprocessor 4111, which may be configured to receive and process global positioning signals and determine, with possible assistance from an external server and antenna, a geographic position of the computing device 4100.

The example in FIG. 41 may be a hardware configuration, although the components shown may be implemented as software as well. Modifications may be made to add, remove, combine, divide, etc. components of the computing device 4100 as desired. Additionally, the components may be implemented using basic computing devices and components, and the same components (e.g., processor 4101, ROM storage 4102, display 4106, etc.) may be used to implement any of the other computing devices and components described herein. For example, the various components described herein may be implemented using computing devices having components such as a processor executing computer-executable instructions stored on a computer-readable medium, as shown in FIG. 41. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:
1. A method comprising:
activating, by a wireless device, a plurality of downlink bandwidth parts (BWPs) of a cell and an uplink BWP of the cell, wherein the plurality of downlink BWPs are associated with a plurality of downlink BWP indexes;
based on the plurality of downlink BWP indexes being different from an uplink BWP index associated with the uplink BWP, switching from a first downlink BWP, of the plurality of downlink BWPs, to a second downlink BWP as an active BWP of the cell, wherein the second downlink BWP is associated with a downlink BWP index that is the same as the uplink BWP index; and
sending, via the uplink BWP, a preamble for a random access procedure.
2. The method of claim 1, further comprising:
activating the second downlink BWP; and
monitoring at least one downlink control channel of the second downlink BWP for a random access response.
3. The method of claim 1, wherein the activating the plurality of downlink BWPs and the uplink BWP comprises:
activating, as a first active downlink BWP, the first downlink BWP in a first slot;
activating, as a second active downlink BWP, the second downlink BWP in a second slot; and
activating the uplink BWP in a third slot, wherein each of the first slot, the second slot, and the third slot are different slots.
4. The method of claim 1, further comprising selecting the first downlink BWP based on a determination of a downlink BWP associated with at least one of:
a lowest or highest downlink BWP index relative to the plurality of downlink BWP indexes; or
a lowest or highest BWP numerology relative to BWP numerologies associated with the plurality of downlink BWPs.
5. The method of claim 1, further comprising selecting the first downlink BWP based on a determination of whether the first downlink BWP comprises a primary BWP or a secondary BWP.

6. The method of claim 1, further comprising selecting the first downlink BWP based on a determination of whether the first downlink BWP comprises a default BWP or a non-default BWP.

7. The method of claim 1, wherein the switching from the first downlink BWP to the second downlink BWP comprises maintaining the first downlink BWP in an active state.

8. The method of claim 1, wherein the switching from the first downlink BWP to the second downlink BWP comprises deactivating the first downlink BWP.

9. The method of claim 1, wherein each of the plurality of downlink BWP indexes is different from all the other downlink BWP indexes of the plurality of downlink BWP indexes.

10. A method comprising:
activating, by a wireless device, a plurality of downlink bandwidth parts (BWPs) and an uplink BWP, wherein the plurality of downlink BWPs are associated with a plurality of downlink BWP indexes;
based on the plurality of downlink BWP indexes being different from an uplink BWP index associated with the uplink BWP, activating a first downlink BWP associated with a downlink BWP index that is the same as the uplink BWP index; and
sending, via the uplink BWP, a preamble for a random access procedure.

11. The method of claim 10, further comprising:
monitoring at least one downlink control channel of the first downlink BWP for a random access response; and
based on the activating the first downlink BWP, deactivating a second downlink BWP of the plurality of downlink BWPs.

12. The method of claim 10, wherein the activating the first downlink BWP comprises activating the first downlink BWP in a first slot, and wherein the activating the plurality of downlink BWPs and the uplink BWP comprises:
activating a second downlink BWP in a second slot; and
activating the uplink BWP in a third slot, wherein each of the first slot, the second slot, and the third slot are different slots.

13. The method of claim 10, further comprising determining the first downlink BWP for activation based on at least one of:
a lowest or highest downlink BWP index relative to the plurality of downlink BWP indexes; or
a lowest or highest BWP numerology relative to BWP numerologies associated with the plurality of downlink BWPs.

14. The method of claim 10, further comprising determining the first downlink BWP for activation based on whether the first downlink BWP comprises a primary BWP or a secondary BWP.

15. The method of claim 10, further comprising determining the first downlink BWP for activation based on whether the first downlink BWP comprises a default BWP or a non-default BWP.

16. The method of claim 10, further comprising switching from a second downlink BWP to the first downlink BWP.

17. The method of claim 16, wherein the switching from the second downlink BWP to the first downlink BWP comprises deactivating the second downlink BWP.

18. A method comprising:
activating, by a wireless device, a plurality of downlink bandwidth parts (BWPs and an uplink BWP, wherein the plurality of downlink BWPs are associated with a plurality of downlink BWP indexes; and
based on the plurality of downlink BWP indexes being different from an uplink BWP index associated with the uplink BWP, activating a first downlink BWP associated with a first downlink BWP index that is the same as the uplink BWP index, wherein:
the first downlink BWP and the plurality of downlink BWPs are both active, or
a second downlink BWP, of the plurality of downlink BWPs, and the first downlink BWP are both active based on the wireless device switching from the second downlink BWP to the first downlink BWP.

19. The method of claim 18, wherein the activating the first downlink BWP is based on at least one of:
the first downlink BWP index;
a BWP numerology of the first downlink BWP;
a second downlink BWP index of the second downlink BWP; or
a BWP numerology of the second downlink BWP.

20. The method of claim 18, further comprising:
receiving, via at least one downlink control channel of the first downlink BWP, a random access response; and
based on the receiving the random access response, switching from the second downlink BWP to the first downlink BWP.

21. The method of claim 18, further comprising:
receiving a physical downlink control channel (PDCCH) order; and
based on the PDCCH order, sending a random access preamble via the uplink BWP.

22. The method of claim 18, further comprising selecting the first downlink BWP for activation based on a determination of whether the first downlink BWP comprises a primary BWP or a secondary BWP.

23. The method of claim 18, further comprising selecting the first downlink BWP for activation based on a determination of whether the first downlink BWP comprises a default BWP or a non-default BWP.

24. The method of claim 18, wherein each of the plurality of downlink BWP indexes is different from all the other downlink BWP indexes of the plurality of downlink BWP indexes.

25. A wireless device comprising:
one or more processors; and
memory storing instructions that, when executed by one or more processors, cause the wireless device to:
activate a plurality of downlink bandwidth parts (BWPs) and an uplink BWP, wherein the plurality of downlink BWPs are associated with a plurality of downlink BWP indexes;
based on the plurality of downlink BWP indexes being different from an uplink BWP index associated with the uplink BWP, activate a first downlink BWP associated with a downlink BWP index that is the same as the uplink BWP index; and
send, via the uplink BWP, a preamble for a random access procedure.

26. The wireless device of claim 25, wherein the instructions, when executed by the one or more processors, cause the wireless device to:
monitor at least one downlink control channel of the first downlink BWP for a random access response; and
based on the activating the first downlink BWP, deactivate a second downlink BWP of the plurality of downlink BWPs.

27. The wireless device of claim 25, wherein the instructions, when executed by the one or more processors, cause the wireless device to activate the first downlink BWP by causing activating the first downlink BWP in a first slot, and wherein the instructions, when executed by the one or more processors, further cause the wireless device to activate the plurality of downlink BWPs and the uplink BWP by causing:

activating a second downlink BWP in a second slot; and
activating the uplink BWP in a third slot, wherein each of the first slot, the second slot, and the third slot are different slots.

28. The wireless device of claim 25, wherein the instructions, when executed by the one or more processors, cause the wireless device to determine the first downlink BWP for activation based on at least one of:
a lowest or highest downlink BWP index relative to the plurality of downlink BWP indexes; or
a lowest or highest BWP numerology relative to BWP numerologies associated with the plurality of downlink BWPs.

29. The wireless device of claim 25, wherein the instructions, when executed by the one or more processors, cause the wireless device to determine the first downlink BWP for activation based on whether the first downlink BWP comprises a primary BWP or a secondary BWP.

30. The wireless device of claim 25, wherein the instructions, when executed by the one or more processors, cause the wireless device to determine the first downlink BWP for activation based on whether the first downlink BWP comprises a default BWP or a non-default BWP.

31. The wireless device of claim 25, wherein the instructions, when executed by the one or more processors, cause the wireless device to switch from a second downlink BWP to the first downlink BWP.

32. The wireless device of claim 31, wherein the instructions, when executed by the one or more processors, cause the wireless device to switch from the second downlink BWP to the first downlink BWP by causing deactivating the second downlink BWP.

33. One or more non-transitory computer readable media storing instructions that, when executed cause:
activating a plurality of downlink bandwidth parts (BWPs) and an uplink BWP, wherein the plurality of downlink BWPs are associated with a plurality of downlink BWP indexes;
based on the plurality of downlink BWP indexes being different from an uplink BWP index associated with the uplink BWP, activating a first downlink BWP associated with a downlink BWP index that is the same as the uplink BWP index; and
sending, via the uplink BWP, a preamble for a random access procedure.

34. The one or more non-transitory computer readable media of claim 33, wherein the instructions, when executed, further cause:
monitoring at least one downlink control channel of the first downlink BWP for a random access response; and
based on the activating the first downlink BWP, deactivating a second downlink BWP of the plurality of downlink BWPs.

35. The one or more non-transitory computer readable media of claim 33, wherein the instructions, when executed, further cause activating the first downlink BWP by causing activating the first downlink BWP in a first slot, and wherein the instructions, when executed, further cause activating the plurality of downlink BWPs and the uplink BWP by causing:
activating a second downlink BWP in a second slot; and
activating the uplink BWP in a third slot, wherein each of the first slot, the second slot, and the third slot are different slots.

36. The one or more non-transitory computer readable media of claim 33, wherein the instructions, when executed, further cause determining the first downlink BWP for activation based on at least one of:
a lowest or highest downlink BWP index relative to the plurality of downlink BWP indexes; or
a lowest or highest BWP numerology relative to BWP numerologies associated with the plurality of downlink BWPs.

37. The one or more non-transitory computer readable media of claim 33, wherein the instructions, when executed, further cause determining the first downlink BWP for activation based on whether the first downlink BWP comprises a primary BWP or a secondary BWP.

38. The one or more non-transitory computer readable media of claim 33, wherein the instructions, when executed, further cause determining the first downlink BWP for activation based on whether the first downlink BWP comprises a default BWP or a non-default BWP.

39. The one or more non-transitory computer readable media of claim 33, wherein the instructions, when executed, further cause switching from a second downlink BWP to the first downlink BWP.

40. The one or more non-transitory computer readable media of claim 39, wherein the instructions, when executed, further cause switching from the second downlink BWP to the first downlink BWP by causing deactivating the second downlink BWP.

41. A system comprising:
a wireless device comprising:
one or more processors; and
memory storing instructions that, when executed by the one or more processors of the wireless device, cause the wireless device to:
activate a plurality of downlink bandwidth parts (BWPs) and an uplink BWP, wherein the plurality of downlink BWPs are associated with a plurality of downlink BWP indexes;
based on the plurality of downlink BWP indexes being different from an uplink BWP index associated with the uplink BWP, activate a first downlink BWP associated with a downlink BWP index that is the same as the uplink BWP index; and
send, via the uplink BWP, a preamble for a random access procedure; and
a base station comprising:
one or more processors; and
memory storing instructions that, when executed by the one or more processors of the base station, cause the base station to:
receive, via the uplink BWP, the preamble for the random access procedure.

42. The system of claim 41, wherein the instructions stored in the memory of the wireless device, when executed by the one or more processors of the wireless device, further cause the wireless device to:
monitor at least one downlink control channel of the first downlink BWP for a random access response; and
based on the activating the first downlink BWP, deactivate a second downlink BWP of the plurality of downlink BWPs.

43. The system of claim 41, wherein the instructions stored in the memory of the wireless device, when executed by the one or more processors of the wireless device, further cause the wireless device to activate the first downlink BWP by causing activating the first downlink BWP in a first slot, and wherein the instructions stored in the memory of the wireless device, when executed by the one or more processors of the wireless device, further cause the wireless device to activate the plurality of downlink BWPs and the uplink BWP by causing:

activating a second downlink BWP in a second slot; and
    activating the uplink BWP in a third slot, wherein each of the first slot, the second slot, and the third slot are different slots.

44. The system of claim 41, wherein the instructions stored in the memory of the wireless device, when executed by the one or more processors of the wireless device, further cause the wireless device to determine the first downlink BWP for activation based on at least one of:

a lowest or highest downlink BWP index relative to the plurality of downlink BWP indexes; or
    a lowest or highest BWP numerology relative to BWP numerologies associated with the plurality of downlink BWPs.

45. The system of claim 41, wherein the instructions stored in the memory of the wireless device, when executed by the one or more processors of the wireless device, further cause the wireless device to determine the first downlink BWP for activation based on whether the first downlink BWP comprises a primary BWP or a secondary BWP.

46. The system of claim 41, wherein the instructions stored in the memory of the wireless device, when executed by the one or more processors of the wireless device, further cause the wireless device to determine the first downlink BWP for activation based on whether the first downlink BWP comprises a default BWP or a non-default BWP.

47. The system of claim 41, wherein the instructions stored in the memory of the wireless device, when executed by the one or more processors of the wireless device, further cause the wireless device to switch from a second downlink BWP to the first downlink BWP.

48. The system of claim 47, wherein the instructions stored in the memory of the wireless device, when executed by the one or more processors of the wireless device, further cause the wireless device to switch from the second downlink BWP to the first downlink BWP by causing deactivating the second downlink BWP.

* * * * *

UNITED STATES PATENT AND TRADEMARK OFFICE
CERTIFICATE OF CORRECTION

PATENT NO. : 11,659,596 B2
APPLICATION NO. : 16/950631
DATED : May 23, 2023
INVENTOR(S) : Cirik et al.

It is certified that error appears in the above-identified patent and that said Letters Patent is hereby corrected as shown below:

On the Title Page

Page 4, Column 1, item (56) Other Publications, Line 53:
Delete "Remaing" and insert --Remaining-- therefor Page 4, Column 2, item (56) Other Publications, Line 36:
Delete "Remaing" and insert --Remaining-- therefor In the Drawings Sheet 8 of 41, Fig. 8:
Delete "840" and insert --801-- therefor Sheet 8 of 41, Fig. 8:
Delete "830" and insert --804-- therefor Sheet 8 of 41, Fig. 8:
Delete "850" and insert --807-- therefor Sheet 8 of 41, Fig. 8:
Delete "810" and insert --806-- therefor Sheet 8 of 41, Fig. 8:
Delete "820" and insert --805-- therefor Sheet 39 of 41, Fig. 39, Reference Numeral 3916, Line 1 (First Occurrence):
Delete "3916" and insert --3914-- therefor Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,659,596 B2

In the Specification

Column 11, Detailed Description, Line 26:
Delete "MasterinformationBlock" and insert --MasterInformationBlock-- therefor Column 13, Detailed Description, Line 25:
After "2", insert --120B-- therefor Column 14, Detailed Description, Line 53:
After "channel", insert --.-- therefor Column 27, Detailed Description, Line 51:
Delete "MN" and insert --SN-- therefor Column 32, Detailed Description, Line 30:
Delete "1250," and insert --1240,-- therefor Column 36, Detailed Description, Line 37:
After "layer", insert --.-- therefor Column 46, Detailed Description, Line 16:
Delete "m+1)," and insert --m+l),-- therefor Column 46, Detailed Description, Line 21:
Delete "m+1)," and insert --m+l),-- therefor Column 46, Detailed Description, Line 26:
Delete "m+1" and insert --m+l-- therefor Column 46, Detailed Description, Line 59:
Delete "m+1)," and insert --m+l),-- therefor Column 46, Detailed Description, Line 61:
Delete "m+1)." and insert --m+l).-- therefor Column 47, Detailed Description, Line 1:
Delete "m+1)," and insert --m+l),-- therefor Column 47, Detailed Description, Line 3:
Delete "m+1)." and insert --m+l).-- therefor Column 47, Detailed Description, Line 9:
Delete "m+1" and insert --m+l-- therefor Column 57, Detailed Description, Line 7:
After "manner", insert --.-- therefor Column 79, Detailed Description, Line 15:
After "running)", insert --.-- therefor Column 79, Detailed Description, Line 23:
After "running)", insert --.-- therefor Column 79, Detailed Description, Line 27:
After "running)", insert --.-- therefor Column 80, Detailed Description, Line 50:
After "running)", insert --.-- therefor Column 81, Detailed Description, Line 67:
Delete "oninitiating" and insert --on initiating-- therefor Column 84, Detailed Description, Line 66:
Delete "T2)." and insert --$T_2$).-- therefor Column 84, Detailed Description, Line 67:
Delete "2306," and insert --2308,-- therefor Column 88, Detailed Description, Line 21:
Delete "2406," and insert --2408,-- therefor Column 91, Detailed Description, Line 56:
Delete "2506," and insert --2508,-- therefor Column 91, Detailed Description, Line 57:
Delete "T3)." and insert --$T_3$).-- therefor Column 91, Detailed Description, Line 65:
Delete "T2" and insert --$T_2$-- therefor Column 92, Detailed Description, Line 12:
Delete "T1" and insert --$T_1$-- therefor Column 92, Detailed Description, Line 33:
Delete "T3" and insert --$T_3$-- therefor Column 92, Detailed Description, Line 34:
After "BWP", insert --.-- therefor Column 92, Detailed Description, Line 36:
Delete "T3" and insert --$T_3$-- therefor Column 94, Detailed Description, Line 16:
Delete "T1." and insert --$T_1$.-- therefor Column 94, Detailed Description, Line 18:
Delete "T0)." and insert --$T_0$).-- therefor Column 94, Detailed Description, Line 20:
Delete "T0." and insert --$T_0$.-- therefor Column 94, Detailed Description, Line 23:
Delete "T2)." and insert --$T_2$).-- therefor Column 94, Detailed Description, Line 52:
Delete "T1," and insert --$T_1$,-- therefor Column 96, Detailed Description, Line 35:
Delete "T3)," and insert --$T_3$),-- therefor Column 96, Detailed Description, Line 37:
Delete "T3)," and insert --$T_3$),-- therefor Column 96, Detailed Description, Line 66:
Delete "T1)," and insert --$T_1$),-- therefor Column 97, Detailed Description, Line 29:
Delete "T3)," and insert --$T_3$),-- therefor Column 97, Detailed Description, Line 33:
Delete "T3)," and insert --$T_3$),-- therefor Column 98, Detailed Description, Line 12:
Delete "T3)." and insert --$T_3$).-- therefor Column 98, Detailed Description, Line 62:
Delete "T0." and insert --$T_0$.-- therefor Column 106, Detailed Description, Line 12:
Delete "receivea" and insert --receive a-- therefor Column 108, Detailed Description, Line 10:
Delete "T3" and insert --$T_3$-- therefor Column 111, Detailed Description, Line 59:
Delete "indiciated" and insert --indicated-- therefor

CERTIFICATE OF CORRECTION (continued)
U.S. Pat. No. 11,659,596 B2

Column 117, Detailed Description, Line 19:
Delete "sucessfully" and insert --successfully-- therefor Column 118, Detailed Description, Line 50:
After "contention-based.", insert --¶-- therefor Column 118, Detailed Description, Line 50:
Before "The", delete "15861"

Column 120, Detailed Description, Line 12:
Delete "baaed" and insert --based-- therefor Column 124, Detailed Description, Line 43:
Delete "T3," and insert --$T_3$,-- therefor Column 128, Detailed Description, Line 12:
After "running)", insert --.-- therefor Column 128, Detailed Description, Line 24:
Delete "T3)." and insert --$T_3$).-- therefor Column 137, Detailed Description, Line 38:
Delete "Lab VIEWMathScript." and insert --LabVIEWMathScript.-- therefor In the Claims Column 139, Claim 18, Line 65:
Delete "(BWPs" and insert --(BWPs)-- therefor